(12) United States Patent
Hodges

(10) Patent No.: US 8,607,328 B1
(45) Date of Patent: Dec. 10, 2013

(54) METHODS AND SYSTEMS FOR AUTOMATED SYSTEM SUPPORT

(76) Inventor: David Hodges, San Jose, CA (US)

( * ) Notice: Subject to any disclaimer, the term of this patent is extended or adjusted under 35 U.S.C. 154(b) by 929 days.

(21) Appl. No.: 11/073,249

(22) Filed: Mar. 4, 2005

(51) Int. Cl.
*G06F 17/00* (2006.01)

(52) U.S. Cl.
USPC .......................................... 726/15; 713/165

(58) Field of Classification Search
USPC .......................................... 726/15; 713/165
See application file for complete search history.

(56) References Cited

U.S. PATENT DOCUMENTS

| | | | |
|---|---|---|---|
| 4,096,570 A | 6/1978 | Ishibashi et al. | |
| 4,797,850 A | 1/1989 | Amitai | |
| 5,034,917 A | 7/1991 | Bland et al. | |
| 5,097,437 A | 3/1992 | Larson | |
| 5,251,310 A | 10/1993 | Smelser et al. | |
| 5,365,587 A | 11/1994 | Campbell et al. | |
| 5,530,749 A | 6/1996 | Easter et al. | |
| 5,708,715 A | 1/1998 | Vicard | |
| 5,748,554 A | 5/1998 | Barth et al. | |
| 5,826,015 A | 10/1998 | Schmidt | |
| 5,901,332 A | 5/1999 | Gephardt et al. | |
| 5,933,087 A | 8/1999 | Wright et al. | |
| 5,982,899 A | 11/1999 | Probst | |
| 5,983,353 A | 11/1999 | McHann, Jr. | |
| 5,995,405 A | 11/1999 | Trick | |
| 6,003,121 A | 12/1999 | Wirt | |
| 6,067,593 A | 5/2000 | Schade | |
| 6,076,139 A | 6/2000 | Welker et al. | |
| 6,304,970 B1 | 10/2001 | Bizzaro et al. | |
| 6,393,566 B1 | 5/2002 | Levine | |
| 6,411,943 B1 | 6/2002 | Crawford | |
| 6,944,857 B1 | 9/2005 | Glaser et al. | |
| 6,948,014 B2 | 9/2005 | Dietrich et al. | |
| 6,999,088 B1 | 2/2006 | Van Dyke et al. | |
| 7,043,617 B2 | 5/2006 | Wiliams | |
| 7,373,661 B2 * | 5/2008 | Smith et al. | 726/15 |
| 7,409,709 B2 * | 8/2008 | Smith et al. | 726/15 |

(Continued)

FOREIGN PATENT DOCUMENTS

| | | |
|---|---|---|
| TW | 527545 | 4/2003 |
| TW | 552554 | 9/2003 |
| WO | WO 91/03011 | 3/1991 |
| WO | WO 2007/016395 | 2/2007 |

OTHER PUBLICATIONS

Imagination Technologies, "POWERVER MBX—Technology Overview", Version 1.5f, May 6, 2009, Copyright 2009 Imagination Technologies Ltd., 17 pages.

(Continued)

*Primary Examiner* — Fikremariam A Yalew
(74) *Attorney, Agent, or Firm* — Blakely Sokoloff Taylor & Zafman LLP

(57) ABSTRACT

Systems, methods, and machine readable media for repairing data processing systems. In one exemplary embodiment, a computer software utility has the ability to repair a personal computer (PC) using a bootable storage medium (e.g. CD). This utility can connect to the Internet and create an encrypted virtual private network (VPN) tunnel to an automated support server network and to other PCs running a similar version of the utility. This utility, in conjunction with the automated support server network, checks the system files (e.g. DLL and system configuration files, etc.) on a PC being repaired and obtains information to perform the checking from the automated support server network and may obtain replacement system files from the automated support server network or the other PCs.

20 Claims, 11 Drawing Sheets

(56) References Cited

U.S. PATENT DOCUMENTS

| | | | |
|---|---|---|---|
| 7,493,654 B2 * | 2/2009 | Bantz et al. | 726/4 |
| 7,627,898 B2 * | 12/2009 | Beck et al. | 726/23 |
| 2001/0043500 A1 | 11/2001 | Otsuka et al. | |
| 2003/0070063 A1 * | 4/2003 | Boyle et al. | 713/2 |
| 2004/0129952 A1 | 7/2004 | Griesmer et al. | |
| 2004/0158742 A1 | 8/2004 | Srinivasan et al. | |
| 2004/0228165 A1 | 11/2004 | Kim et al. | |
| 2004/0236960 A1 * | 11/2004 | Zimmer et al. | 713/200 |
| 2005/0012759 A1 | 1/2005 | Valmiki et al. | |
| 2005/0024369 A1 | 2/2005 | Xie | |
| 2005/0149923 A1 * | 7/2005 | Lee | 717/172 |
| 2006/0129848 A1 | 6/2006 | Paksoy et al. | |
| 2006/0184651 A1 * | 8/2006 | Tirnumala | 709/220 |
| 2006/0248095 A1 | 11/2006 | Cozzani | |
| 2007/0011493 A1 * | 1/2007 | Du et al. | 714/36 |
| 2007/0150948 A1 * | 6/2007 | De Spiegeleer | 726/22 |
| 2007/0180528 A1 * | 8/2007 | Kane | 726/24 |
| 2008/0034200 A1 * | 2/2008 | Polcha et al. | 713/153 |
| 2008/0060075 A1 * | 3/2008 | Cox et al. | 726/24 |

OTHER PUBLICATIONS

INTEL, "82801E Communications I/O Controller Hub (C-ICH) for Applied Computing", 2001, 2 pages.

IINTEL, "845G Chipset Graphics Memory Controller Hum (BMCH)" Revision 1.0, Whitepaper, May 2002, 16 pages.

* cited by examiner

METHODS AND SYSTEMS FOR AUTOMATED SYSTEM SUPPORT

BACKGROUND OF THE INVENTION

Modern data processing systems, such as general purpose computer systems, allow the users to configure these systems in a variety of different ways. This great versatility and flexibility often, however, creates unstable systems which crash or hang or are otherwise rendered unusable. In addition to these problems, users, administrators and technicians face many problems from computer viruses, Ad ware, application bugs, defective or failing hardware, unintended changes by inexperienced users, etc. All of these factors can cause file and configuration corruption leading to a system failure which often results from a problem with the software stored on a data processing system. In many cases, these failures can lead to a computer system being inoperable or so overloaded that they become unusable.

Current solutions to these problems are limited and in many cases can be fairly expensive and may cause data loss. There are certain utilities which are available and which can attempt to repair certain types of problems. Examples of such utilities include "Norton Utilities." Another example of a current solution frequently employed by computer manufacturers uses a bootable CD to reload the computer to the factory state. This is known to frequently cause data loss and in many cases will reload the computer with out-of-date software. U.S. Pat. No. 6,411,943 describes a technique for providing online backup services and for providing remote antiviral protection. Other solutions may require a trained computer technician to provide a repair service which could be expensive.

SUMMARY OF THE DESCRIPTION

Methods, systems, and machine readable media for repairing data processing systems are described herein.

In one exemplary embodiment, a computer software utility has the ability to repair a personal computer using a bootable storage medium, such as a CD ROM. This utility can connect to the Internet and can create an encrypted virtual private network (VPN) tunnel, through the use of VPN client software executed from the personal computer, to an automated support server network and optionally to other personal computers running a similar version of the utility. This utility, in conjunction with the automated support server network, checks the system files, such as DLL and system configuration files, etc. on the PC being repaired and obtains information to perform the checking from the automated support server network and may obtain replacement system files from the automated support server network or from the other personal computers having compatible software, such as compatible operating systems.

A further exemplary method described herein includes connecting to at least one remotely located server system through an encrypted virtual private network tunnel and checking a plurality of system files stored on the client system through the encrypted virtual private network tunnel.

The use of one or more virtual private network tunnels allows for, in certain embodiments, the transmission of information in a secure and authenticated manner between systems, such as between a client system being repaired and one or more server computer systems which are part of the automated support server system, and these one or more VPN tunnels also allow for secure and authenticated communication between the client system being repaired and other compatible client systems which provide a peer-to-peer connection between the two client systems. The use of other client systems to provide the replacement files allows for a distribution of the processing load across the network established, for example, by the VPN tunnel, which may be considered to be a form of an Intranet.

Certain embodiments of the present invention may be used with various different operating systems, including the Windows operating system from Microsoft, or Linux operating systems, or the Macintosh operating system from Apple Computer, Inc.

Other aspects of the present invention include various data processing systems which perform methods described herein as well as machine readable media which cause the performance of these methods described herein.

BRIEF DESCRIPTION OF THE DRAWINGS

The present invention is illustrated by way of example and not limitation in the figures of the accompanying drawings in which like references indicate similar elements.

DETAILED DESCRIPTION

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

Figure 1:
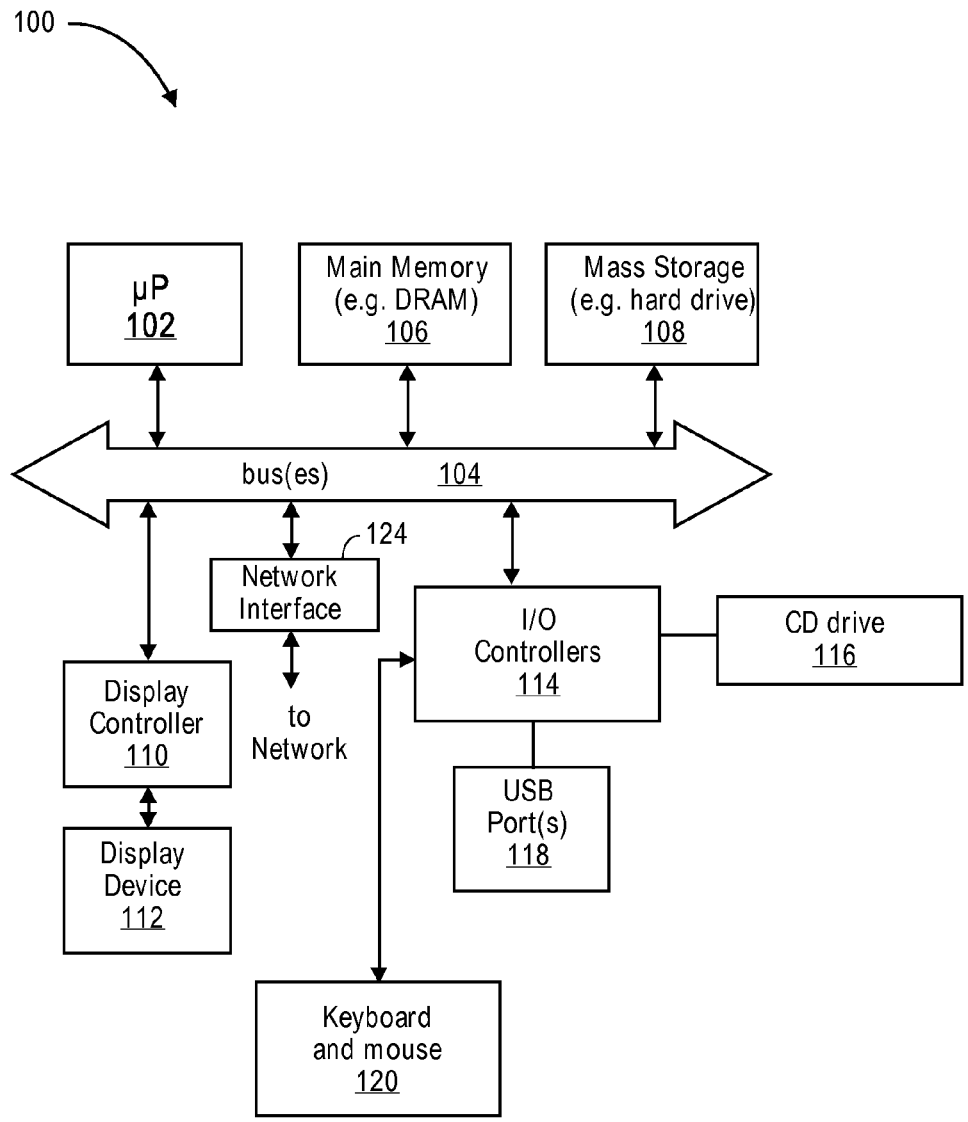
FIG. 1 shows an exemplary embodiment of a data processing system, which may be a general purpose computer system, and which may operate in any one of the methods described herein. For example, FIG. 1 may illustrate a client computer system or a server computer system or an other client computer system.

FIG. 1 shows one example of a typical data processing system, such as a general purpose computer system, which may be used with the present invention. Note that while FIG.

1 illustrates various components of a computer system, it is not intended to represent any particular architecture or manner of interconnecting the components as such details are not germane to the present invention. It will also be appreciated that network computers and other data processing systems such as personal digital assistants, cellular telephones, handheld computers, Internet appliances, etc. which have fewer components or perhaps more components or a different arrangement of components may also be used with the present invention and may be considered "client systems." The computer system of FIG. 1 may, for example, be a computer running a Windows operating system or may be a Macintosh computer from Apple Computer, Inc.

Figure 3:
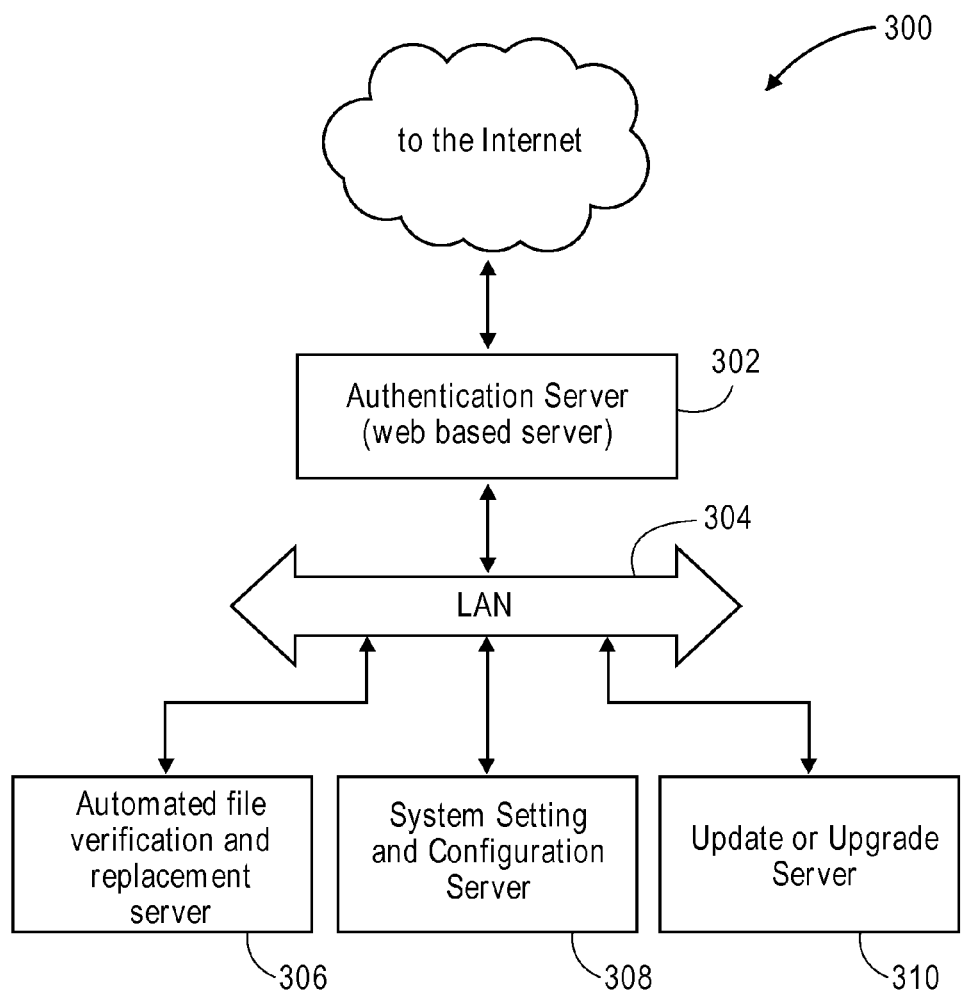
FIG. 3 shows an exemplary architecture of an automated support server system which includes several different separate servers for several of the different functions and operations performed according to the various methods described herein.

As shown in FIG. 1, the system 100, which is a form of a data processing system, includes a bus 104 which is coupled to one or more microprocessors 102 and a main memory 106 and a mass storage 108. The microprocessor may be one or more microprocessors from Intel or IBM. The bus 104 interconnects these various components together as well as the other components shown in FIG. 1. The main memory 106 may be dynamic random access memory which is volatile memory. The mass storage 108 is typically a magnetic hard drive or a magnetic optical drive or an optical drive or a DVD RAM or other types of memory systems which maintain data, such as large amounts of data even after power is removed from the system. Typically, the mass storage 108 will also be a random access memory although this is not required. While FIG. 1 shows that the mass storage 108 is a local device directly coupled with the rest of the components in the data processing system, it will be appreciated that the present invention may utilize a non-volatile memory which is remote from the system, such as a network storage device which is coupled to the data processing system through a network interface such as a modem or Ethernet interface. The mass storage device 108, such as a hard drive, will typically include most if not all of the software which is executed by the data processing system, including, for example, the operating system software with all the auxiliary files and configuration settings, which are included with the operating system. The bus 104 may include one or more buses connected to each other through various bridges, controllers, and/or adapters as is well known in the art. Various input/output devices are also shown in FIG. 1, such as a display device 112 (e.g. a CRT or LCD display device) which is coupled to the bus 104 through a display controller 110. One or more input/output (I/O) controllers 114 couples various input/output devices to the bus 104. In the example shown in FIG. 1, the input/output devices include a keyboard and mouse 120, one or more USB ports 118, as well as a CD drive 116 which may alternatively be a DVD drive or other types of optical drives or other types of storage devices. It is this drive which is used to receive a bootable CD according to certain aspects of the present invention. Another peripheral which is coupled to the bus 104 is a network interface device 124 which may be an Ethernet adapter or a dial-up modem connection or cable modem or wireless modem (e.g. WiFi). These various types of network interfaces are used to connect to a network, such as the Internet, or to a local area network (LAN) as is well known in the art. The data processing system shown in FIG. 1 may represent a typical client computer system which is being repaired or a typical server computer system which operates at an automated support server system. FIG. 3 shows an example of one embodiment of an automated support server system according to certain embodiments of the invention.

Figure 2:
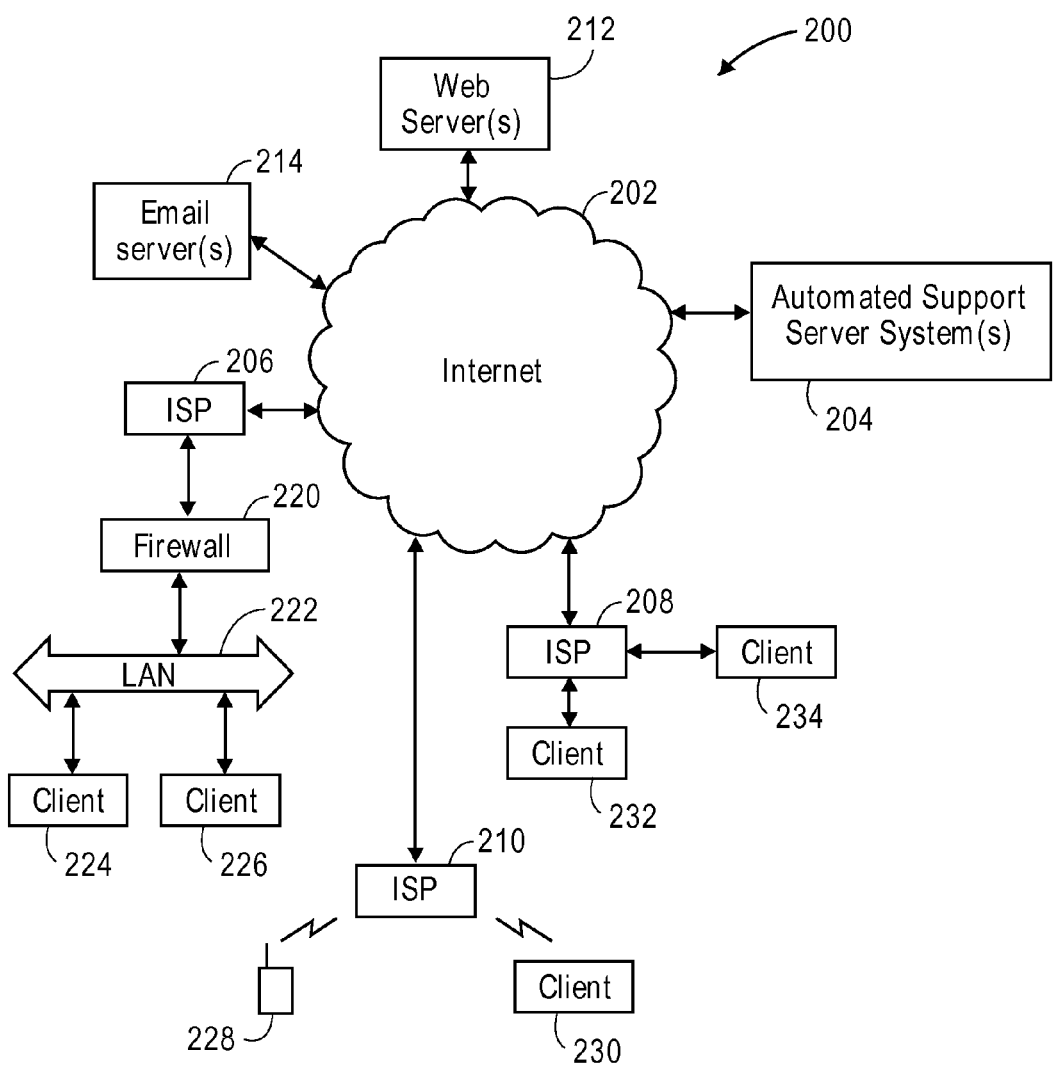
FIG. 2 shows a general example of one embodiment of the present invention in which an automated support server system is connected through the Internet to various client systems.

FIG. 2 illustrates an example of the Internet being used to couple the automated support server system to a plurality of different client systems which may be repaired through the use of the automated support server system. The network 200 shown in FIG. 2 includes one or more automated support server systems, such as the automated support server system 204 which is coupled to the Internet 202. In addition, email servers 214 and web servers 212 are also coupled to the Internet 202. A plurality of ISP's (Internet Service Providers) are also coupled to the Internet, such as ISPs 206, 208, and 210. Each of these ISPs allow the client computer systems to be coupled through the Internet to the various web servers, email servers, and other systems, such as the automated support server system of the present invention. Typically, each computer or data processing device includes a network interface, such as a cable modem, or a dial-up modem, or an Ethernet card, or a wireless modem which allows the data processing device, such as client computer systems 224, 226, 232, 234, 230, and 228 to be coupled to the Internet. In the case of client systems 224 and 226, they are coupled to the Internet through a local area network 222 and through a firewall 220. The client systems shown in FIG. 2 may be traditional general purpose computer systems or handheld computers or even cellular telephones or personal digital assistants. In the case of systems 228 and 230, the connection to the ISP 210 is at least in part through a wireless connection, such as WiFi.

While the automated support server system 204 may be implemented with a single server computer, alternative embodiments use multiple server systems, each of which can perform separate, independent functions and operations for the entire system. FIG. 3 gives an example of an architecture for an automated support server system which includes multiple independent server computer systems. The automated support server system 300 shown in FIG. 3 includes an authentication server 302 which may be a web-based server and which may act as a firewall to the rest of the system as well as an authentication device which authenticates communications between the automated support server system 300 and client systems which are coupled to the automated support server system through the Internet. The authentication server 302 typically would also execute VPN server software in order to provide the VPN tunnel functionality between the automated support server system and client systems which are coupled to it through the Internet. The VPN client software on the client systems and the VPN software on the server system may be conventional VPN software such as "OpenVPN." The VPN tunnel allows secure and authenticated communication across a public network such as the Internet. In one implementation, all communication through the network goes through one Internet software port (using, for example, the TCP/IP protocols and the http protocol) between each client and the authentication server 302. This software port may be port 80, for example. This allows the connection of multiple servers such as the servers 306, 308, and 310 which are coupled to the server 302 through a local area network (LAN) 304.

The three servers 306, 308 and 310 perform different functions as indicated in FIG. 3. This allows for increased bandwidth of the system relative to an automated support server system which utilizes a single server computer. The server 306 performs an automated file verification and replacement function, while the server 308 performs testing and checking of configuration files and setting files on a client system. The server 310 checks for software updates or upgrades and provides for the ability to obtain these updates or upgrades. It will be appreciated that the LAN 304 may be implemented in a variety of topologies, including the topology shown in FIG. 3. It will also be appreciated that the automated support server system may use redundant servers, such as redundant versions of the server 306 and/or redundant versions of servers 308 and 310.

It will be appreciated that a "VPN tunnel" may be considered, from a broad perspective, to be any type of networking tunnel which is used to connect two networks together to allow an encrypted communication through the network, which may be a public network such as the Internet. The "VPN tunnel" may be considered to be any type of software protocol, implemented on both a client and a server, to allow an encrypted connection between two networks and through a public network, wherein the information is packetized into one tunnel or stream or data pathway such as a software port. Typically the tunneling involves transmitting an encrypted content and/or encrypted receiving address using a communication protocol within another communication protocol through the same software port, and the encrypted receiving address is usually an IP (Internet Protocol) address, and the software port may be a single UDP or TCP software port. A port number which specifies the software port will typically be associated with the data stream transmitted within the tunnel.

Figure 4:
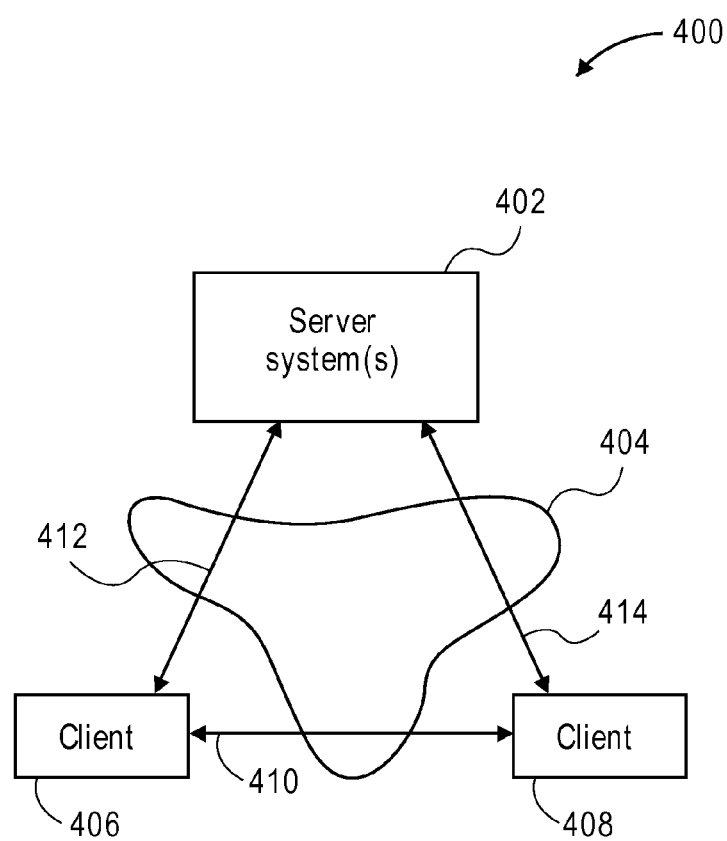
FIG. 4 shows an example of a virtual private network which connects client systems to one or more server systems as well as connecting, through a peer-to-peer connection, various client systems according to certain embodiments of the present invention.

One aspect of the invention utilizes, in at least certain embodiments of the invention, a peer-to-peer connection between client systems in addition to a connection between each client system and one or more servers at an automated support server system. This connection may be through a public network or through a private network or through a virtual private network tunnel. In one particular embodiment, the peer-to-peer connection between the clients, such as clients 406 and 408 shown in FIG. 4, is through a virtual private network tunnel which is also used to provide a connection between each client system and one or more server systems at the automated support server system. In the example shown in FIG. 4, the network 400 includes two client systems 406 and 408 which are coupled to each other and to the server systems through a virtual private network tunnel 404 which provides the secure connections 410, 412, and 414 as shown in FIG. 4. In certain embodiments, the connection between the client system being repaired and one or more servers at the automated support server system may be through a VPN tunnel while the connection between the client system being repaired and the other clients may be a conventional connection which does not utilize a VPN tunnel. The peer-to-peer connections between client systems, such as the connection 410, allows for offloading of services from the servers onto other client systems in order to reduce the load in the repair process on the server systems. This is described in further detail below.

Figure 5A:
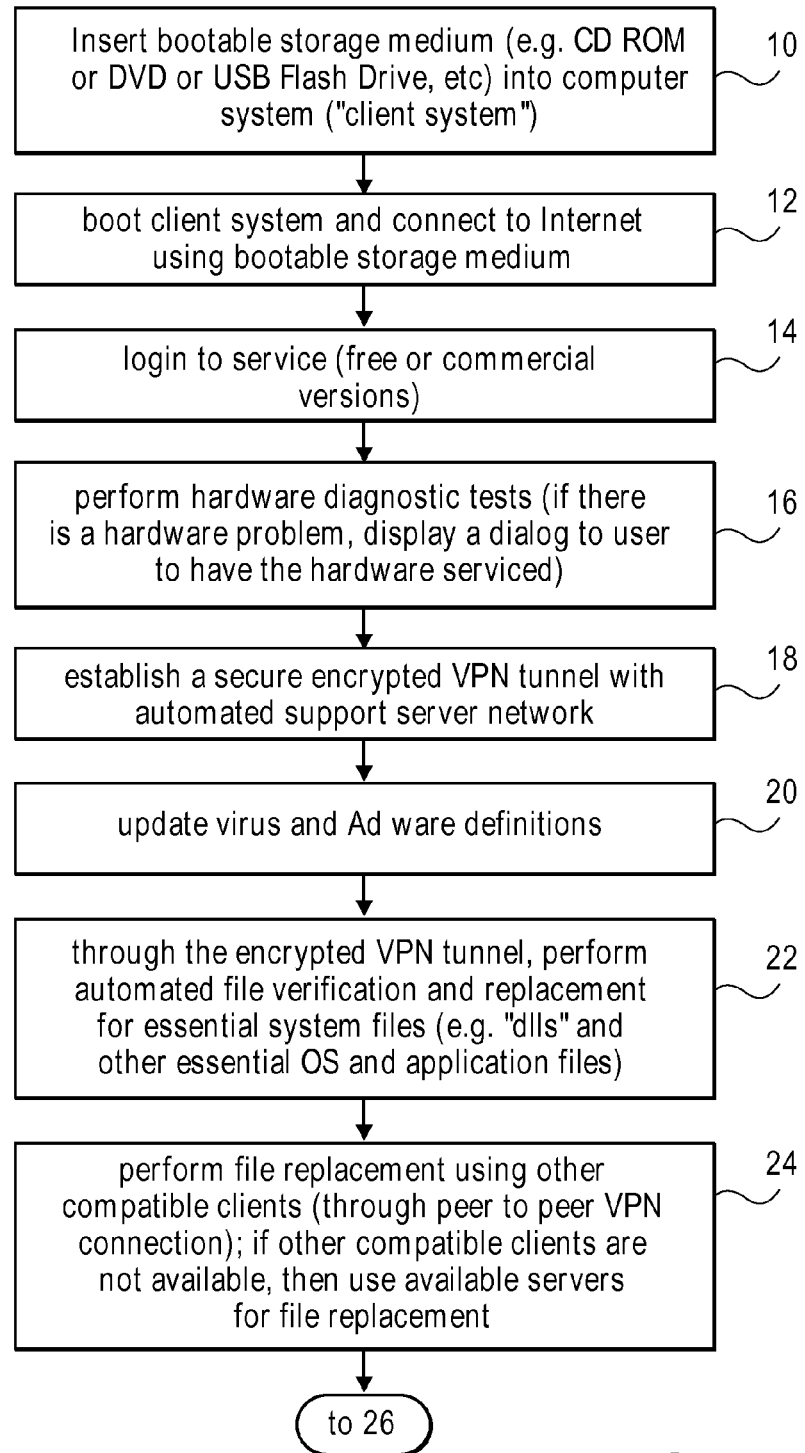
FIGS. 5A, 5B, and 5C illustrate one exemplary method of the present invention.
Figure 5B:
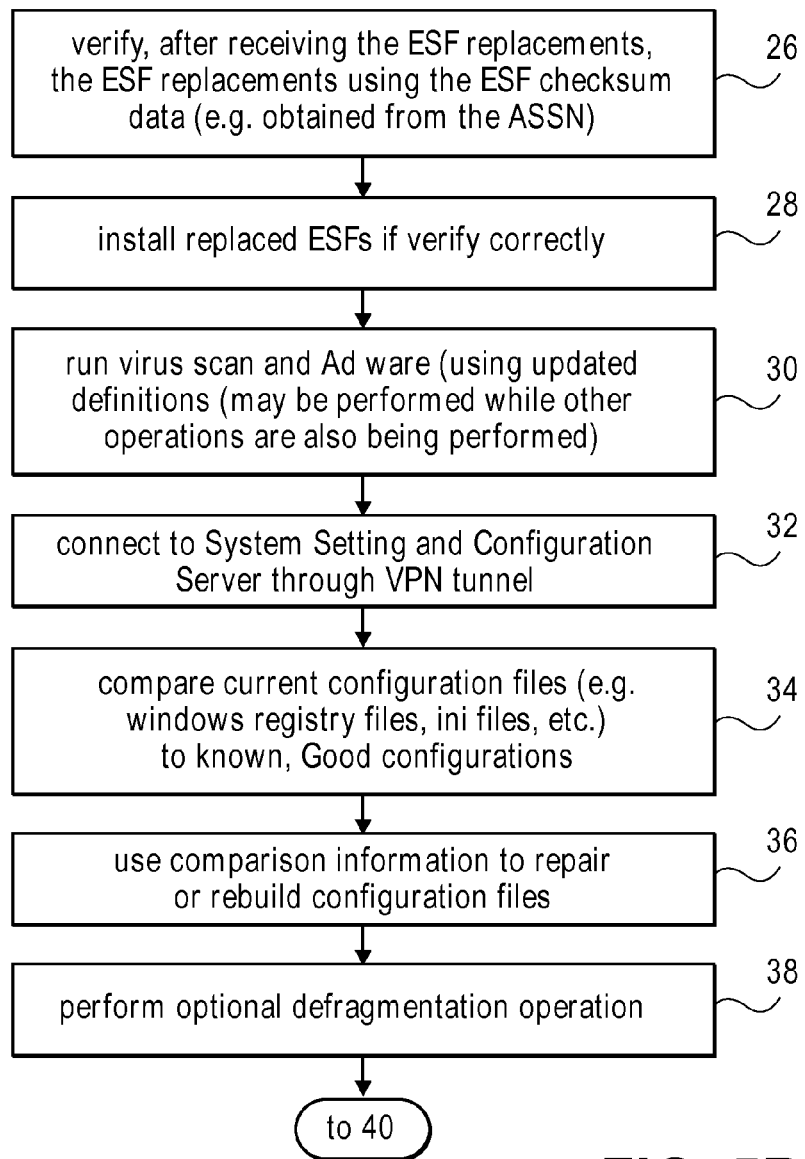
Figure 5C:
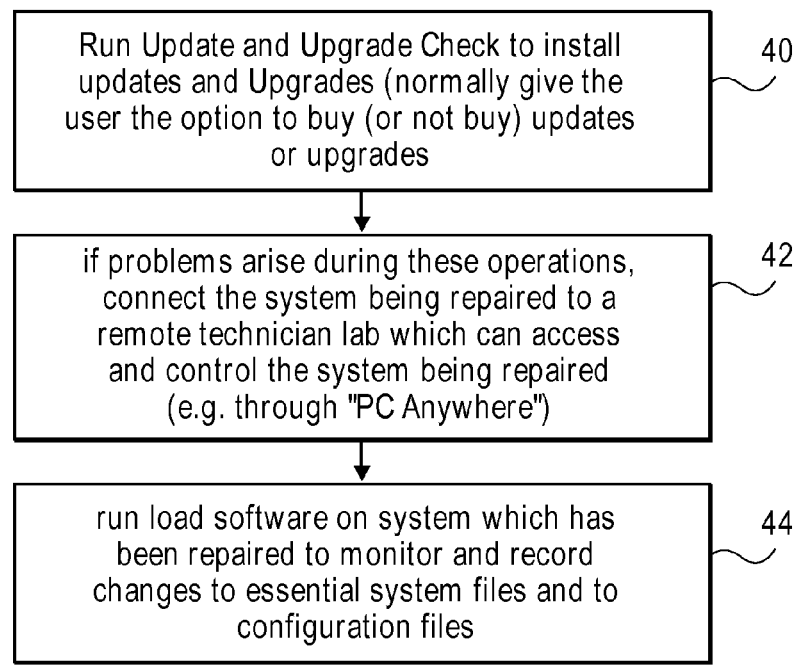

FIGS. 5A, 5B and 5C will now be referred to while providing a general description of one exemplary method of the present invention. It will be appreciated that alternative methods may employ a subset of the operations shown in FIGS. 5A-5C or may employ additional operations (and hence be a superset) or may perform the operations in a different sequence than the sequence shown in FIGS. 5A-5C.

At least certain embodiments of the invention use an alternate operating system (OS) located on a storage medium such as a CD ROM, which is separate from the currently installed and active operating system, to start or boot the computer. The user can insert this bootable storage medium into the computer system being repaired, which may be referred to as the client system. The bootable storage medium typically includes all the necessary software which is used when booting the computer as well as certain utilities which are used to repair the computer. These utilities may include a virus scanner, an Ad ware scanner, a scan disk utility, a defragmentation utility, a virtual private network client, as well as several custom programs described below. Further, the bootable storage medium includes software which allows the computer system to connect to the Internet and to utilize a high-speed connection. In operation 12, the client system is booted and connected to the Internet using the bootable storage medium. If the computer system is unable to automatically detect network settings, then the user is prompted with a connection wizard which attempts to help the user get the computer system connected to the Internet. Once the utility has connected the computer system to the Internet, the user is prompted to sign in, log in, or continue using a free mode in operation 14.

In the free mode, the user is notified before continuing the free mode that the free mode may not fix the computer or may cause more problems. The user is asked to accept the consequences. If the user accepts, then the free mode performs hardware diagnostic tests on the computer system to determine if there is a hardware problem such as faulty memory, a faulty disk controller or a faulty hard drive, etc. If there is a hardware problem, a message is displayed to the user instructing the user to have the hardware fixed before proceeding further with testing and repairs. This message may also suggest sources (e.g. repair shops) which can perform the needed hardware repair. The free version may use certain utilities such as the virus scanner, the Ad ware scanner, the scan disk utility, and the defragmentation utility to test for software problems. The free mode may update needed DAT files and start a systematic scan, such as the scans which are performed by Norton Utilities. The commercial version is available as a service if the user agrees to pay the fees required by the service. If the user accepts the use of the commercial version, then operation 16 is performed in which the hardware diagnostic tests are run on the computer system to determine if there is a hardware problem, such as faulty memory, a faulty disk controller, or a faulty hard drive, etc. If there is a hardware problem, a message is displayed to the user instructing the user to have the hardware fixed before proceeding with further testing. Alternatively, the user could receive this message and still be able to continue testing the rest of the system in certain instances. The message to the user may further suggest sources (e.g. repair shops) which can perform the needed hardware repair. Operation 18 establishes a secure, encrypted VPN tunnel with the automated support server network. In response, the automated support server network provides updated definitions for viruses and Ad ware in operation 20. In certain embodiments, operation 30 could be performed immediately after operation 20 (rather than after operation 28 as shown in FIG. 5B). Then, the client system launches an automated file verification and replacement utility, in operation 22, which verifies essential system files such as DLLs and other essential operating system and application files.

Figure 6:
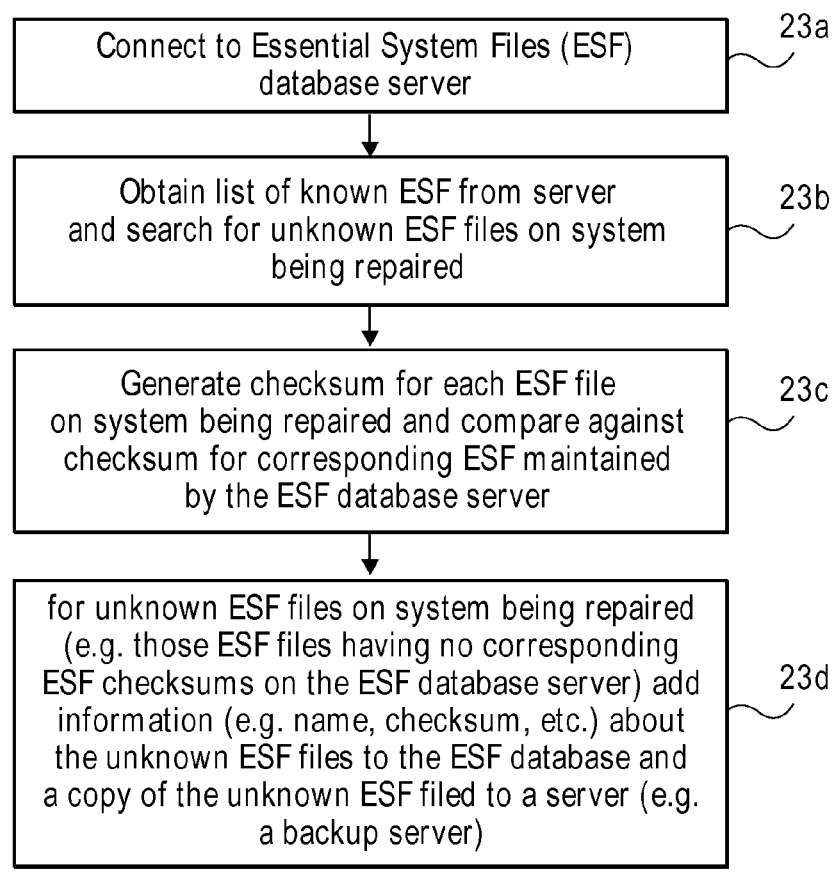
FIG. 6 illustrates an exemplary method for checking essential system files.

FIG. 6 shows one exemplary method for performing automated file verification and replacement for essential system files. In the example of FIG. 6, operation 23A involves the connection to a particular server having a database of essential system files (ESF). A list of ESF files from the server is obtained and this allows the client system to search for unknown ESF files on the system being repaired. This is performed in operation 23B. One way of performing this search would be to search for ESF files which are referred to in the configuration files. Then in operation 23C, a checksum is generated for each ESF file on the system being repaired and this checksum is compared against a checksum stored in the database for the corresponding ESF file which is maintained in the database. This is shown as operation 23C of FIG.

6. For unknown ESF files on the system being repaired, such as those ESF files having no corresponding ESF checksum on the ESF database server, information is added about the ESF file including the name of the file, a checksum, the size of the file, the date of creation, the date of modification, etc. In this manner, the automatic file verification and replacement utility updates the automated file verification and replacement (AFVR) server so that the server stores checksums of every version of every essential system file it encounters along with a list of every computer connected to it and the ESF files each computer has. The AFVR server (such as server 306) also stores a local copy of each ESF. Using this information, it verifies each ESF on the client computer being repaired and records any corrupt files. If it finds any corrupt ESF files, operation 24 is performed in FIG. 5A in which the file replacement procedure is performed using other compatible clients, if possible (if the use of other compatible clients is not possible, then the AFVR server, or a proxy of that server, provides the replacement files (which replace the corrupt ESF files)). The utility software on the client's system establishes a secure peer-to-peer connection with at least one other compatible (e.g. using the same or similar OS as the client being repaired and having one or more of the needed ESF files) client computer which is also connected to (or capable of being connected to) the AFVR server. Using the peer-to-peer network between client systems, which may be through a virtual private network tunnel, the needed ESF files are transferred to the computer being repaired and verified once again against the server ESF checksum data in operation 26. The AFVR server will typically attempt to find one or more other compatible client computer systems which use the same or similar OS as the client computer system being repaired and which have one or more of the needed ESF files. Since the AFVR server can keep a list of the ESF files on all of the client computers which it repairs or otherwise provides services to, the AFVR server will be able to identify one or more other compatible client computer systems which use the same or similar OS and which have one or more of the needed ESF files. The AFVR server will identify those other compatible client computer systems and transmit addresses and/or other information about those other compatible client computer systems to the client computer system being repaired which can then use the addresses and/or other information to establish peer-to-peer connections to the one or more other compatible client computer systems which possess copies of the needed ESF files. For any needed ESF files which are not available from other compatible systems, the AFVR server can provide these needed ESF files to the client system being repaired through a downloading operation from the AFVR server to this client system. It can be seen that the needed ESF files, for a particular client computer system being repaired, may come from a plurality of sources including the AFVR server and from several different other compatible client computer systems (which, for example, may not be currently being repaired). Another aspect of the AFVR server is that the same AFVR server, rather than separate AFVR servers for different, separate OS's, may provide needed ESF files for different OS's such as for Linux OS's, various different versions of Windows OS's and various different versions of the Macintosh OS. Further, the same Configuration server (e.g. server 308) may provide replacement configuration files for different OS's such as for versions of the Linux OS, various different versions of Windows OS's and various different versions of the Macintosh OS, rather than having separate configuration servers which provide (e.g. transmit through a secure connection) the configuration files for each of the different OS's.

Figure 7:
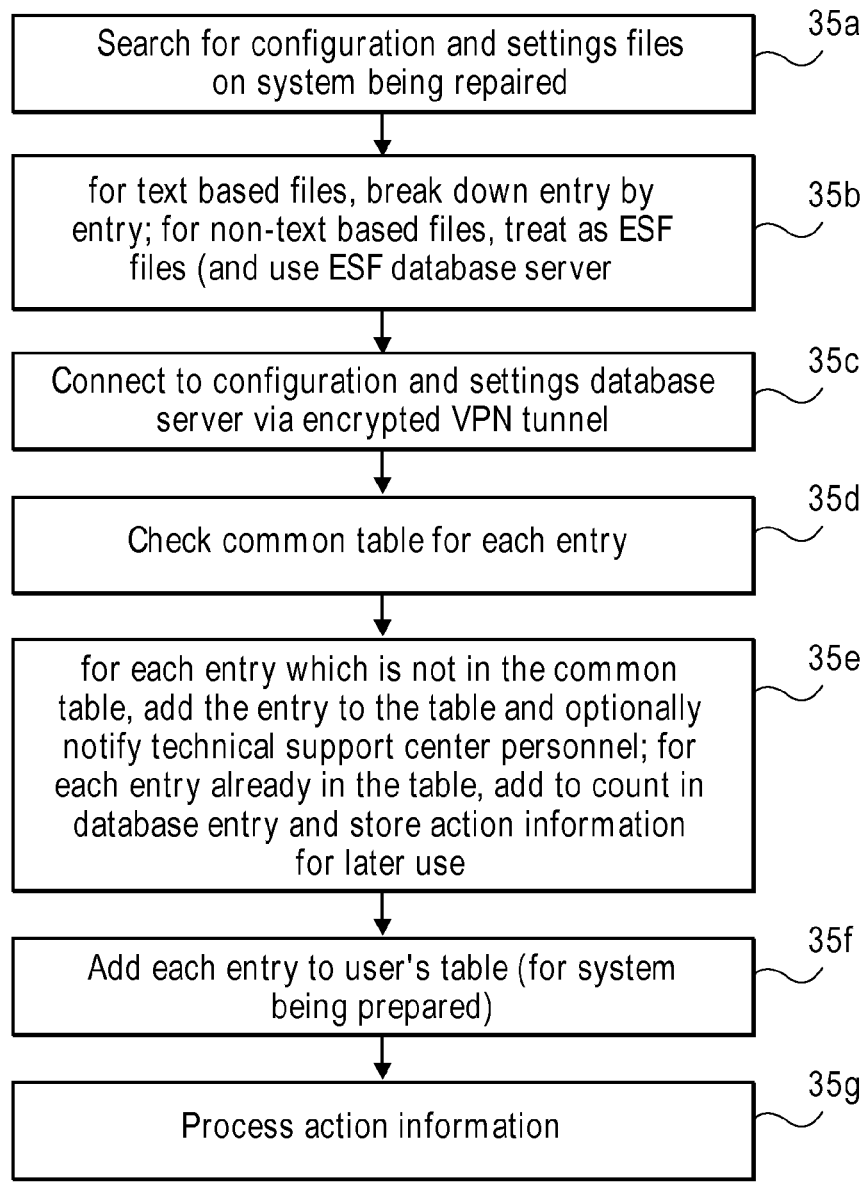
FIG. 7 shows an exemplary method for checking configuration and setting files for a system being repaired.

After these replaced ESF files are verified, then they may be installed in operation 28. While the AFVR utility runs, the system may start another process to scan for virus files or for Ad ware. Any Ad ware or viruses found are cleaned and disabled using techniques which are known in the art. This is shown as operation 30 in FIG. 5B. This operation 30 may be performed in a different sequence (e.g. immediately after operation 20). Next the system starts scanning for setting and configuration files using a setting and configuration scanner (SCS) utility. The SCS utility connects the client system being repaired to an SCS server, such as the server 308 of FIG. 3, through the virtual private network tunnel previously created. This is shown as operation 32. Then this exemplary method performs operation 34 in which current configuration files, such as Windows registry files, INI files, etc. are compared to known good configurations. Examples of system files are shown in Tables I-IV below. FIG. 7 shows an exemplary method for performing operation 34. The SCS server, such as server 308 of FIG. 3, contains common configuration structures derived from all known configuration files including but not limited to the Windows registry files, INI files, preferences or configuration files used by the system or applications located on the computer, as well as known working configurations of the current client computer system being repaired, if available. Using this information, the SCS utility compares current configuration information against the server data and then repairs or rebuilds the configuration files in operation 36. An exemplary method for performing this comparison is shown in FIG. 7. In operation 35*a* of FIG. 7, the configuration and setting files are searched for in the system being repaired. For text-based files, these files are broken down on an entry-by-entry basis and processed for each entry as shown in FIG. 7. For non-text based files which have a readable format, these files will normally be processed as if they were text based files (so they are broken down entry by entry). Examples of non-text based files which have a readable format that can be deciphered include configuration files (e.g. from a peripheral vendor) which are not text based but which have published references which describe how to read and decipher the format of the non-text based files. The information from the published references is used to decipher and understand the non-text based files, allowing them to be broken down as if they were text based files. Normally, the configuration files are not scripts. For non-text based files which have an unreadable format, these are treated as essential system files and are processed according to, in one exemplary embodiment, the method shown in FIG. 6. After connecting to the SCS server which includes a configuration and settings database in operation 35*c*, a common table is checked for each entry in operation 35*d*. Then in operation 35*e*, for each entry which is not in the common table, the entry is added to the table and optionally a person at a technical support center is notified of this addition. This may allow the personnel at the technical support center to examine the entry and determine whether or not it is a faulty configuration or setting. For each entry which is already in the table, a count in the database entry is increased by 1 and action information is stored for later use. In operation 35*f*, each entry is added to a user table for the particular system being repaired so that the SCS server can keep track of all changes to configurations and settings on the system being repaired for that particular system. Operation 35*g* processes the action information. The action information includes operations in a script which specifies how to modify (e.g. repair or replace) configuration and/or settings files which have been identified as needing to be repaired or replaced. The script may cause one or more of such files to be repaired or replaced by specifying the operations which repair or replace such configuration and/or settings files.

Following the repair or rebuilding of configuration or setting files, an optional defragmentation operation may be performed in operation 38. It will be appreciated that this operation may be performed in parallel with the other operations or at a different time in the sequence of operations. For example, it will be appreciated that the optional defragmentation is preferably the last operation (after operation 40) rather than before operation 40. In operation 40, an update and upgrade checker may be run to install updates and upgrades. Typically, the user is given the choice of whether or not to perform the updates and/or upgrades and whether or not to obtain the updates and/or upgrades. There may be a charge for either or they may be both free depending on the particular circumstance. Operation 42 notes that if problems arise during any of the preceding operations, the system may be connected to a remote technician lab operated by experienced computer technicians who can access and control the system through a remote connection such as through a utility known as "PC Anywhere."

Figure 8:
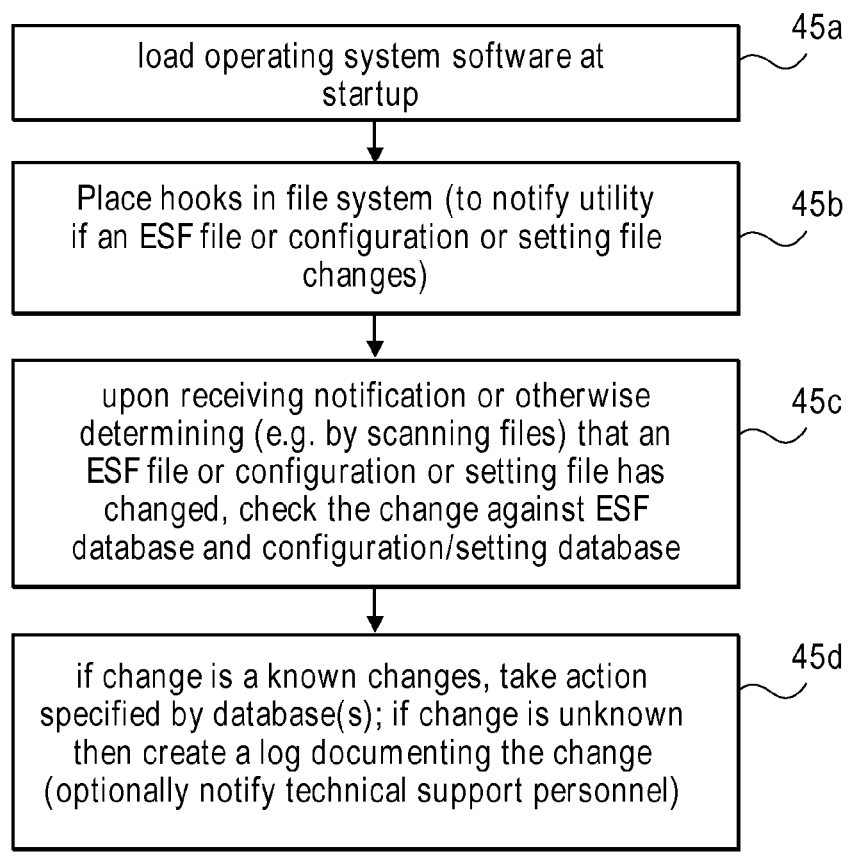
FIG. 8 illustrates a method for monitoring a client system according to one embodiment of the present invention.

After the system has been repaired, the system may run software which monitors and records changes to essential system files and to configuration files. This will assist in future repair operations and may also be used to provide information to the automated support server system so that its databases can be updated to reflect the changes. An exemplary method of operation 44 is shown in FIG. 8. In operation 45a, the operating system software is loaded at startup and then hooks are placed in the file system in operation 45b to allow for the notification of any change to an ESF file or a configuration or setting file. In operation 45c, upon receiving notification or otherwise determining (e.g. by scanning the files) that an ESF file or a configuration or setting file has changed, the change is checked against the ESF database on an ESF server and against a configuration/setting database on the SCS server. As shown in operation 45d, if the change is a known change, a certain action may be specified by the database and this action is then performed by the client system. For example, this action may dictate that the setting file be modified in order to prevent the system from crashing. If the change is not known, then a log documenting the change is made in either the ESF server or the SCS server. Optionally, technical support personnel may be notified of this unknown change to allow for a study of the change and a determination of the proper action to be taken. The method of FIG. 8 acts as an ESF and SCS monitor, reporting any changes to ESF files and all known configuration files and settings. This information may be reported back to one or more of the servers at the automated support server system. The software components which perform the method of FIG. 8 may optionally include firewall software which monitors network activity and prevents access to software ports and other functionality on the data processing system which is executing these software components. The firewall software may be adjustable by the user to allow for communication over certain software ports and may also report firewall changes to the ESF and SCS monitor which may in turn report the firewall changes back to the one or more servers at the automated support server system. New or updated ESF files are transferred to a server system for analysis and cataloging purposes. Using this utility and service, virtually every software problem is repairable without the need for data loss or an expensive on-site technician. In cases of hardware problems, local repair shops and technicians may be located for users, and the diagnostic information created by the utility will enable the shops and technicians to expedite the repair process.

Figure 9:
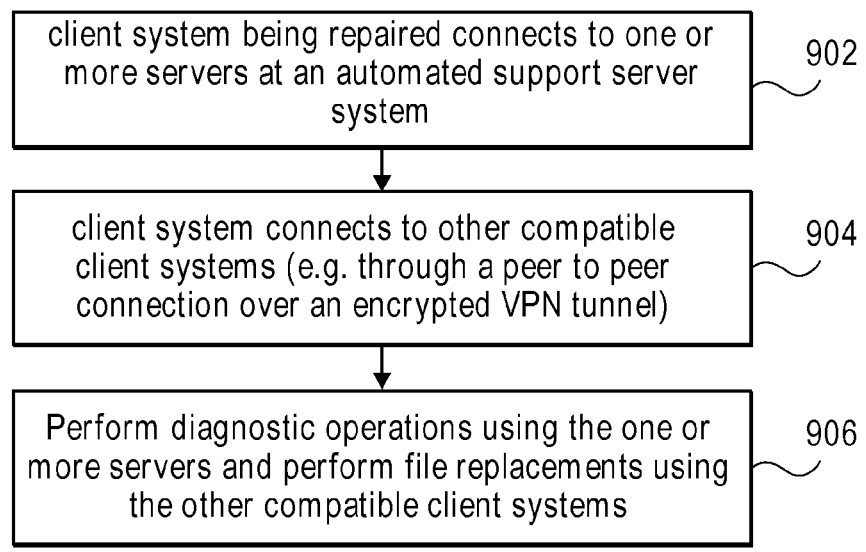
FIG. 9 shows an exemplary method for interconnecting a client system being repaired with one or more server systems and also with one or more compatible other client systems.

FIG. 9 shows an exemplary method in which a peer-to-peer network is created with other compatible client systems which can then be used to provide the file replacements rather than using the servers themselves to provide the file replacements. This increases the bandwidth of the servers by freeing the servers up from having to do the file replacements.

The bootable storage medium may in part include open source software which allows for an open source community to document, modify and improve one or more of the utilities on the system. This bootable storage medium may also include an operating system which is different than the operating system on the client system being repaired. For example, the bootable storage medium, such as a CD, may contain a copy of the Linux operating system and necessary software for establishing an Internet connection and for providing a VPN tunnel and other utilities even though the system being repaired is a Windows system or a system running another type of operating system, such as a Macintosh.

These are a variety of different system files (e.g. ESF and/or configuration files) which currently exist. The methods described herein analyze and/or verify these files. The following section provides examples, in four tables (Table I, II, III, and IV) set out below, of system files (or locations of system files), for various types of computer systems.

TABLE I

Exemplary Mac OSX System File Locations

~/Library/Preferences
~/Library/Preferences/LSApplications
~/Library/Preferences/LSClaimedTypes
~/Library/Preferences/LSSchemes
/Applications
/Applications/Dock Extras
/Applications/Utilities
/Library/Caches
/Library/Preferences
/Library/StartupItems
/Library/WebServer/Documents
/Network/Applications
/private/etc
/private/var
/System/Library/CoreServices/Menu Extras (not user installable)
/System/Library/Extensions
/System/Library/Preferences
/System/Library/PrivateFrameworks
/System/Library/StartupItems
/Users/Shared
/Users/username/Library/Preferences

TABLE II

Exemplary Linux System File Locations

/etc/conf.modules
/etc/exports
/etc/fstab
/etc/gated.conf
/etc/gated.version
/etc/gateway
/etc/group
/etc/host.conf
/etc/hosts
/etc/hosts.allow
/etc/hosts.deny
/etc/httpd.conf
/etc/identd.conf
/etc/inetd.conf
/etc/inittab
/etc/issue TABLE II-continued Exemplary Linux System File Locations /etc/issue.net
/etc/ld.so.conf
/etc/lilo.conf
/etc/logrotate.conf
/etc/lynx.cfg
/etc/motd
/etc/mtab
/etc/mtools.conf
/etc/networks
/etc/nologin
/etc/passwd
/etc/protocols
/etc/rc.d/rc
/etc/rc.d/rc.local
/etc/rc.d/rc.sysinit
/etc/rc.d/rc/rcX.d
/etc/redhat-release
/etc/resolv.conf
/etc/rpc
/etc/rpmrc
/etc/securetty
/etc/sendmail.cf
/etc/services
/etc/shadow
/etc/shells
/etc/sysconfig/network
/etc/sysconfig/network-scripts/if*
/etc/syslogd.conf
/etc/termcap
/etc/usertty
/etc/wgetrc
/home/xxx/.wgetrc
/proc/sys/kernel/ctrl-alt-del
/proc/sys/kernel/domainname
/proc/sys/kernel/hostname
/proc/sys/kernel/modprobe
/proc/sys/kernel/osrelease TABLE II-continued Exemplary Linux System File Locations /proc/sys/kernel/ostype
/proc/sys/kernel/sysrq
/proc/sys/kernel/threads-max
~/.bash_history
~/.bash_login
~/.bash_logout
~/.bash_profile
~/.bashrc
~/.emacs
~/.exrc
~/.forward
~/.fvwmrc
~/.gtkrc
~/.hushlogin
~/.kderc
~/.mail.rc
~/.muttrc
~/.ncftp/
~/.netrc
~/.pinerc
~/.profile
~/.rhosts
~/.rpmrc
~/.signature
~/.twmrc
~/.vimrc
~/.Xauthority
~/.Xdefaults,
~/.Xdefaults-hostname
~/.xinitrc
~/.Xmodmap
~/.xmodmaprc
~/.Xresources
~/.xserverrc
~/mbox
~/News/Sent-Message-IDs

TABLE III

Windows Configuration Files

C:\Documents and Settings\%USERNAME%\Application Data\Corel\WordPerfect Office 11\User Config\Color.ini
C:\Documents and Settings\%USERNAME%\Application Data\Corel\WordPerfect Office 11\User Config\Corelflt.ini
C:\Documents and Settings\%USERNAME%\Application Data\Corel\WordPerfect Office 11\User Config\filters.ini
C:\Documents and Settings\%USERNAME%\Application Data\Miranda\profile.dat
C:\Documents and Settings\%USERNAME%\Application Data\Mozilla\Firefox\profiles.ini
C:\Documents and Settings\%USERNAME%\Application Data\Mozilla\Firefox\Profiles\default.66z\components.ini
C:\Documents and Settings\%USERNAME%\Application Data\Mozilla\Firefox\Profiles\default.66z\defaults.ini
C:\Documents and Settings\%USERNAME%\Application Data\Mozilla\pluginreg.dat
C:\Documents and Settings\%USERNAME%\Application Data\SmartFTP\Custom.dat
C:\Documents and Settings\%USERNAME%\Application Data\SmartFTP\Folders.dat
C:\Documents and Settings\%USERNAME%\Application Data\Talkback\MozillaOrg\Firefox10\Win32\2004070723\manifest.ini
C:\Documents and Settings\%USERNAME%\Application Data\Talkback\MozillaOrg\Firefox10\Win32\2004080301\manifest.ini
C:\Documents and Settings\%USERNAME%\Application Data\Talkback\MozillaOrg\Firefox10\Win32\2004100109\Talkback.ini
C:\Documents and Settings\%USERNAME%\Application Data\Talkback\MozillaOrg\FirefoxTrunk\Win32\2005012706\manifest.ini
C:\Documents and Settings\%USERNAME%\Application Data\Talkback\MozillaOrg\Mozilla17\Win32\2004061609\manifest.ini
C:\Documents and Settings\%USERNAME%\Application Data\Talkback\MozillaOrg\Thunderbird10\Win32\2004070722\manifest.ini
C:\Documents and Settings\%USERNAME%\Application Data\Talkback\MozillaOrg\Thunderbird10\Win32\2004120606\manifest.ini TABLE III-continued

| Windows Configuration Files |
|---|
| C:\Documents and Settings\%USERNAME%\Application Data\Thunderbird\profiles.ini |
| C:\Documents and Settings\%USERNAME%\Application Data\Thunderbird\Profiles\default.r4w\components.ini |
| C:\Documents and Settings\%USERNAME%\Application Data\Thunderbird\Profiles\default.r4w\defaults.ini |
| C:\Documents and Settings\%USERNAME%\Application Data\Thunderbird\Profiles\default.r4w\Mail\mail.purpletech.net\popstate.dat |
| C:\Documents and Settings\%USERNAME%\Application Data\Thunderbird\Profiles\default.r4w\panacea.dat |
| C:\Documents and Settings\%USERNAME%\Application Data\Thunderbird\Profiles\default.r4w\training.dat |
| C:\Documents and Settings\%USERNAME%\Application Data\Thunderbird\Profiles\default.r4w\xpti.dat |
| C:\Documents and Settings\%USERNAME%\Local Settings\DESKTOP.INI |
| C:\Documents and Settings\%USERNAME%\My Documents\My Music\Desktop.ini |
| C:\Documents and Settings\%USERNAME%\My Documents\My Videos\Desktop.ini |
| C:\Documents and Settings\%USERNAME%\ntuser.dat |
| C:\Documents and Settings\%USERNAME%\Recent\Desktop.ini |
| C:\Documents and Settings\%USERNAME%\Start Menu\DESKTOP.INI |
| C:\Documents and Settings\%USERNAME%\Start Menu\Programs\Accessories\DESKTOP.INI |
| C:\Documents and Settings\%USERNAME%\Start Menu\Programs\Administrative Tools\desktop.ini |
| C:\Documents and Settings\%USERNAME%\Start Menu\Programs\Startup\DESKTOP.INI |
| C:\Documents and Settings\Administrator\Application Data\DESKTOP.INI |
| C:\Documents and Settings\Administrator\Favorites\Desktop.ini |
| C:\Documents and Settings\Administrator\My Documents\DESKTOP.INI |
| C:\Documents and Settings\Administrator\My Documents\My Pictures\Desktop.ini |
| C:\Documents and Settings\Administrator\ntuser.dat |
| C:\Documents and Settings\Administrator\Recent\Desktop.ini |
| C:\Documents and Settings\Administrator\Start Menu\DESKTOP.INI |
| C:\Documents and Settings\Administrator\Start Menu\Programs\Accessories\DESKTOP.INI |
| C:\Documents and Settings\Administrator\Start Menu\Programs\DESKTOP.INI |
| C:\Documents and Settings\All Users\Application Data\DESKTOP.INI |
| C:\Documents and Settings\All Users\Documents\My Music\Desktop.ini |
| C:\Documents and Settings\All Users\Documents\My Pictures\Desktop.ini |
| C:\Documents and Settings\All Users\Documents\My Videos\Desktop.ini |
| C:\Documents and Settings\All Users\Start Menu\DESKTOP.INI |
| C:\Documents and Settings\All Users\Start Menu\Programs\Accessories\Communications\DESKTOP.INI |
| C:\Documents and Settings\All Users\Start Menu\Programs\Accessories\DESKTOP.INI |
| C:\Documents and Settings\All Users\Start Menu\Programs\Accessories\System Tools\DESKTOP.INI |
| C:\Documents and Settings\All Users\Start Menu\Programs\DESKTOP.INI |
| C:\Documents and Settings\All Users\Start Menu\Programs\Startup\DESKTOP.INI |
| C:\Documents and Settings\Default User\Application Data\Sonic\Update Manager\sumdb.dat |
| C:\Documents and Settings\Default User\Local Settings\DESKTOP.INI |
| C:\Documents and Settings\Default User\My Documents\My Music\Desktop.ini |
| C:\Documents and Settings\Default User\My Documents\My Videos\Desktop.ini |
| C:\Documents and Settings\Default User\NTUSER.INI |
| C:\Documents and Settings\Default User\SendTo\DESKTOP.INI |
| C:\Documents and Settings\Default User\Start Menu\Programs\Accessories\Accessibility\DESKTOP.INI |
| C:\Documents and Settings\Default User\Start Menu\Programs\Accessories\Entertainment\DESKTOP.INI |
| C:\Documents and Settings\Default User\Start Menu\Programs\Startup\DESKTOP.INI |
| C:\Documents and Settings\LocalService\ntuser.dat |
| C:\Documents and Settings\NetworkService\Application Data\Mozilla\Firefox\profiles.ini |
| C:\Documents and Settings\NetworkService\Application Data\Mozilla\Firefox\Profiles\default.jci\components.ini |
| C:\Documents and Settings\NetworkService\Application Data\Mozilla\Firefox\Profiles\default.jci\xpti.dat |
| C:\Documents and Settings\NetworkService\Application |

TABLE III-continued

| Windows Configuration Files |
|---|

Data\Mozilla\Firefox\Profiles\default.zbz\xpti.dat
C:\Documents and Settings\NetworkService\Application
Data\Talkback\MozillaOrg\Firefox10\Win32\2004080301\manifest.ini
C:\Documents and Settings\NetworkService\Local Settings\DESKTOP.INI
C:\Documents and Settings\NetworkService\NTUSER.INI
C:\DRIVERS\MODEM\BCMSMHOM.INI
C:\DRIVERS\MODEM\SETUP.INI
C:\I386\HWCOMP.DAT
C:\I386\WINNTUPG\MS\SNA\SNAUPG30.INI
C:\PHP\BACKUP\php.ini
C:\Program Files\AIM\unwise32.ini
C:\Program Files\AnalogX\PortBlocker\pblock.dat
C:\Program Files\AnalogX\WhoIs\whois.dat
C:\Program Files\AOD\timedata.ini
C:\Program Files\Broadcom\BACS\patterns.dat
C:\Program Files\Common Files\mozilla.org\GRE\1.7_2004061609\Setup
GRE\config.ini
C:\Program Files\Common Files\Sonic\Update Manager\banner.ini
C:\Program Files\Common Files\Storage\PFD01_12.dat
C:\Program Files\EarthLink Setup\Windows\access\program
files\EarthLink TotalAccess\setupmisc.cfg
C:\Program Files\EarthLink Setup\Windows\access\program
files\EarthLink TotalAccess\WinPoet.cfg
C:\Program Files\FutureDial\SnapSync Software\SnapSync.ini
C:\Program Files\GetRight\GRFolder.ini
C:\Program Files\ISOpen\Ressources\cd.dat
C:\Program Files\ISOpen\Ressources\GRAPHIC.DAT
C:\Program Files\Jasc Software Inc\Paint Shop Photo Album\asul.dat
C:\Program Files\Jasc Software Inc\Paint Shop Photo
Album\Backgrounds\Classic_camera_medium.dat
C:\Program Files\Jasc Software Inc\Paint Shop Photo
Album\Backgrounds\Classic_gallery_large.dat
C:\Program Files\Jasc Software Inc\Paint Shop Photo
Album\Backgrounds\Classic_gallery_small.dat
C:\Program Files\Jasc Software Inc\Paint Shop Photo
Album\Backgrounds\Classic_inactive_large.dat
C:\Program Files\Jasc Software Inc\Paint Shop Photo
Album\Backgrounds\Classic_inactive_small.dat
C:\Program Files\Jasc Software Inc\Paint Shop Photo
Album\Backgrounds\Classic_search_medium.dat
C:\Program Files\Jasc Software Inc\Paint Shop Photo
Album\Backgrounds\Classic_stitch_large.dat
C:\Program Files\Jasc Software Inc\Paint Shop Photo
Album\Backgrounds\Classic_stitch_small.dat
C:\Program Files\Jasc Software Inc\Paint Shop Photo
Album\Backgrounds\Classic_upload_medium.dat
C:\Program Files\Jasc Software Inc\Paint Shop Photo
Album\Backgrounds\Grid_camera_large.dat
C:\Program Files\Jasc Software Inc\Paint Shop Photo
Album\Backgrounds\Grid_camera_small.dat
C:\Program Files\Jasc Software Inc\Paint Shop Photo
Album\Backgrounds\Grid_gallery_medium.dat
C:\Program Files\Jasc Software Inc\Paint Shop Photo
Album\Backgrounds\Grid_image.dat
C:\Program Files\Jasc Software Inc\Paint Shop Photo
Album\Backgrounds\Grid_inactive_medium.dat
C:\Program Files\Jasc Software Inc\Paint Shop Photo
Album\Backgrounds\Grid_search_large.dat
C:\Program Files\Jasc Software Inc\Paint Shop Photo
Album\Backgrounds\Grid_search_small.dat
C:\Program Files\Jasc Software Inc\Paint Shop Photo
Album\Backgrounds\Grid_stitch_medium.dat
C:\Program Files\Jasc Software Inc\Paint Shop Photo
Album\Backgrounds\Grid_upload_large.dat
C:\Program Files\Jasc Software Inc\Paint Shop Photo
Album\Backgrounds\Grid_upload_small.dat
C:\Program Files\Jasc Software Inc\Paint Shop Pro 8\ADINIT.DAT
C:\Program Files\JetAudio\JetCast.cfg
C:\Program Files\JetAudio\Vis\Sound2Vision\DAT\config.dat
C:\Program Files\JetAudio\Vis\Sound2Vision\DAT\contrast.dat
C:\Program Files\JetAudio\Vis\Sound2Vision\DAT\shape128.dat
C:\Program Files\JetAudio\Vis\Sound2Vision\DAT\userpresetlist.dat
C:\Program Files\mIRC\aliases.ini
C:\Program Files\mIRC\popups.ini
C:\Program Files\mIRC\urls.ini
C:\Program Files\Mozilla Firefox\components.ini
C:\Program Files\Mozilla Firefox\components\talkback-l10n.ini
C:\Program Files\Mozilla Thunderbird\components.ini TABLE III-continued

| Windows Configuration Files |
|---|

C:\Program Files\Mozilla Thunderbird\components\talkback-l10n.ini
C:\Program Files\Mozilla Thunderbird\defaults\messenger\mailViews.dat
C:\Program Files\mozilla.org\Mozilla\components\master.ini
C:\Program Files\mozilla.org\Mozilla\defaults\messenger\mailViews.dat
C:\Program Files\MSN\MSNCoreFiles\MARKET.INI
C:\Program Files\MSN\MSNCoreFiles\Markets\14\MARKET.INI
C:\Program Files\MSN\MSNCoreFiles\Markets\163\MARKET.INI
C:\Program Files\MSN\MSNCoreFiles\Markets\220\MARKET.INI
C:\Program Files\MSN\MSNCoreFiles\Markets\238\MARKET.INI
C:\Program Files\MSN\MSNCoreFiles\MIGRATE.INI
C:\Program Files\MUSICMATCH\MUSICMATCH Jukebox\drives.ini
C:\Program Files\MUSICMATCH\MUSICMATCH Jukebox\MMCD.INI
C:\Program Files\MUSICMATCH\MUSICMATCH Jukebox\Skins\Pegasus\mmtheme.ini .
C:\Program Files\MUSICMATCH\MUSICMATCH Jukebox\Skins\Zephyr II\fw_mmtheme.ini
C:\Program Files\MUSICMATCH\MUSICMATCH Jukebox\Skins\Zephyr II\port_mmtheme.ini
C:\Program Files\MUSICMATCH\MUSICMATCH Jukebox\UserInfo.dat
C:\Program Files\MUSICMATCH\MUSICMATCH Update\MMJB\drives.ini
C:\Program Files\MUSICMATCH\MUSICMATCH Update\MMJB\JewelCaseConfig.ini
C:\Program Files\MUSICMATCH\MUSICMATCH Update\MMJB\MrbFList.cfg
C:\Program Files\MUSICMATCH\MUSICMATCH Update\MMJB\Setup.ini
C:\Program Files\MUSICMATCH\MUSICMATCH Update\MMUpdateMgr.dat
C:\Program Files\NewzCrawler\Defaults\Exports\exports.ini
C:\Program Files\OpenOffice.org1.1.2\help\en\sbasic.cfg
C:\Program Files\OpenOffice.org1.1.2\help\en\sdraw.cfg
C:\Program Files\OpenOffice.org1.1.2\help\en\smath.cfg
C:\Program Files\OpenOffice.org1.1.2\program\bootstrap.ini
C:\Program Files\OpenOffice.org1.1.2\program\configmgr.ini
C:\Program Files\OpenOffice.org1.1.2\program\pyuno.ini
C:\Program Files\OpenOffice.org1.1.2\program\soffice.ini
C:\Program Files\OpenOffice.org1.1.2\share\autocorr\acor1033.dat
C:\Program Files\OpenOffice.org1.1.2\share\dict\ooo\th_en_US.dat
C:\Program Files\OpenOffice.org1.1.2\user\config\inethist.dat
C:\Program Files\OpenOffice.org1.1.2\user\config\soffice.cfg
C:\Program Files\ORiNOCO\WirelessClient\Utility\orinoco.ini
C:\Program Files\ReadPlease\ReadWordsLite\ReadWordsLite.ini
C:\Program Files\Real\RealPlayer\Msg\Category.dat
C:\Program Files\Real\RealPlayer\Msg\SCategory.dat
C:\Program Files\RoboDemo\RoboDemo.dat
C:\Program Files\Sonic\DLA\setupopt.ini
C:\Program Files\SuperScan\scanner.ini
C:\Program Files\Synaptics\SynTP\Media\CERTIFY.INI
C:\Program Files\Synaptics\SynTP\Media\SYNTP.INI
C:\Program Files\Synaptics\SynTP\Media\SYNUNST.INI
C:\Program Files\Synaptics\SynTP\SynUnst.ini
C:\Program Files\TFTP Client\irunin.ini
C:\Program Files\TFTP Desktop\irunin.ini
C:\Program Files\TFTP Turbo\irunin.ini
C:\Program Files\Winamp\Plugins\ml\main.dat
C:\Program Files\Winamp\Plugins\vis_avs.dat
C:\Program Files\Windows NT\Pinball\FONT.DAT
C:\Program Files\WinRAR\rarnew.dat
C:\Program Files\WordPerfect Office 11\Config\Color.ini
C:\Program Files\WordPerfect Office 11\Config\Corelflt.ini
C:\Program Files\WordPerfect Office 11\Config\filters.ini
C:\Program Files\WordPerfect Office 11\Config\quattroproll\corel quattro pro 7\QP_EN_Docker.cfg
C:\Program Files\WordPerfect Office 11\Config\quattroproll\corel quattro pro 7\QuattroPro.INI
C:\Program Files\WordPerfect Office 11\Config\quattroproll\lotus 1-2-3\QP_EN_Docker.cfg
C:\Program Files\WordPerfect Office 11\Config\quattroproll\lotus 1-2-3\QuattroPro.INI
C:\Program Files\WordPerfect Office 11\Programs\Convert\EMCGM2.INI
C:\Program Files\WordPerfect Office 11\Programs\Convert\EMWP22.INI
C:\Program Files\WordPerfect Office 11\Programs\Convert\IMDRW2.INI
C:\Program Files\WordPerfect Office 11\Programs\Convert\IMHG32.INI
C:\Program Files\WordPerfect Office 11\Programs\Convert\IMPCT2.INI
C:\Program Files\WordPerfect Office 11\Programs\Convert\IMPS_2.INI
C:\Program Files\WordPerfect Office 11\Programs\Convert\IMWMF2.INI
C:\Program Files\WordPerfect Office 11\Programs\Convert\IPHGW2.INI
C:\Program Files\WordPerfect Office 11\Programs\Convert\IPPP32.INI
C:\Program Files\WordPerfect Office 11\Programs\Convert\IPPP72.INI TABLE III-continued

| Windows Configuration Files |
|---|

C:\Program Files\WordPerfect Office 11\Programs\Convert\IPSH32.INI
C:\Program Files\WordPerfect Office 11\Programs\Convert\WPPCOREL.INI
C:\Program Files\WordPerfect Office 11\Programs\PFDTLR.DAT
C:\WINDOWS\_delis32.ini
C:\WINDOWS\CONTROL.INI
C:\WINDOWS\FindServ.INI
C:\WINDOWS\Help\SBSI\Training\ENGINE.INI
C:\WINDOWS\mozver.dat
C:\WINDOWS\msoffice.ini
C:\WINDOWS\ODBC.INI
C:\WINDOWS\odbctrap.ini
C:\WINDOWS\ORUN32.INI
C:\WINDOWS\Prefetch\Layout.ini
C:\WINDOWS\SA2004.ini
C:\WINDOWS\ServicePackFiles\i386\_networkingperfcounters.ini
C:\WINDOWS\ServicePackFiles\i386\aspnet_perf2.ini
C:\WINDOWS\ServicePackFiles\i386\lang\imjpinst.ini
C:\WINDOWS\ServicePackFiles\i386\tcpmon.ini
C:\WINDOWS\SYSLOG.INI
C:\WINDOWS\SYSTEM32\BDEMERGE.INI
C:\WINDOWS\SYSTEM32\DESKTOP.INI
C:\WINDOWS\SYSTEM32\DirectX\Dinput\GLMDA.INI
C:\WINDOWS\SYSTEM32\DirectX\Dinput\GR3001.INI
C:\WINDOWS\SYSTEM32\DirectX\Dinput\GR4001.INI
C:\WINDOWS\SYSTEM32\DirectX\Dinput\GR4003.INI
C:\WINDOWS\SYSTEM32\DirectX\Dinput\HAMMER.INI
C:\WINDOWS\SYSTEM32\DirectX\Dinput\LGC202.INI
C:\WINDOWS\SYSTEM32\DirectX\Dinput\LGC209.INI
C:\WINDOWS\SYSTEM32\DirectX\Dinput\LGC291.INI
C:\WINDOWS\SYSTEM32\DirectX\Dinput\MS26.INI
C:\WINDOWS\SYSTEM32\DirectX\Dinput\MS26.INI
C:\WINDOWS\SYSTEM32\DirectX\Dinput\MS3B.INI
C:\WINDOWS\SYSTEM32\DirectX\Dinput\MS6.INI
C:\WINDOWS\SYSTEM32\DirectX\Dinput\MS7_G.INI
C:\WINDOWS\SYSTEM32\DirectX\Dinput\MS8_G.INI
C:\WINDOWS\SYSTEM32\DirectX\Dinput\MSE_G.INI
C:\WINDOWS\SYSTEM32\DirectX\Dinput\MSPRW.INI
C:\WINDOWS\SYSTEM32\dla\DLA.INI
C:\WINDOWS\SYSTEM32\emptyregdb.dat
C:\WINDOWS\SYSTEM32\FXSPERF.INI
C:\WINDOWS\SYSTEM32\IZArcARJ.dat
C:\WINDOWS\SYSTEM32\IZArcJAR.dat
C:\WINDOWS\SYSTEM32\IZArcRAR.dat
C:\WINDOWS\SYSTEM32\lvcoinst.ini
C:\WINDOWS\SYSTEM32\MQPERF.INI
C:\WINDOWS\SYSTEM32\NOISE.DAT
C:\WINDOWS\SYSTEM32\OEMINFO.INI
C:\WINDOWS\SYSTEM32\PERFC009.DAT
C:\WINDOWS\SYSTEM32\PERFD009.DAT
C:\WINDOWS\SYSTEM32\PERFH009.DAT
C:\WINDOWS\SYSTEM32\PRODSPEC.INI
C:\WINDOWS\SYSTEM32\px.ini
C:\WINDOWS\SYSTEM32\RASCTRS.INI
C:\WINDOWS\SYSTEM32\RSVP.INI
C:\WINDOWS\SYSTEM32\SPOOL\DRIVERS\W32X86\3\AD2KGELP.INI
C:\WINDOWS\SYSTEM32\tcpmon.ini
C:\WINDOWS\SYSTEM32\UNWISE.INI
C:\WINDOWS\SYSTEM32\WBEM\Repository\$WinMgmt.CFG
C:\WINDOWS\Tasks\DESKTOP.INI
C:\WINDOWS\tftpdesk.INI
C:\WINDOWS\VBADDIN.INI
C:\WINDOWS\winamp.ini
C:\WINDOWS\WORDPAD.INI
C:\BOOT.IC:\Documents and Settings\%USERNAME%\Application Data\Corel\WordPerfect Office 11\User Config\CdrConv.ini
C:\Documents and Settings\%USERNAME%\Application Data\Corel\WordPerfect Office 11\User Config\CorelApp.ini
C:\Documents and Settings\%USERNAME%\Application Data\Corel\WordPerfect Office 11\User Config\corelpdf.ini
C:\Documents and Settings\%USERNAME%\Application Data\DESKTOP.INI
C:\Documents and Settings\%USERNAME%\Application Data\Mozilla\Firefox\pluginreg.dat
C:\Documents and Settings\%USERNAME%\Application Data\Mozilla\Firefox\Profiles\default.66z\compatibility.ini
C:\Documents and Settings\%USERNAME%\Application Data\Mozilla\Firefox\Profiles\default.66z\compreg.dat
C:\Documents and Settings\%USERNAME%\Application Data\Mozilla\Firefox\Profiles\default.66z\xpti.dat TABLE III-continued

| Windows Configuration Files |
|---|
| C:\Documents and Settings\%USERNAME%\Application Data\Mozilla\registry.dat |
| C:\Documents and Settings\%USERNAME%\Application Data\SmartFTP\Favorites.dat |
| C:\Documents and Settings\%USERNAME%\Application Data\Talkback\MozillaOrg\Firefox10\Win32\2004062622\manifest.ini |
| C:\Documents and Settings\%USERNAME%\Application Data\Talkback\MozillaOrg\Firefox10\Win32\2004070723\Talkback.ini |
| C:\Documents and Settings\%USERNAME%\Application Data\Talkback\MozillaOrg\Firefox10\Win32\2004100109\manifest.ini |
| C:\Documents and Settings\%USERNAME%\Application Data\Talkback\MozillaOrg\Firefox10\Win32\2004110711\manifest.ini |
| C:\Documents and Settings\%USERNAME%\Application Data\Talkback\MozillaOrg\FirefoxTrunk\Win32\2005012706\Talkback.ini |
| C:\Documents and Settings\%USERNAME%\Application Data\Talkback\MozillaOrg\Thunderbird10\Win32\2004062616\manifest.ini |
| C:\Documents and Settings\%USERNAME%\Application Data\Talkback\MozillaOrg\Thunderbird10\Win32\2004091303\manifest.ini |
| C:\Documents and Settings\%USERNAME%\Application Data\Thunderbird\pluginreg.dat |
| C:\Documents and Settings\%USERNAME%\Application Data\Thunderbird\Profiles\default.r4w\compatibility.ini |
| C:\Documents and Settings\%USERNAME%\Application Data\Thunderbird\Profiles\default.r4w\compreg.dat |
| C:\Documents and Settings\%USERNAME%\Application Data\Thunderbird\Profiles\default.r4w\Mail\mail.purpletech.net\msgFilterRules.dat |
| C:\Documents and Settings\%USERNAME%\Application Data\Thunderbird\Profiles\default.r4w\mailViews.dat |
| C:\Documents and Settings\%USERNAME%\Application Data\Thunderbird\Profiles\default.r4w\persdict.dat |
| C:\Documents and Settings\%USERNAME%\Application Data\Thunderbird\Profiles\default.r4w\virtualFolders.dat |
| C:\Documents and Settings\%USERNAME%\Application Data\Thunderbird\registry.dat |
| C:\Documents and Settings\%USERNAME%\My Documents\DESKTOP.INI |
| C:\Documents and Settings\%USERNAME%\My Documents\My Pictures\Desktop.ini |
| C:\Documents and Settings\%USERNAME%\NetHood\Share on prx-server\Desktop.ini |
| C:\Documents and Settings\%USERNAME%\NTUSER.INI |
| C:\Documents and Settings\%USERNAME%\SendTo\DESKTOP.INI |
| C:\Documents and Settings\%USERNAME%\Start Menu\Programs\Accessories\Accessibility\DESKTOP.INI |
| C:\Documents and Settings\%USERNAME%\Start Menu\Programs\Accessories\Entertainment\DESKTOP.INI |
| C:\Documents and Settings\%USERNAME%\Start Menu\Programs\DESKTOP.INI |
| C:\Documents and Settings\%USERNAME%\UserData\index.dat |
| C:\Documents and Settings\Administrator\Application Data\Sonic\Update Manager\sumdb.dat |
| C:\Documents and Settings\Administrator\Local Settings\DESKTOP.INI |
| C:\Documents and Settings\Administrator\My Documents\My Music\Desktop.ini |
| C:\Documents and Settings\Administrator\My Documents\My Videos\Desktop.ini |
| C:\Documents and Settings\Administrator\NTUSER.INI |
| C:\Documents and Settings\Administrator\SendTo\DESKTOP.INI |
| C:\Documents and Settings\Administrator\Start Menu\Programs\Accessories\Accessibility\DESKTOP.INI |
| C:\Documents and Settings\Administrator\Start Menu\Programs\Accessories\Entertainment\DESKTOP.INI |
| C:\Documents and Settings\Administrator\Start Menu\Programs\Startup\DESKTOP.INI |
| C:\Documents and Settings\All Users\Documents\DESKTOP.INI |
| C:\Documents and Settings\All Users\Documents\My Music\Sample Music\DESKTOP.INI |
| C:\Documents and Settings\All Users\Documents\My Pictures\Sample Pictures\DESKTOP.INI |
| C:\Documents and Settings\All Users\NTUSER.DAT |
| C:\Documents and Settings\All Users\Start Menu\Programs\Accessories\Accessibility\DESKTOP.INI |
| C:\Documents and Settings\All Users\Start Menu\Programs\Accessories\Communications\Fax\DESKTOP.INI |
| C:\Documents and Settings\All Users\Start Menu\Programs\Accessories\Entertainment\DESKTOP.INI |
| C:\Documents and Settings\All Users\Start Menu\Programs\Administrative Tools\DESKTOP.INI |
| C:\Documents and Settings\All Users\Start |

TABLE III-continued

Windows Configuration Files

Menu\Programs\Games\DESKTOP.INI
C:\Documents and Settings\Default User\Application Data\DESKTOP.INI
C:\Documents and Settings\Default User\Favorites\Desktop.ini
C:\Documents and Settings\Default User\My Documents\DESKTOP.INI
C:\Documents and Settings\Default User\My Documents\My Pictures\Desktop.ini
C:\Documents and Settings\Default User\NTUSER.DAT
C:\Documents and Settings\Default User\Recent\Desktop.ini
C:\Documents and Settings\Default User\Start Menu\DESKTOP.INI
C:\Documents and Settings\Default User\Start Menu\Programs\Accessories\DESKTOP.INI
C:\Documents and Settings\Default User\Start Menu\Programs\DESKTOP.INI
C:\Documents and Settings\LocalService\Local Settings\DESKTOP.INI
C:\Documents and Settings\LocalService\NTUSER.INI
C:\Documents and Settings\NetworkService\Application Data\Mozilla\Firefox\Profiles\default.jci\compatibility.ini
C:\Documents and Settings\NetworkService\Application Data\Mozilla\Firefox\Profiles\default.jci\compreg.dat
C:\Documents and Settings\NetworkService\Application Data\Mozilla\Firefox\Profiles\default.zbz\compreg.dat
C:\Documents and Settings\NetworkService\Application Data\Mozilla\pluginreg.dat
C:\Documents and Settings\NetworkService\Favorites\Desktop.ini
C:\Documents and Settings\NetworkService\NTUSER.DAT
C:\DRIVERS\dlink-drivers\Setup.ini
C:\DRIVERS\MODEM\BCMSMU.INI
C:\PHP\php.ini
C:\Program Files\AIM\Xpcs Registry.dat
C:\Program Files\AnalogX\WhoIs\servers.dat
C:\Program Files\AOD\aol.ini
C:\Program Files\ATTNaturalVoices\TTS1.4\Desktop\data\tts.cfg
C:\Program Files\Chartist\AZSPELL.INI
C:\Program Files\Common Files\Nullsoft\dsunlk.dat
C:\Program Files\Common Files\Sonic\Update Manager\rgnurls.ini
C:\Program Files\Common Files\Storage\PFG41_12.dat
C:\Program Files\EarthLink Setup\Windows\access\program files\EarthLink TotalAccess\swflash.cfg
C:\Program Files\GetRight\GRSkin.ini
C:\Program Files\ISOpen\Ressources\Disc.dat
C:\Program Files\Jasc Software Inc\Animation Shop 3\PSRES\unisym.dat
C:\Program Files\Jasc Software Inc\Paint Shop Photo Album\Backgrounds\Classic_camera_large.dat
C:\Program Files\Jasc Software Inc\Paint Shop Photo Album\Backgrounds\Classic_camera_small.dat
C:\Program Files\Jasc Software Inc\Paint Shop Photo Album\Backgrounds\Classic_gallery_medium.dat
C:\Program Files\Jasc Software Inc\Paint Shop Photo Album\Backgrounds\Classic_image.dat
C:\Program Files\Jasc Software Inc\Paint Shop Photo Album\Backgrounds\Classic_inactive_medium.dat
C:\Program Files\Jasc Software Inc\Paint Shop Photo Album\Backgrounds\Classic_search_large.dat
C:\Program Files\Jasc Software Inc\Paint Shop Photo Album\Backgrounds\Classic_search_small.dat
C:\Program Files\Jasc Software Inc\Paint Shop Photo Album\Backgrounds\Classic_stitch_medium.dat
C:\Program Files\Jasc Software Inc\Paint Shop Photo Album\Backgrounds\Classic_upload_large.dat
C:\Program Files\Jasc Software Inc\Paint Shop Photo Album\Backgrounds\Classic_upload_small.dat
C:\Program Files\Jasc Software Inc\Paint Shop Photo Album\Backgrounds\Grid_camera_medium.dat
C:\Program Files\Jasc Software Inc\Paint Shop Photo Album\Backgrounds\Grid_gallery_large.dat
C:\Program Files\Jasc Software Inc\Paint Shop Photo Album\Backgrounds\Grid_gallery_small.dat
C:\Program Files\Jasc Software Inc\Paint Shop Photo Album\Backgrounds\Grid_inactive_large.dat
C:\Program Files\Jasc Software Inc\Paint Shop Photo Album\Backgrounds\Grid_inactive_small.dat
C:\Program Files\Jasc Software Inc\Paint Shop Photo Album\Backgrounds\Grid_search_medium.dat
C:\Program Files\Jasc Software Inc\Paint Shop Photo Album\Backgrounds\Grid_stitch_large.dat
C:\Program Files\Jasc Software Inc\Paint Shop Photo Album\Backgrounds\Grid_stitch_small.dat
C:\Program Files\Jasc Software Inc\Paint Shop Photo TABLE III-continued Windows Configuration Files Album\Backgrounds\Grid_upload_medium.dat
C:\Program Files\Jasc Software Inc\Paint Shop Photo Album\system\s.dat
C:\Program Files\Jasc Software Inc\Paint Shop Pro 8\PostScript Resources\unisym.dat
C:\Program Files\JetAudio\jetAudio.cfg
C:\Program Files\JetAudio\Vis\Sound2Vision\DAT\ath.dat
C:\Program Files\JetAudio\Vis\Sound2Vision\DAT\config.ini
C:\Program Files\JetAudio\Vis\Sound2Vision\DAT\image.dat
C:\Program Files\JetAudio\Vis\Sound2Vision\DAT\tex.dat
C:\Program Files\Linksys\Wireless-G Notebook Adapter with SpeedBooster\Language.ini
C:\Program Files\mIRC\mirc.ini
C:\Program Files\mIRC\servers.ini
C:\Program Files\Modem Helper\MDM_Util.ini
C:\Program Files\Mozilla Firefox\components\master.ini
C:\Program Files\Mozilla Firefox\defaults.ini
C:\Program Files\Mozilla Thunderbird\components\master.ini
C:\Program Files\Mozilla Thunderbird\defaults.ini
C:\Program Files\mozilla.org\Mozilla\components\compreg.dat
C:\Program Files\mozilla.org\Mozilla\components\talkback-l10n.ini
C:\Program Files\mozilla.org\Mozilla\defaults\messenger\US\mailViews.dat
C:\Program Files\MSN\MSNCoreFiles\Markets\100\MARKET.INI
C:\Program Files\MSN\MSNCoreFiles\Markets\150\MARKET.INI
C:\Program Files\MSN\MSNCoreFiles\Markets\188\MARKET.INI
C:\Program Files\MSN\MSNCoreFiles\Markets\222\MARKET.INI
C:\Program Files\MSN\MSNCoreFiles\Markets\36\MARKET.INI
C:\Program Files\MUSICMATCH\MUSICMATCH Jukebox\DbParams.ini
C:\Program Files\MUSICMATCH\MUSICMATCH Jukebox\JewelCaseConfig.ini
C:\Program Files\MUSICMATCH\MUSICMATCH Jukebox\Skins\Pegasus\fw_mmtheme.ini
C:\Program Files\MUSICMATCH\MUSICMATCH Jukebox\Skins\Pegasus\port_mmtheme.ini
C:\Program Files\MUSICMATCH\MUSICMATCH Jukebox\Skins\Zephyr II\mmtheme.ini
C:\Program Files\MUSICMATCH\MUSICMATCH Jukebox\TrackListConfig.ini
C:\Program Files\MUSICMATCH\MUSICMATCH Update\MMJB\DbParams.ini
C:\Program Files\MUSICMATCH\MUSICMATCH Update\MMJB\fw_mmtheme.ini
C:\Program Files\MUSICMATCH\MUSICMATCH Update\MMJB\mmtheme.ini
C:\Program Files\MUSICMATCH\MUSICMATCH Update\MMJB\port_mmtheme.ini
C:\Program Files\MUSICMATCH\MUSICMATCH Update\MMJB\TrackListConfig.ini
C:\Program Files\NewzCrawler\Codepages\unicode.dat
C:\Program Files\OfficeUpdate11\ident.ini
C:\Program Files\OpenOffice.org1.1.2\help\en\scalc.cfg
C:\Program Files\OpenOffice.org1.1.2\help\en\simpress.cfg
C:\Program Files\OpenOffice.org1.1.2\help\en\swriter.cfg
C:\Program Files\OpenOffice.org1.1.2\program\components\xpti.dat
C:\Program Files\OpenOffice.org1.1.2\program\pythonloader.uno.ini
C:\Program Files\OpenOffice.org1.1.2\program\setup.ini
C:\Program Files\OpenOffice.org1.1.2\program\uno.ini
C:\Program Files\OpenOffice.org1.1.2\share\autocorr\acor2057.dat
C:\Program Files\OpenOffice.org1.1.2\user\autocorr\acor1033.dat
C:\Program Files\OpenOffice.org1.1.2\user\config\java.ini
C:\Program Files\ORiNOCO\WirelessClient\Utility\arccsel.dat
C:\Program Files\ReadPlease\ReadWordsLite\pronun.ini
C:\Program Files\ReadPlease\ReadWordsLite\SAPI51\setup.ini
C:\Program Files\Real\RealPlayer\Msg\Messages.dat
C:\Program Files\Sonic\RecordNow!\genre.ini
C:\Program Files\SupervisionCam\info.ini
C:\Program Files\Synaptics\SynTP\Media\SETUP.INI
C:\Program Files\Synaptics\SynTP\Media\SYNTPENH.INI
C:\Program Files\Synaptics\SynTP\SynTPEnh.ini
C:\Program Files\TFTP Client\irunin.dat
C:\Program Files\TFTP Desktop\irunin.dat
C:\Program Files\TFTP Turbo\irunin.dat
C:\Program Files\Winamp\Plugins\gen_ml.ini
C:\Program Files\Winamp\Plugins\ml\recent.dat
C:\Program Files\Winamp\Winamp.ini
C:\Program Files\Windows NT\Pinball\PINBALL.DAT
C:\Program Files\WordPerfect Office 11\Config\CdrConv.ini
C:\Program Files\WordPerfect Office 11\Config\CorelApp.ini
C:\Program Files\WordPerfect Office 11\Config\corelpdf.ini
C:\Program Files\WordPerfect Office 11\Config\quattroproll\corel quattro pro 7\QP_EN_Bar.cfg
C:\Program Files\WordPerfect Office 11\Config\quattroproll\corel quattro pro 7\QP_EN_ShortCutKeys.cfg TABLE III-continued Windows Configuration Files C:\Program Files\WordPerfect Office 11\Config\quattroproll\lotus 1-2-3\QP_EN_Bar.cfg
C:\Program Files\WordPerfect Office 11\Config\quattroproll\lotus 1-2-3\QP_EN_ShortCutKeys.cfg
C:\Program Files\WordPerfect Office 11\Programs\Convert\EBTIF2.INI
C:\Program Files\WordPerfect Office 11\Programs\Convert\EMPS_2.INI
C:\Program Files\WordPerfect Office 11\Programs\Convert\IMCGM2.INI
C:\Program Files\WordPerfect Office 11\Programs\Convert\IMDXF2.INI
C:\Program Files\WordPerfect Office 11\Programs\Convert\IMHGL2.INI
C:\Program Files\WordPerfect Office 11\Programs\Convert\IMPIC2.INI
C:\Program Files\WordPerfect Office 11\Programs\Convert\IMPSI2.INI
C:\Program Files\WordPerfect Office 11\Programs\Convert\IPCSH2.INI
C:\Program Files\WordPerfect Office 11\Programs\Convert\IPPP22.INI
C:\Program Files\WordPerfect. Office 11\Programs\Convert\IPPP42.INI
C:\Program Files\WordPerfect Office 11\Programs\Convert\ippp82.ini
C:\Program Files\WordPerfect Office 11\Programs\Convert\ISGDI32.INI
C:\Program Files\WordPerfect Office 11\Programs\Data\panose.dat
C:\SystemInfo.ini
C:\WINDOWS\BOOTSTAT.DAT
C:\WINDOWS\DESKTOP.INI
C:\WINDOWS\Fonts\DESKTOP.INI
C:\WINDOWS\loc2.INI
C:\WINDOWS\MSDFMAP.INI
C:\WINDOWS\nsreg.dat
C:\WINDOWS\ODBCINST.INI
C:\WINDOWS\Offline Web Pages\DESKTOP.INI
C:\WINDOWS\php.ini
C:\WINDOWS\REPAIR\NTUSER.DAT
C:\WINDOWS\smscfg.ini
C:\WINDOWS\SYSTEM.INI
C:\WINDOWS\SYSTEM32\Com\COMEMPTY.DAT
C:\WINDOWS\SYSTEM32\DirectX\Dinput\ACTC094.INI
C:\WINDOWS\SYSTEM32\DirectX\Dinput\GLMDIGGP.INI
C:\WINDOWS\SYSTEM32\DirectX\Dinput\GR3001_G.INI
C:\WINDOWS\SYSTEM32\DirectX\Dinput\GR4001_G.INI
C:\WINDOWS\SYSTEM32\DirectX\Dinput\GR4005.INI
C:\WINDOWS\SYSTEM32\DirectX\Dinput\IA3002.INI
C:\WINDOWS\SYSTEM32\DirectX\Dinput\LGC207.INI
C:\WINDOWS\SYSTEM32\DirectX\Dinput\LGC20A.INI
C:\WINDOWS\SYSTEM32\DirectX\Dinput\MS1B.INI
C:\WINDOWS\SYSTEM32\DirectX\Dinput\MS27.INI
C:\WINDOWS\SYSTEM32\DirectX\Dinput\MS34.INI
C:\WINDOWS\SYSTEM32\DirectX\Dinput\MS56.INI
C:\WINDOWS\SYSTEM32\DirectX\Dinput\MS7.INI
C:\WINDOWS\SYSTEM32\DirectX\Dinput\MS8.INI
C:\WINDOWS\SYSTEM32\DirectX\Dinput\MSE.INI
C:\WINDOWS\SYSTEM32\DirectX\Dinput\MSF1F.INI
C:\WINDOWS\SYSTEM32\DirectX\Dinput\RAIDERPD.INI
C:\WINDOWS\SYSTEM32\DSSEC.DAT
C:\WINDOWS\SYSTEM32\ESENTPRF.INI
C:\WINDOWS\SYSTEM32\IZArcACE.dat.
C:\WINDOWS\SYSTEM32\IZArcBH.dat
C:\WINDOWS\SYSTEM32\IZArcLHA.dat
C:\WINDOWS\SYSTEM32\IZArcZip.dat
C:\WINDOWS\SYSTEM32\MLANG.DAT
C:\WINDOWS\SYSTEM32\MSDTCPRF.INI
C:\WINDOWS\SYSTEM32\OEMBIOS.DAT
C:\WINDOWS\SYSTEM32\OOBE\OOBEINFO.INI
C:\WINDOWS\SYSTEM32\PERFCI.INI
C:\WINDOWS\SYSTEM32\PERFFILT.INI
C:\WINDOWS\SYSTEM32\PERFI009.DAT
C:\WINDOWS\SYSTEM32\PERFWCI.INI
C:\WINDOWS\SYSTEM32\PSCHDPRF.INI
C:\WINDOWS\SYSTEM32\QuickTime\CFUniCharPropertyDatabase.data
C:\WINDOWS\SYSTEM32\RgsData.dat
C:\WINDOWS\SYSTEM32\secupd.dat
C:\WINDOWS\SYSTEM32\SPOOL\DRIVERS\W32X86\ad2kgelp.ini
C:\WINDOWS\SYSTEM32\TSLABELS.INI
C:\WINDOWS\SYSTEM32\WBEM\Performance\WmiApRpl.ini
C:\WINDOWS\SYSTEM32\WBEM\Repository\FS\OBJECTS.DATA
C:\WINDOWS\Tasks\SA.DAT
C:\WINDOWS\VB.INI
C:\WINDOWS\WIN.INI
C:\WINDOWS\wininit.ini

TABLE IV

Windows Essential System Files

C:\CONFIG.SYS
C:\MSDOS.SYS
C:\PHP\IISConfig.exe
C:\PHP\php.exe
C:\PHP\php4ts.dll
C:\Program Files\abelhadigital.com\HostsMan\hm.exe
C:\Program Files\abelhadigital.com\HostsMan\UnzDll.dll
C:\Program Files\abelhadigital.com\HostsMan\ZipDll.dll
C:\Program Files\Abyss Web Server\abyssws.exe
C:\Program Files\AIM\aim.exe
C:\Program Files\AIM\aim95.exe
C:\Program Files\AIM\AIM_xmlp.dll
C:\Program Files\AIM\aimapi.dll
C:\Program Files\AIM\aimauto.exe
C:\Program Files\AIM\aimax.dll
C:\Program Files\AIM\AimCoreSvcs.dll
C:\Program Files\AIM\AimRes.dll
C:\Program Files\AIM\AimSecondarySvcs.dll
C:\Program Files\AIM\aimtalk.dll
C:\Program Files\AIM\ate32.dll
C:\Program Files\AIM\ateima32.dll
C:\Program Files\AIM\chksign.dll
C:\Program Files\AIM\CoolBos.dll
C:\Program Files\AIM\CoolBucky.dll
C:\Program Files\AIM\CoolHttp.dll
C:\Program Files\AIM\CoolSecNss.dll
C:\Program Files\AIM\CoolSocket.dll
C:\Program Files\AIM\CoolSos.dll
C:\Program Files\AIM\csh.dll
C:\Program Files\AIM\dBenderC.dll
C:\Program Files\AIM\dunzip32.dll
C:\Program Files\AIM\idlemon.dll
C:\Program Files\AIM\inetsocket.dll
C:\Program Files\AIM\jga0aol.dll
C:\Program Files\AIM\jga0tlk.dll
C:\Program Files\AIM\jgalaol.dll
C:\Program Files\AIM\jgaltlk.dll
C:\Program Files\AIM\jgataol.dll
C:\Program Files\AIM\jgattlk.dll
C:\Program Files\AIM\jgedaol.dll
C:\Program Files\AIM\jgedtlk.dll
C:\Program Files\AIM\jgs2aol.dll
C:\Program Files\AIM\jgs2tlk.dll
C:\Program Files\AIM\jgs3aol.dll
C:\Program Files\AIM\jgs3tlk.dll
C:\Program Files\AIM\jgs6tlk.dll
C:\Program Files\AIM\jgs7tlk.dll
C:\Program Files\AIM\jgseaol.dll
C:\Program Files\AIM\jgsetlk.dll
C:\Program Files\AIM\jgtkaol.dll
C:\Program Files\AIM\jgtktlk.dll
C:\Program Files\AIM\msvcr70.dll
C:\Program Files\AIM\nspr4.dll
C:\Program Files\AIM\nss3.dll
C:\Program Files\AIM\nssckbi.dll
C:\Program Files\AIM\oscarui.dll
C:\Program Files\AIM\oscore.dll
C:\Program Files\AIM\oscres.dll
C:\Program Files\AIM\Patcher.dll
C:\Program Files\AIM\Patcher.exe
C:\Program Files\AIM\plc4.dll
C:\Program Files\AIM\plds4.dll
C:\Program Files\AIM\ProgressDlg.dll
C:\Program Files\AIM\rtvideo.dll
C:\Program Files\AIM\sb.dll
C:\Program Files\AIM\SendFile.exe
C:\Program Files\AIM\ShareFile.exe
C:\Program Files\AIM\smime3.dll
C:\Program Files\AIM\softokn3.dll
C:\Program Files\AIM\ssl3.dll
C:\Program Files\AIM\Sysfiles\AolOnDesktop.exe
C:\Program Files\AIM\Sysfiles\imagehlp.dll
C:\Program Files\AIM\Sysfiles\msvcr70.dll
C:\Program Files\AIM\Sysfiles\msvcr71.dll
C:\Program Files\AIM\Sysfiles\WxBug.EXE
C:\Program Files\AIM\Unwise32.exe
C:\Program Files\AIM\wndutils.dll
C:\Program Files\AIM\xmlparse.dll TABLE IV-continued Windows Essential System Files C:\Program Files\AIM\xmltok.dll
C:\Program Files\AIM\Xpcs.dll
C:\Program Files\AIM\Xprt.dll
C:\Program Files\AIM\Xptl.dll
C:\Program Files\AnalogX\Atomic TimeSync\ats.exe
C:\Program Files\AnalogX\Atomic TimeSync\atsu.exe
C:\Program Files\AnalogX\NetStat Live\inetmibl.dll
C:\Program Files\AnalogX\NetStat Live\nsl.exe
C:\Program Files\AnalogX\NetStat Live\nslu.exe
C:\Program Files\AnalogX\PortBlocker\pblock.exe
C:\Program Files\AnalogX\PortBlocker\pblocku.exe
C:\Program Files\AnalogX\PortMapper\pmapper.exe
C:\Program Files\AnalogX\PortMapper\pmapperu.exe
C:\Program Files\AnalogX\WhoIs\whois.exe
C:\Program Files\AnalogX\WhoIs\whoisu.exe
C:\Program Files\AOD\AolAod.exe
C:\Program Files\ATTNaturalVoices\TTS1.4\Desktop\bin\nvdesktopproxy.exe
C:\Program Files\ATTNaturalVoices\TTS1.4\Desktop\bin\nvdttts.dll
C:\Program Files\ATTNaturalVoices\TTS1.4\Desktop\bin\nvdttts40.dll
C:\Program Files\ATTNaturalVoices\TTS1.4\Desktop\bin\ttsdesktopproxy.exe
C:\Program Files\ATTNaturalVoices\TTS1.4\Desktop\bin\WinDictEdit.exe
C:\Program Files\ATTNaturalVoices\TTS1.4\Desktop\data\en_us\fe_en_us.dll
C:\Program Files\AWS\WeatherBug\MiniBugTransporter.dll
C:\Program Files\Basepath Software\Albumatic2\albumatic.exe
C:\Program Files\Basepath Software\Albumatic2\Imagery.dll
C:\Program Files\Blighty Design\hhupd.exe
C:\Program Files\Blighty Design\spade.exe
C:\Program Files\Broadcom\BACS\BACS.exe
C:\Program Files\Broadcom\BACS\BacsTray.exe
C:\Program Files\Broadcom\BACS\BASFND.sys
C:\Program Files\Broadcom\BACS\BMAPI.dll
C:\Program Files\Broadcom\BACS\cabw32.dll
C:\Program Files\Broadcom\BACS\FAD.sys
C:\Program Files\Broadcom\BACS\FADXP32.sys
C:\Program Files\CDBurnerXP Pro\cdbxp.exe
C:\Program Files\CDBurnerXP Pro\lame_enc.dll
C:\Program Files\CDBurnerXP Pro\NCTAudioCDRipper2.dll
C:\Program Files\CDBurnerXP Pro\NCTAudioCDWriter2.dll
C:\Program Files\CDBurnerXP Pro\NCTAudioFile2.dll
C:\Program Files\CDBurnerXP Pro\NCTAudioInformation2.dll
C:\Program Files\CDBurnerXP Pro\NCTAudioPlayer2.dll
C:\Program Files\CDBurnerXP Pro\NCTAudioTransform2.dll
C:\Program Files\CDBurnerXP Pro\NCTDataCDWriter2.dll
C:\Program Files\CDBurnerXP Pro\NCTDataDVDWriter2.dll
C:\Program Files\CDBurnerXP Pro\Resources\xplibico.dll
C:\Program Files\CDBurnerXP Pro\XAPI2000.dll
C:\Program Files\CFS-Technologies\Speakonia\spchapi.exe
C:\Program Files\CFS-Technologies\Speakonia\Speakonia.exe
C:\Program Files\CFS-Technologies\Speakonia\tv_enua.exe
C:\Program Files\Chartist\az32dlg.dll
C:\Program Files\Chartist\AZ32LIC.DLL
C:\Program Files\Chartist\az32rce.dll
C:\Program Files\Chartist\AZS32.dll
C:\Program Files\Chartist\chartp32.exe
C:\Program Files\Chartist\unicows.dll
C:\Program Files\Cisco Aironet\ADU.exe
C:\Program Files\Cisco Aironet\cscodiag.exe
C:\Program Files\Cisco Aironet\oemres.dll
C:\Program Files\CladaSoft\Bukster 1.0 Beta\bukster.exe
C:\Program Files\coLinux\colinux-bridged-net-daemon.exe
C:\Program Files\coLinux\colinux-console-fltk.exe
C:\Program Files\coLinux\colinux-console-nt.exe
C:\Program Files\coLinux\colinux-daemon.exe
C:\Program Files\coLinux\colinux-net-daemon.exe
C:\Program Files\coLinux\linux.sys
C:\Program Files\coLinux\netdriver\devcon.exe
C:\Program Files\coLinux\netdriver\tapdrvr.sys
C:\Program Files\Common Files\AOL\YGPPicFinder.dll
C:\Program Files\Common Files\AOL\YGPPicFinderRes.dll
C:\Program Files\Common Files\AOL\YGPPicRip.dll
C:\Program Files\Common Files\Corel\Shared\Writing Tools\11\CODAC.dll
C:\Program Files\Common Files\Corel\Shared\Writing Tools\11\CrlWTC110.dll
C:\Program Files\Common Files\Corel\Shared\Writing

TABLE IV-continued

Windows Essential System Files

Tools\11\OUPEng.dll
C:\Program Files\Common Files\Corel\Shared\Writing Tools\11\WT11cbe.dll
C:\Program Files\Common Files\Corel\Shared\Writing Tools\11\WT11COD.dll
C:\Program Files\Common Files\Corel\Shared\Writing Tools\11\WT11LDDE.dll
C:\Program Files\Common Files\Corel\Shared\Writing Tools\11\WT11LDEN.dll
C:\Program Files\Common Files\Corel\Shared\Writing Tools\11\WT11LDES.dll
C:\Program Files\Common Files\Corel\Shared\Writing Tools\11\WT11LDFR.dll
C:\Program Files\Common Files\Corel\Shared\Writing Tools\11\WT11LDIT.dll
C:\Program Files\Common Files\Corel\Shared\Writing Tools\11\WT11LDNL.dll
C:\Program Files\Common Files\Corel\Shared\Writing Tools\11\WT11LDPO.dll
C:\Program Files\Common Files\Corel\Shared\Writing Tools\11\WT11LDXX.dll
C:\Program Files\Common Files\Corel\Shared\Writing Tools\11\WT11LI.dll
C:\Program Files\Common Files\Corel\Shared\Writing Tools\11\WT11sphs.dll
C:\Program Files\Common Files\Corel\Shared\Writing Tools\11\WT11spls.dll
C:\Program Files\Common Files\Corel\Shared\Writing Tools\11\WT11SPML.dll
C:\Program Files\Common Files\Corel\Shared\Writing Tools\11\WT11sptlEN.exe
C:\Program Files\Common Files\Corel\Shared\Writing Tools\11\WT11SPTP.dll
C:\Program Files\Common Files\Corel\Shared\Writing Tools\11\WT11SPWP.dll
C:\Program Files\Common Files\Corel\Shared\Writing Tools\11\WT11uien.dll
C:\Program Files\Common Files\Designer\MSADDNDR.DLL
C:\Program Files\Common Files\FotoWire\HTTPEncoder.dll
C:\Program Files\Common Files\Java\Update\Base Images\j2re1.4.2-b28\patch-j2re1.4.2_03-b02\patchjre.exe
C:\Program Files\Common Files\L&H\SpeechEngines\tscore10.dll
C:\Program Files\Common Files\mozilla.org\GRE\1.7_2004061609\components\accessibility.dll
C:\Program Files\Common Files\mozilla.org\GRE\1.7_2004061609\components\appshell.dll
C:\Program Files\Common Files\mozilla.org\GRE\1.7_2004061609\components\caps.dll
C:\Program Files\Common Files\mozilla.org\GRE\1.7_2004061609\components\chrome.dll
C:\Program Files\Common Files\mozilla.org\GRE\1.7_2004061609\components\cookie.dll
C:\Program Files\Common Files\mozilla.org\GRE\1.7_2004061609\components\docshell.dll
C:\Program Files\Common Files\mozilla.org\GRE\1.7_2004061609\components\editor.dll
C:\Program Files\Common Files\mozilla.org\GRE\1.7_2004061609\components\embedcomponents.dll
C:\Program Files\Common Files\mozilla.org\GRE\1.7_2004061609\components\gkgfxwin.dll
C:\Program Files\Common Files\mozilla.org\GRE\1.7_2004061609\components\gklayout.dll
C:\Program Files\Common Files\mozilla.org\GRE\1.7_2004061609\components\gkparser.dll
C:\Program Files\Common Files\mozilla.org\GRE\1.7_2004061609\components\gkplugin.dll
C:\Program Files\Common Files\mozilla.org\GRE\1.7_2004061609\components\gkwidget.dll
C:\Program Files\Common Files\mozilla.org\GRE\1.7_2004061609\components\i18n.dll
C:\Program Files\Common Files\mozilla.org\GRE\1.7_2004061609\components\imgicon.dll
C:\Program Files\Common Files\mozilla.org\GRE\1.7_2004061609\components\imglib2.dll
C:\Program Files\Common Files\mozilla.org\GRE\1.7_2004061609\components\ipcdc.dll
C:\Program Files\Common Files\mozilla.org\GRE\1.7_2004061609\components\jar50.dll TABLE IV-continued Windows Essential System Files C:\Program Files\Common Files\mozilla.org\GRE\1.7_2004061609\components\necko.dll
C:\Program Files\Common Files\mozilla.org\GRE\1.7_2004061609\components\necko2.dll
C:\Program Files\Common Files\mozilla.org\GRE\1.7_2004061609\components\oji.dll
C:\Program Files\Common Files\mozilla.org\GRE\1.7_2004061609\components\p3p.dll
C:\Program Files\Common Files\mozilla.org\GRE\1.7_2004061609\components\pipboot.dll
C:\Program Files\Common Files\mozilla.org\GRE\1.7_2004061609\components\pipnss.dll
C:\Program Files\Common Files\mozilla.org\GRE\1.7_2004061609\components\profile.dll
C:\Program Files\Common Files\mozilla.org\GRE\1.7_2004061609\components\rdf.dll
C:\Program Files\Common Files\mozilla.org\GRE\1.7_2004061609\components\uconv.dll
C:\Program Files\Common Files\mozilla.org\GRE\1.7_2004061609\components\ucvmath.dll
C:\Program Files\Common Files\mozilla.org\GRE\1.7_2004061609\components\universalchardet.dll
C:\Program Files\Common Files\mozilla.org\GRE\1.7_2004061609\components\wallet.dll
C:\Program Files\Common Files\mozilla.org\GRE\1.7_2004061609\components\webbrwsr.dll
C:\Program Files\Common Files\mozilla.org\GRE\1.7_2004061609\components\xmlextras.dll
C:\Program Files\Common Files\mozilla.org\GRE\1.7_2004061609\components\xpc3250.dll
C:\Program Files\Common Files\mozilla.org\GRE\1.7_2004061609\components\xpcom_compat_c.dll
C:\Program Files\Common Files\mozilla.org\GRE\1.7_2004061609\components\xpinstal.dll
C:\Program Files\Common Files\mozilla.org\GRE\1.7_2004061609\components\xppref32.dll
C:\Program Files\Common Files\mozilla.org\GRE\1.7_2004061609\gkgfx.dll
C:\Program Files\Common Files\mozilla.org\GRE\1.7_2004061609\ipc\modules\lockmodule.dll
C:\Program Files\Common Files\mozilla.org\GRE\1.7_2004061609\ipc\modules\transmgr.dll
C:\Program Files\Common Files\mozilla.org\GRE\1.7_2004061609\js3250.dll
C:\Program Files\Common Files\mozilla.org\GRE\1.7_2004061609\jsj3250.dll
C:\Program Files\Common Files\mozilla.org\GRE\1.7_2004061609\mozctl.dll
C:\Program Files\Common Files\mozilla.org\GRE\1.7_2004061609\mozctlx.dll
C:\Program Files\Common Files\mozilla.org\GRE\1.7_2004061609\mozilla-ipcd.exe
C:\Program Files\Common Files\mozilla.org\GRE\1.7_2004061609\mozz.dll
C:\Program Files\Common Files\mozilla.org\GRE\1.7_2004061609\nspr4.dll
C:\Program Files\Common Files\mozilla.org\GRE\1.7_2004061609\nss3.dll
C:\Program Files\Common Files\mozilla.org\GRE\1.7_2004061609\nssckbi.dll
C:\Program Files\Common Files\mozilla.org\GRE\1.7_2004061609\plc4.dll
C:\Program Files\Common Files\mozilla.org\GRE\1.7_2004061609\plds4.dll
C:\Program Files\Common Files\mozilla.org\GRE\1.7_2004061609\Setup GRE\SETUP.EXE
C:\Program Files\Common Files\mozilla.org\GRE\1.7_2004061609\Setup GRE\setuprsc.dll
C:\Program Files\Common Files\mozilla.org\GRE\1.7_2004061609\smime3.dll
C:\Program Files\Common Files\mozilla.org\GRE\1.7_2004061609\softokn3.dll
C:\Program Files\Common Files\mozilla.org\GRE\1.7_2004061609\ssl3.dll
C:\Program Files\Common Files\mozilla.org\GRE\1.7_2004061609\xpcom.dll
C:\Program Files\Common Files\mozilla.org\GRE\1.7_2004061609\xpcom_compat.dll
C:\Program Files\Common TABLE IV-continued Windows Essential System Files Files\mozilla.org\GRE\1.7_2004061609\xpicleanup.exe
C:\Program Files\Common
Files\mozilla.org\GRE\1.7_2004061609\xpistub.dll
C:\Program Files\Common Files\MSSoap\Binaries\MSSOAP1.DLL
C:\Program Files\Common
Files\MSSoap\Binaries\Resources\1033\MSSOAPR.DLL
C:\Program Files\Common Files\MSSoap\Binaries\WISC10.DLL
C:\Program Files\Common Files\Nullsoft\ActiveX\AmpX.dll
C:\Program Files\Common
Files\Nullsoft\ActiveX\AOLMediaPlaybackControl.exe
C:\Program Files\Common Files\Nullsoft\ActiveX\plugins\enc_aac.dll
C:\Program Files\Common Files\Nullsoft\ActiveX\plugins\in_cdda.dll
C:\Program Files\Common Files\Nullsoft\ActiveX\plugins\in_dshow.dll
C:\Program Files\Common Files\Nullsoft\ActiveX\plugins\in_midi.dll
C:\Program Files\Common Files\Nullsoft\ActiveX\plugins\in_mp3.dll
C:\Program Files\Common Files\Nullsoft\ActiveX\plugins\in_nsv.dll
C:\Program Files\Common Files\Nullsoft\ActiveX\plugins\in_qt.dll
C:\Program Files\Common Files\Nullsoft\ActiveX\plugins\in_vlb.dll
C:\Program Files\Common Files\Nullsoft\ActiveX\plugins\in_wave.dll
C:\Program Files\Common Files\Nullsoft\ActiveX\plugins\in_wm.dll
C:\Program Files\Common
Files\Nullsoft\ActiveX\plugins\nsvdec_aac.dll
C:\Program Files\Common
Files\Nullsoft\ActiveX\plugins\nsvdec_mp3.dll
C:\Program Files\Common
Files\Nullsoft\ActiveX\plugins\nsvdec_vlb.dll
C:\Program Files\Common
Files\Nullsoft\ActiveX\plugins\nsvdec_vp3.dll
C:\Program Files\Common
Files\Nullsoft\ActiveX\plugins\nsvdec_vp5.dll
C:\Program Files\Common Files\Nullsoft\ActiveX\plugins\out_ds.dll
C:\Program Files\Common Files\Nullsoft\ActiveX\plugins\out_mm2.dll
C:\Program Files\Common.
Files\Nullsoft\Video\ActiveX\plugins\nsvplayx_vp5_mp3.dll
C:\Program Files\Common Files\Palo Alto Software\7.0\PAS7_App.exe
C:\Program Files\Common Files\Palo Alto
Software\7.0\PAS7_AppData.dll
C:\Program Files\Common Files\Palo Alto
Software\7.0\PAS7_Converter.dll
C:\Program Files\Common Files\Palo Alto
Software\7.0\PAS7_PlanActivities.dll
C:\Program Files\Common Files\Palo Alto
Software\7.0\pas7_plandata.dll
C:\Program Files\Common Files\Palo Alto
Software\7.0\PAS7_PublishXML.dll
C:\Program Files\Common Files\Palo Alto Software\7.0\PAS7_QB2003.dll
C:\Program Files\Common Files\Palo Alto
Software\7.0\PAS7_SamplePlans.dll
C:\Program Files\Common Files\Palo Alto Software\7.0\PAS7_Wizard.dll
C:\Program Files\Common Files\Palo Alto
Software\7.0\PAS7_XMLWizard.dll
C:\Program Files\Common Files\Real\Codecs\14_43260.dll
C:\Program Files\CommonFiles\Real\Codecs\28_83260.dll
C:\Program Files\CommonFiles\Real\Codecs\atrc3260.dll
C:\Program Files\CommonFiles\Real\Codecs\cook3260.dll
C:\Program Files\CommonFiles\Real\Codecs\ddnt3260.dll
C:\Program Files\CommonFiles\Real\Codecs\dnet3260.dll
C:\Program Files\CommonFiles\Real\Codecs\drv13260.dll
C:\Program Files\CommonFiles\Real\Codecs\drv23260.dll
C:\Program Files\CommonFiles\Real\Codecs\drv33260.dll
C:\Program Files\CommonFiles\Real\Codecs\drv43260.dll
C:\Program Files\CommonFiles\Real\Codecs\dspr3260.dll
C:\Program Files\CommonFiles\Real\Codecs\rnco3260.dll
C:\Program Files\CommonFiles\Real\Codecs\rv103260.dll
C:\Program Files\CommonFiles\Real\Codecs\rv203260.dll
C:\Program Files\CommonFiles\Real\Codecs\rv303260.dll
C:\Program Files\CommonFiles\Real\Codecs\rv403260.dll
C:\Program Files\CommonFiles\Real\Codecs\sipr3260.dll
C:\Program Files\CommonFiles\Real\Codecs\tokr3260.dll
C:\Program Files\CommonFiles\Real\Common\embd3260.dll
C:\Program Files\CommonFiles\Real\Common\pnen3260.dll
C:\Program Files\CommonFiles\Real\Common\pngu3266.dll
C:\Program Files\CommonFiles\Real\Common\pnrs3260.dll
C:\Program Files\CommonFiles\Real\Common\rjbviz.dll
C:\Program Files\CommonFiles\Real\Common\rner3260.dll
C:\Program Files\CommonFiles\Real\Common\rpcl3260.dll
C:\Program Files\CommonFiles\Real\Common\rpmn3260.dll
C:\Program Files\CommonFiles\Real\Common\rppr3260.dll TABLE IV-continued Windows Essential System Files C:\Program Files\CommonFiles\Real\Common\rput3260.dll
C:\Program Files\CommonFiles\Real\Common\trdr3260.dll
C:\Program Files\CommonFiles\Real\Plugins\audp3260.dll
C:\Program Files\CommonFiles\Real\Plugins\auth3260.dll
C:\Program Files\CommonFiles\Real\Plugins\basc3260.dll
C:\Program Files\CommonFiles\Real\Plugins\Dbc_hbrf.dll
C:\Program Files\CommonFiles\Real\Plugins\Dbc_hbrr.dll
C:\Program Files\CommonFiles\Real\Plugins\http3260.dll
C:\Program Files\CommonFiles\Real\Plugins\memf3260.dll
C:\Program Files\CommonFiles\Real\Plugins\meta3260.dll
C:\Program Files\CommonFiles\Real\Plugins\mp3f3260.dll
C:\Program Files\CommonFiles\Real\Plugins\mp3m3260.dll
C:\Program Files\CommonFiles\Real\Plugins\mp3r3260.dll
C:\Program Files\CommonFiles\Real\Plugins\ntau3260.dll
C:\Program Files\CommonFiles\Real\Plugins\plus3260.dll
C:\Program Files\CommonFiles\Real\Plugins\pnxr3260.dll
C:\Program Files\CommonFiles\Real\Plugins\ppff3260.dll
C:\Program Files\CommonFiles\Real\Plugins\pxcg3260.dll
C:\Program Files\CommonFiles\Real\Plugins\pxcj3260.dll
C:\Program Files\CommonFiles\Real\Plugins\pxcp3260.dll
C:\Program Files\CommonFiles\Real\Plugins\pxff3260.dll
C:\Program Files\CommonFiles\Real\Plugins\pxgf3260.dll
C:\Program Files\CommonFiles\Real\Plugins\pxgr3260.dll
C:\Program Files\CommonFiles\Real\Plugins\pxjf3260.dll
C:\Program Files\CommonFiles\Real\Plugins\pxjr3260.dll
C:\Program Files\CommonFiles\Real\Plugins\pxpf3260.dll
C:\Program Files\CommonFiles\Real\Plugins\pxpr3260.dll
C:\Program Files\Common Files\Real\Plugins\pxre3260.dll
C:\Program Files\Common Files\Real\Plugins\rare3260.dll
C:\Program Files\Common Files\Real\Plugins\rmff3260.dll
C:\Program Files\Common Files\Real\Plugins\rn5a3260.dll
C:\Program Files\Common Files\Real\Plugins\rtff3260.dll
C:\Program Files\Common Files\Real\Plugins\rtre3260.dll
C:\Program Files\Common Files\Real\Plugins\rupf3260.dll
C:\Program Files\Common Files\Real\Plugins\rupr3260.dll
C:\Program Files\Common Files\Real\Plugins\rvre3260.dll
C:\Program Files\Common Files\Real\Plugins\sdpp3260.dll
C:\Program Files\Common Files\Real\Plugins\smlf3260.dll
C:\Program Files\Common Files\Real\Plugins\smlr3260.dll
C:\Program Files\Common Files\Real\Plugins\smmr3260.dll
C:\Program Files\Common Files\Real\Plugins\smpl3260.dll
C:\Program Files\Common Files\Real\Plugins\stub3260.dll
C:\Program Files\Common Files\Real\Plugins\SVG3RFF.dll
C:\Program Files\Common Files\Real\Plugins\SVG3RR.dll
C:\Program Files\Common Files\Real\Plugins\swff3260.dll
C:\Program Files\Common Files\Real\Plugins\swfr3260.dll
C:\Program Files\Common Files\Real\Plugins\vidp3260.dll
C:\Program Files\Common Files\Real\Update\rnat3260.dll
C:\Program Files\Common Files\Real\Update\rnqu3260.dll
C:\Program Files\Common Files\Real\Update\rpup3260.dll
C:\Program Files\Common Files\Real\Update\setu3260.dll
C:\Program Files\Common Files\Real\Update\upgr3260.dll
C:\Program Files\Common Files\Real\Update\upgrdhlp.exe
C:\Program Files\Common Files\Sonic\Update Manager\dimpls\dmdimpls.dll
C:\Program Files\Common Files\Sonic\Update Manager\sfcwall31.dll
C:\Program Files\Common Files\Sonic\Update Manager\sgtray.exe
C:\Program Files\Common Files\Sonic\Update Manager\sus.dll
C:\Program Files\Common Files\Sonic\Update Manager\trayrenu.dll
C:\Program Files\Common Files\Sonic\Update Manager\vxhttp.dll
C:\Program Files\Common Files\SWF Studio\GetURL.dll
C:\Program Files\Common Files\SWF Studio\Registry.dll
C:\Program Files\Common Files\System\ADO\msader15.dll
C:\Program Files\Common Files\System\ADO\msado15.dll
C:\Program Files\Common Files\System\ADO\msadomd.dll
C:\Program Files\Common Files\System\ADO\msador15.dll
C:\Program Files\Common Files\System\ADO\msadox.dll
C:\Program Files\Common Files\System\ADO\msadrh15.dll
C:\Program Files\Common Files\System\ADO\msjro.dll
C:\Program Files\Common Files\System\directdb.dll
C:\Program Files\Common Files\System\MSADC\msadce.dll
C:\Program Files\Common Files\System\MSADC\msadcer.dll
C:\Program Files\Common Files\System\MSADC\msadcf.dll
C:\Program Files\Common Files\System\MSADC\msadcfr.dll
C:\Program Files\Common Files\System\MSADC\msadco.dll
C:\Program Files\Common Files\System\MSADC\msadcor.dll
C:\Program Files\Common Files\System\MSADC\msadcs.dll
C:\Program Files\Common Files\System\MSADC\msadds.dll TABLE IV-continued Windows Essential System Files C:\Program Files\Common Files\System\MSADC\msaddsr.dll
C:\Program Files\Common Files\System\MSADC\msdaprsr.dll
C:\Program Files\Common Files\System\MSADC\msdaprst.dll
C:\Program Files\Common Files\System\MSADC\msdarem.dll
C:\Program Files\Common Files\System\MSADC\msdaremr.dll
C:\Program Files\Common Files\System\MSADC\msdfmap.dll
C:\Program Files\Common Files\System\Ole DB\msdadc.dll
C:\Program Files\Common Files\System\Ole DB\msdaenum.dll
C:\Program Files\Common Files\System\Ole DB\msdaer.dll
C:\Program Files\Common Files\System\Ole DB\MSDAIPP.DLL
C:\Program Files\Common Files\System\Ole DB\msdaora.dll
C:\Program Files\Common Files\System\Ole DB\msdaorar.dll
C:\Program Files\Common Files\System\Ole DB\msdaosp.dll
C:\Program Files\Common Files\System\Ole DB\MSDAPML.DLL
C:\Program Files\Common Files\System\Ole DB\msdaps.dll
C:\Program Files\Common Files\System\Ole DB\msdasc.dll
C:\Program Files\Common Files\System\Ole DB\msdasql.dll
C:\Program Files\Common Files\System\Ole DB\msdasqlr.dll
C:\Program Files\Common Files\System\Ole DB\msdatl3.dll
C:\Program Files\Common Files\System\Ole DB\msdatt.dll
C:\Program Files\Common Files\System\Ole DB\msdaurl.dll
C:\Program Files\Common Files\System\Ole DB\MSDMENG.DLL
C:\Program Files\Common Files\System\Ole DB\MSDMINE.DLL
C:\Program Files\Common Files\System\Ole DB\MSMDCB80.DLL
C:\Program Files\Common Files\System\Ole DB\MSMDGD80.DLL
C:\Program Files\Common Files\System\Ole DB\MSMDUN80.DLL
C:\Program Files\Common Files\System\Ole DB\MSOLAP80.DLL
C:\Program Files\Common Files\System\Ole DB\MSOLUI80.DLL
C:\Program Files\Common Files\System\Ole DB\msxactps.dll
C:\Program Files\Common Files\System\Ole DB\oledb32.dll
C:\Program Files\Common Files\System\Ole DB\oledb32r.dll
C:\Program Files\Common Files\System\Ole DB\sqloledb.dll
C:\Program Files\Common Files\System\Ole DB\sqlxmlx.dll
C:\Program Files\Common Files\System\wab32.dll
C:\Program Files\Common Files\System\wab32res.dll
C:\Program Files\COWON\iAUDIO U2 Firmware\CWLib.dll
C:\Program Files\COWON\iAUDIO U2 Firmware\regdll.dll
C:\Program Files\COWON\iAUDIO U2 Firmware\Stmp0404.dll
C:\Program Files\COWON\iAUDIO U2 Firmware\stmp0407.dll
C:\Program Files\COWON\iAUDIO U2 Firmware\stmp0409.dll
C:\Program Files\COWON\iAUDIO U2 Firmware\stmp040a.dll
C:\Program Files\COWON\iAUDIO U2 Firmware\Stmp040c.dll
C:\Program Files\COWON\iAUDIO U2 Firmware\stmp0411.dll
C:\Program Files\COWON\iAUDIO U2 Firmware\stmp0412.dll
C:\Program Files\COWON\iAUDIO U2 Firmware\Stmp0804.dll
C:\Program Files\COWON\iAUDIO U2 Firmware\StMp3Rec.sys
C:\Program Files\COWON\iAUDIO U2 Firmware\stupdaterapp.exe
C:\Program Files\COWON\iAUDIO U2 Firmware\w98Eject.exe
C:\Program Files\CyberLink\PowerDVD\AppBarCom.dll
C:\Program Files\CyberLink\PowerDVD\ATIPDLXX.dll
C:\Program Files\CyberLink\PowerDVD\CLAudRC.dll
C:\Program Files\CyberLink\PowerDVD\clds.dll
C:\Program Files\CyberLink\PowerDVD\CLDShow.dll
C:\Program Files\CyberLink\PowerDVD\CLInet.dll
C:\Program Files\CyberLink\PowerDVD\clpciid.sys
C:\Program Files\CyberLink\PowerDVD\CLTEST.EXE
C:\Program Files\CyberLink\PowerDVD\clwo.dll
C:\Program Files\CyberLink\PowerDVD\DDTESTER.EXE
C:\Program Files\CyberLink\PowerDVD\DVD_RES.dll
C:\Program Files\CyberLink\PowerDVD\HWTest.dll
C:\Program Files\CyberLink\PowerDVD\LakeVB.dll
C:\Program Files\CyberLink\PowerDVD\Msvcrt.dll
C:\Program Files\CyberLink\PowerDVD\OSD_MLang.dll
C:\Program Files\CyberLink\PowerDVD\pl2all.dll
C:\Program Files\CyberLink\PowerDVD\PowerDVD.exe
C:\Program Files\CyberLink\PowerDVD\PWRDVDH.dll
C:\Program Files\CyberLink\PowerDVD\PwrDVDRC.dll
C:\Program Files\CyberLink\PowerDVD\PwrDVDV.dll
C:\Program Files\CyberLink\PowerDVD\PWRDVDX.dll
C:\Program Files\CyberLink\PowerDVD\Skins\Classic\classic.dll
C:\Program Files\CyberLink\PowerDVD\UI_RES.dll
C:\Program Files\CyberLink\PowerDVD\ui_skin.dll
C:\Program Files\EarthLink Setup\Setup.exe
C:\Program Files\EarthLink Setup\Windows\access\program files\EarthLink TotalAccess\_Setup.exe
C:\Program Files\EarthLink Setup\Windows\access\program files\EarthLink TotalAccess\E60Cmmon.dll
C:\Program Files\EarthLink Setup\Windows\access\program TABLE IV-continued Windows Essential System Files files\EarthLink TotalAccess\Ecrypt.dll
C:\Program Files\EarthLink Setup\Windows\access\program files\EarthLink TotalAccess\instmsia.exe
C:\Program Files\EarthLink Setup\windows\access\program files\EarthLink TotalAccess\instmsiw.exe
C:\Program Files\EarthLink Setup\Windows\access\program files\EarthLink TotalAccess\mfc70.dll
C:\Program Files\EarthLink Setup\Windows\access\program files\EarthLink TotalAccess\msvcr70.dll
C:\Program Files\EarthLink Setup\Windows\access\program files\EarthLink TotalAccess\putkey.exe
C:\Program Files\EarthLink Setup\Windows\access\program files\EarthLink TotalAccess\SetupKrn.dll
C:\Program Files\EarthLink Setup\Windows\access\program files\EarthLink TotalAccess\Utils.dll
C:\Program Files\EarthLink Setup\Windows\access\program files\EarthLink TotalAccess\Win.dll
C:\Program Files\EarthLink Setup\Windows\Config\ECONFIG.EXE
C:\Program Files\EarthLink Setup\Windows\Config\recovery.exe
C:\Program Files\Foundstone\SiteDigger\SiteDigger v1.0.exe
C:\Program Files\Foundstone\Vision\_ISREG32.DLL
C:\Program Files\Foundstone\Vision\Vision.exe
C:\Program Files\GetRight\dunzip32.dll
C:\Program Files\GetRight\getright.exe
C:\Program Files\GetRight\libeay32.dll
C:\Program Files\GetRight\NPGetRt.dll
C:\Program Files\GetRight\RunOnceShortcut.exe
C:\Program Files\GetRight\ssleay32.dll
C:\Program Files\GetRight\ToGetRight.exe
C:\Program Files\GetRight\UNWISE.EXE
C:\Program Files\GetRight\xx2gr.dll
C:\Program Files\GetRight\zlibl.dll
C:\Program Files\GFI\LANguard Network Security Scanner 5.0\apistrings.dll
C:\Program Files\GFI\LANguard Network Security Scanner 5.0\atlreporter.dll
C:\Program Files\GFI\LANguard Network Security Scanner 5.0\audpolwiz.exe
C:\Program Files\GFI\LANguard Network Security Scanner 5.0\autocheck.dll
C:\Program Files\GFI\LANguard Network Security Scanner 5.0\cabber.dll
C:\Program Files\GFI\LANguard Network Security Scanner 5.0\compareop.dll
C:\Program Files\GFI\LANguard Network Security Scanner 5.0\compareui.dll
C:\Program Files\GFI\LANguard Network Security Scanner 5.0\crmimodule.dll
C:\Program Files\GFI\LANguard Network Security Scanner 5.0\custompatchesui.dll
C:\Program Files\GFI\LANguard Network Security Scanner 5.0\dbprocessorop.dll
C:\Program Files\GFI\LANguard Network Security Scanner 5.0\dnslookupop.dll
C:\Program Files\GFI\LANguard Network Security Scanner 5.0\dnslookupui.dll
C:\Program Files\GFI\LANguard Network Security Scanner 5.0\enable40.dll
C:\Program Files\GFI\LANguard Network Security Scanner 5.0\enumeratecomputersop.dll
C:\Program Files\GFI\LANguard Network Security Scanner 5.0\enumeratecomputersui.dll
C:\Program Files\GFI\LANguard Network Security Scanner 5.0\exporter.dll
C:\Program Files\GFI\LANguard Network Security Scanner 5.0\fmcmn_rc.dll
C:\Program Files\GFI\LANguard Network Security Scanner 5.0\gatherinfoop.dll
C:\Program Files\GFI\LANguard Network Security Scanner 5.0\gatherlivepcsop.dll
C:\Program Files\GFI\LANguard Network Security Scanner 5.0\geninfo.dll
C:\Program Files\GFI\LANguard Network Security Scanner 5.0\gfi_log.dll
C:\Program Files\GFI\LANguard Network Security Scanner 5.0\glbobj.dll
C:\Program Files\GFI\LANguard Network Security Scanner 5.0\impex.exe
C:\Program Files\GFI\LANguard Network Security Scanner

TABLE IV-continued

Windows Essential System Files 5.0\impexop.dll
C:\Program Files\GFI\LANguard Network Security Scanner 5.0\importer.dll
C:\Program Files\GFI\LANguard Network Security Scanner 5.0\insthlps.dll
C:\Program Files\GFI\LANguard Network Security Scanner 5.0\lnscmd.dll
C:\Program Files\GFI\LANguard Network Security Scanner 5.0\lnss.exe
C:\Program Files\GFI\LANguard Network Security Scanner 5.0\lnssatt.exe
C:\Program Files\GFI\LANguard Network Security Scanner 5.0\lnsscmd.exe
C:\Program Files\GFI\LANguard Network Security Scanner 5.0\lnsscomm.exe
C:\Program Files\GFI\LANguard Network Security Scanner 5.0\lnssinstsql.dll
C:\Program Files\GFI\LANguard Network Security Scanner 5.0\lnsslicense.dll
C:\Program Files\GFI\LANguard Network Security Scanner 5.0\lnssrep.exe
C:\Program Files\GFI\LANguard Network Security Scanner 5.0\lnssversion.dll
C:\Program Files\GFI\LANguard Network Security Scanner 5.0\lnssxplore.dll
C:\Program Files\GFI\LANguard Network Security Scanner 5.0\maintenance.dll
C:\Program Files\GFI\LANguard Network Security Scanner 5.0\misspatchop.dll
C:\Program Files\GFI\LANguard Network Security Scanner 5.0\modlop.dll
C:\Program Files\GFI\LANguard Network Security Scanner 5.0\nsshttp.dll
C:\Program Files\GFI\LANguard Network Security Scanner 5.0\ntrights.dll
C:\Program Files\GFI\LANguard Network Security Scanner 5.0\optionsui.dll
C:\Program Files\GFI\LANguard Network Security Scanner 5.0\parameterfilesui.dll
C:\Program Files\GFI\LANguard Network Security Scanner 5.0\patchdeployment.dll
C:\Program Files\GFI\LANguard Network Security Scanner 5.0\patchdeploymentui.dll
C:\Program Files\GFI\LANguard Network Security Scanner 5.0\PatchManagement\deployactions.dll
C:\Program Files\GFI\LANguard Network Security Scanner 5.0\PatchManagement\patchagent.exe
C:\Program Files\GFI\LANguard Network Security Scanner 5.0\PatchManagement\patchagentres409.dll
C:\Program Files\GFI\LANguard Network Security Scanner 5.0\PatchManagement\qchain.exe
C:\Program Files\GFI\LANguard Network Security Scanner 5.0\PatchManagement\reboot.exe
C:\Program Files\GFI\LANguard Network Security Scanner 5.0\portscansop.dll
C:\Program Files\GFI\LANguard Network Security Scanner 5.0\programupdates.dll
C:\Program Files\GFI\LANguard Network Security Scanner 5.0\repcontainer.exe
C:\Program Files\GFI\LANguard Network Security Scanner 5.0\scanfiltersui.dll
C:\Program Files\GFI\LANguard Network Security Scanner 5.0\scheduledscans.dll
C:\Program Files\GFI\LANguard Network Security Scanner 5.0\schedulescanui.dll
C:\Program Files\GFI\LANguard Network Security Scanner 5.0\scriptdbg.exe
C:\Program Files\GFI\LANguard Network Security Scanner 5.0\securityscannerui.dll
C:\Program Files\GFI\LANguard Network Security Scanner 5.0\selm_ap.dll
C:\Program Files\GFI\LANguard Network Security Scanner 5.0\sengine.dll
C:\Program Files\GFI\LANguard Network Security Scanner 5.0\snmpauditop.dll
C:\Program Files\GFI\LANguard Network Security Scanner 5.0\snmpauditui.dll
C:\Program Files\GFI\LANguard Network Security Scanner 5.0\snmpwalkop.dll TABLE IV-continued Windows Essential System Files C:\Program Files\GFI\LANguard Network Security Scanner 5.0\snmpwalkui.dll
C:\Program Files\GFI\LANguard Network Security Scanner 5.0\sp.dll
C:\Program Files\GFI\LANguard Network Security Scanner 5.0\sqlaudit.exe
C:\Program Files\GFI\LANguard Network Security Scanner 5.0\sqlauditop.dll
C:\Program Files\GFI\LANguard Network Security Scanner 5.0\sqlauditui.dll
C:\Program Files\GFI\LANguard Network Security Scanner 5.0\startscanui.dll
C:\Program Files\GFI\LANguard Network Security Scanner 5.0\streamit.dll
C:\Program Files\GFI\LANguard Network Security Scanner 5.0\subnodesui.dll
C:\Program Files\GFI\LANguard Network Security Scanner 5.0\traceroute.exe
C:\Program Files\GFI\LANguard Network Security Scanner 5.0\tracerouteop.dll
C:\Program Files\GFI\LANguard Network Security Scanner 5.0\tracerouteui.dll
C:\Program Files\GFI\LANguard Network Security Scanner 5.0\trb_ext.dll
C:\Program Files\GFI\LANguard Network Security Scanner 5.0\trouble.exe
C:\Program Files\GFI\LANguard Network Security Scanner 5.0\Update.exe
C:\Program Files\GFI\LANguard Network Security Scanner 5.0\userstoolop.dll
C:\Program Files\GFI\LANguard Network Security Scanner 5.0\userstoolui.dll
C:\Program Files\GFI\LANguard Network Security Scanner 5.0\whoisclientop.dll
C:\Program Files\GFI\LANguard Network Security Scanner 5.0\whoisclientui.dll
C:\Program Files\GNUGS\GSDLL32.DLL
C:\Program Files\GNUGS\GSWIN32C.EXE
C:\Program Files\HighMAT CD Writing Wizard\1033\HMTCDRes.dll
C:\Program Files\HighMAT CD Writing Wizard\HMTCD.dll
C:\Program Files\HOSTS File Manager\Add URL.exe
C:\Program Files\HOSTS File Manager\GUI.exe
C:\Program Files\HOSTS File Manager\HOSTS_Back.exe
C:\Program Files\HOSTS File Manager\HostsManager.exe
C:\Program Files\Iarsn\TaskInfo2003 5.0\INETWH32.dll
C:\Program Files\Iarsn\TaskInfo2003 5.0\TaskInfo.exe
C:\Program Files\Internet Explorer\Connection Wizard\icwconn.dll
C:\Program Files\Internet Explorer\Connection Wizard\icwconn1.exe
C:\Program Files\Internet Explorer\Connection Wizard\icwconn2.exe
C:\Program Files\Internet Explorer\Connection Wizard\icwdl.dll
C:\Program Files\Internet Explorer\Connection Wizard\icwhelp.dll
C:\Program Files\Internet Explorer\Connection Wizard\ICWRES.DLL
C:\Program Files\Internet Explorer\Connection Wizard\icwrmind.exe
C:\Program Files\Internet Explorer\Connection Wizard\ICWTUTOR.EXE
C:\Program Files\Internet Explorer\Connection Wizard\icwutil.dll
C:\Program Files\Internet Explorer\Connection Wizard\inetwiz.exe
C:\Program Files\Internet Explorer\Connection Wizard\ISIGNUP.EXE
C:\Program Files\Internet Explorer\Connection Wizard\TRIALOC.DLL
C:\Program Files\Internet Explorer\hmmapi.dll
C:\Program Files\Internet Explorer\iedw.exe
C:\Program Files\Internet Explorer\iexplore.exe
C:\Program Files\Internet Explorer\MUI\0409\mscorier.dll
C:\Program Files\Internet Explorer\PLUGINS\nppdf32.dll
C:\Program Files\Internet Explorer\PLUGINS\npqtplugin.dll
C:\Program Files\Internet Explorer\PLUGINS\npqtplugin2.dll
C:\Program Files\Internet Explorer\PLUGINS\npqtplugin3.dll
C:\Program Files\Internet Explorer\PLUGINS\npqtplugin4.dll
C:\Program Files\Internet Explorer\PLUGINS\npqtplugin5.dll
C:\Program Files\Internet Explorer\PLUGINS\npqtplugin6.dll
C:\Program Files\Internet Explorer\PLUGINS\npqtplugin7.dll
C:\Program Files\IRS\Driver\WinPcap_3_1_beta.exe
C:\Program Files\IRS\IRS.exe
C:\Program Files\ISOpen\ISOpen.exe
C:\Program Files\ISOpen\ISOPENASPI.dll
C:\Program Files\ISOpen\RegDown.exe
C:\Program Files\ISOpen\wnaspi32.dll
C:\Program Files\IZArc\7-zip32.dll
C:\Program Files\IZArc\Bga32.dll
C:\Program Files\IZArc\cabinet.dll TABLE IV-continued Windows Essential System Files C:\Program Files\IZArc\IZArc.exe
C:\Program Files\IZArc\IZArcCM.dll
C:\Program Files\IZArc\tar32.dll
C:\Program Files\IZArc\unacev2.dll
C:\Program Files\IZArc\UnGca32.dll
C:\Program Files\IZArc\unrar.dll
C:\Program Files\IZArc\Yzl.dll
C:\Program Files\Jasc Software Inc\Animation Shop 3\Anim.exe
C:\Program Files\Jasc Software Inc\Animation Shop 3\basefx.dll
C:\Program Files\Jasc Software Inc\Animation Shop 3\FPXLIB.DLL
C:\Program Files\Jasc Software Inc\Animation Shop 3\inetwh32.dll
C:\Program Files\Jasc Software Inc\Animation Shop 3\jbrws.dll
C:\Program Files\Jasc Software Inc\Animation Shop 3\jbrwsutil.dll
C:\Program Files\Jasc Software Inc\Animation Shop 3\jcap.dll
C:\Program Files\Jasc Software Inc\Animation Shop 3\JCM.dll
C:\Program Files\Jasc Software Inc\Animation Shop 3\jcmyk.dll
C:\Program Files\Jasc Software Inc\Animation Shop 3\jcontrols.dll
C:\Program Files\Jasc Software Inc\Animation Shop 3\jff.dll
C:\Program Files\Jasc Software Inc\Animation Shop 3\jlem.dll
C:\Program Files\Jasc Software Inc\Animation Shop 3\jmem.dll
C:\Program Files\Jasc Software Inc\Animation Shop 3\JPEGLIB.DLL
C:\Program Files\Jasc Software Inc\Animation Shop 3\morefx.dll
C:\Program Files\Jasc Software Inc\Animation Shop 3\PCDLIB32.DLL
C:\Program Files\Jasc Software Inc\Animation Shop 3\roboex32.dll
C:\Program Files\Jasc Software Inc\Animation Shop 3\sxlrt306.dll
C:\Program Files\Jasc Software Inc\Paint Shop Photo Album\Cameras\camapi32.dll
C:\Program Files\Jasc Software Inc\Paint Shop Photo Album\Cameras\camwia.doll
C:\Program Files\Jasc Software Inc\Paint Shop Photo Album\Cameras\comm32.dll
C:\Program Files\Jasc Software Inc\Paint Shop Photo Album\Cameras\commsti.dll
C:\Program Files\Jasc Software Inc\Paint Shop Photo Album\ConvertDB.exe
C:\Program Files\Jasc Software Inc\Paint Shop Photo Album\encoder.dll
C:\Program Files\Jasc Software Inc\Paint Shop Photo Album\kdu_v32R.dll
C:\Program Files\Jasc Software Inc\Paint Shop Photo Album\LangDlls\apprc.dll
C:\Program Files\Jasc Software Inc\Paint Shop Photo Album\LangDlls\convertrc.dll
C:\Program Files\Jasc Software Inc\Paint Shop Photo Album\LangDlls\exifrc.dll
C:\Program Files\Jasc Software Inc\Paint Shop Photo Album\LangDlls\movprojrc.dll
C:\Program Files\Jasc Software Inc\Paint Shop Photo Album\LangDlls\playerrc.dll
C:\Program Files\Jasc Software Inc\Paint Shop Photo Album\LangDlls\scandrvrc.dll
C:\Program Files\Jasc Software Inc\Paint Shop Photo Album\MovieProjector.exe
C:\Program Files\Jasc Software Inc\Paint Shop Photo Album\PhotoServices\sfUpload.dll
C:\Program Files\Jasc Software Inc\Paint Shop Photo Album\player.exe
C:\Program Files\Jasc Software Inc\Paint Shop Photo Album\ProductTour\ProductTour.exe
C:\Program Files\Jasc Software Inc\Paint Shop Photo Album\pspa.exe
C:\Program Files\Jasc Software Inc\Paint Shop Photo Album\scandrv.exe
C:\Program Files\Jasc Software Inc\Paint Shop Photo Album\system\BurnCD.exe
C:\Program Files\Jasc Software Inc\Paint Shop Photo Album\system\burncdrc.dll
C:\Program Files\Jasc Software Inc\Paint Shop Photo Album\system\edi32.dll
C:\Program Files\Jasc Software Inc\Paint Shop Photo Album\system\ediVcd.dll
C:\Program Files\Jasc Software Inc\Paint Shop Photo Album\system\EnrouteStitch.dll
C:\Program Files\Jasc Software Inc\Paint Shop Photo Album\system\gear12d.dll
C:\Program Files\Jasc Software Inc\Paint Shop Photo Album\system\iepsp.dll
C:\Program Files\Jasc Software Inc\Paint Shop Photo Album\system\IGJPEG2K.dll
C:\Program Files\Jasc Software Inc\Paint Shop Photo TABLE IV-continued Windows Essential System Files Album\system\IGLZW.dll
C:\Program Files\Jasc Software Inc\Paint Shop Photo Album\system\LPIFpx5LDll.dll
C:\Program Files\Jasc Software Inc\Paint Shop Photo Album\system\LPIJpegDll.dll
C:\Program Files\Jasc Software Inc\Paint Shop Photo Album\system\QT.dll
C:\Program Files\Jasc Software Inc\Paint Shop Photo Album\system\register.exe
C:\Program Files\Jasc Software Inc\Paint Shop Photo Album\system\sconfdll.dll
C:\Program Files\Jasc Software Inc\Paint Shop Photo Album\system\Stitch.dll
C:\Program Files\Jasc Software Inc\Paint Shop Photo Album\WebLayout\utils\SplitHtml.exe
C:\Program Files\Jasc Software Inc\Paint Shop Pro 8\Commands\JascCmdArtistic.dll
C:\Program Files\Jasc Software Inc\Paint Shop Pro 8\Commands\JascCmdBevels.dll
C:\Program Files\Jasc Software Inc\Paint Shop Pro 8\Commands\JascCmdBrowse.dll
C:\Program Files\Jasc Software Inc\Paint Shop Pro 8\Commands\JascCmdClipboard.dll
C:\Program Files\Jasc Software Inc\Paint Shop Pro 8\Commands\JascCmdColor.dll
C:\Program Files\Jasc Software Inc\Paint Shop Pro 8\Commands\JascCmdExternal.dll
C:\Program Files\Jasc Software Inc\Paint Shop Pro 8\Commands\JascCmdFile.dll
C:\Program Files\Jasc Software Inc\Paint Shop Pro 8\Commands\JascCmdGeometry.dll
C:\Program Files\Jasc Software Inc\Paint Shop Pro 8\Commands\JascCmdJGL.dll
C:\Program Files\Jasc Software Inc\Paint Shop Pro 8\Commands\JascCmdLayers.dll
C:\Program Files\Jasc Software Inc\Paint Shop Pro 8\Commands\JascCmdLighting.dll
C:\Program Files\Jasc Software Inc\Paint Shop Pro 8\Commands\JascCmdNonGraphic.dll
C:\Program Files\Jasc Software Inc\Paint Shop Pro 8\Commands\JascCmdPhoto.dll
C:\Program Files\Jasc Software Inc\Paint Shop Pro 8\Commands\JascCmdPluginHost.dll
C:\Program Files\Jasc Software Inc\Paint Shop Pro 8\Commands\JascCmdPrint.dll
C:\Program Files\Jasc Software Inc\Paint Shop Pro 8\Commands\JascCmdPyScript.dll
C:\Program Files\Jasc Software Inc\Paint Shop Pro 8\Commands\JascCmdSelections.dll
C:\Program Files\Jasc Software Inc\Paint Shop Pro 8\Commands\JascCmdStandard.dll
C:\Program Files\Jasc Software Inc\Paint Shop Pro 8\Commands\JascCmdTexture.dll
C:\Program Files\Jasc Software Inc\Paint Shop Pro 8\Commands\JascCmdVector.dll
C:\Program Files\Jasc Software Inc\Paint Shop Pro 8\Commands\JascCmdWeb.dll
C:\Program Files\Jasc Software Inc\Paint Shop Pro 8\Commands\JascToolObject.dll
C:\Program Files\Jasc Software Inc\Paint Shop Pro 8\Commands\JascToolPaint.dll
C:\Program Files\Jasc Software Inc\Paint Shop Pro 8\Commands\JascToolSelect.dll
C:\Program Files\Jasc Software Inc\Paint Shop Pro 8\Commands\JascToolStandard.dll
C:\Program Files\Jasc Software Inc\Paint Shop Pro 8\Commands\JascToolText.dll
C:\Program Files\Jasc Software Inc\Paint Shop Pro 8\Commands\JascToolWarp.dll
C:\Program Files\Jasc Software Inc\Paint Shop Pro 8\DC120V154_32.dll
C:\Program Files\Jasc Software Inc\Paint Shop Pro 8\FPXIG.DLL
C:\Program Files\Jasc Software Inc\Paint Shop Pro 8\gear12d.dll
C:\Program Files\Jasc Software Inc\Paint Shop Pro 8\IGCAD.DLL
C:\Program Files\Jasc Software Inc\Paint Shop Pro 8\IGDGN.dll
C:\Program Files\Jasc Software Inc\Paint Shop Pro 8\igfpx.dll
C:\Program Files\Jasc Software Inc\Paint Shop Pro 8\IGHPGL.dll
C:\Program Files\Jasc Software Inc\Paint Shop Pro 8\IGJPEG2K.dll
C:\Program Files\Jasc Software Inc\Paint Shop Pro 8\IGLZW.DLL TABLE IV-continued Windows Essential System Files C:\Program Files\Jasc Software Inc\Paint Shop Pro 8\JascBrowser.dll
C:\Program Files\Jasc Software Inc\Paint Shop Pro 8\JascBrowserUtil.dll
C:\Program Files\Jasc Software Inc\Paint Shop Pro 8\JascCapture.dll
C:\Program Files\Jasc Software Inc\Paint Shop Pro 8\JascCmdProc.dll
C:\Program Files\Jasc Software Inc\Paint Shop Pro 8\JascCMYK.dll
C:\Program Files\Jasc Software Inc\Paint Shop Pro 8\JascColorMgr.dll
C:\Program Files\Jasc Software Inc\Paint Shop Pro 8\JascCommandBase.dll
C:\Program Files\Jasc Software Inc\Paint Shop Pro 8\JascControls.dll
C:\Program Files\Jasc Software Inc\Paint Shop Pro 8\JascDebugTools.dll
C:\Program Files\Jasc Software Inc\Paint Shop Pro 8\JascErrorCodes.dll
C:\Program Files\Jasc Software Inc\Paint Shop Pro 8\JascFileFormats.dll
C:\Program Files\Jasc Software Inc\Paint Shop Pro 8\JascFileUtil.dll
C:\Program Files\Jasc Software Inc\Paint Shop Pro 8\JascHook.dll
C:\Program Files\Jasc Software Inc\Paint Shop Pro 8\JascLanguage.dll
C:\Program Files\Jasc Software Inc\Paint Shop Pro 8\JascLayerPalette.dll
C:\Program Files\Jasc Software Inc\Paint Shop Pro 8\JascLearningCenter.dll
C:\Program Files\Jasc Software Inc\Paint Shop Pro 8\JascMaterialPalette.dll
C:\Piogram Files\Jasc Software Inc\Paint Shop Pro 8\JascMemory.dll
C:\Program Files\Jasc Software Inc\Paint Shop Pro 8\JascMIP.dll
C:\Program Files\Jasc Software Inc\Paint Shop Pro 8\JascPreferences.dll
C:\Program Files\Jasc Software Inc\Paint Shop Pro 8\JascRender.dll
C:\Program Files\Jasc Software Inc\Paint Shop Pro 8\JascSingletonMgr.dll
C:\Program Files\Jasc Software Inc\Paint Shop Pro 8\JascSvgIdentify.dll
C:\Program Files\Jasc Software Inc\Paint Shop Pro 8\JascSvgImport.dll
C:\Program Files\Jasc Software Inc\Paint Shop Pro 8\JascToolBase.dll
C:\Program Files\Jasc Software Inc\Paint Shop Pro 8\JascWorkspace.dll
C:\Program Files\Jasc Software Inc\Paint Shop Pro 8\JPEGACC.DLL
C:\Program Files\Jasc Software Inc\Paint Shop Pro 8\kdu_v32R.dll
C:\Program Files\Jasc Software Inc\Paint Shop Pro 8\Learning Center\Product_Tour.exe
C:\Program Files\Jasc Software Inc\Paint Shop Pro 8\Learning Center\TourSync.exe
C:\Program Files\Jasc Software Inc\Paint Shop Pro 8\Paint Shop Pro.exe
C:\Program Files\Jasc Software Inc\Paint Shop Pro 8\PCDLIB32.DLL
C:\Program Files\Jasc Software Inc\Paint Shop Pro 8\PhotoServices\sfUpload.dll
C:\Program Files\Jasc Software Inc\Paint Shop Pro 8\Python Libraries\DLLs\expat.dll
C:\Program Files\Jasc Software Inc\Paint Shop Pro 8\Python Libraries\DLLs\tcl83.dll
C:\Program Files\Jasc Software Inc\Paint Shop Pro 8\Python Libraries\DLLs\tk83.dll
C:\Program Files\Jasc Software Inc\Paint Shop Pro 8\Python Libraries\TCL\tcl8.3\dde1.1\tcldde83.dll
C:\Program Files\Jasc Software Inc\Paint Shop Pro 8\Python Libraries\TCL\tcl8.3\reg1.0\tclreg83.dll
C:\Program Files\Jasc Software Inc\Paint Shop Pro 8\Python Libraries\w9xpopen.exe
C:\Program Files\Jasc Software Inc\Paint Shop Pro 8\python22.dll
C:\Program Files\Jasc Software Inc\Paint Shop Pro 8\register.exe
C:\Program Files\Jasc Software Inc\Paint Shop Pro 8\sxlrt308.dll
C:\Program Files\Jasc Software Inc\Paint Shop Pro 8\unicows.dll
C:\Program Files\Jasc Software Inc\Paint Shop Pro 8\Xerces.dll
C:\Program Files\Java\j2re1.4.2_03\bin\awt.dll
C:\Program Files\Java\j2re1.4.2_03\bin\axbridge.dll
C:\Program Files\Java\j2re1.4.2_03\bin\client\jvm.dll
C:\Program Files\Java\j2re1.4.2_03\bin\cmm.dll
C:\Program Files\Java\j2re1.4.2_03\bin\dcpr.dll
C:\Program Files\Java\j2re1.4.2_03\bin\dt_shmem.dll
C:\Program Files\Java\j2re1.4.2_03\bin\dt_socket.dll
C:\Program Files\Java\j2re1.4.2_03\bin\eula.dll
C:\Program Files\Java\j2re1.4.2_03\bin\fontmanager.dll
C:\Program Files\Java\j2re1.4.2_03\bin\hpi.dll
C:\Program Files\Java\j2re1.4.2_03\bin\hprof.dll TABLE IV-continued Windows Essential System Files C:\Program Files\Java\j2re1.4.2_03\bin\ioser12.dll
C:\Program Files\Java\j2re1.4.2_03\bin\jaas_nt.dll
C:\Program Files\Java\j2re1.4.2_03\bin\java.dll
C:\Program Files\Java\j2re1.4.2_03\bin\java.exe
C:\Program Files\Java\j2re1.4.2_03\bin\javaw.exe
C:\Program Files\Java\j2re1.4.2_03\bin\jawt.dll
C:\Program Files\Java\j2re1.4.2_03\bin\jcov.dll
C:\Program Files\Java\j2re1.4.2_03\bin\JdbcOdbc.dll
C:\Program Files\Java\j2re1.4.2_03\bin\jdwp.dll
C:\Program Files\Java\j2re1.4.2_03\bin\jpeg.dll
C:\Program Files\Java\j2re1.4.2_03\bin\jpicom32.dll
C:\Program Files\Java\j2re1.4.2_03\bin\jpicpl32.exe
C:\Program Files\Java\j2re1.4.2_03\bin\jpiexp32.dll
C:\Program Files\Java\j2re1.4.2_03\bin\jpins4.dll
C:\Program Files\Java\j2re1.4.2_03\bin\jpins6.dll
C:\Program Files\Java\j2re1.4.2_03\bin\jpins7.dll
C:\Program Files\Java\j2re1.4.2_03\bin\jpinsp.dll
C:\Program Files\Java\j2re1.4.2_03\bin\jpishare.dll
C:\Program Files\Java\j2re1.4.2_03\bin\jsound.dll
C:\Program Files\Java\j2re1.4.2_03\bin\jucheck.exe
C:\Program Files\Java\j2re1.4.2_03\bin\jusched.exe
C:\Program Files\Java\j2re1.4.2_03\bin\keytool.exe
C:\Program Files\Java\j2re1.4.2_03\bin\kinit.exe
C:\Program Files\Java\j2re1.4.2_03\bin\klist.exe
C:\Program Files\Java\j2re1.4.2_03\bin\ktab.exe
C:\Program Files\Java\j2re1.4.2_03\bin\msvcrt.dll
C:\Program Files\Java\j2re1.4.2_03\bin\net.dll
C:\Program Files\Java\j2re1.4.2_03\bin\nio.dll
C:\Program Files\Java\j2re1.4.2_03\bin\NPJava11.dll
C:\Program Files\Java\j2re1.4.2_03\bin\NPJava12.dll
C:\Program Files\Java\j2re1.4.2_03\bin\NPJava13.dll
C:\Program Files\Java\j2re1.4.2_03\bin\NPJava14.dll
C:\Program Files\Java\j2re1.4.2_03\bin\NPJava32.dll
C:\Program Files\Java\j2re1.4.2_03\bin\NPJPI142_03.dll
C:\Program Files\Java\j2re1.4.2_03\bin\NPOJI610.dll
C:\Program Files\Java\j2re1.4.2_03\bin\orbd.exe
C:\Program Files\Java\j2re1.4.2_03\bin\policytool.exe
C:\Program Files\Java\j2re1.4.2_03\bin\RegUtils.dll
C:\Program Files\Java\j2re1.4.2_03\bin\rmi.dll
C:\Program Files\Java\j2re1.4.2_03\bin\rmid.exe
C:\Program Files\Java\j2re1.4.2_03\bin\rmiregistry.exe
C:\Program Files\Java\j2re1.4.2_03\bin\servertool.exe
C:\Program Files\Java\j2re1.4.2_03\bin\tnameserv.exe
C:\Program Files\Java\j2re1.4.2_03\bin\verify.dll
C:\Program Files\Java\j2re1.4.2_03\bin\w2k_lsa_auth.dll
C:\Program Files\Java\j2re1.4.2_03\bin\zip.dll
C:\Program Files\Java\j2re1.4.2_03\javaws\JavaWebStart.dll
C:\Program Files\Java\j2re1.4.2_03\javaws\javaws.exe
C:\Program Files\Java\j2re1.4.2_03\javaws\javawspl.dll
C:\Program Files\JetAudio\_fileext.dll
C:\Program Files\JetAudio\JcServer.exe
C:\Program Files\JetAudio\jdl_FLAC.dll
C:\Program Files\JetAudio\jdl_id3lib.dll
C:\Program Files\JetAudio\jdl_ogg.dll
C:\Program Files\JetAudio\jdl_vorbis.dll
C:\Program Files\JetAudio\jdl_vorbisenc.dll
C:\Program Files\JetAudio\jdl_vorbisfile.dll
C:\Program Files\JetAudio\JetAudio.exe
C:\Program Files\JetAudio\JetCast.exe
C:\Program Files\JetAudio\JetCfg.dll
C:\Program Files\JetAudio\jetChat.dll
C:\Program Files\JetAudio\jetChat.exe
C:\Program Files\JetAudio\JetCrash.dll
C:\Program Files\JetAudio\JetFlExt.dll
C:\Program Files\JetAudio\JetLyric.exe
C:\Program Files\JetAudio\JetRecorder.exe
C:\Program Files\JetAudio\JetTrim.exe
C:\Program Files\JetAudio\jetUpdate.exe
C:\Program Files\JetAudio\JFACDRd.dll
C:\Program Files\JetAudio\JFACDWt.dll
C:\Program Files\JetAudio\JFACMDec.dll
C:\Program Files\JetAudio\JFAMP3En.dll
C:\Program Files\JetAudio\JFAPERd.dll
C:\Program Files\JetAudio\JFAPEWt.dll
C:\Program Files\JetAudio\JFAudFP.dll
C:\Program Files\JetAudio\JFCDPl.dll
C:\Program Files\JetAudio\JFDSPl.dll
C:\Program Files\JetAudio\JFDVDPl.dll TABLE IV-continued Windows Essential System Files C:\Program Files\JetAudio\JFEffB3D.dll
C:\Program Files\JetAudio\JFEffBBE.dll
C:\Program Files\JetAudio\JFEffDRC.dll
C:\Program Files\JetAudio\JFEffEQ.dll
C:\Program Files\JetAudio\JFEffFX.dll
C:\Program Files\JetAudio\JFEffRvb.dll
C:\Program Files\JetAudio\JFEffSP.dll
C:\Program Files\JetAudio\JFEffWid.dll
C:\Program Files\JetAudio\JFEffXB.dll
C:\Program Files\JetAudio\JFFLACRd.dll
C:\Program Files\JetAudio\JFFLACWt.dll
C:\Program Files\JetAudio\JFIMSRD.dll
C:\Program Files\JetAudio\JFMIDRd.dll
C:\Program Files\JetAudio\JFMODRd.dll
C:\Program Files\JetAudio\JFMP3Dec.dll
C:\Program Files\JetAudio\JFMP3Enc.dll
C:\Program Files\JetAudio\JFMP3Rd.dll
C:\Program Files\JetAudio\JFMPCRd.dll
C:\Program Files\JetAudio\JFNetFP.dll
C:\Program Files\JetAudio\JFNetworkWt.dll
C:\Program Files\JetAudio\JFOGGEnc.dll
C:\Program Files\JetAudio\JFOGGRd.dll
C:\Program Files\JetAudio\JFOGGWt.dll
C:\Program Files\JetAudio\JFPCMCnv.dll
C:\Program Files\JetAudio\JFQTPl.dll
C:\Program Files\JetAudio\JFRMPl.dll
C:\Program Files\JetAudio\JFRMWt.dll
C:\Program Files\JetAudio\JFSpeexRd.dll
C:\Program Files\JetAudio\JFSpeexidt.dll
C:\Program Files\JetAudio\JFVCDPl.dll
C:\Program Files\JetAudio\JFWavIn.dll
C:\Program Files\JetAudio\JFWavOut.dll
C:\Program Files\JetAudio\JFWavRd.dll
C:\Program Files\JetAudio\JFWavWt.dll
C:\Program Files\JetAudio\JFWMANetWt.dll
C:\Program Files\JetAudio\JFWMANetWt9.dll
C:\Program Files\JetAudio\JFWMARd.dll
C:\Program Files\JetAudio\JFWMAWt.dll
C:\Program Files\JetAudio\JFWMAWt7.dll
C:\Program Files\JetAudio\JSMP3OGGWt.dll
C:\Program Files\JetAudio\jsWMAWt.dll
C:\Program Files\JetAudio\JXCDDB.dll
C:\Program Files\JetAudio\JXCDMan.dll
C:\Program Files\JetAudio\JXExplr.dll
C:\Program Files\JetAudio\JXMP3Enc.dll
C:\Program Files\JetAudio\JXOGGDEC.dll
C:\Program Files\JetAudio\JXOGGDecF64.dll
C:\Program Files\JetAudio\JXOGGDecI32.dll
C:\Program Files\JetAudio\JXPDev.dll
C:\Program Files\JetAudio\JXScsiIf.dll
C:\Program Files\JetAudio\JXTag.dll
C:\Program Files\JetAudio\JXVisual.dll
C:\Program Files\JetAudio\mfc42.dll
C:\Program Files\JetAudio\msvcirt.dll
C:\Program Files\JetAudio\msvcp60.dll
C:\Program Files\JetAudio\msvcrt.dll
C:\Program Files\JetAudio\pthreadVC.dll
C:\Program Files\JetAudio\Skin\makejsk.exe
C:\Program Files\JetAudio\Vis\HarmonyColor.dll
C:\Program Files\JetAudio\Vis\hermes.dll
C:\Program Files\JetAudio\Vis\PixelTrip.dll
C:\Program Files\JetAudio\Vis\vis_s2v.dll
C:\Program Files\JetAudio\Vis\vis_space.dll
C:\Program Files\JetAudio\Vis\vis_synesth.dll
C:\Program Files\JetAudio\Vis\vis_synesth_config.exe
C:\Program Files\LGUsbDriver\BLDDRV.EXE
C:\Program Files\LGUsbDriver\lgatbus.sys
C:\Program Files\LGUsbDriver\lgatcm95.sys
C:\Program Files\LGUsbDriver\lgatcmnt.sys
C:\Program Files\LGUsbDriver\lgatcr.sys
C:\Program Files\LGUsbDriver\lgatmdm.sys
C:\Program Files\LGUsbDriver\lgatserd.sys
C:\Program Files\LGUsbDriver\lgatwh95.sys
C:\Program Files\LGUsbDriver\lgatwhnt.sys
C:\Program Files\LGUsbDriver\limona-usbscrub.exe
C:\Program Files\Linksys\Wireless-G Notebook Adapter with SpeedBooster\bcmwl5.sys
C:\Program Files\Linksys\Wireless-G Notebook Adapter with

TABLE IV-continued

Windows Essential System Files

C:\Program Files\Linksys\Wireless-G Notebook Adapter with SpeedBooster\BMWL3.dll
C:\Program Files\Linksys\Wireless-G Notebook Adapter with SpeedBooster\BMWL3s.dll
C:\Program Files\Linksys\Wireless-G Notebook Adapter with SpeedBooster\NICServ.exe
C:\Program Files\Linksys\Wireless-G Notebook Adapter with SpeedBooster\OdHost.exe
C:\Program Files\Linksys\Wireless-G Notebook Adapter with SpeedBooster\PCANUser.exe
C:\Program Files\Linksys\Wireless-G Notebook Adapter with SpeedBooster\Remove.exe
C:\Program Files\Linksys\Wireless-G Notebook Adapter with SpeedBooster\RunU.exe
C:\Program Files\Linksys\Wireless-G Notebook Adapter with SpeedBooster\Startup.exe
C:\Program Files\Linksys\Wireless-G Notebook Adapter with SpeedBooster\TouchW32.exe
C:\Program Files\Linksys\Wireless-G Notebook Adapter with SpeedBooster\vanguard.exe
C:\Program Files\Linksys\Wireless-G Notebook Adapter with SpeedBooster\WPC54CFG.exe
C:\Program Files\Messenger\custsat.dll
C:\Program Files\Messenger\msgsc.dll
C:\Program Files\Messenger\msgslang.dll
C:\Program Files\Messenger\msmsgs.exe
C:\Program Files\Messenger\MSMSGSIN.EXE
C:\Program Files\Messer\lame_enc.dll
C:\Program Files\Messer\MESSER.exe
C:\Program Files\Miraxus\GreatCrypt\GCDecryptor.exe
C:\Program Files\Miraxus\GreatCrypt\Grcrypt.exe
C:\Program Files\mIRC\mirc.exe
C:\Program Files\Modem Helper\bvrp_pci.sys
C:\Program Files\Modem Helper\check.dll
C:\Program Files\Modem Helper\EnumPCI.exe
C:\Program Files\Modem Helper\MDM_Util.exe
C:\Program Files\Modem Helper\MDMCore.dll
C:\Program Files\Modem Helper\MDMDptch.dll
C:\Program Files\Modem Helper\MDMDsply.dll
C:\Program Files\Modem Helper\MDMLog.dll
C:\Program Files\Modem Helper\MDMSetup.dll
C:\Program Files\Modem Helper\MdmVers.dll
C:\Program Files\Modem Helper\test0.dll
C:\Program Files\Modem Helper\testl.dll
C:\Program Files\Movie Maker\1033\wmm2eres.dll
C:\Program Files\Movie Maker\1033\wmm2res.dll
C:\Program Files\Movie Maker\moviemk.exe
C:\Program Files\Movie Maker\wmm2ae.dll
C:\Program Files\Movie Maker\wmm2eres.dll
C:\Program Files\Movie Maker\wmm2ext.dll
C:\Program Files\Movie Maker\wmm2filt.dll
C:\Program Files\Movie Maker\wmm2fxa.dll
C:\Program Files\Movie Maker\wmm2fxb.dll
C:\Program Files\Movie Maker\wmm2res.dll
C:\Program Files\Movie Maker\wmm2res2.dll
C:\Program Files\Movie Maker\WMMFILT.DLL
C:\Program Files\Movie Maker\WMMRES.DLL
C:\Program Files\Movie Maker\WMMUTIL.DLL
C:\Program Files\Mozilla Firefox\AccessibleMarshal.dll
C:\Program Files\Mozilla Firefox\components\BrandRes.dll
C:\Program Files\Mozilla Firefox\components\fullsoft.dll
C:\Program Files\Mozilla Firefox\components\inspector.dll
C:\Program Files\Mozilla Firefox\components\jar50.dll
C:\Program Files\Mozilla Firefox\components\jsd3250.dll
C:\Program Files\Mozilla Firefox\components\qfaservices.dll
C:\Program Files\Mozilla Firefox\components\talkback.exe
C:\Program Files\Mozilla Firefox\components\xpinstal.dll
C:\Program Files\Mozilla Firefox\firefox.exe
C:\Program Files\Mozilla. Firefox\js3250.dll
C:\Program Files\Mozilla Firefox\nspr4.dll
C:\Program Files\Mozilla Firefox\nss3.dll
C:\Program Files\Mozilla Firefox\nssckbi.dll
C:\Program Files\Mozilla Firefox\plc4.dll
C:\Program Files\Mozilla Firefox\plds4.dll
C:\Program Files\Mozilla Firefox\plugins\GetFlash.exe
C:\Program Files\Mozilla Firefox\plugins\NPMGWRAP.DLL
C:\Program Files\Mozilla Firefox\plugins\npnul32.dll
C:\Program Files\Mozilla Firefox\plugins\nppdf32.dll
C:\Program Files\Mozilla Firefox\plugins\npqtplugin.dll TABLE IV-continued Windows Essential System Files C:\Program Files\Mozilla Firefox\plugins\npqtplugin2.dll
C:\Program Files\Mozilla Firefox\plugins\npqtplugin3.dll
C:\Program Files\Mozilla Firefox\plugins\npqtplugin4.dll
C:\Program Files\Mozilla Firefox\plugins\npqtplugin5.dll
C:\Program Files\Mozilla Firefox\plugins\npqtplugin6.dll
C:\Program Files\Mozilla Firefox\plugins\npqtplugin7.dll
C:\Program Files\Mozilla Firefox\plugins\NPSWF32.dll
C:\Program Files\Mozilla Firefox\smime3.dll
C:\Program Files\Mozilla Firefox\softokn3.dll
C:\Program Files\Mozilla Firefox\ssl3.dll
C:\Program Files\Mozilla Firefox\xpcom.dll
C:\Program Files\Mozilla Firefox\xpcom_compat.dll
C:\Program Files\Mozilla Firefox\xpcom_core.dll
C:\Program Files\Mozilla Firefox\xpicleanup.exe
C:\Program Files\Mozilla Firefox\xpistub.dll
C:\Program Files\Mozilla Thunderbird\AccessibleMarshal.dll
C:\Program Files\Mozilla Thunderbird\components\BrandRes.dll
C:\Program Files\Mozilla Thunderbird\components\fullsoft.dll
C:\Program Files\Mozilla Thunderbird\components\jar50.dll
C:\Program Files\Mozilla Thunderbird\components\jsd3250.dll
C:\Program Files\Mozilla Thunderbird\components\myspell.dll
C:\Program Files\Mozilla Thunderbird\components\cifaservices.dll
C:\Program Files\Mozilla Thunderbird\components\spellchk.dll
C:\Program Files\Mozilla Thunderbird\components\talkback.exe
C:\Program Files\Mozilla Thunderbird\components\xpinstal.dll
C:\Program Files\Mozilla Thunderbird\js3250.dll
C:\Program Files\Mozilla Thunderbird\MapiProxy.dll
C:\Program Files\Mozilla Thunderbird\mozMapi32.dll
C:\Program Files\Mozilla Thunderbird\nsldap32v50.dll
C:\Program Files\Mozilla Thunderbird\nsldappr32v50.dll
C:\Program Files\Mozilla Thunderbird\nspr4.dll
C:\Program Files\Mozilla Thunderbird\nss3.dll
C:\Program Files\Mozilla Thunderbird\nssckbi.dll
C:\Program Files\Mozilla Thunderbird\plc4.dll
C:\Program Files\Mozilla Thunderbird\plds4.dll
C:\Program Files\Mozilla Thunderbird\regxpcom.exe
C:\Program Files\Mozilla Thunderbird\smime3.dll
C:\Program Files\Mozilla Thunderbird\softokn3.dll
C:\Program Files\Mozilla Thunderbird\ssl3.dll
C:\Program Files\Mozilla Thunderbird\thunderbird.exe
C:\Program Files\Mozilla Thunderbird\xpcom.dll
C:\Program Files\Mozilla Thunderbird\xpcom_compat.dll
C:\Program Files\Mozilla Thunderbird\xpicleanup.exe
C:\Program Files\Mozilla Thunderbird\xpistub.dll
C:\Program Files\mozilla.org\Mozilla\AccessibleMarshal.dll
C:\Program Files\mozilla.org\Mozilla\components\addrbook.dll
C:\Program Files\mozilla.org\Mozilla\components\appcomps.dll
C:\Program Files\mozilla.org\Mozilla\components\autoconfig.dll
C:\Program Files\mozilla.org\Mozilla\components\bayesflt.dll
C:\Program Files\mozilla.org\Mozilla\components\BrandRes.dll
C:\Program Files\mozilla.org\Mozilla\components\composer.dll
C:\Program Files\mozilla.org\Mozilla\components\emitter.dll
C:\Program Files\mozilla.org\Mozilla\components\fullsoft.dll
C:\Program Files\mozilla.org\Mozilla\components\impComm4xMail.dll
C:\Program Files\mozilla.org\Mozilla\components\impEudra.dll
C:\Program Files\mozilla.org\Mozilla\components\import.dll
C:\Program Files\mozilla.org\Mozilla\components\importOE.dll
C:\Program Files\mozilla.org\Mozilla\components\impOutlk.dll
C:\Program Files\mozilla.org\Mozilla\components\impText.dll
C:\Program Files\mozilla.org\Mozilla\components\inspector.dll
C:\Program Files\mozilla.org\Mozilla\components\jsd3250.dll
C:\Program Files\mozilla.org\Mozilla\components\mailview.dll
C:\Program Files\mozilla.org\Mozilla\components\mime.dll
C:\Program Files\mozilla.org\Mozilla\components\mork.dll
C:\Program Files\mozilla.org\Mozilla\components\mozfind.dll
C:\Program Files\mozilla.org\Mozilla\components\mozldap.dll
C:\Program Files\mozilla.org\Mozilla\components\msgbase.dll
C:\Program Files\mozilla.org\Mozilla\components\msgcompo.dll
C:\Program Files\mozilla.org\Mozilla\components\msgdb.dll
C:\Program Files\mozilla.org\Mozilla\components\msgimap.dll
C:\Program Files\mozilla.org\Mozilla\components\msglocal.dll
C:\Program Files\mozilla.org\Mozilla\components\msgMapi.dll
C:\Program Files\mozilla.org\Mozilla\components\msgmdn.dll
C:\Program Files\mozilla.org\Mozilla\components\msgnews.dll
C:\Program Files\mozilla.org\Mozilla\components\msgsmime.dll
C:\Program Files\mozilla.org\Mozilla\components\myspell.dll
C:\Program Files\mozilla.org\Mozilla\components\nsprefm.dll
C:\Program Files\mozilla.org\Mozilla\components\palmsync.dll

TABLE IV-continued

Windows Essential System Files

C:\Program Files\mozilla.org\Mozilla\components\pippki.dll
C:\Program Files\mozilla.org\Mozilla\components\qfaservices.dll
C:\Program Files\mozilla.org\Mozilla\components\spellchk.dll
C:\Program Files\mozilla.org\Mozilla\components\talkback.exe
C:\Program Files\mozilla.org\Mozilla\components\transformiix.dll
C:\Program Files\mozilla.org\Mozilla\components\txmgr.dll
C:\Program Files\mozilla.org\Mozilla\components\vcard.dll
C:\Program Files\mozilla.org\Mozilla\components\websrvcs.dll
C:\Program Files\mozilla.org\Mozilla\components\wlltvwrs.dll
C:\Program Files\mozilla.org\Mozilla\MapiProxy.dll
C:\Program Files\mozilla.org\Mozilla\mozABConduit.dll
C:\Program Files\mozilla.org\Mozilla\mozilla.exe
C:\Program Files\mozilla.org\Mozilla\mozMapi32.dll
C:\Program Files\mozilla.org\Mozilla\msgbsutl.dll
C:\Program Files\mozilla.org\Mozilla\nsldap32v50.dll
C:\Program Files\mozilla.org\Mozilla\nsldappr32v50.dll
C:\Program Files\mozilla.org\Mozilla\nspr4.dll
C:\Program Files\mozilla.org\Mozilla\nss3.dll
C:\Program Files\mozilla.org\Mozilla\PalmSyncProxy.dll
C:\Program Files\mozilla.org\Mozilla\plc4.dll
C:\Program Files\mozilla.org\Mozilla\plds4.dll
C:\Program Files\mozilla.org\Mozilla\plugins\GetFlash.exe
C:\Program Files\mozilla.org\Mozilla\plugins\NPMGWRAP.DLL
C:\Program Files\mozilla.org\Mozilla\plugins\npnul32.dll
C:\Program Files\mozilla.org\Mozilla\plugins\nppdf32.dll
C:\Program Files\mozilla.org\Mozilla\plugins\npqtplugin.dll
C:\Program Files\mozilla.org\Mozilla\plugins\npqtplugin2.dll
C:\Program Files\mozilla.org\Mozilla\plugins\npqtplugin3.dll
C:\Program Files\mozilla.org\Mozilla\plugins\npqtplugin4.dll
C:\Program Files\mozilla.org\Mozilla\plugins\npqtplugin5.dll
C:\Program Files\mozilla.org\Mozilla\plugins\npqtplugin6.dll
C:\Program Files\mozilla.org\Mozilla\plugins\npqtplugin7.dll
C:\Program Files\mozilla.org\Mozilla\plugins\NPSWF32.dll
C:\Program Files\mozilla.org\Mozilla\regxpcom.exe
C:\Program Files\mozilla.org\Mozilla\smime3.dll
C:\Program Files\mozilla.org\Mozilla\softokn3.dll
C:\Program Files\mozilla.org\Mozilla\ssl3.dll
C:\Program Files\mozilla.org\Mozilla\xpicleanup.exe
C:\Program Files\MSN Gaming Zone\Windows\BCKG.DLL
C:\Program Files\MSN Gaming Zone\Windows\BCKGRES.DLL
C:\Program Files\MSN Gaming Zone\Windows\BCKGZM.EXE
C:\Program Files\MSN Gaming Zone\Windows\CHKR.DLL
C:\Program Files\MSN Gaming Zone\Windows\CHKRRES.DLL
C:\Program Files\MSN Gaming Zone\Windows\CHKRZM.EXE
C:\Program Files\MSN Gaming Zone\Windows\Cmnclim.dll
C:\Program Files\MSN Gaming Zone\Windows\Cmnresm.dll
C:\Program Files\MSN Gaming Zone\Windows\HRTZ.DLL
C:\Program Files\MSN Gaming Zone\Windows\Hrtzres.dll
C:\Program Files\MSN Gaming Zone\Windows\HRTZZM.EXE
C:\Program Files\MSN Gaming Zone\Windows\RVSE.DLL
C:\Program Files\MSN Gaming Zone\Windows\Rvseres.dll
C:\Program Files\MSN Gaming Zone\Windows\Rvsezm.exe
C:\Program Files\MSN Gaming Zone\Windows\SHVL.DLL
C:\Program Files\MSN Gaming Zone\Windows\Shvlres.dll
C:\Program Files\MSN Gaming Zone\Windows\SHVLZM.EXE
C:\Program Files\MSN Gaming Zone\Windows\UniAnsi.dll
C:\Program Files\MSN Gaming Zone\Windows\zClientm.exe
C:\Program Files\MSN Gaming Zone\Windows\ZCorem.dll
C:\Program Files\MSN Gaming Zone\Windows\ZEEVERM.DLL
C:\Program Files\MSN Gaming Zone\Windows\ZNetM.dll
C:\Program Files\MSN Gaming Zone\Windows\ZONECLIM.DLL
C:\Program Files\MSN Gaming Zone\Windows\zonelibM.dll
C:\Program Files\MSN Messenger\custsat.dll
C:\Program Files\MSN Messenger\msgsc.dll
C:\Program Files\MSN Messenger\msgslang.dll
C:\Program Files\MSN Messenger\msnmgr.exe
C:\Program Files\MSN\MSNCoreFiles\1033\DWINTL.DLL
C:\Program Files\MSN\MSNCoreFiles\COPYMAR.EXE
C:\Program Files\MSN\MSNCoreFiles\CSAPI3T1.DLL
C:\Program Files\MSN\MSNCoreFiles\CUSTDIAL.DLL
C:\Program Files\MSN\MSNCoreFiles\DW.EXE
C:\Program Files\MSN\MSNCoreFiles\LOGONMGR.DLL
C:\Program Files\MSN\MSNCoreFiles\MIGRATE.DLL
C:\Program Files\MSN\MSNCoreFiles\MSDBX.DLL
C:\Program Files\MSN\MSNCoreFiles\MSMOM.DLL
C:\Program Files\MSN\MSNCoreFiles\MSN6.EXE
C:\Program Files\MSN\MSNCoreFiles\MSNMETAL.DLL
C:\Program Files\MSN\MSNCoreFiles\MSNMTLLC.DLL TABLE IV-continued Windows Essential System Files C:\Program Files\MSN\MSNCoreFiles\MSNSPELL.DLL
C:\Program Files\MSN\MSNCoreFiles\POPC.DLL
C:\Program Files\MSN\MSNCoreFiles\Setup\MIGRATE.DLL
C:\Program Files\MSN\MSNCoreFiles\Setup\MSN9XMIG.DLL
C:\Program Files\MSN\MSNCoreFiles\Setup\MSNUNIN.EXE
C:\Program Files\MSN\MSNCoreFiles\SQDLL.DLL
C:\Program Files\MSN\MSNCoreFiles\UPDATE.EXE
C:\Program Files\MUSICMATCH\MUSICMATCH Jukebox\accessor.dll
C:\Program Files\MUSICMATCH\MUSICMATCH Jukebox\analog.dll
C:\Program Files\MUSICMATCH\MUSICMATCH Jukebox\AsiUtil.dll
C:\Program Files\MUSICMATCH\MUSICMATCH Jukebox\CDFeatureRRObject.dll
C:\Program Files\MUSICMATCH\MUSICMATCH Jukebox\cdinfo.dll
C:\Program Files\MUSICMATCH\MUSICMATCH Jukebox\Components\BurnManager.dll
C:\Program Files\MUSICMATCH\MUSICMATCH Jukebox\Components\CdPlayerIni.dll
C:\Program Files\MUSICMATCH\MUSICMATCH Jukebox\Components\Convx.dll
C:\Program Files\MUSICMATCH\MUSICMATCH Jukebox\Components\FWAppOptions.dll
C:\Program Files\MUSICMATCH\MUSICMATCH Jukebox\Components\INIProperties.dll
C:\Program Files\MUSICMATCH\MUSICMATCH Jukebox\Components\JewelCaseObject.dll
C:\Program Files\MUSICMATCH\MUSICMATCH Jukebox\Components\JpegObject.dll
C:\Program Files\MUSICMATCH\MUSICMATCH Jukebox\Components\Legacy.dll
C:\Program Files\MUSICMATCH\MUSICMATCH Jukebox\Components\MMC.dll
C:\Program Files\MUSICMATCH\MUSICMATCH Jukebox\Components\MMC3.dll
C:\Program Files\MUSICMATCH\MUSICMATCH Jukebox\Components\MMJBPortablesAppOptions.dll
C:\Program Files\MUSICMATCH\MUSICMATCH Jukebox\Components\MMJBPortablesResourceObject.dll
C:\Program Files\MUSICMATCH\MUSICMATCH Jukebox\Components\mmprinter.dll
C:\Program Files\MUSICMATCH\MUSICMATCH Jukebox\Components\MXLObj.dll
C:\Program Files\MUSICMATCH\MUSICMATCH Jukebox\Components\OstaGen.dll
C:\Program Files\MUSICMATCH\MUSICMATCH Jukebox\Components\PlaylistManager.dll
C:\Program Files\MUSICMATCH\MUSICMATCH Jukebox\Components\PortableDeviceManager.dll
C:\Program Files\MUSICMATCH\MUSICMATCH Jukebox\Components\ResourceObject.dll
C:\Program Files\MUSICMATCH\MUSICMATCH Jukebox\Components\Stingray.dll
C:\Program Files\MUSICMATCH\MUSICMATCH Jukebox\Components\stprinter.dll
C:\Program Files\MUSICMATCH\MUSICMATCH Jukebox\Components\SyncManager.dll
C:\Program Files\MUSICMATCH\MUSICMATCH Jukebox\Components\Upgrade.dll
C:\Program Files\MUSICMATCH\MUSICMATCH Jukebox\CoreDll.dll
C:\Program Files\MUSICMATCH\MUSICMATCH Jukebox\DestinationWavDll.dll
C:\Program Files\MUSICMATCH\MUSICMATCH Jukebox\digital.dll
C:\Program Files\MUSICMATCH\MUSICMATCH Jukebox\directorps.dll
C:\Program Files\MUSICMATCH\MUSICMATCH Jukebox\Enforce.dll
C:\Program Files\MUSICMATCH\MUSICMATCH Jukebox\EnforceRMS.dll
C:\Program Files\MUSICMATCH\MUSICMATCH Jukebox\EventMgr.dll
C:\Program Files\MUSICMATCH\MUSICMATCH Jukebox\FileAssoc.dll
C:\Program Files\MUSICMATCH\MUSICMATCH Jukebox\FileCacheMgr.dll
C:\Program Files\MUSICMATCH\MUSICMATCH Jukebox\fileco.dll
C:\Program Files\MUSICMATCH\MUSICMATCH Jukebox\FWRun.dll
C:\Program Files\MUSICMATCH\MUSICMATCH Jukebox\gdiutil.dll
C:\Program Files\MUSICMATCH\MUSICMATCH Jukebox\Help\Inetwh32.dll
C:\Program Files\MUSICMATCH\MUSICMATCH Jukebox\Help\Roboex32.dll
C:\Program Files\MUSICMATCH\MUSICMATCH Jukebox\HHActiveX.dll
C:\Program Files\MUSICMATCH\MUSICMATCH Jukebox\iupnp.dll
C:\Program Files\MUSICMATCH\MUSICMATCH Jukebox\ixml.dll
C:\Program Files\MUSICMATCH\MUSICMATCH Jukebox\JewelCasePrinter.dll
C:\Program Files\MUSICMATCH\MUSICMATCH Jukebox\KeyboardHookDll.dll
C:\Program Files\MUSICMATCH\MUSICMATCH Jukebox\libmmd.dll
C:\Program Files\MUSICMATCH\MUSICMATCH Jukebox\linein.dll
C:\Program Files\MUSICMATCH\MUSICMATCH Jukebox\mixer.dll
C:\Program Files\MUSICMATCH\MUSICMATCH Jukebox\mm_director.exe
C:\Program Files\MUSICMATCH\MUSICMATCH Jukebox\mm_server.exe
C:\Program Files\MUSICMATCH\MUSICMATCH Jukebox\mm_TDMEngine.exe
C:\Program Files\MUSICMATCH\MUSICMATCH Jukebox\mm_tray.exe
C:\Program Files\MUSICMATCH\MUSICMATCH Jukebox\mm_upnpsvr.dll TABLE IV-continued Windows Essential System Files C:\Program Files\MUSICMATCH\MUSICMATCH Jukebox\MMC70U.DLL
C:\Program Files\MUSICMATCH\MUSICMATCH Jukebox\mmcd.dll
C:\Program Files\MUSICMATCH\MUSICMATCH Jukebox\MMComReg.exe
C:\Program Files\MUSICMATCH\MUSICMATCH Jukebox\mmdb.dll
C:\Program Files\MUSICMATCH\MUSICMATCH Jukebox\mmdiag.exe
C:\Program Files\MUSICMATCH\MUSICMATCH Jukebox\MMFWLaunch.exe
C:\Program Files\MUSICMATCH\MUSICMATCH Jukebox\mmfwloc.dll
C:\Program Files\MUSICMATCH\MUSICMATCH Jukebox\mmgit.dll
C:\Program Files\MUSICMATCH\MUSICMATCH Jukebox\mmhttp.dll
C:\Program Files\MUSICMATCH\MUSICMATCH Jukebox\MMHttpSvr.dll
C:\Program Files\MUSICMATCH\MUSICMATCH Jukebox\MMInet.dll
C:\Program Files\MUSICMATCH\MUSICMATCH Jukebox\mmjb.exe
C:\Program Files\MUSICMATCH\MUSICMATCH Jukebox\MMJBBurn.exe
C:\Program Files\MUSICMATCH\MUSICMATCH Jukebox\MMJBLaunch.exe
C:\Program Files\MUSICMATCH\MUSICMATCH Jukebox\mmjbloc.dll
C:\Program Files\MUSICMATCH\MUSICMATCH Jukebox\MMJBPortables.exe
C:\Program Files\MUSICMATCH\MUSICMATCH Jukebox\MMJBPortablesLaunch.exe
C:\Program Files\MUSICMATCH\MUSICMATCH Jukebox\MMJBPortablesLoc.dll
C:\Program Files\MUSICMATCH\MUSICMATCH Jukebox\mmjbrun.exe
C:\Program Files\MUSICMATCH\MUSICMATCH Jukebox\mmjbupdt.dll
C:\Program Files\MUSICMATCH\MUSICMATCH Jukebox\mmlicmgr.dll
C:\Program Files\MUSICMATCH\MUSICMATCH Jukebox\MMPclSvr.dll
C:\Program Files\MUSICMATCH\MUSICMATCH Jukebox\mmportal.dll
C:\Program Files\MUSICMATCH\MUSICMATCH Jukebox\MMRadioEngine.dll
C:\Program Files\MUSICMATCH\MUSICMATCH Jukebox\mmreg.dll
C:\Program Files\MUSICMATCH\MUSICMATCH Jukebox\mmsal32.dll
C:\Program Files\MUSICMATCH\MUSICMATCH Jukebox\mmsiteserv.dll
C:\Program Files\MUSICMATCH\MUSICMATCH Jukebox\mmtask.exe
C:\Program Files\MUSICMATCH\MUSICMATCH Jukebox\mmuiserv.dll
C:\Program Files\MUSICMATCH\MUSICMATCH Jukebox\MMVCP70.dll
C:\Program Files\MUSICMATCH\MUSICMATCH Jukebox\MMVCR70.dll
C:\Program Files\MUSICMATCH\MUSICMATCH Jukebox\mmxmlhttp.dll
C:\Program Files\MUSICMATCH\MUSICMATCH Jukebox\mmzip32.dll
C:\Program Files\MUSICMATCH\MUSICMATCH Jukebox\MSDI.dll
C:\Program Files\MUSICMATCH\MUSICMATCH Jukebox\NetUtilsDLL.dll
C:\Program Files\MUSICMATCH\MUSICMATCH Jukebox\ObjectManager.dll
C:\Program Files\MUSICMATCH\MUSICMATCH Jukebox\offers.mmc
C:\Program Files\MUSICMATCH\MUSICMATCH Jukebox\Plugins\Equalize.dll
C:\Program Files\MUSICMATCH\MUSICMATCH Jukebox\Plugins\fadein.dll
C:\Program Files\MUSICMATCH\MUSICMATCH Jukebox\Plugins\fadeout.dll
C:\Program Files\MUSICMATCH\MUSICMATCH Jukebox\Plugins\MMCodec.dll
C:\Program Files\MUSICMATCH\MUSICMATCH Jukebox\Plugins\normalize.dll
C:\Program Files\MUSICMATCH\MUSICMATCH Jukebox\Plugins\Portables\PrefPluginSvr.dll
C:\Program Files\MUSICMATCH\MUSICMATCH Jukebox\Plugins\Portables\WMDM9_2\PortDev.dll
C:\Program Files\MUSICMATCH\MUSICMATCH Jukebox\Plugins\resample.dll
C:\Program Files\MUSICMATCH\MUSICMATCH Jukebox\Plugins\Tagging\MemID3V1.dll
C:\Program Files\MUSICMATCH\MUSICMATCH Jukebox\Plugins\Tagging\MemID3V2.dll
C:\Program Files\MUSICMATCH\MUSICMATCH Jukebox\Plugins\Tagging\MemMMJB2X.dll
C:\Program Files\MUSICMATCH\MUSICMATCH Jukebox\Plugins\Tagging\MMTagger.dll
C:\Program Files\MUSICMATCH\MUSICMATCH Jukebox\Plugins\Tagging\SrcMP3.dll
C:\Program Files\MUSICMATCH\MUSICMATCH Jukebox\Plugins\Tagging\SrcWAV.dll
C:\Program Files\MUSICMATCH\MUSICMATCH Jukebox\Plugins\Tagging\SrcWma.dll
C:\Program Files\MUSICMATCH\MUSICMATCH Jukebox\Plugins\Visual_wa\MMVisual.dll
C:\Program Files\MUSICMATCH\MUSICMATCH Jukebox\Plugins\Visual_wa\vis_slideshow.dll
C:\Program Files\MUSICMATCH\MUSICMATCH Jukebox\PortableDevice.dll
C:\Program Files\MUSICMATCH\MUSICMATCH Jukebox\PortableDevice2.dll
C:\Program Files\MUSICMATCH\MUSICMATCH Jukebox\PortablesRun.dll
C:\Program Files\MUSICMATCH\MUSICMATCH Jukebox\PortalServices2.dll
C:\Program Files\MUSICMATCH\MUSICMATCH Jukebox\preferences.dll
C:\Program Files\MUSICMATCH\MUSICMATCH Jukebox\ProvisionalCert.mmc
C:\Program Files\MUSICMATCH\MUSICMATCH Jukebox\pslauncher.dll
C:\Program Files\MUSICMATCH\MUSICMATCH Jukebox\record.dll
C:\Program Files\MUSICMATCH\MUSICMATCH Jukebox\services.dll
C:\Program Files\MUSICMATCH\MUSICMATCH Jukebox\StgCdr.dll
C:\Program Files\MUSICMATCH\MUSICMATCH Jukebox\TDMUI.dll
C:\Program Files\MUSICMATCH\MUSICMATCH Jukebox\threadUtil.dll TABLE IV-continued Windows Essential System Files C:\Program Files\MUSICMATCH\MUSICMATCH Jukebox\ti.exe
C:\Program Files\MUSICMATCH\MUSICMATCH Jukebox\TrackListPrinter.dll
C:\Program Files\MUSICMATCH\MUSICMATCH Jukebox\TrackUtils.dll
C:\Program Files\MUSICMATCH\MUSICMATCH Jukebox\unicows.dll
C:\Program Files\MUSICMATCH\MUSICMATCH Jukebox\unmatch.exe
C:\Program Files\MUSICMATCH\MUSICMATCH Jukebox\unzip32.dll
C:\Program Files\MUSICMATCH\MUSICMATCH Jukebox\wmobjmgr.dll
C:\Program Files\MUSICMATCH\MUSICMATCH Jukebox\wnaspint.dll
C:\Program Files\MUSICMATCH\MUSICMATCH Jukebox\xanalyze.dll
C:\Program Files\MUSICMATCH\MUSICMATCH Jukebox\xaudio.dll
C:\Program Files\MUSICMATCH\MUSICMATCH Jukebox\xtr.dll
C:\Program Files\MUSICMATCH\MUSICMATCH Jukebox\zip32.dll
C:\Program Files\MUSICMATCH\MUSICMATCH Update\DLM\MMUpdateMgr.exe
C:\Program Files\MUSICMATCH\MUSICMATCH Update\DLM\MMUpdateMgrSetup.exe
C:\Program Files\MUSICMATCH\MUSICMATCH Update\DLM\mrbupd.dll
C:\Program Files\MUSICMATCH\MUSICMATCH Update\MarimbaChan.dll
C:\Program Files\MUSICMATCH\MUSICMATCH Update\MMJB\accessor.dll
C:\Program Files\MUSICMATCH\MUSICMATCH Update\MMJB\analog.dll
C:\Program Files\MUSICMATCH\MUSICMATCH Update\MMJB\AsiUtil.dll
C:\Program Files\MUSICMATCH\MUSICMATCH Update\MMJB\Atl9x.dll
C:\Program Files\MUSICMATCH\MUSICMATCH Update\MMJB\AtlNT.dll
C:\Program Files\MUSICMATCH\MUSICMATCH Update\MMJB\BurnManager.dll
C:\Program Files\MUSICMATCH\MUSICMATCH Update\MMJB\CDFeatureRRObject.dll
C:\Program Files\MUSICMATCH\MUSICMATCH Update\MMJB\cdinfo.dll
C:\Program Files\MUSICMATCH\MUSICMATCH Update\MMJB\CdPlayerIni.dll
C:\Program Files\MUSICMATCH\MUSICMATCH Update\MMJB\Convx.dll
C:\Program Files\MUSICMATCH\MUSICMATCH Update\MMJB\CoreDll.dll
C:\Program Files\MUSICMATCH\MUSICMATCH Update\MMJB\DestinationWavDll.dll
C:\Program Files\MUSICMATCH\MUSICMATCH Update\MMJB\digital.dll
C:\Program Files\MUSICMATCH\MUSICMATCH Update\MMJB\directorps.dll
C:\Program Files\MUSICMATCH\MUSICMATCH Update\MMJB\Enforce.dll
C:\Program Files\MUSICMATCH\MUSICMATCH Update\MMJB\EnforceRMS.dll
C:\Program Files\MUSICMATCH\MUSICMATCH Update\MMJB\Equalize.dll
C:\Program Files\MUSICMATCH\MUSICMATCH Update\MMJB\EventMgr.dll
C:\Program Files\MUSICMATCH\MUSICMATCH Update\MMJB\fadein.dll
C:\Program Files\MUSICMATCH\MUSICMATCH Update\MMJB\fadeout.dll
C:\Program Files\MUSICMATCH\MUSICMATCH Update\MMJB\FileAssoc.dll
C:\Program Files\MUSICMATCH\MUSICMATCH Update\MMJB\FileCacheMgr.dll
C:\Program Files\MUSICMATCH\MUSICMATCH Update\MMJB\fileco.dll
C:\Program Files\MUSICMATCH\MUSICMATCH Update\MMJB\FWAppOptions.dll
C:\Program Files\MUSICMATCH\MUSICMATCH Update\MMJB\FWRun.dll
C:\Program Files\MUSICMATCH\MUSICMATCH Update\MMJB\gdiutil.dll
C:\Program Files\MUSICMATCH\MUSICMATCH Update\MMJB\HHActiveX.dll
C:\Program Files\MUSICMATCH\MUSICMATCH Update\MMJB\Inetwh32.dll
C:\Program Files\MUSICMATCH\MUSICMATCH Update\MMJB\INIProperties.dll
C:\Program Files\MUSICMATCH\MUSICMATCH Update\MMJB\iupnp.dll
C:\Program Files\MUSICMATCH\MUSICMATCH Update\MMJB\ixml.dll
C:\Program Files\MUSICMATCH\MUSICMATCH Update\MMJB\JewelCaseObject.dll
C:\Program Files\MUSICMATCH\MUSICMATCH Update\MMJB\JewelCasePrinter.dll
C:\Program Files\MUSICMATCH\MUSICMATCH Update\MMJB\JpegObject.dll
C:\Program Files\MUSICMATCH\MUSICMATCH Update\MMJB\KeyboardHookDll.dll
C:\Program Files\MUSICMATCH\MUSICMATCH Update\MMJB\Legacy.dll
C:\Program Files\MUSICMATCH\MUSICMATCH Update\MMJB\libmmd.dll
C:\Program Files\MUSICMATCH\MUSICMATCH Update\MMJB\linein.dll
C:\Program Files\MUSICMATCH\MUSICMATCH Update\MMJB\MemID3V1.dll
C:\Program Files\MUSICMATCH\MUSICMATCH Update\MMJB\MemID3V2.dll
C:\Program Files\MUSICMATCH\MUSICMATCH Update\MMJB\MemMMJB2X.dll
C:\Program Files\MUSICMATCH\MUSICMATCH Update\MMJB\mixer.dll
C:\Program Files\MUSICMATCH\MUSICMATCH Update\MMJB\mm_director.exe
C:\Program Files\MUSICMATCH\MUSICMATCH Update\MMJB\mm_server.exe
C:\Program Files\MUSICMATCH\MUSICMATCH Update\MMJB\mm_tray.exe
C:\Program Files\MUSICMATCH\MUSICMATCH Update\MMJB\mm_upnpsvr.dll
C:\Program Files\MUSICMATCH\MUSICMATCH Update\MMJB\MMC.dll
C:\Program Files\MUSICMATCH\MUSICMATCH Update\MMJB\MMC3.dll
C:\Program Files\MUSICMATCH\MUSICMATCH Update\MMJB\MMC70U.DLL
C:\Program Files\MUSICMATCH\MUSICMATCH Update\MMJB\mmcd.dll
C:\Program Files\MUSICMATCH\MUSICMATCH Update\MMJB\MMCodec.dll
C:\Program Files\MUSICMATCH\MUSICMATCH Update\MMJB\MMComReg.exe
C:\Program Files\MUSICMATCH\MUSICMATCH Update\MMJB\mmdb.dll
C:\Program Files\MUSICMATCH\MUSICMATCH Update\MMJB\mmdiag.exe
C:\Program Files\MUSICMATCH\MUSICMATCH Update\MMJB\MMFWLaunch.exe
C:\Program Files\MUSICMATCH\MUSICMATCH Update\MMJB\mmfwloc.dll TABLE IV-continued Windows Essential System Files C:\Program Files\MUSICMATCH\MUSICMATCH Update\MMJB\mmhttp.dll
C:\Program Files\MUSICMATCH\MUSICMATCH Update\MMJB\MMHttpSvr.dll
C:\Program Files\MUSICMATCH\MUSICMATCH Update\MMJB\MMInet.dll
C:\Program Files\MUSICMATCH\MUSICMATCH Update\MMJB\mmjb.exe
C:\Program Files\MUSICMATCH\MUSICMATCH Update\MMJB\MMJBBurn.exe
C:\Program Files\MUSICMATCH\MUSICMATCH Update\MMJB\MMJBLaunch.exe
C:\Program Files\MUSICMATCH\MUSICMATCH Update\MMJB\mmjbloc.dll
C:\Program Files\MUSICMATCH\MUSICMATCH Update\MMJB\MMJBPortables.exe
C:\Program Files\MUSICMATCH\MUSICMATCH Update\MMJB\MMJBPortablesAppOptions.dll
C:\Program Files\MUSICMATCH\MUSICMATCH Update\MMJB\MMJBPortablesLaunch.exe
C:\Program Files\MUSICMATCH\MUSICMATCH Update\MMJB\MMJBPortablesLoc.dll
C:\Program Files\MUSICMATCH\MUSICMATCH Update\MMJB\MMJBPortablesResourceObject.dll
C:\Program Files\MUSICMATCH\MUSICMATCH Update\MMJB\mmjbrun.exe
C:\Program Files\MUSICMATCH\MUSICMATCH Update\MMJB\mmjbupdt.dll
C:\Program Files\MUSICMATCH\MUSICMATCH Update\MMJB\MMPclSvr.dll
C:\Program Files\MUSICMATCH\MUSICMATCH Update\MMJB\mmportal.dll
C:\Program Files\MUSICMATCH\MUSICMATCH Update\MMJB\mmprinter.dll
C:\Program Files\MUSICMATCH\MUSICMATCH Update\MMJB\mmreg.dll
C:\Program Files\MUSICMATCH\MUSICMATCH Update\MMJB\mmsal32.dll
C:\Program Files\MUSICMATCH\MUSICMATCH Update\MMJB\mmsiteserv.dll
C:\Program Files\MUSICMATCH\MUSICMATCH Update\MMJB\MMTagger.dll
C:\Program Files\MUSICMATCH\MUSICMATCH Update\MMJB\mmtask.exe
C:\Program Files\MUSICMATCH\MUSICMATCH Update\MMJB\mmuiserv.dll
C:\Program Files\MUSICMATCH\MUSICMATCH Update\MMJB\MMVCP70.dll
C:\Program Files\MUSICMATCH\MUSICMATCH Update\MMJB\MMVCR70.dll
C:\Program Files\MUSICMATCH\MUSICMATCH Update\MMJB\MMVisual.dll
C:\Program Files\MUSICMATCH\MUSICMATCH Update\MMJB\mmxmlhttp.dll
C:\Program Files\MUSICMATCH\MUSICMATCH Update\MMJB\mmzip32.dll
C:\Program Files\MUSICMATCH\MUSICMATCH Update\MMJB\MSDI.dll
C:\Program Files\MUSICMATCH\MUSICMATCH Update\MMJB\msvcp60.dll
C:\Program Files\MUSICMATCH\MUSICMATCH Update\MMJB\msvcrt.dll
C:\Program Files\MUSICMATCH\MUSICMATCH Update\MMJB\MXLObj.dll
C:\Program Files\MUSICMATCH\MUSICMATCH Update\MMJB\NetUtilsDLL.dll
C:\Program Files\MUSICMATCH\MUSICMATCH Update\MMJB\normalize.dll
C:\Program Files\MUSICMATCH\MUSICMATCH Update\MMJB\ObjectManager.dll
C:\Program Files\MUSICMATCH\MUSICMATCH Update\MMJB\OstaGen.dll
C:\Program Files\MUSICMATCH\MUSICMATCH Update\MMJB\PhilipsRemote.exe
C:\Program Files\MUSICMATCH\MUSICMATCH Update\MMJB\PlaylistManager.dll
C:\Program Files\MUSICMATCH\MUSICMATCH Update\MMJB\PortableDevice.dll
C:\Program Files\MUSICMATCH\MUSICMATCH Update\MMJB\PortableDevice2.dll
C:\Program Files\MUSICMATCH\MUSICMATCH Update\MMJB\PortableDeviceManager.dll
C:\Program Files\MUSICMATCH\MUSICMATCH Update\MMJB\PortablesRun.dll
C:\Program Files\MUSICMATCH\MUSICMATCH Update\MMJB\PortalServices2.dll
C:\Program Files\MUSICMATCH\MUSICMATCHUpdate\MMJB\PortDev.dll
C:\Program Files\MUSICMATCH\MUSICMATCHUpdate\MMJB\preferences.dll
C:\Program Files\MUSICMATCH\MUSICMATCHUpdate\MMJB\PrefPluginSvr.dll
C:\Program Files\MUSICMATCH\MUSICMATCH Update\MMJB\ProvisionalCert.mmc
C:\Program Files\MUSICMATCH\MUSICMATCHUpdate\MMJB\pslauncher.dll
C:\Program Files\MUSICMATCH\MUSICMATCHUpdate\MMJB\record.dll
C:\Program Files\MUSICMATCH\MUSICMATCHUpdate\MMJB\RefreshIcon.exe
C:\Program Files\MUSICMATCH\MUSICMATCHUpdate\MMJB\resample.dll
C:\Program Files\MUSICMATCH\MUSICMATCH Update\MMJB\ResourceObject.dll
C:\Program Files\MUSICMATCH\MUSICMATCHUpdate\MMJB\Roboex32.dll
C:\Program Files\MUSICMATCH\MUSICMATCHUpdate\MMJB\services.dll
C:\Program Files\MUSICMATCH\MUSICMATCHUpdate\MMJB\Setup.exe
C:\Program Files\MUSICMATCH\MUSICMATCHUpdate\MMJB\skinmgr.dll
C:\Program Files\MUSICMATCH\MUSICMATCHUpdate\MMJB\skinnedctrls.dll
C:\Program Files\MUSICMATCH\MUSICMATCHUpdate\MMJB\SrcMP3.dll
C:\Program Files\MUSICMATCH\MUSICMATCHUpdate\MMJB\SrcWAV.dll
C:\Program Files\MUSICMATCH\MUSICMATCHUpdate\MMJB\StgCdr.dll
C:\Program Files\MUSICMATCH\MUSICMATCHUpdate\MMJB\Stingray.dll
C:\Program Files\MUSICMATCH\MUSICMATCH Update\MMJB\StopPhilipsRemote.exe
C:\Program Files\MUSICMATCH\MUSICMATCHUpdate\MMJB\stprinter.dll
C:\Program Files\MUSICMATCH\MUSICMATCHUpdate\MMJB\SyncManager.dll
C:\Program Files\MUSICMATCH\MUSICMATCH Update\MMJB\TDM\mm_TDMEngine.exe TABLE IV-continued Windows Essential System Files C:\Program Files\MUSICMATCH\MUSICMATCHUpdate\MMJB\TDM\mmgit.dll
C:\Program Files\MUSICMATCH\MUSICMATCHUpdate\MMJB\TDM\mmlicmgr.dll
C:\Program Files\MUSICMATCH\MUSICMATCHUpdate\MMJB\TDM\SrcWMA.dll
C:\Program Files\MUSICMATCH\MUSICMATCHUpdate\MMJB\TDM\TDMUI.dll
C:\Program Files\MUSICMATCH\MUSICMATCHUpdate\MMJB\TDM\WMDMDist.exe
C:\Program Files\MUSICMATCH\MUSICMATCHUpdate\MMJB\TDM\WMFDist.exe
C:\Program Files\MUSICMATCH\MUSICMATCHUpdate\MMJB\TDM\wmobjmgr.dll
C:\Program Files\MUSICMATCH\MUSICMATCHUpdate\MMJB\threadUtil.dll
C:\Program Files\MUSICMATCH\MUSICMATCHUpdate\MMJB\ti.exe
C:\Program Files\MUSICMATCH\MUSICMATCH Update\MMJB\TrackListPrinter.dll
C:\Program Files\MUSICMATCH\MUSICMATCHUpdate\MMJB\TrackUtils.dll
C:\Program Files\MUSICMATCH\MUSICMATCHUpdate\MMJB\unicows.dll
C:\Program Files\MUSICMATCH\MUSICMATCHUpdate\MMJB\unmatch.exe
C:\Program Files\MUSICMATCH\MUSICMATCHUpdate\MMJB\unzip32.dll
C:\Program Files\MUSICMATCH\MUSICMATCHUpdate\MMJB\Upgrade.dll
C:\Program Files\MUSICMATCH\MUSICMATCHUpdate\MMJB\vis_slideshow.dll
C:\Program Files\MUSICMATCH\MUSICMATCHUpdate\MMJB\xanalyze.dll
C:\Program Files\MUSICMATCH\MUSICMATCHUpdate\MMJB\xaudio.dll
C:\Program Files\MUSICMATCH\MUSICMATCHUpdate\MMJB\xtr.dll
C:\Program Files\MUSICMATCH\MUSICMATCHUpdate\MMJB\zip32.dll
C:\Program Files\MUSICMATCH\MUSICMATCHUpdate\MMUpdateMgr.exe
C:\Program Files\MUSICMATCH\MUSICMATCHUpdate\mrbupd.dll
C:\Program Files\MUSICMATCH\MUSICMATCHUpdate\TDM\mm_TDMEngine.exe
C:\Program Files\MUSICMATCH\MUSICMATCHUpdate\TDM\mmgit.dll
C:\Program Files\MUSICMATCH\MUSICMATCH Update\TDM\mmlicmgr.dll
C:\Program Files\MUSICMATCH\MUSICMATCH Update\TDM\SrcWMA.dll
C:\Program Files\MUSICMATCH\MUSICMATCH Update\TDM\TDMUI.dll
C:\Program Files\MUSICMATCH\MUSICMATCH Update\TDM\WMDMDist.exe
C:\Program Files\MUSICMATCH\MUSICMATCH Update\TDM\WMFDist.exe
C:\Program Files\MUSICMATCH\MUSICMATCH Update\TDM\wmobjmgr.dll
C:\Program Files\NetMeeting\callcont.dll
C:\Program Files\NetMeeting\CB32.EXE
C:\Program Files\NetMeeting\conf.exe
C:\Program Files\NetMeeting\confmrsl.dll
C:\Program Files\NetMeeting\dcap32.dll
C:\Program Files\NetMeeting\h323cc.dll
C:\Program Files\NetMeeting\mst120.dll
C:\Program Files\NetMeeting\mst123.dll
C:\Program Files\NetMeeting\nac.dll
C:\Program Files\NetMeeting\nmas.dll
C:\Program Files\NetMeeting\nmasnt.dll
C:\Program Files\NetMeeting\nmchat.dll
C:\Program Files\NetMeeting\nmcom.dll
C:\Program Files\NetMeeting\nmft.dll
C:\Program Files\NetMeeting\nmoldwb.dll
C:\Program Files\NetMeeting\nmwb.dll
C:\Program Files\NetMeeting\rrcm.dll
C:\Program Files\NetMeeting\WB32.EXE
C:\Program Files\Network Stumbler\NetStumbler.exe
C:\Program Files\NewzCrawler\NCRSSAuto.dll
C:\Program Files\NewzCrawler\News.exe
C:\Program Files\OfficeUpdate11\oudetect.dll
C:\Program Files\OpenOffice.org1.1.2\program\abp645mi.dll
C:\Program Files\OpenOffice.org1.1.2\program\acceptor.uno.dll
C:\Program Files\OpenOffice.org1.1.2\program\adabas2.dll
C:\Program Files\OpenOffice.org1.1.2\program\ado2.dll
C:\Program Files\OpenOffice.org1.1.2\program\analysis645mi.dll
C:\Program Files\OpenOffice.org1.1.2\program\basctl645mi.dll
C:\Program Files\OpenOffice.org1.1.2\program\bib645mi.dll
C:\Program Files\OpenOffice.org1.1.2\program\bridgefac.uno.dll
C:\Program Files\OpenOffice.org1.1.2\program\cached1.dll
C:\Program Files\OpenOffice.org1.1.2\program\calc645mi.dll
C:\Program Files\OpenOffice.org1.1.2\program\cfgmgr2.dll
C:\Program Files\OpenOffice.org1.1.2\program\cmdmail.dll
C:\Program Files\OpenOffice.org1.1.2\program\cnt645mi.dll
C:\Program Files\OpenOffice.org1.1.2\program\comphelp3MSC.dll
C:\Program Files\OpenOffice.org1.1.2\program\components\addrbook.dll
C:\Program Files\OpenOffice.org1.1.2\program\components\mork.dll
C:\Program Files\OpenOffice.org1.1.2\program\components\mozldap.dll
C:\Program Files\OpenOffice.org1.1.2\program\components\necko.dll
C:\Program Files\OpenOffice.org1.1.2\program\components\profile.dll
C:\Program Files\OpenOffice.org1.1.2\program\components\rdf.dll
C:\Program Files\OpenOffice.org1.1.2\program\components\strres.dll
C:\Program Files\OpenOffice.org1.1.2\program\components\ucharuti.dll
C:\Program Files\OpenOffice.org1.1.2\program\components\uconv.dll
C:\Program Files\OpenOffice.org1.1.2\program\components\ucvcn.dll
C:\Program Files\OpenOffice.org1.1.2\program\components\ucvibm.dll

TABLE IV-continued

Windows Essential System Files

C:\Program Files\OpenOffice.org1.1.2\program\components\ucvja.dll
C:\Program Files\OpenOffice.org1.1.2\program\components\ucvko.dll
C:\Program Files\OpenOffice.org1.1.2\program\components\ucvlatin.dll
C:\Program Files\OpenOffice.org1.1.2\program\components\ucvtw.dll
C:\Program Files\OpenOffice.org1.1.2\program\components\ucvtw2.dll
C:\Program Files\OpenOffice.org1.1.2\program\components\urildr.dll
C:\Program Files\OpenOffice.org1.1.2\program\components\vcard.dll
C:\Program Files\OpenOffice.org1.1.2\program\components\xpc3250.dll
C:\Program Files\OpenOffice.org1.1.2\program\components\xppref32.dll
C:\Program Files\OpenOffice.org1.1.2\program\connector.uno.dll
C:\Program Files\OpenOffice.org1.1.2\program\corereflection.uno.dll
C:\Program Files\OpenOffice.org1.1.2\program\cppu3.dll
C:\Program Files\OpenOffice.org1.1.2\program\cppuhelper3MSC.dll
C:\Program Files\OpenOffice.org1.1.2\program\crashrep.exe
C:\Program Files\OpenOffice.org1.1.2\program\ctl645mi.dll
C:\Program Files\OpenOffice.org1.1.2\program\date645mi.dll
C:\Program Files\OpenOffice.org1.1.2\program\dba645mi.dll
C:\Program Files\OpenOffice.org1.1.2\program\dbase645mi.dll
C:\Program Files\OpenOffice.org1.1.2\program\dbghelp.dll
C:\Program Files\OpenOffice.org1.1.2\program\dbi645mi.dll
C:\Program Files\OpenOffice.org1.1.2\program\dbp645mi.dll
C:\Program Files\OpenOffice.org1.1.2\program\dbpool2.dll
C:\Program Files\OpenOffice.org1.1.2\program\dbtools2.dll
C:\Program Files\OpenOffice.org1.1.2\program\dbu645mi.dll
C:\Program Files\OpenOffice.org1.1.2\program\del645mi.dll
C:\Program Files\OpenOffice.org1.1.2\program\dict_ja.dll
C:\Program Files\OpenOffice.org1.1.2\program\dict_zh.dll
C:\Program Files\OpenOffice.org1.1.2\program\dl645mi.dll
C:\Program Files\OpenOffice.org1.1.2\program\dnd.dll
C:\Program Files\OpenOffice.org1.1.2\program\dtrans.dll
C:\Program Files\OpenOffice.org1.1.2\program\emser645mi.dll
C:\Program Files\OpenOffice.org1.1.2\program\evtatt.dll
C:\Program Files\OpenOffice.org1.1.2\program\file645mi.dll
C:\Program Files\OpenOffice.org1.1.2\program\fileacc.dll
C:\Program Files\OpenOffice.org1.1.2\program\filter\egi645mi.dll
C:\Program Files\OpenOffice.org1.1.2\program\filter\eme645mi.dll
C:\Program Files\OpenOffice.org1.1.2\program\filter\emp645mi.dll
C:\Program Files\OpenOffice.org1.1.2\program\filter\epb645mi.dll
C:\Program Files\OpenOffice.org1.1.2\program\filter\epg645mi.dll
C:\Program Files\OpenOffice.org1.1.2\program\filter\epn645mi.dll
C:\Program Files\OpenOffice.org1.1.2\program\filter\epp645mi.dll
C:\Program Files\OpenOffice.org1.1.2\program\filter\eps645mi.dll
C:\Program Files\OpenOffice.org1.1.2\program\filter\ept645mi.dll
C:\Program Files\OpenOffice.org1.1.2\program\filter\era645mi.dll
C:\Program Files\OpenOffice.org1.1.2\program\filter\eti645mi.dll
C:\Program Files\OpenOffice.org1.1.2\program\filter\exp645mi.dll
C:\Program Files\OpenOffice.org1.1.2\program\filter\icd645mi.dll
C:\Program Files\OpenOffice.org1.1.2\program\filter\icg645mi.dll
C:\Program Files\OpenOffice.org1.1.2\program\filter\idx645mi.dll
C:\Program Files\OpenOffice.org1.1.2\program\filter\ime645mi.dll
C:\Program Files\OpenOffice.org1.1.2\program\filter\ipb645mi.dll
C:\Program Files\OpenOffice.org1.1.2\program\filter\ipd645mi.dll
C:\Program Files\OpenOffice.org1.1.2\program\filter\ips645mi.dll
C:\Program Files\OpenOffice.org1.1.2\program\filter\ipt645mi.dll
C:\Program Files\OpenOffice.org1.1.2\program\filter\ipx645mi.dll
C:\Program Files\OpenOffice.org1.1.2\program\filter\ira645mi.dll
C:\Program Files\OpenOffice.org1.1.2\program\filter\itg645mi.dll
C:\Program Files\OpenOffice.org1.1.2\program\filter\iti645mi.dll
C:\Program Files\OpenOffice.org1.1.2\program\flash645mi.dll
C:\Program Files\OpenOffice.org1.1.2\program\flat645mi.dll
C:\Program Files\OpenOffice.org1.1.2\program\fop.dll
C:\Program Files\OpenOffice.org1.1.2\program\fps.dll
C:\Program Files\OpenOffice.org1.1.2\program\frm645mi.dll
C:\Program Files\OpenOffice.org1.1.2\program\ftransl.dll
C:\Program Files\OpenOffice.org1.1.2\program\fwe645mi.dll
C:\Program Files\OpenOffice.org1.1.2\program\fwi645mi.dll
C:\Program Files\OpenOffice.org1.1.2\program\fwk645mi.dll
C:\Program Files\OpenOffice.org1.1.2\program\fwl645mi.dll
C:\Program Files\OpenOffice.org1.1.2\program\go645mi.dll
C:\Program Files\OpenOffice.org1.1.2\program\hyphen645mi.dll
C:\Program Files\OpenOffice.org1.1.2\program\i18n645mi.dll
C:\Program Files\OpenOffice.org1.1.2\program\i18npool645mi.dll
C:\Program Files\OpenOffice.org1.1.2\program\i18nregexpMSC.dll
C:\Program Files\OpenOffice.org1.1.2\program\i18nsearch.dll
C:\Program Files\OpenOffice.org1.1.2\program\i18nutilMSC.dll
C:\Program Files\OpenOffice.org1.1.2\program\icudt22l.dll
C:\Program Files\OpenOffice.org1.1.2\program\icuin22.dll
C:\Program Files\OpenOffice.org1.1.2\program\icule22.dll TABLE IV-continued Windows Essential System Files C:\Program Files\OpenOffice.org1.1.2\program\icuuc22.dll
C:\Program Files\OpenOffice.org1.1.2\program\implreg.uno.dll
C:\Program Files\OpenOffice.org1.1.2\program\introspection.uno.dll
C:\Program Files\OpenOffice.org1.1.2\program\invocadapt.uno.dll
C:\Program Files\OpenOffice.org1.1.2\program\invocation.uno.dll
C:\Program Files\OpenOffice.org1.1.2\program\j645mi_g.dll
C:\Program Files\OpenOffice.org1.1.2\program\java_uno.dll
C:\Program Files\OpenOffice.org1.1.2\program\java_uno_accessbridge.dll
C:\Program Files\OpenOffice.org1.1.2\program\javaloader.uno.dll
C:\Program Files\OpenOffice.org1.1.2\program\javavm.uno.dll
C:\Program Files\OpenOffice.org1.1.2\program\jdbc2.dll
C:\Program Files\OpenOffice.org1.1.2\program\jpipe.dll
C:\Program Files\OpenOffice.org1.1.2\program\js3250.dll
C:\Program Files\OpenOffice.org1.1.2\program\juh.dll
C:\Program Files\OpenOffice.org1.1.2\program\juhx.dll
C:\Program Files\OpenOffice.org1.1.2\program\jvm645mi.dll
C:\Program Files\OpenOffice.org1.1.2\program\jvmaccess3MSC.dll
C:\Program Files\OpenOffice.org1.1.2\program\jvmsetup.exe
C:\Program Files\OpenOffice.org1.1.2\program\libcurl.dll
C:\Program Files\OpenOffice.org1.1.2\program\libdb32.dll
C:\Program Files\OpenOffice.org1.1.2\program\libdb_java32.dll
C:\Program Files\OpenOffice.org1.1.2\program\lng645mi.dll
C:\Program Files\OpenOffice.org1.1.2\program\localedata_en.dll
C:\Program Files\OpenOffice.org1.1.2\program\localedata_es.dll
C:\Program Files\OpenOffice.org1.1.2\program\localedata_euro.dll
C:\Program Files\OpenOffice.org1.1.2\program\localedata_others.dll
C:\Program Files\OpenOffice.org1.1.2\program\lth645mi.dil
C:\Program Files\OpenOffice.org1.1.2\program\mcnttype.dll
C:\Program Files\OpenOffice.org1.1.2\program\mozab2.dll
C:\Program Files\OpenOffice.org1.1.2\program\mozabdrv2.dll
C:\Program Files\OpenOffice.org1.1.2\program\mozreg.dll
C:\Program Files\OpenOffice.org1.1.2\program\msci_uno.dll
C:\Program Files\OpenOffice.org1.1.2\program\msfontextract.exe
C:\Program Files\OpenOffice.org1.1.2\program\msgbsutl.dll
C:\Program Files\OpenOffice.org1.1.2\program\msvcp70.dll
C:\Program Files\OpenOffice.org1.1.2\program\msvcr70.dll
C:\Program Files\OpenOffice.org1.1.2\program\mysql2.dll
C:\Program Files\OpenOffice.org1.1.2\program\namingservice.uno.dll
C:\Program Files\OpenOffice.org1.1.2\program\nestedreg.uno.dll
C:\Program Files\OpenOffice.org1.1.2\program\nsldap32v50.dll
C:\Program Files\OpenOffice.org1.1.2\program\nsldappr32v50.dll
C:\Program Files\OpenOffice.org1.1.2\program\nspr4.dll
C:\Program Files\OpenOffice.org1.1.2\program\nsreg.dll
C:\Program Files\OpenOffice.org1.1.2\program\odbc2.dll
C:\Program Files\OpenOffice.org1.1.2\program\odbcbase2.dll
C:\Program Files\OpenOffice.org1.1.2\program\ofa645mi.dll
C:\Program Files\OpenOffice.org1.1.2\program\offacc645mi.dll
C:\Program Files\OpenOffice.org1.1.2\program\officebean.dll
C:\Program Files\OpenOffice.org1.1.2\program\oleautobridge.uno.dll
C:\Program Files\OpenOffice.org1.1.2\program\OoVirgHook.dll
C:\Program Files\OpenOffice.org1.1.2\program\opc645mi.dll
C:\Program Files\OpenOffice.org1.1.2\program\OpenOfficeHookTray.exe
C:\Program Files\OpenOffice.org1.1.2\program\package2.dll
C:\Program Files\OpenOffice.org1.1.2\program\pcr645mi.dll
C:\Program Files\OpenOffice.org1.1.2\program\pdffilter645mi.dll
C:\Program Files\OpenOffice.org1.1.2\program\pk645mi.dll
C:\Program Files\OpenOffice.org1.1.2\program\pkgchk.exe
C:\Program Files\OpenOffice.org1.1.2\program\pkgchk645mi.dll
C:\Program Files\OpenOffice.org1.1.2\program\pl645mi.dll
C:\Program Files\OpenOffice.org1.1.2\program\placewaremi.dll
C:\Program Files\OpenOffice.org1.1.2\program\plc4.dll
C:\Program Files\OpenOffice.org1.1.2\program\plds4.dll
C:\Program Files\OpenOffice.org1.1.2\program\preload645mi.dll
C:\Program Files\OpenOffice.org1.1.2\program\proxyfac.uno.dll
C:\Program Files\OpenOffice.org1.1.2\program\proxyset.dll
C:\Program Files\OpenOffice.org1.1.2\program\python-core-2.2.2\bin\python.exe
C:\Program Files\OpenOffice.org1.1.2\program\python22.dll
C:\Program Files\OpenOffice.org1.1.2\program\pythonloader.uno.dll
C:\Program Files\OpenOffice.org1.1.2\program\pyuno.dll
C:\Program Files\OpenOffice.org1.1.2\program\quickstart.exe
C:\Program Files\OpenOffice.org1.1.2\program\reg3.dll
C:\Program Files\OpenOffice.org1.1.2\program\reg4msdoc645mi.dll
C:\Program Files\OpenOffice.org1.1.2\program\regactivex645mi.dll
C:\Program Files\OpenOffice.org1.1.2\program\regsvrex.exe
C:\Program Files\OpenOffice.org1.1.2\program\regtypeprov.uno.dll
C:\Program Files\OpenOffice.org1.1.2\program\remotebridge.uno.dll TABLE IV-continued

| Windows Essential System Files |
|---|
| C:\Program Files\OpenOffice.org1.1.2\program\res645mi.dll |
| C:\Program Files\OpenOffice.org1.1.2\program\rmcxt3.dll |
| C:\Program Files\OpenOffice.org1.1.2\program\sal3.dll |
| C:\Program Files\OpenOffice.org1.1.2\program\salhelper3MSC.dll |
| C:\Program Files\OpenOffice.org1.1.2\program\sax.uno.dll |
| C:\Program Files\OpenOffice.org1.1.2\program\sb645mi.dll |
| C:\Program Files\OpenOffice.org1.1.2\program\sc645mi.dll |
| C:\Program Files\OpenOffice.org1.1.2\program\sch645mi.dll |
| C:\Program Files\OpenOffice.org1.1.2\program\scn645mi.dll |
| C:\Program Files\OpenOffice.org1.1.2\program\sd645mi.dll |
| C:\Program Files\OpenOffice.org1.1.2\program\sdbc2.dll |
| C:\Program Files\OpenOffice.org1.1.2\program\security.uno.dll |
| C:\Program Files\OpenOffice.org1.1.2\program\servicemgr.uno.dll |
| C:\Program Files\OpenOffice.org1.1.2\program\set645mi.dll |
| C:\Program Files\OpenOffice.org1.1.2\program\setofficelang.exe |
| C:\Program Files\OpenOffice.org1.1.2\program\setup.exe |
| C:\Program Files\OpenOffice.org1.1.2\program\sfx645mi.dll |
| C:\Program Files\OpenOffice.org1.1.2\program\shlibloader.uno.dll |
| C:\Program Files\OpenOffice.org1.1.2\program\shlxthdl.dll |
| C:\Program Files\OpenOffice.org1.1.2\program\simplereg.uno.dll |
| C:\Program Files\OpenOffice.org1.1.2\program\sm645mi.dll |
| C:\Program Files\OpenOffice.org1.1.2\program\smplmail.dll |
| C:\Program Files\OpenOffice.org1.1.2\program\so645mi.dll |
| C:\Program Files\OpenOffice.org1.1.2\program\so_activex.dll |
| C:\Program Files\OpenOffice.org1.1.2\program\soffice.exe |
| C:\Program Files\OpenOffice.org1.1.2\program\sot645mi.dll |
| C:\Program Files\OpenOffice.org1.1.2\program\spell645mi.dll |
| C:\Program Files\OpenOffice.org1.1.2\program\spl645mi.dll |
| C:\Program Files\OpenOffice.org1.1.2\program\srtrs1.dll |
| C:\Program Files\OpenOffice.org1.1.2\program\stlport_vc745.dll |
| C:\Program Files\OpenOffice.org1.1.2\program\store3.dll |
| C:\Program Files\OpenOffice.org1.1.2\program\streams.uno.dll |
| C:\Program Files\OpenOffice.org1.1.2\program\sts645mi.dll |
| C:\Program Files\OpenOffice.org1.1.2\program\svg645mi.dll |
| C:\Program Files\OpenOffice.org1.1.2\program\svl645mi.dll |
| C:\Program Files\OpenOffice.org1.1.2\program\svt645mi.dll |
| C:\Program Files\OpenOffice.org1.1.2\program\svx645mi.dll |
| C:\Program Files\OpenOffice.org1.1.2\program\sw645mi.dll |
| C:\Program Files\OpenOffice.org1.1.2\program\sysdtrans.dll |
| C:\Program Files\OpenOffice.org1.1.2\program\syssh.dll |
| C:\Program Files\OpenOffice.org1.1.2\program\testtool.exe |
| C:\Program Files\OpenOffice.org1.1.2\program\textinstream.uno.dll |
| C:\Program Files\OpenOffice.org1.1.2\program\textoutstream.uno.dll |
| C:\Program Files\OpenOffice.org1.1.2\program\tk645mi.dll |
| C:\Program Files\OpenOffice.org1.1.2\program\tl645mi.dll |
| C:\Program Files\OpenOffice.org1.1.2\program\tplx645mi.dll |
| C:\Program Files\OpenOffice.org1.1.2\program\tvhlp1.dll |
| C:\Program Files\OpenOffice.org1.1.2\program\typeconverter.uno.dll |
| C:\Program Files\OpenOffice.org1.1.2\program\typemgr.uno.dll |
| C:\Program Files\OpenOffice.org1.1.2\program\ucb1.dll |
| C:\Program Files\OpenOffice.org1.1.2\program\ucbhelper2MSC.dll |
| C:\Program Files\OpenOffice.org1.1.2\program\ucpchelp1.dll |
| C:\Program Files\OpenOffice.org1.1.2\program\ucpdav1.dll |
| C:\Program Files\OpenOffice.org1.1.2\program\ucpfile1.dll |
| C:\Program Files\OpenOffice.org1.1.2\program\ucpftp1.dll |
| C:\Program Files\OpenOffice.org1.1.2\program\ucphier1.dll |
| C:\Program Files\OpenOffice.org1.1.2\program\ucppkg1.dll |
| C:\Program Files\OpenOffice.org1.1.2\program\ulingu645mi.dll |
| C:\Program Files\OpenOffice.org1.1.2\program\unicows.dll |
| C:\Program Files\OpenOffice.org1.1.2\program\urp_uno.dll |
| C:\Program Files\OpenOffice.org1.1.2\program\usp645mi.dll |
| C:\Program Files\OpenOffice.org1.1.2\program\utl645mi.dll |
| C:\Program Files\OpenOffice.org1.1.2\program\uui645mi.dll |
| C:\Program Files\OpenOffice.org1.1.2\program\uuresolver.uno.dll |
| C:\Program Files\OpenOffice.org1.1.2\program\uwinapi.dll |
| C:\Program Files\OpenOffice.org1.1.2\program\vcl645mi.dll |
| C:\Program Files\OpenOffice.org1.1.2\program\vos3MSC.dll |
| C:\Program Files\OpenOffice.org1.1.2\program\wrp645mi.dll |
| C:\Program Files\OpenOffice.org1.1.2\program\xcr645mi.dll |
| C:\Program Files\OpenOffice.org1.1.2\program\xmergesync.dll |
| C:\Program Files\OpenOffice.org1.1.2\program\xmlfa645mi.dll |
| C:\Program Files\OpenOffice.org1.1.2\program\xmlfd645mi.dll |
| C:\Program Files\OpenOffice.org1.1.2\program\xmx645mi.dll |
| C:\Program Files\OpenOffice.org1.1.2\program\xo645mi.dll |
| C:\Program Files\OpenOffice.org1.1.2\program\xpcom.dll |
| C:\Program Files\OpenOffice.org1.1.2\program\xsltdlg645mi.dll |
| C:\Program Files\OpenOffice.org1.1.2\program\xsltfilter645mi.dll |
| C:\Program Files\OpenOffice.org1.1.2\program\zlib.dll |

TABLE IV-continued

Windows Essential System Files

C:\Program Files\OpenVPN\bin\libeay32.dll
C:\Program Files\OpenVPN\bin\libssl32.dll
C:\Program Files\OpenVPN\bin\openssl.exe
C:\Program Files\OpenVPN\bin\openvpn.exe
C:\Program Files\OpenVPN\bin\openvpnserv.exe
C:\Program Files\OpenVPN\driver\tap0801.sys
C:\Program Files\ORiNOCO\WirelessClient\Driver\ntpr11ag.sys
C:\Program Files\ORiNOCO\WirelessClient\Utility\AegisE2.dll
C:\Program Files\ORiNOCO\WirelessClient\Utility\AegisE5.dll
C:\Program Files\ORiNOCO\WirelessClient\Utility\AegisI2.exe
C:\Program Files\ORiNOCO\WirelessClient\Utility\AegisI5.exe
C:\Program Files\ORiNOCO\WirelessClient\Utility\libeay32.dll
C:\Program Files\ORiNOCO\WirelessClient\Utility\mfc42.dll
C:\Program Files\ORiNOCO\WirelessClient\Utility\orinoco.exe
C:\Program Files\ORiNOCO\WirelessClient\Utility\prcfg10.dll
C:\Program Files\ORiNOCO\WirelessClient\Utility\ssleay32.dll
C:\Program Files\Outlook Express\msimn.exe
C:\Program Files\Outlook Express\msoe.dll
C:\Program Files\Outlook Express\msoeres.dll
C:\Program Files\Outlook Express\oeimport.dll
C:\Program Files\Outlook Express\oemig50.exe
C:\Program Files\Outlook Express\oemiglib.dll
C:\Program Files\Outlook Express\setup50.exe
C:\Program Files\Outlook Express\wab.exe
C:\Program Files\Outlook Express\wabfind.dll
C:\Program Files\Outlook Express\wabimp.dll
C:\Program Files\Outlook Express\wabmig.exe
C:\Program Files\OverDisk\OverDisk.exe
C:\Program Files\Palo Alto Software\Business Plan Pro 2004\bppenu\import\KeyFile.exe
C:\Program Files\Palo Alto Software\Business Plan Pro 2004\bppenu\Launcher.exe
C:\Program Files\Palo Alto Software\Business Plan Pro 2004\bppenu\resources\KeyFile.exe
C:\Program Files\Palo Alto Software\Business Plan Pro 2004\bppenu\resources\VCD.exe
C:\Program Files\QuickTime\PictureViewer.exe
C:\Program Files\QuickTime\Plugins\npqtplugin.dll
C:\Program Files\QuickTime\Plugins\npqtplugin2.dll
C:\Program Files\QuickTime\Plugins\npqtplugin3.dll
C:\Program Files\QuickTime\Plugins\npqtplugin4.dll
C:\Program Files\QuickTime\Plugins\npqtplugin5.dll
C:\Program Files\QuickTime\Plugins\npqtplugin6.dll
C:\Program Files\QuickTime\Plugins\npqtplugin7.dll
C:\Program Files\QuickTime\QTInfo.exe
C:\Program Files\QuickTime\qttask.exe
C:\Program Files\QuickTime\QuickTimePlayer.exe
C:\Program Files\QuickTime\QuickTimeUpdater.exe
C:\Program Files\RDTestDrive\fscommand\flamsetup.exe
C:\Program Files\RDTestDrive\fscommand\setup.exe
C:\Program Files\ReadPlease\ReadWordsLite\RWProDemo.exe
C:\Program Files\ReadPlease\ReadWordsLite\SAPI51\InstMsiA.exe
C:\Program Files\ReadPlease\ReadWordsLite\SAPI51\InstMsiW.exe
C:\Program Files\ReadPlease\ReadWordsLite\SAPI51\setup.exe
C:\Program Files\Real\RealPlayer\pnmi3260.dll
C:\Program Files\Real\RealPlayer\pset3260.dll
C:\Program Files\Real\RealPlayer\realplay.exe
C:\Program Files\Real\RealPlayer\rnms3260.dll
C:\Program Files\Real\RealPlayer\rpap3260.dll
C:\Program Files\Real\RealPlayer\rpbasic.dll
C:\Program Files\Real\RealPlayer\rpde3260.dll
C:\Program Files\Real\RealPlayer\rprp3260.dll
C:\Program Files\Real\RealPlayer\rpshellsearch.dll
C:\Program Files\Real\RealPlayer\rpun3260.dll
C:\Program Files\Real\RealPlayer\Setup\.g2cln.exe
C:\Program Files\Real\RealPlayer\Setup\setup.exe
C:\Program Files\Real\RealPlayer\twebbrowse.dll
C:\Program Files\Schematic\hgraph01.dll
C:\Program Files\Schematic\Schematic.exe
C:\Program Files\Sekhol Technologies\Auto Web Browser 1.2\sfinder.exe
C:\Program Files\Sekhol Technologies\Sekhol Finder 2.1\check.exe
C:\Program Files\Sekhol Technologies\Sekhol Finder 2.1\gdiplus.dll
C:\Program Files\Sekhol Technologies\Sekhol Finder 2.1\sfinder.exe
C:\Program Files\SmartFTP\Controls.dll
C:\Program Files\SmartFTP\CrashRpt.dll
C:\Program Files\SmartFTP\dbghelp.dll
C:\Program Files\SmartFTP\FTPAPI.dll TABLE IV-continued Windows Essential System Files C:\Program Files\SmartFTP\Language.dll
C:\Program Files\SmartFTP\ResEng.dll
C:\Program Files\SmartFTP\SmartFTP.exe
C:\Program Files\SmartFTP\SmartHook.dll
C:\Program Files\SmartFTP\update.exe
C:\Program Files\Sonic\DLA\dlaunin.exe
C:\Program Files\Sonic\RecordNow!\gdiplus.dll
C:\Program Files\Sonic\RecordNow!\Launch.exe
C:\Program Files\Sonic\RecordNow!\LeaderReg.EXE
C:\Program Files\Sonic\RecordNow!\mainrENU.dll
C:\Program Files\Sonic\RecordNow!\msvcp70.dll
C:\Program Files\Sonic\RecordNow!\msvcr70.dll
C:\Program Files\Sonic\RecordNow!\RecordNow.exe
C:\Program Files\Sonic\RecordNow!\shlext.dll
C:\Program Files\Sonic\RecordNow!\Unicows.dll
C:\Program Files\sterm\Driver\WinPcap_3_1_beta.exe
C:\Program Files\sterm\sterm.exe
C:\Program Files\SuperScan\scanner.exe
C:\Program Files\SuperScan\ws2check.exe
C:\Program Files\SupervisionCam\HttpRoot\SupervisionView.exe
C:\Program Files\SupervisionCam\SupervisionCam.exe
C:\Program Files\SupervisionCam\sutil.dll
C:\Program Files\Synaptics\SynTP\InstNT.exe
C:\Program Files\Synaptics\SynTP\Media\INSTNT.EXE
C:\Program Files\Synaptics\SynTP\Media\SETUP.EXE
C:\Program Files\Synaptics\SynTP\Media\SYNCOM.DLL
C:\Program Files\Synaptics\SynTP\Media\SYNCTRL.DLL
C:\Program Files\Synaptics\SynTP\Media\SYNISDLL.DLL
C:\Program Files\Synaptics\SynTP\Media\SYNMOOD.EXE
C:\Program Files\Synaptics\SynTP\Media\SYNTP.SYS
C:\Program Files\Synaptics\SynTP\Media\SYNTPAPI.DLL
C:\Program Files\Synaptics\SynTP\Media\SYNTPCOI.DLL
C:\Program Files\Synaptics\SynTP\Media\SYNTPCOM.DLL
C:\Program Files\Synaptics\SynTP\Media\SYNTPCPL.DLL
C:\Program Files\Synaptics\SynTP\Media\SYNTPENH.EXE
C:\Program Files\Synaptics\SynTP\Media\SYNTPFCS.DLL
C:\Program Files\Synaptics\SynTP\Media\SYNTPLPR.EXE
C:\Program Files\Synaptics\SynTP\Media\SYNZMETR.EXE
C:\Program Files\Synaptics\SynTP\Media\TUTORIAL.EXE
C:\Program Files\Synaptics\SynTP\SynISDLL.dll
C:\Program Files\Synaptics\SynTP\SynMood.exe
C:\Program Files\Synaptics\SynTP\SynTPCOM.dll
C:\Program Files\Synaptics\SynTP\SynTPCpl.dll
C:\Program Files\Synaptics\SynTP\SynTPEnh.exe
C:\Program Files\Synaptics\SynTP\SynTPLpr.exe
C:\Program Files\Synaptics\SynTP\SynZMetr.exe
C:\Program Files\Synaptics\SynTP\Tutorial.exe
C:\Program Files\Syslogd\Syslogd_Manager.exe
C:\Program Files\Syslogd\Syslogd_Service.exe
C:\Program Files\TextAloud\AppCloserProject.exe
C:\Program Files\TextAloud\KEYPUSH.DLL
C:\Program Files\TextAloud\lame_enc.dll
C:\Program Files\TextAloud\pdftotext.exe
C:\Program Files\TextAloud\TAForIE.dll
C:\Program Files\TextAloud\TextAloudMP3.exe
C:\Program Files\Texthelp Systems\PDFaloud\lhttseng.exe
C:\Program Files\Texthelp Systems\PDFaloud\spchcpl.exe
C:\Program Files\TFTP Client\tftpc.exe
C:\Program Files\TFTP Desktop\tftpc.exe
C:\Program Files\TFTP Desktop\tftpdesk.dll
C:\Program Files\TFTP Desktop\tftpdesk.exe
C:\Program Files\TFTP Desktop\tftps.dll
C:\Program Files\TFTP Turbo\tftpc.exe
C:\Program Files\TFTP Turbo\tftpt.exe
C:\Program Files\TFTP Turbo\tftpti.exe
C:\Program Files\TFTP Turbo\tftptmsg.dll
C:\Program Files\TFTP Turbo\tftptui.exe
C:\Program Files\The Playa\ThePlaya.exe
C:\Program Files\UltraEdit\htmltidy.dll
C:\Program Files\UltraEdit\SftpDLL.dll
C:\Program Files\UltraEdit\SSCE4332.DLL
C:\Program Files\UltraEdit\ucl.exe
C:\Program Files\UltraEdit\ucres.dll
C:\Program Files\UltraEdit\ue32ctmn.dll
C:\Program Files\UltraEdit\uedit32.exe
C:\Program Files\UltraEdit\UEDOS32.exe
C:\Program Files\UltraEdit\ueres.dll
C:\Program Files\videofixer\videofixer.exe TABLE IV-continued Windows Essential System Files C:\Program Files\Winamp\Plugins\CDDBControlWinamp.dll
C:\Program Files\Winamp\Plugins\CDDBUIWinamp.dll
C:\Program Files\Winamp\Plugins\dsp_sps.dll
C:\Program Files\Winamp\Plugins\enc_aac.dll
C:\Program Files\Winamp\Plugins\enc_lame.dll
C:\Program Files\Winamp\Plugins\enc_mp4.dll
C:\Program Files\Winamp\Plugins\gen_ff.dll
C:\Program Files\Winamp\Plugins\gen_hotkeys.dll
C:\Program Files\Winamp\Plugins\gen_jumpex.dll
C:\Program Files\Winamp\Plugins\gen_ml.dll
C:\Program Files\Winamp\Plugins\gen_tray.dll
C:\Program Files\Winamp\Plugins\in_cdda.dll
C:\Program Files\Winamp\Plugins\in_dshow.dll
C:\Program Files\Winamp\Plugins\in_midi.dll
C:\Program Files\Winamp\Plugins\in_mod.dll
C:\Program Files\Winamp\Plugins\in_mp3.dll
C:\Program Files\Winamp\Plugins\in_mp4.dll
C:\Program Files\Winamp\Plugins\in_nsv.dll
C:\Program Files\Winamp\Plugins\in_vorbis.dll
C:\Program Files\Winamp\Plugins\in_wave.dll
C:\Program Files\Winamp\Plugins\in_wm.dll
C:\Program Files\Winamp\Plugins\lame_enc.dll
C:\Program Files\Winamp\Plugins\libmp4v2.dll
C:\Program Files\Winamp\Plugins\nsvdec_vp5.dll
C:\Program Files\Winamp\Plugins\nsvdec_vp6.dll
C:\Program Files\Winamp\Plugins\out_disk.dll
C:\Program Files\Winamp\Plugins\out_ds.dll
C:\Program Files\Winamp\Plugins\out_wave.dll
C:\Program Files\Winamp\Plugins\read_file.dll
C:\Program Files\Winamp\Plugins\vis_ays.dll
C:\Program Files\Winamp\Plugins\vis_milk.dll
C:\Program Files\Winamp\Plugins\vis_nsfs.dll
C:\Program Files\Winamp\Plugins\vms_desktop.dll
C:\Program Files\Winamp\Plugins\wmahelp.dll
C:\Program Files\Winamp\PXSDKPLS.dll
C:\Program Files\Winamp\winamp.exe
C:\Program Files\Winamp\winampa.exe
C:\Program Files\Windows Media Components\Encoder\_instENC.exe
C:\Program Files\Windows Media Components\Encoder\_unrmENC.exe
C:\Program Files\Windows Media Components\Encoder\Lang\WMEncENU.dll
C:\Program Files\Windows Media Components\Encoder\Lang\WMEXENU.dll
C:\Program Files\Windows Media Components\Encoder\MSPShell.dll
C:\Program Files\Windows Media Components\Encoder\redist\WMEDist.exe
C:\Program Files\Windows Media Components\Encoder\WMEnc.exe
C:\Program Files\Windows Media Components\Encoder\wmencagt.exe
C:\Program Files\Windows Media Components\Encoder\WMEncEng.dll
C:\Program Files\Windows Media Components\Encoder\wmencloc.dll
C:\Program Files\Windows Media Components\Encoder\wmeosppg.dll
C:\Program Files\Windows Media Components\Encoder\wmesrcwp.dll
C:\Program Files\Windows Media Components\Encoder\WMEX.dll
C:\Program Files\Windows Media Components\Encoder\wmmv.exe
C:\Program Files\Windows Media Components\Encoder\wmprevu.dll
C:\Program Files\Windows Media Player\custsat.dll
C:\Program Files\Windows Media Player\dlimport.exe
C:\Program Files\Windows Media Player\migrate.exe
C:\Program Files\Windows Media Player\mplayer2.exe
C:\Program Files\Windows Media Player\mpvis.dll
C:\Program Files\Windows Media Player\npdrmv2.dll
C:\Program Files\Windows Media Player\npdsplay.dll
C:\Program Files\Windows Media Player\npwmsdrm.dll
C:\Program Files\Windows Media Player\setup_wm.exe
C:\Program Files\Windows Media Player\wmpband.dll
C:\Program Files\Windows Media Player\wmplayer.exe
C:\Program Files\Windows Media Player\wmpns.dll
C:\Program Files\Windows Media Player\WMPVIS.DLL
C:\Program Files\Windows NT\Accessories\wordpad.exe
C:\Program Files\Windows NT\dialer.exe
C:\Program Files\Windows NT\HTRN_JIS.DLL
C:\Program Files\Windows NT\HYPERTRM.EXE
C:\Program Files\Windows NT\Pinball\pinball.exe
C:\Program Files\WinPcap\daemon_mgm.exe
C:\Program Files\WinPcap\npf_mgm.exe
C:\Program Files\WinPcap\rpcapd.exe
C:\Program Files\WinRAR\Formats\UNACEV2.DLL
C:\Program Files\WinRAR\Rar.exe
C:\Program Files\WinRAR\RarExt.dll
C:\Program Files\WinRAR\UnRAR.exe
C:\Program Files\WinRAR\WinRAR.exe

TABLE IV-continued

Windows Essential System Files

C:\Program Files\WordPerfect Office 11\Filters\IECDRintl110.dll
C:\Program Files\WordPerfect Office 11\Filters\IECMXintl110.dll
C:\Program Files\WordPerfect Office 11\Filters\IEEPSintl110.dll
C:\Program Files\WordPerfect Office 11\Filters\IEPSintl110.dll
C:\Program Files\WordPerfect Office 11\Filters\IESVGintl110.dll
C:\Program Files\WordPerfect Office 11\Filters\IEVCTintl110.dll
C:\Program Files\WordPerfect Office 11\Filters\IEWMFintl110.dll
C:\Program Files\WordPerfect Office 11\Filters\IEWPGintl110.dll
C:\Program Files\WordPerfect Office 11\Filters\isgdi32.dll
C:\Program Files\WordPerfect Office 11\Fontnav\dunzip32.dll
C:\Program Files\WordPerfect Office 11\Programs\51Keyboard.dll
C:\Program Files\WordPerfect Office 11\Programs\ABFrame.dll
C:\Program Files\WordPerfect Office 11\Programs\ABFXData.dll
C:\Program Files\WordPerfect Office 11\Programs\abiewabx.dll
C:\Program Files\WordPerfect Office 11\Programs\ABIEWccab.dll
C:\Program Files\WordPerfect Office 11\Programs\ABIEWcsv.dll
C:\Program Files\WordPerfect Office 11\Programs\ABIEWol.dll
C:\Program Files\WordPerfect Office 11\Programs\ABLDData.dll
C:\Program Files\WordPerfect Office 11\Programs\ABMPData.dll
C:\Program Files\WordPerfect Office 11\Programs\ABSetup.dll
C:\Program Files\WordPerfect Office 11\Programs\ABWrapper.dll
C:\Program Files\WordPerfect Office 11\Programs\AddrBkUI.dll
C:\Program Files\WordPerfect Office 11\Programs\Amzi4.dll
C:\Program Files\WordPerfect Office 11\Programs\axcntrls.dll
C:\Program Files\WordPerfect Office 11\Programs\BasicTabledData.dll
C:\Program Files\WordPerfect Office 11\Programs\brsweben.dll
C:\Program Files\WordPerfect Office 11\Programs\brwswben.dll
C:\Program Files\WordPerfect Office 11\Programs\CARMOrganizer.exe
C:\Program Files\WordPerfect Office 11\Programs\cbde.dll
C:\Program Files\WordPerfect Office 11\Programs\cbdeen.dll
C:\Program Files\WordPerfect Office 11\Programs\CChAlphaBmp.dll
C:\Program Files\WordPerfect Office 11\Programs\ccharten.dll
C:\Program Files\WordPerfect Office 11\Programs\CChDropDown.dll
C:\Program Files\WordPerfect Office 11\Programs\CChImgTxtBtn.dll
C:\Program Files\WordPerfect Office 11\Programs\CChLblCtrl.dll
C:\Program Files\WordPerfect Office 11\Programs\CChLblEng.dll
C:\Program Files\WordPerfect Office 11\Programs\CChOptBtnCmb.dll
C:\Program Files\WordPerfect Office 11\Programs\CChTxtClkCtrl.dll
C:\Program Files\WordPerfect Office 11\Programs\cclp.dll
C:\Program Files\WordPerfect Office 11\Programs\cdb.dll
C:\Program Files\WordPerfect Office 11\Programs\cdben.dll
C:\Program Files\WordPerfect Office 11\Programs\CDRAUTOSENSE110.dll
C:\Program Files\WordPerfect Office 11\Programs\CdrConv.exe
C:\Program Files\WordPerfect Office 11\Programs\CdrCore110.dll
C:\Program Files\WordPerfect Office 11\Programs\CdrCpr110.dll
C:\Program Files\WordPerfect Office 11\Programs\CDRCRV110.dll
C:\Program Files\WordPerfect Office 11\Programs\CDRFLT110.dll
C:\Program Files\WordPerfect Office 11\Programs\CdrFnt110.dll
C:\Program Files\WordPerfect Office 11\Programs\CDRFNTINTL110.dll
C:\Program Files\WordPerfect Office 11\Programs\CdrHlp110.dll
C:\Program Files\WordPerfect Office 11\Programs\CdrIntl.dll
C:\Program Files\WordPerfect Office 11\Programs\CdrPDF110.dll
C:\Program Files\WordPerfect Office 11\Programs\CdrPDFCmp110.dll
C:\Program Files\WordPerfect Office 11\Programs\CDRPDFINTL110.dll
C:\Program Files\WordPerfect Office 11\Programs\CdrPDFUI110.dll
C:\Program Files\WordPerfect Office 11\Programs\CdrPrn110.dll
C:\Program Files\WordPerfect Office 11\Programs\CDRPRNINTL110.dll
C:\Program Files\WordPerfect Office 11\Programs\CdrPsi110.dll
C:\Program Files\WordPerfect Office 11\Programs\cdrrip110.dll
C:\Program Files\WordPerfect Office 11\Programs\CdrSty110.dll
C:\Program Files\WordPerfect Office 11\Programs\CdrTra110.dll
C:\Program Files\WordPerfect Office 11\Programs\CdrTxr110.dll
C:\Program Files\WordPerfect Office 11\Programs\CdrTxt110.dll
C:\Program Files\WordPerfect Office 11\Programs\CDRTXTINTL110.dll
C:\Program Files\WordPerfect Office 11\Programs\CdrTxtUI110.dll
C:\Program Files\WordPerfect Office 11\Programs\cfox.dll
C:\Program Files\WordPerfect Office 11\Programs\ChartEng.dll
C:\Program Files\WordPerfect Office 11\Programs\ChartSDK.dll
C:\Program Files\WordPerfect Office 11\Programs\ChartUI.dll
C:\Program Files\WordPerfect Office 11\Programs\ChartUIen.dll
C:\Program Files\WordPerfect Office 11\Programs\ChartUItdg.dll
C:\Program Files\WordPerfect Office 11\Programs\ChartUItdgEN.dll
C:\Program Files\WordPerfect Office 11\Programs\ciwin110.dll
C:\Program Files\WordPerfect Office 11\Programs\ciwin90.dll
C:\Program Files\WordPerfect Office 11\Programs\Clipbook.exe
C:\Program Files\WordPerfect Office 11\Programs\CmMAPI32.dll
C:\Program Files\WordPerfect Office 11\Programs\cmrg.dll
C:\Program Files\WordPerfect Office 11\Programs\cmrgen.dll

TABLE IV-continued

Windows Essential System Files

C:\Program Files\WordPerfect Office 11\Programs\codb.dll
C:\Program Files\WordPerfect Office 11\Programs\codben.dll
C:\Program Files\WordPerfect Office 11\Programs\Convert\AmiProExport110.DLL
C:\Program Files\WordPerfect Office 11\Programs\Convert\AmiProImport110.DLL
C:\Program Files\WordPerfect Office 11\Programs\Convert\AsciiExport110.DLL
C:\Program Files\WordPerfect Office 11\Programs\Convert\AsciiImport110.DLL
C:\Program Files\WordPerfect Office 11\Programs\Convert\DisplayWriteExport110.DLL
C:\Program Files\WordPerfect Office 11\Programs\Convert\DisplayWriteImport110.DLL
C:\Program Files\WordPerfect Office 11\Programs\Convert\EdgarExport110.DLL
C:\Program Files\WordPerfect Office 11\Programs\Convert\EPXML.DLL
C:\Program Files\WordPerfect Office 11\Programs\Convert\ExcelExport110.DLL
C:\Program Files\WordPerfect Office 11\Programs\Convert\ExcelImport110.DLL
C:\Program Files\WordPerfect Office 11\Programs\Convert\GraphicsExport110.DLL
C:\Program Files\WordPerfect Office 11\Programs\Convert\GraphicsImport110.DLL
C:\Program Files\WordPerfect Office 11\Programs\Convert\imstype.DLL
C:\Program Files\WordPerfect Office 11\Programs\Convert\isgdi32.dll
C:\Program Files\WordPerfect Office 11\Programs\Convert\KermitExport110.DLL
C:\Program Files\WordPerfect Office 11\Programs\Convert\KermitImport110.DLL
C:\Program Files\WordPerfect Office 11\Programs\Convert\Lotus123Export110.DLL
C:\Program Files\WordPerfect Office 11\Programs\Convert\Lotus123Import110.DLL
C:\Program Files\WordPerfect Office 11\Programs\Convert\MultiMateExport110.DLL
C:\Program Files\WordPerfect Office 11\Programs\Convert\MultiMateImport110.DLL
C:\Program Files\WordPerfect Office 11\Programs\Convert\NavyDIFExport110.DLL
C:\Program Files\WordPerfect Office 11\Programs\Convert\NavyDIFImport110.DLL
C:\Program Files\WordPerfect Office 11\Programs\Convert\OfficeWriterExport110.DLL
C:\Program Files\WordPerfect Office 11\Programs\Convert\OfficeWriterImport110.DLL
C:\Program Files\WordPerfect Office 11\Programs\Convert\PlanPerfectImport110.DLL
C:\Program Files\WordPerfect Office 11\Programs\Convert\PresentationsExport110.DLL
C:\Program Files\WordPerfect Office 11\Programs\Convert\ProfessionalWriteExport110.DLL
C:\Program Files\WordPerfect Office 11\Programs\Convert\ProfessionalWriteImport110.DLL
C:\Program Files\WordPerfect Office 11\Programs\Convert\QuattroPro9Import110.DLL
C:\Program Files\WordPerfect Office 11\Programs\Convert\QuattroProDosImport110.DLL
C:\Program Files\WordPerfect Office 11\Programs\Convert\QuattroProExport110.DLL
C:\Program Files\WordPerfect Office 11\Programs\Convert\QuattroProImport110.DLL
C:\Program Files\WordPerfect Office 11\Programs\Convert\RTFExport110.DLL
C:\Program Files\WordPerfect Office 11\Programs\Convert\RTFImport110.DLL
C:\Program Files\WordPerfect Office 11\Programs\Convert\SpreadsheetDIFExport110.DLL
C:\Program Files\WordPerfect Office 11\Programs\Convert\SpreadsheetDIFImport110.DLL
C:\Program Files\WordPerfect Office 11\Programs\Convert\UnicodeExport110.DLL
C:\Program Files\WordPerfect Office 11\Programs\Convert\UnicodeImport110.DLL
C:\Program Files\WordPerfect Office 11\Programs\Convert\VolksWriterExport110.DLL
C:\Program Files\WordPerfect Office

TABLE IV-continued

Windows Essential System Files

11\Programs\Convert\VolksWriterImport110.DLL
C:\Program Files\WordPerfect Office
11\Programs\Convert\Word1Export110.DLL
C:\Program Files\WordPerfect Office
11\Programs\Convert\Word1Import110.DLL
C:\Program Files\WordPerfect Office
11\Programs\Convert\Word2Export110.DLL
C:\Program Files\WordPerfect Office
11\Programs\Convert\Word2Import110.DLL
C:\Program Files\WordPerfect Office
11\Programs\Convert\Word6FarEastImport110.DLL
C:\Program Files\WordPerfect Office
11\Programs\Convert\Word95Import110.DLL
C:\Program Files\WordPerfect Office
11\Programs\Convert\Word97Export110.dll
C:\Program Files\WordPerfect Office
11\Programs\Convert\Word97Import110.DLL
C:\Program Files\WordPerfect Office
11\Programs\Convert\WordDosExport110.DLL
C:\Program Files\WordPerfect Office
11\Programs\Convert\WordDosImport110.DLL
C:\Program Files\WordPerfect Office
11\Programs\Convert\WordPerfect2Import110.DLL
C:\Program Files\WordPerfect Office
11\Programs\Convert\WordPerfect3Import110.DLL
C:\Program Files\WordPerfect Office
11\Programs\Convert\WordPerfect4Export110.DLL
C:\Program Files\WordPerfect Office
11\Programs\Convert\WordPerfect4Import110.DLL
C:\Program Files\WordPerfect Office
11\Programs\Convert\WordPerfect5Export110.DLL
C:\Program Files\WordPerfect Office
11\Programs\Convert\WordPerfect5Import110.DLL
C:\Program Files\WordPerfect Office
11\Programs\Convert\WordPerfect5TextExport110.DLL
C:\Program Files\WordPerfect Office
11\Programs\Convert\WordPerfect6Export110.DLL
C:\Program Files\WordPerfect Office
11\Programs\Convert\WordPerfect6Import110.DLL
C:\Program Files\WordPerfect Office
11\Programs\Convert\WordPerfect6TextExport110.DLL
C:\Program Files\WordPerfect Office
11\Programs\Convert\WordPerfect6TextImport110.DLL
C:\Program Files\WordPerfect Office
11\Programs\Convert\WordStar2000Export110.DLL
C:\Program Files\WordPerfect Office
11\Programs\Convert\WordStar2000Import110.DLL
C:\Program Files\WordPerfect Office
11\Programs\Convert\WordStarVintageExport110.DLL
C:\Program Files\WordPerfect Office
11\Programs\Convert\WordStarVintageImport110.DLL
C:\Program Files\WordPerfect Office
11\Programs\Convert\WorksImport110.DLL
C:\Program Files\WordPerfect Office
11\Programs\Convert\WorksPaintImport110.DLL
C:\Program Files\WordPerfect Office
11\Programs\Convert\WPG1ChartingDataExport110.DLL
C:\Program Files\WordPerfect Office
11\Programs\Convert\WPG1ChartingDataImport110.DLL
C:\Program Files\WordPerfect Office
11\Programs\Convert\WPG1ChartingStyleExport110.DLL
C:\Program Files\WordPerfect Office
11\Programs\Convert\WPG1ChartingStyleImport110.DLL
C:\Program Files\WordPerfect Office
11\Programs\Convert\WPG1Export110.DLL
C:\Program Files\WordPerfect Office
11\Programs\Convert\WPG1Import110.DLL
C:\Program Files\WordPerfect Office
11\Programs\Convert\WPG2ChartingDataExport110.DLL
C:\Program Files\WordPerfect Office
11\Programs\Convert\WPG2ChartingDataImport110.DLL
C:\Program Files\WordPerfect Office
11\Programs\Convert\WPG2ChartingStyleExport110.DLL
C:\Program Files\WordPerfect Office
11\Programs\Convert\WPG2ChartingStyleImport110.DLL
C:\Program Files\WordPerfect Office
11\Programs\Convert\WPG2Export110.DLL
C:\Program Files\WordPerfect Office TABLE IV-continued Windows Essential System Files 11\Programs\Convert\WPG2Import110.DLL
C:\Program Files\WordPerfect Office 11\Programs\Convert\WPG2WMF.dll
C:\Program Files\WordPerfect Office 11\Programs\Convert\WriteImport110.DLL
C:\Program Files\WordPerfect Office 11\Programs\Convert\XMLExport110.DLL
C:\Program Files\WordPerfect Office 11\Programs\Convert\XyWriteExport110.DLL
C:\Program Files\WordPerfect Office 11\Programs\Convert\XyWriteImport110.DLL
C:\Program Files\WordPerfect Office 11\Programs\CorUpd.exe
C:\Program Files\WordPerfect Office 11\Programs\CorUpdIntl.dll
C:\Program Files\WordPerfect Office 11\Programs\CrlChartText.dll
C:\Program Files\WordPerfect Office 11\Programs\CRLCLR110.dll
C:\Program Files\WordPerfect Office 11\Programs\CRLCLRINTL110.dll
C:\Program Files\WordPerfect Office 11\Programs\CRLCMNRES110.dll
C:\Program Files\WordPerfect Office 11\Programs\CRLCTL110.dll
C:\Program Files\WordPerfect Office 11\Programs\CRLCTL90.dll
C:\Program Files\WordPerfect Office 11\Programs\CRLCTLINTL110.dll
C:\Program Files\WordPerfect Office 11\Programs\CRLCUI110.dll
C:\Program Files\WordPerfect Office 11\Programs\CrlCUIintl110.dll
C:\Program Files\WordPerfect Office 11\Programs\CRLFOM110.dll
C:\Program Files\WordPerfect Office 11\Programs\CRLFOMUI110.dll
C:\Program Files\WordPerfect Office 11\Programs\CRLFRMWK110.dll
C:\Program Files\WordPerfect Office 11\Programs\CRLFRMWKINTL110.dll
C:\Program Files\WordPerfect Office 11\Programs\CrlFUI110.dll
C:\Program Files\WordPerfect Office 11\Programs\CRLI18N110.dll
C:\Program Files\WordPerfect Office 11\Programs\CrlInet.dll
C:\Program Files\WordPerfect Office 11\Programs\CrlIUI110.dll
C:\Program Files\WordPerfect Office 11\Programs\CRLLSHAPE110.dll
C:\Program Files\WordPerfect Office 11\Programs\CRLPE110.dll
C:\Program Files\WordPerfect Office 11\Programs\CRLPEFRMWK110.dll
C:\Program Files\WordPerfect Office 11\Programs\CrlPPD110.dll
C:\Program Files\WordPerfect Office 11\Programs\CrlRcvy110.dll
C:\Program Files\WordPerfect Office 11\Programs\CRLRCVYINTL110.dll
C:\Program Files\WordPerfect Office 11\Programs\CRLUI110.dll
C:\Program Files\WordPerfect Office 11\Programs\CRLUTL110.dll
C:\Program Files\WordPerfect Office 11\Programs\CRLUTLINTL110.dll
C:\Program Files\WordPerfect Office 11\Programs\CrlWeb110.dll
C:\Program Files\WordPerfect Office 11\Programs\CrusherC.dll
C:\Program Files\WordPerfect Office 11\Programs\CrusherS.dll
C:\Program Files\WordPerfect Office 11\Programs\csp32d.dll
C:\Program Files\WordPerfect Office 11\Programs\csr32d.dll
C:\Program Files\WordPerfect Office 11\Programs\Ctlgllen.dll
C:\Program Files\WordPerfect Office 11\Programs\cui.dll
C:\Program Files\WordPerfect Office 11\Programs\CvtOptions110.DLL
C:\Program Files\WordPerfect Office 11\Programs\cxben.dll
C:\Program Files\WordPerfect Office 11\Programs\d2lwin11.exe
C:\Program Files\WordPerfect Office 11\Programs\dart.dll
C:\Program Files\WordPerfect Office 11\Programs\dbghelp.dll
C:\Program Files\WordPerfect Office 11\Programs\DrwBaseToolCore110.dll
C:\Program Files\WordPerfect Office 11\Programs\DrwBezierFreeHandToolCore110.dll
C:\Program Files\WordPerfect Office 11\Programs\DrwBlendTool110.dll
C:\Program Files\WordPerfect Office 11\Programs\DrwBlendToolCore110.dll
C:\Program Files\WordPerfect Office 11\Programs\DrwPickToolCore110.dll
C:\Program Files\WordPerfect Office 11\Programs\DrwZoomPanToolCore110.dll
C:\Program Files\WordPerfect Office 11\Programs\DTD11en.dll
C:\Program Files\WordPerfect Office 11\Programs\Fn3API.dll
C:\Program Files\WordPerfect Office 11\Programs\FUIIntl.dll
C:\Program Files\WordPerfect Office 11\Programs\FXAB32.DLL
C:\Program Files\WordPerfect Office 11\Programs\Fxdb.dll
C:\Program Files\WordPerfect Office 11\Programs\gfi32us.dll
C:\Program Files\WordPerfect Office 11\Programs\Gi110.dll
C:\Program Files\WordPerfect Office 11\Programs\GLCOM97.exe
C:\Program Files\WordPerfect Office 11\Programs\glu.dll
C:\Program Files\WordPerfect Office 11\Programs\Hook.dll
C:\Program Files\WordPerfect Office 11\Programs\htmlwp11.dll
C:\Program Files\WordPerfect Office 11\Programs\IAYG11EN.dll
C:\Program Files\WordPerfect Office 11\Programs\iewizard.dll
C:\Program Files\WordPerfect Office 11\Programs\IntrntEN.dll
C:\Program Files\WordPerfect Office 11\Programs\IUIIntl.dll
C:\Program Files\WordPerfect Office 11\Programs\Js32.dll
C:\Program Files\WordPerfect Office 11\Programs\kodakcms.dll TABLE IV-continued Windows Essential System Files C:\Program Files\WordPerfect Office 11\Programs\kpcp32.dll
C:\Program Files\WordPerfect Office 11\Programs\kpsys32.dll
C:\Program Files\WordPerfect Office 11\Programs\Ldap32.dll
C:\Program Files\WordPerfect Office 11\Programs\LOPS.dll
C:\Program Files\WordPerfect Office 11\Programs\opengl.dll
C:\Program Files\WordPerfect Office 11\Programs\optmiz.dll
C:\Program Files\WordPerfect Office 11\Programs\PCDLIB32.DLL
C:\Program Files\WordPerfect Office 11\Programs\PDFPublish110.dll
C:\Program Files\WordPerfect Office 11\Programs\PDFPublish110EN.dll
C:\Program Files\WordPerfect Office 11\Programs\PFDT110EN.DLL
C:\Program Files\WordPerfect Office 11\Programs\PFICON110.DLL
C:\Program Files\WordPerfect Office 11\Programs\PFIT110.DLL
C:\Program Files\WordPerfect Office 11\Programs\PFIT110EN.DLL
C:\Program Files\WordPerfect Office 11\Programs\PFMAIL110.DLL
C:\Program Files\WordPerfect Office 11\Programs\PFPI110EN.DLL
C:\Program Files\WordPerfect Office 11\Programs\PFSE110.DLL
C:\Program Files\WordPerfect Office 11\Programs\PR_WP.DLL
C:\Program Files\WordPerfect Office 11\Programs\PrintEngine110.dll
C:\Program Files\WordPerfect Office 11\Programs\PrintEngine110EN.dll
C:\Program Files\WordPerfect Office 11\Programs\PrintServer110.exe
C:\Program Files\WordPerfect Office 11\Programs\PrintServer110EN.dll
C:\Program Files\WordPerfect Office 11\Programs\PRLMEN.dll
C:\Program Files\WordPerfect Office 11\Programs\Prwin11.exe
C:\Program Files\WordPerfect Office 11\Programs\ps110.dll
C:\Program Files\WordPerfect Office 11\Programs\ps110.exe
C:\Program Files\WordPerfect Office 11\Programs\qad2wpg.dll
C:\Program Files\WordPerfect Office 11\Programs\QBool.dll
C:\Program Files\WordPerfect Office 11\Programs\QCHART.dll
C:\Program Files\WordPerfect Office 11\Programs\QEng.dll
C:\Program Files\WordPerfect Office ll\Programs\QFinance.dll
C:\Program Files\WordPerfect Office 11\Programs\qform.dll
C:\Program Files\WordPerfect Office 11\Programs\QFunc1.dll
C:\Program Files\WordPerfect Office 11\Programs\qpadden.dll
C:\Program Files\WordPerfect Office 11\Programs\QPRCEN.dll
C:\Program Files\WordPerfect Office 11\Programs\QPSTRCMT.dll
C:\Program Files\WordPerfect Office 11\Programs\QPSTREN.DLL
C:\Program Files\WordPerfect Office 11\Programs\QPSTRNAM.dll
C:\Program Files\WordPerfect Office 11\Programs\QPSTRU2.dll
C:\Program Files\WordPerfect Office 11\Programs\QPUTL110.dll
C:\Program Files\WordPerfect Office 11\Programs\QPW.exe
C:\Program Files\WordPerfect Office 11\Programs\qpw110.dll
C:\Program Files\WordPerfect Office 11\Programs\QPWCall.dll
C:\Program Files\WordPerfect Office 11\Programs\QPWHost.dll
C:\Program Files\WordPerfect Office 11\Programs\QStat.dll
C:\Program Files\WordPerfect Office 11\Programs\Resero.dll
C:\Program Files\WordPerfect Office 11\Programs\rgqp110en.dll
C:\Program Files\WordPerfect Office 11\Programs\RtSetup.exe
C:\Program Files\WordPerfect Office 11\Programs\ScrpBk.dll
C:\Program Files\WordPerfect Office 11\Programs\ScrpBkEn.dll
C:\Program Files\WordPerfect Office 11\Programs\SelfExec.exe
C:\Program Files\WordPerfect Office 11\Programs\Show.exe
C:\Program Files\WordPerfect Office 11\Programs\sprof32.dll
C:\Program Files\WordPerfect Office 11\Programs\Suite11.dll
C:\Program Files\WordPerfect Office 11\Programs\Suite11EN.dll
C:\Program Files\WordPerfect Office 11\Programs\Suite11FrmWk.dll
C:\Program Files\WordPerfect Office 11\Programs\SWCustEN.dll
C:\Program Files\WordPerfect Office 11\Programs\swfexport.dll
C:\Program Files\WordPerfect Office 11\Programs\swi32.dll
C:\Program Files\WordPerfect Office 11\Programs\UA110.exe
C:\Program Files\WordPerfect Office 11\Programs\UAWin110.dll
C:\Program Files\WordPerfect Office 11\Programs\UAX110.dll
C:\Program Files\WordPerfect Office 11\Programs\URLIO110.dll
C:\Program Files\WordPerfect Office 11\Programs\Utilitys.dll
C:\Program Files\WordPerfect Office 11\Programs\Viewers\vwqp32.dll
C:\Program Files\WordPerfect Office 11\Programs\Viewers\vwqp9.dll
C:\Program Files\WordPerfect Office 11\Programs\Viewers\vwshw32.dll
C:\Program Files\WordPerfect Office 11\Programs\Viewers\vwwpd32.dll
C:\Program Files\WordPerfect Office 11\Programs\Viewers\vwwpg232.dll
C:\Program Files\WordPerfect Office 11\Programs\WABData.dll
C:\Program Files\WordPerfect Office 11\Programs\WebRes.dll
C:\Program Files\WordPerfect Office 11\Programs\WPFPCUDataEN.dll
C:\Program Files\WordPerfect Office 11\Programs\WPIntegration.dll
C:\Program Files\WordPerfect Office 11\Programs\Wpld11en.dll
C:\Program Files\WordPerfect Office 11\Programs\WPLDES11.dll
C:\Program Files\WordPerfect Office 11\Programs\WPLDES11.exe
C:\Program Files\WordPerfect Office 11\Programs\wpq11en.dll
C:\Program Files\WordPerfect Office 11\Programs\wpwin11.dll
C:\Program Files\WordPerfect Office 11\Programs\wpwin11.exe TABLE IV-continued Windows Essential System Files C:\Program Files\WordPerfect Office 11\Programs\wpwpen.dll
C:\Program Files\WordPerfect Office 11\Programs\WStr11.dll
C:\Program Files\WordPerfect Office 11\Programs\WStr11EN.dll
C:\Program Files\WordPerfect Office 11\Programs\wstr9.dll
C:\Program Files\WordPerfect Office 11\Programs\XWiz11en.dll
C:\Program Files\WordPerfect Office 11\Shared\Equation\eqnedt32.exe
C:\Program Files\WordPerfect Office 11\Shared\Textart\Textart.exe
C:\Program Files\WordPerfect Office 11\Shared\Textart\WPTA11US.dll
C:\WINDOWS\AppPatch\acgenral.dll
C:\WINDOWS\AppPatch\aclayers.dll
C:\WINDOWS\AppPatch\aclua.dll
C:\WINDOWS\AppPatch\acspecfc.dll
C:\WINDOWS\AppPatch\acxtrnal.dll
C:\WINDOWS\BCMSMD2K.exe
C:\WINDOWS\BCMSMMSG.exe
C:\WINDOWS\BCMSMU.exe
C:\WINDOWS\DASAct.dll
C:\WINDOWS\DASShp.dll
C:\WINDOWS\delttsul.exe
C:\WINDOWS\dla.exe
C:\WINDOWS\explorer.exe
C:\WINDOWS\extract.exe
C:\WINDOWS\Help\BNTS.DLL
C:\WINDOWS\Help\SBSI\Training\COMPLINC.DLL
C:\WINDOWS\Help\SBSI\Training\LEARN32.DLL
C:\WINDOWS\Help\SBSI\Training\ORUN32.EXE
C:\WINDOWS\Help\SBSI\Training\PCTREE32.DLL
C:\WINDOWS\Help\SBSI\Training\USERSID.EXE
C:\WINDOWS\Help\sniffpol.dll
C:\WINDOWS\Help\sstub.dll
C:\WINDOWS\Help\Tours\mmTour\TOUR.EXE
C:\WINDOWS\Help\tshoot.dll
C:\WINDOWS\hh.exe
C:\WINDOWS\IME\mscandui.dll
C:\WINDOWS\IME\softkbd.dll
C:\WINDOWS\IME\spgrmr.dll
C:\WINDOWS\IME\sptip.dll
C:\WINDOWS\INF\unregmp2.exe
C:\WINDOWS\iun506.exe
C:\WINDOWS\iun6002.exe
C:\WINDOWS\lhsp\Dialog\AExLxd60.dll
C:\WINDOWS\lhsp\Dialog\ENGgnd60.dll
C:\WINDOWS\lhsp\Dialog\ENGlxd60.dll
C:\WINDOWS\lhsp\Dialog\WexLxd60.dll
C:\WINDOWS\lhsp\G2P\ENGg2p60.dll
C:\WINDOWS\lhsp\Language\ENGCT160.dll
C:\WINDOWS\lhsp\System\LHSAPI30.DLL
C:\WINDOWS\lhsp\System\ttsdct32.dll
C:\WINDOWS\lhsp\System\ttsmgr32.dll
C:\WINDOWS\lhsp\TPP\ENGeml60.dll
C:\WINDOWS\lhsp\TPP\ENGtxt60.dll
C:\WINDOWS\lhsp\ttsENGwr.dll
C:\WINDOWS\lhsp\tv\tv_enua.dll
C:\WINDOWS\lhsp\tv\tvenuax.dll
C:\WINDOWS\lhsp\Voice\ENGvf160.dll
C:\WINDOWS\lhsp\Voice\ENGvm160.dll
C:\WINDOWS\MSAGENT\agentanm.dll
C:\WINDOWS\MSAGENT\agentctl.dll
C:\WINDOWS\MSAGENT\agentdp2.dll
C:\WINDOWS\MSAGENT\agentdpv.dll
C:\WINDOWS\MSAGENT\agentmpx.dll
C:\WINDOWS\MSAGENT\agentpsh.dll
C:\WINDOWS\MSAGENT\agentsr.dll
C:\WINDOWS\MSAGENT\agentsvr.exe
C:\WINDOWS\MSAGENT\agtintl.dll
C:\WINDOWS\MSAGENT\INTL\AGT0405.DLL
C:\WINDOWS\MSAGENT\INTL\AGT0406.DLL
C:\WINDOWS\MSAGENT\INTL\AGT0407.DLL
C:\WINDOWS\MSAGENT\INTL\AGT0408.DLL
C:\WINDOWS\MSAGENT\INTL\AGT0409.DLL
C:\WINDOWS\MSAGENT\INTL\AGT040B.DLL
C:\WINDOWS\MSAGENT\INTL\AGT040C.DLL
C:\WINDOWS\MSAGENT\INTL\AGT040E.DLL
C:\WINDOWS\MSAGENT\INTL\AGT0410.DLL
C:\WINDOWS\MSAGENT\INTL\AGT0413.DLL
C:\WINDOWS\MSAGENT\INTL\AGT0414.DLL
C:\WINDOWS\MSAGENT\INTL\AGT0415.DLL
C:\WINDOWS\MSAGENT\INTL\AGT0416.DLL TABLE IV-continued Windows Essential System Files C:\WINDOWS\MSAGENT\INTL\AGT0419.DLL
C:\WINDOWS\MSAGENT\INTL\AGT041D.DLL
C:\WINDOWS\MSAGENT\INTL\AGT041F.DLL
C:\WINDOWS\MSAGENT\INTL\AGT0816.DLL
C:\WINDOWS\MSAGENT\INTL\AGT0C0A.DLL
C:\WINDOWS\MSAGENT\mslwvtts.dll
C:\WINDOWS\MUI\muisetup.exe
C:\WINDOWS\notepad.exe
C:\WINDOWS\occache\iestm32.dll
C:\WINDOWS\opuc.dll
C:\WINDOWS\PCHealth\HelpCtr\Binaries\BRPINFO.DLL
C:\WINDOWS\PCHealth\HelpCtr\Binaries\HCAppRes.dll
C:\WINDOWS\PCHealth\HelpCtr\Binaries\helpctr.exe
C:\WINDOWS\PCHealth\HelpCtr\Binaries\HelpHost.exe
C:\WINDOWS\PCHealth\HelpCtr\Binaries\helpsvc.exe
C:\WINDOWS\PCHealth\HelpCtr\Binaries\hscupd.exe
C:\WINDOWS\PCHealth\HelpCtr\Binaries\msconfig.exe
C:\WINDOWS\PCHealth\HelpCtr\Binaries\msinfo.dll
C:\WINDOWS\PCHealth\HelpCtr\Binaries\NOTIFLAG.EXE
C:\WINDOWS\PCHealth\HelpCtr\Binaries\pchshell.dll
C:\WINDOWS\PCHealth\HelpCtr\Binaries\pchsvc.dll
C:\WINDOWS\PCHealth\UploadLB\Binaries\uploadm.exe
C:\WINDOWS\Q330994.EXE
C:\WINDOWS\regedit.exe
C:\WINDOWS\Resources\Themes\Luna\Shell\Homestead\shellstyle.dll
C:\WINDOWS\Resources\Themes\Luna\Shell\Metallic\shellstyle.dll
C:\WINDOWS\Resources\Themes\Luna\Shell\NormalColor\shellstyle.dll
C:\WINDOWS\SETPWRCG.EXE
C:\WINDOWS\slrundll.exe
C:\WINDOWS\speech\spchtel.dll
C:\WINDOWS\speech\speech.dll
C:\WINDOWS\speech\vcmd.exe
C:\WINDOWS\speech\vcmshl.dll
C:\WINDOWS\speech\Vdict.dll
C:\WINDOWS\speech\VText.dll
C:\WINDOWS\speech\WrapSAPI.dll
C:\WINDOWS\speech\Xcommand.dll
C:\WINDOWS\speech\Xlisten.dll
C:\WINDOWS\speech\XTel.Dll
C:\WINDOWS\speech\Xvoice.dll
C:\WINDOWS\SRCHASST\msgr3en.dll
C:\WINDOWS\SRCHASST\srchctls.dll
C:\WINDOWS\SRCHASST\srchui.dll
C:\WINDOWS\SYSTEM32\1033\DWINTL.DLL
C:\WINDOWS\SYSTEM32\6to4svc.dll
C:\WINDOWS\SYSTEM32\AAAAMON.DLL
C:\WINDOWS\SYSTEM32\ACCTRES.DLL
C:\WINDOWS\SYSTEM32\accwiz.exe
C:\WINDOWS\SYSTEM32\ACLEDIT.DLL
C:\WINDOWS\SYSTEM32\aclui.dll
C:\WINDOWS\SYSTEM32\activeds.dll
C:\WINDOWS\SYSTEM32\actmovie.exe
C:\WINDOWS\SYSTEM32\actxprxy.dll
C:\WINDOWS\SYSTEM32\admparse.dll
C:\WINDOWS\SYSTEM32\ADPTIF.DLL
C:\WINDOWS\SYSTEM32\adsldp.dll
C:\WINDOWS\SYSTEM32\adsldpc.dll
C:\WINDOWS\SYSTEM32\adsmsext.dll
C:\WINDOWS\SYSTEM32\ADSNDS.DLL
C:\WINDOWS\SYSTEM32\adsnt.dll
C:\WINDOWS\SYSTEM32\ADSNW.DLL
C:\WINDOWS\SYSTEM32\advapi32.dll
C:\WINDOWS\SYSTEM32\advpack.dll
C:\WINDOWS\SYSTEM32\AegisC5.dll
C:\WINDOWS\SYSTEM32\AegisI5.exe
C:\WINDOWS\SYSTEM32\ahui.exe
C:\WINDOWS\SYSTEM32\alg.exe
C:\WINDOWS\SYSTEM32\alrsvc.dll
C:\WINDOWS\SYSTEM32\amstream.dll
C:\WINDOWS\SYSTEM32\ANSI.SYS
C:\WINDOWS\SYSTEM32\APCUPS.DLL
C:\WINDOWS\SYSTEM32\APPEND.EXE
C:\WINDOWS\SYSTEM32\apphelp.dll
C:\WINDOWS\SYSTEM32\appmgmts.dll
C:\WINDOWS\SYSTEM32\appmgr.dll
C:\WINDOWS\SYSTEM32\ArmAccess.dll
C:\WINDOWS\SYSTEM32\ARP.EXE
C:\WINDOWS\SYSTEM32\asferror.dll TABLE IV-continued Windows Essential System Files C:\WINDOWS\SYSTEM32\asfsipc.dll
C:\WINDOWS\SYSTEM32\asr_fmt.exe
C:\WINDOWS\SYSTEM32\ASR_LDM.EXE
C:\WINDOWS\SYSTEM32\asr_pfu.exe
C:\WINDOWS\SYSTEM32\asycfilt.dll
C:\WINDOWS\SYSTEM32\at.exe
C:\WINDOWS\SYSTEM32\ATHPRXY.DLL
C:\WINDOWS\SYSTEM32\ati2cqag.dll
C:\WINDOWS\SYSTEM32\ati2dvaa.dll
C:\WINDOWS\SYSTEM32\ati2dvag.dll
C:\WINDOWS\SYSTEM32\ati3d1ag.dll
C:\WINDOWS\SYSTEM32\ati3duag.dll
C:\WINDOWS\SYSTEM32\ativtmxx.dll
C:\WINDOWS\SYSTEM32\ativvaxx.dll
C:\WINDOWS\SYSTEM32\ATKCTRS.DLL
C:\WINDOWS\SYSTEM32\atl.dll
C:\WINDOWS\SYSTEM32\atl70.dll
C:\WINDOWS\SYSTEM32\atl71.dll
C:\WINDOWS\SYSTEM32\atmadm.exe
C:\WINDOWS\SYSTEM32\atmfd.dll
C:\WINDOWS\SYSTEM32\atmlib.dll
C:\WINDOWS\SYSTEM32\ATMPVCNO.DLL
C:\WINDOWS\SYSTEM32\ATRACE.DLL
C:\WINDOWS\SYSTEM32\ATTRIB.EXE
C:\WINDOWS\SYSTEM32\audiosrv.dll
C:\WINDOWS\SYSTEM32\auditusr.exe
C:\WINDOWS\SYSTEM32\authz.dll
C:\WINDOWS\SYSTEM32\autochk.exe
C:\WINDOWS\SYSTEM32\autoconv.exe
C:\WINDOWS\SYSTEM32\AUTODISC.DLL
C:\WINDOWS\SYSTEM32\autofmt.exe
C:\WINDOWS\SYSTEM32\autolfn.exe
C:\WINDOWS\SYSTEM32\autoupdate.exe
C:\WINDOWS\SYSTEM32\AVICAP.DLL
C:\WINDOWS\SYSTEM32\AVICAP32.DLL
C:\WINDOWS\SYSTEM32\avifil32.dll
C:\WINDOWS\SYSTEM32\AVIFILE.DLL
C:\WINDOWS\SYSTEM32\AVMETER.DLL
C:\WINDOWS\SYSTEM32\AVTAPI.DLL
C:\WINDOWS\SYSTEM32\AVWAV.DLL
C:\WINDOWS\SYSTEM32\AW32n50.dll
C:\WINDOWS\SYSTEM32\AWINDIS5.SYS
C:\WINDOWS\SYSTEM32\basesrv.dll
C:\WINDOWS\SYSTEM32\batmeter.dll
C:\WINDOWS\SYSTEM32\batt.dll
C:\WINDOWS\SYSTEM32\BCMSM168.dll
C:\WINDOWS\SYSTEM32\BCMSMI32.dll
C:\WINDOWS\SYSTEM32\bidispl.dll
C:\WINDOWS\SYSTEM32\BInstDll.dll
C:\WINDOWS\SYSTEM32\bits\qmgr.dll
C:\WINDOWS\SYSTEM32\bitsprx2.dll
C:\WINDOWS\SYSTEM32\bitsprx3.dll
C:\WINDOWS\SYSTEM32\blackbox.dll
C:\WINDOWS\SYSTEM32\blastcln.exe
C:\WINDOWS\SYSTEM32\BMAPI.dll
C:\WINDOWS\SYSTEM32\BOOTCFG.EXE
C:\WINDOWS\SYSTEM32\BOOTOK.EXE
C:\WINDOWS\SYSTEM32\BOOTVID.DLL
C:\WINDOWS\SYSTEM32\BOOTVRFY.EXE
C:\WINDOWS\SYSTEM32\borlndmm.dll
C:\WINDOWS\SYSTEM32\browselc.dll
C:\WINDOWS\SYSTEM32\browser.dll
C:\WINDOWS\SYSTEM32\browseui.dll
C:\WINDOWS\SYSTEM32\browsewm.dll
C:\WINDOWS\SYSTEM32\BSelList.dll
C:\WINDOWS\SYSTEM32\bthci.dll
C:\WINDOWS\SYSTEM32\bthserv.dll
C:\WINDOWS\SYSTEM32\btpanui.dll
C:\WINDOWS\SYSTEM32\BUYB12.dll
C:\WINDOWS\SYSTEM32\buyb12ex.dll
C:\WINDOWS\SYSTEM32\cabinet.dll
C:\WINDOWS\SYSTEM32\cabview.dll
C:\WINDOWS\SYSTEM32\CACLS.EXE
C:\WINDOWS\SYSTEM32\CALC.EXE
C:\WINDOWS\SYSTEM32\CALLCONT.DLL
C:\WINDOWS\SYSTEM32\camocx.dll
C:\WINDOWS\SYSTEM32\CAPESNPN.DLL
C:\WINDOWS\SYSTEM32\capicom.dll TABLE IV-continued Windows Essential System Files C:\WINDOWS\SYSTEM32\CARDS.DLL
C:\WINDOWS\SYSTEM32\catsrv.dll
C:\WINDOWS\SYSTEM32\catsrvps.dll
C:\WINDOWS\SYSTEM32\catsrvut.dll
C:\WINDOWS\SYSTEM32\CBTNDIS5.sys
C:\WINDOWS\SYSTEM32\cc3250mt.dll
C:\WINDOWS\SYSTEM32\cc3260mt.dll
C:\WINDOWS\SYSTEM32\CCFGNT.DLL
C:\WINDOWS\SYSTEM32\ccrpbds6.dll
C:\WINDOWS\SYSTEM32\ccs.exe
C:\WINDOWS\SYSTEM32\cdfview.dll
C:\WINDOWS\SYSTEM32\cdm.dll
C:\WINDOWS\SYSTEM32\CDMODEM.DLL
C:\WINDOWS\SYSTEM32\cdosys.dll
C:\WINDOWS\SYSTEM32\CDRProX.dll
C:\WINDOWS\SYSTEM32\certcli.dll
C:\WINDOWS\SYSTEM32\certmgr.dll
C:\WINDOWS\SYSTEM32\cewmdm.dll
C:\WINDOWS\SYSTEM32\cfgbkend.dll
C:\WINDOWS\SYSTEM32\cfgmgr32.dll
C:\WINDOWS\SYSTEM32\Cfx4032.dll
C:\WINDOWS\SYSTEM32\CHARMAP.EXE
C:\WINDOWS\SYSTEM32\CHKDSK.EXE
C:\WINDOWS\SYSTEM32\CHKNTFS.EXE
C:\WINDOWS\SYSTEM32\CIADMIN.DLL
C:\WINDOWS\SYSTEM32\ciaResSvr20.dll
C:\WINDOWS\SYSTEM32\ciaSubClsSvr.dll
C:\WINDOWS\SYSTEM32\ciaXPRegSvr20.dll
C:\WINDOWS\SYSTEM32\CIC.DLL
C:\WINDOWS\SYSTEM32\CIDAEMON.EXE
C:\WINDOWS\SYSTEM32\ciodm.dll
C:\WINDOWS\SYSTEM32\cipher.exe
C:\WINDOWS\SYSTEM32\cisvc.exe
C:\WINDOWS\SYSTEM32\CKCNV.EXE
C:\WINDOWS\SYSTEM32\CLB.DLL
C:\WINDOWS\SYSTEM32\clbcatex.dll
C:\WINDOWS\SYSTEM32\clbcatq.dll
C:\WINDOWS\SYSTEM32\cleanmgr.exe
C:\WINDOWS\SYSTEM32\cliconfg.dll
C:\WINDOWS\SYSTEM32\cliconfg.exe
C:\WINDOWS\SYSTEM32\clipbrd.exe
C:\WINDOWS\SYSTEM32\clipsrv.exe
C:\WINDOWS\SYSTEM32\clusapi.dll
C:\WINDOWS\SYSTEM32\cmcfg32.dll
C:\WINDOWS\SYSTEM32\CMCT3FR.DLL
C:\WINDOWS\SYSTEM32\cmd.exe
C:\WINDOWS\SYSTEM32\cmdhere.dll
C:\WINDOWS\SYSTEM32\cmdial32.dll
C:\WINDOWS\SYSTEM32\cmdl32.exe
C:\WINDOWS\SYSTEM32\Cmdlgde.dll
C:\WINDOWS\SYSTEM32\CMDLGFR.DLL
C:\WINDOWS\SYSTEM32\cmmon32.exe
C:\WINDOWS\SYSTEM32\CMPBK32.DLL
C:\WINDOWS\SYSTEM32\cmprops.dll
C:\WINDOWS\SYSTEM32\cmsetacl.dll
C:\WINDOWS\SYSTEM32\cmstp.exe
C:\WINDOWS\SYSTEM32\cmutil.dll
C:\WINDOWS\SYSTEM32\cnbjmon.dll
C:\WINDOWS\SYSTEM32\CNETCFG.DLL
C:\WINDOWS\SYSTEM32\CNVFAT.DLL
C:\WINDOWS\SYSTEM32\CodecManager.dll
C:\WINDOWS\SYSTEM32\colbact.dll
C:\WINDOWS\SYSTEM32\Com\comadmin.dll
C:\WINDOWS\SYSTEM32\Com\comrepl.exe
C:\WINDOWS\SYSTEM32\Com\COMREREG.EXE
C:\WINDOWS\SYSTEM32\COMADDIN.DLL
C:\WINDOWS\SYSTEM32\COMADMIN.DLL
C:\WINDOWS\SYSTEM32\COMCAT.DLL
C:\WINDOWS\SYSTEM32\comctl32.dll
C:\WINDOWS\SYSTEM32\comdlg32.dll
C:\WINDOWS\SYSTEM32\COMMDLG.DLL
C:\WINDOWS\SYSTEM32\COMP.EXE
C:\WINDOWS\SYSTEM32\COMPACT.EXE
C:\WINDOWS\SYSTEM32\compatui.dll
C:\WINDOWS\SYSTEM32\COMPOBJ.DLL
C:\WINDOWS\SYSTEM32\compstui.dll
C:\WINDOWS\SYSTEM32\COMREPL.DLL
C:\WINDOWS\SYSTEM32\COMREPL.EXE TABLE IV-continued Windows Essential System Files C:\WINDOWS\SYSTEM32\comres.dll
C:\WINDOWS\SYSTEM32\comsdupd.exe
C:\WINDOWS\SYSTEM32\COMSNAP.DLL
C:\WINDOWS\SYSTEM32\comsvcs.dll
C:\WINDOWS\SYSTEM32\comuid.dll
C:\WINDOWS\SYSTEM32\CONFMSP.DLL
C:\WINDOWS\SYSTEM32\conime.exe
C:\WINDOWS\SYSTEM32\CONSOLE.DLL
C:\WINDOWS\SYSTEM32\CONTROL.EXE
C:\WINDOWS\SYSTEM32\CONVERT.EXE
C:\WINDOWS\SYSTEM32\corpol.dll
C:\WINDOWS\SYSTEM32\COUNTRY.SYS
C:\WINDOWS\SYSTEM32\cpwmon2k.dll
C:\WINDOWS\SYSTEM32\cpwsave.exe
C:\WINDOWS\SYSTEM32\credui.dll
C:\WINDOWS\SYSTEM32\CRTDLL.DLL
C:\WINDOWS\SYSTEM32\crypt32.dll
C:\WINDOWS\SYSTEM32\cryptdlg.dll
C:\WINDOWS\SYSTEM32\cryptdll.dll
C:\WINDOWS\SYSTEM32\cryptext.dll
C:\WINDOWS\SYSTEM32\cryptnet.dll
C:\WINDOWS\SYSTEM32\cryptsvc.dll
C:\WINDOWS\SYSTEM32\cryptui.dll
C:\WINDOWS\SYSTEM32\csccfg10.dll
C:\WINDOWS\SYSTEM32\cscdll.dll
C:\WINDOWS\SYSTEM32\csco21.sys
C:\WINDOWS\SYSTEM32\cscogina.dll
C:\WINDOWS\SYSTEM32\cscript.exe
C:\WINDOWS\SYSTEM32\cscui.dll
C:\WINDOWS\SYSTEM32\csrsrv.dll
C:\WINDOWS\SYSTEM32\csrss.exe
C:\WINDOWS\SYSTEM32\cssdk32.dll
C:\WINDOWS\SYSTEM32\CSSEQCHK.DLL
C:\WINDOWS\SYSTEM32\ctfmon.exe
C:\WINDOWS\SYSTEM32\CTL3D32.DLL
C:\WINDOWS\SYSTEM32\CTL3DV2.DLL
C:\WINDOWS\SYSTEM32\d3d8.dll
C:\WINDOWS\SYSTEM32\d3d8thk.dll
C:\WINDOWS\SYSTEM32\d3d9.dll
C:\WINDOWS\SYSTEM32\D3DIM.DLL
C:\WINDOWS\SYSTEM32\d3dim700.dll
C:\WINDOWS\SYSTEM32\D3DPMESH.DLL
C:\WINDOWS\SYSTEM32\D3DRAMP.DLL
C:\WINDOWS\SYSTEM32\D3DRM.DLL
C:\WINDOWS\SYSTEM32\D3DXOF.DLL
C:\WINDOWS\SYSTEM32\danim.dll
C:\WINDOWS\SYSTEM32\DartSnmp.dll
C:\WINDOWS\SYSTEM32\DartSock.dll
C:\WINDOWS\SYSTEM32\DartZip.dll
C:\WINDOWS\SYSTEM32\dataclen.dll
C:\WINDOWS\SYSTEM32\DATIME.DLL
C:\WINDOWS\SYSTEM32\davclnt.dll
C:\WINDOWS\SYSTEM32\DBGENG.DLL
C:\WINDOWS\SYSTEM32\dbghelp.dll
C:\WINDOWS\SYSTEM32\DBMSADSN.DLL
C:\WINDOWS\SYSTEM32\dbmsrpcn.dll
C:\WINDOWS\SYSTEM32\dbmsvinn.dLL
C:\WINDOWS\SYSTEM32\dbnetlib.dll
C:\WINDOWS\SYSTEM32\dbnmpntw.dll
C:\WINDOWS\SYSTEM32\dciman32.dll
C:\WINDOWS\SYSTEM32\DCOMCNFG.EXE
C:\WINDOWS\SYSTEM32\DDEML.DLL
C:\WINDOWS\SYSTEM32\ddeshare.exe
C:\WINDOWS\SYSTEM32\ddraw.dll
C:\WINDOWS\SYSTEM32\ddrawex.dll
C:\WINDOWS\SYSTEM32\DEBUG.EXE
C:\WINDOWS\SYSTEM32\defrag.exe
C:\WINDOWS\SYSTEM32\DESKADP.DLL
C:\WINDOWS\SYSTEM32\DESKMON.DLL
C:\WINDOWS\SYSTEM32\DESKPERF.DLL
C:\WINDOWS\SYSTEM32\devenum.dll
C:\WINDOWS\SYSTEM32\devmgr.dll
C:\WINDOWS\SYSTEM32\dfrgfat.exe
C:\WINDOWS\SYSTEM32\dfrgntfs.exe
C:\WINDOWS\SYSTEM32\DFRGRES.DLL
C:\WINDOWS\SYSTEM32\dfrgsnap.dll
C:\WINDOWS\SYSTEM32\dfrgui.dll
C:\WINDOWS\SYSTEM32\dfsshlex.dll TABLE IV-continued Windows Essential System Files C:\WINDOWS\SYSTEM32\dgnet.dll
C:\WINDOWS\SYSTEM32\DGRPSETU.DLL
C:\WINDOWS\SYSTEM32\DGSETUP.DLL
C:\WINDOWS\SYSTEM32\dhcpcsvc.dll
C:\WINDOWS\SYSTEM32\DHCPMON.DLL
C:\WINDOWS\SYSTEM32\DHCPSAPI.DLL
C:\WINDOWS\SYSTEM32\DIACTFRM.DLL
C:\WINDOWS\SYSTEM32\diantz.exe
C:\WINDOWS\SYSTEM32\digest.dll
C:\WINDOWS\SYSTEM32\DIMAP.DLL
C:\WINDOWS\SYSTEM32\dinput.dll
C:\WINDOWS\SYSTEM32\dinput8.dll
C:\WINDOWS\SYSTEM32\DISKCOPY.DLL
C:\WINDOWS\SYSTEM32\diskpart.exe
C:\WINDOWS\SYSTEM32\DISKPERF.EXE
C:\WINDOWS\SYSTEM32\DISPEX.DLL
C:\WINDOWS\SYSTEM32\DivX.dll
C:\WINDOWS\SYSTEM32\dla\dlainst.dll
C:\WINDOWS\SYSTEM32\dla\tfsnboio.sys
C:\WINDOWS\SYSTEM32\dla\tfsncofs.sys
C:\WINDOWS\SYSTEM32\dla\tfsndrct.sys
C:\WINDOWS\SYSTEM32\dla\tfsndres.sys
C:\WINDOWS\SYSTEM32\dla\tfsnifs.sys
C:\WINDOWS\SYSTEM32\dla\tfsnopio.sys
C:\WINDOWS\SYSTEM32\dla\tfsnpool.sys
C:\WINDOWS\SYSTEM32\dla\tfsnudf.sys
C:\WINDOWS\SYSTEM32\dla\tfsnudfa.sys
C:\WINDOWS\SYSTEM32\dla\tfswcmd.exe
C:\WINDOWS\SYSTEM32\dla\tfswcres.dll
C:\WINDOWS\SYSTEM32\dla\tfswctrl.exe
C:\WINDOWS\SYSTEM32\dla\tfswshx.dll
C:\WINDOWS\SYSTEM32\DLLCACHE\abp480n5.sys
C:\WINDOWS\SYSTEM32\DLLCACHE\acpiec.sys
C:\WINDOWS\SYSTEM32\DLLCACHE\adptif.dll
C:\WINDOWS\SYSTEM32\DLLCACHE\adsnds.dll
C:\WINDOWS\SYSTEM32\DLLCACHE\adsnw.dll
C:\WINDOWS\SYSTEM32\DLLCACHE\agt0405.dll
C:\WINDOWS\SYSTEM32\DLLCACHE\agt0406.dll
C:\WINDOWS\SYSTEM32\DLLCACHE\agt0407.dll
C:\WINDOWS\SYSTEM32\DLLCACHE\agt0408.dll
C:\WINDOWS\SYSTEM32\DLLCACHE\agt040b.dll
C:\WINDOWS\SYSTEM32\DLLCACHE\agt040c.dll
C:\WINDOWS\SYSTEM32\DLLCACHE\agt040e.dll
C:\WINDOWS\SYSTEM32\DLLCACHE\agt0410.dll
C:\WINDOWS\SYSTEM32\DLLCACHE\agt0413.dll
C:\WINDOWS\SYSTEM32\DLLCACHE\agt0414.dll
C:\WINDOWS\SYSTEM32\DLLCACHE\agt0415.dll
C:\WINDOWS\SYSTEM32\DLLCACHE\agt0416.dll
C:\WINDOWS\SYSTEM32\DLLCACHE\agt0419.dll
C:\WINDOWS\SYSTEM32\DLLCACHE\agt041d.dll
C:\WINDOWS\SYSTEM32\DLLCACHE\agt041f.dll
C:\WINDOWS\SYSTEM32\DLLCACHE\agt0816.dll
C:\WINDOWS\SYSTEM32\DLLCACHE\agt0c0a.dll
C:\WINDOWS\SYSTEM32\DLLCACHE\ahal54x.sys
C:\WINDOWS\SYSTEM32\DLLCACHE\aic78u2.sys
C:\WINDOWS\SYSTEM32\DLLCACHE\aliide.sys
C:\WINDOWS\SYSTEM32\DLLCACHE\amsint.sys
C:\WINDOWS\SYSTEM32\DLLCACHE\ansi.sys
C:\WINDOWS\SYSTEM32\DLLCACHE\apcups.dll
C:\WINDOWS\SYSTEM32\DLLCACHE\append.exe
C:\WINDOWS\SYSTEM32\DLLCACHE\arp.exe
C:\WINDOWS\SYSTEM32\DLLCACHE\asc.sys
C:\WINDOWS\SYSTEM32\DLLCACHE\asc3350p.sys
C:\WINDOWS\SYSTEM32\DLLCACHE\asc3550.sys
C:\WINDOWS\SYSTEM32\DLLCACHE\asr_ldm.exe
C:\WINDOWS\SYSTEM32\DLLCACHE\atkctrs.dll
C:\WINDOWS\SYSTEM32\DLLCACHE\atmepvc.sys
C:\WINDOWS\SYSTEM32\DLLCACHE\atmpvcno.dll
C:\WINDOWS\SYSTEM32\DLLCACHE\atmuni.sys
C:\WINDOWS\SYSTEM32\DLLCACHE\atrace.dll
C:\WINDOWS\SYSTEM32\DLLCACHE\attrib.exe
C:\WINDOWS\SYSTEM32\DLLCACHE\autodisc.dll
C:\WINDOWS\SYSTEM32\DLLCACHE\avicap.dll
C:\WINDOWS\SYSTEM32\DLLCACHE\avifile.dll
C:\WINDOWS\SYSTEM32\DLLCACHE\avmeter.dll
C:\WINDOWS\SYSTEM32\DLLCACHE\avtapi.dll
C:\WINDOWS\SYSTEM32\DLLCACHE\avway.dll
C:\WINDOWS\SYSTEM32\DLLCACHE\bnts.dll TABLE IV-continued Windows Essential System Files C:\WINDOWS\SYSTEM32\DLLCACHE\bootcfg.exe
C:\WINDOWS\SYSTEM32\DLLCACHE\bootok.exe
C:\WINDOWS\SYSTEM32\DLLCACHE\bootvrfy.exe
C:\WINDOWS\SYSTEM32\DLLCACHE\brpinfo.dll
C:\WINDOWS\SYSTEM32\DLLCACHE\cacls.exe
C:\WINDOWS\SYSTEM32\DLLCACHE\capesnpn.dll
C:\WINDOWS\SYSTEM32\DLLCACHE\cbidf2k.sys
C:\WINDOWS\SYSTEM32\DLLCACHE\ccfgnt.dll
C:\WINDOWS\SYSTEM32\DLLCACHE\cd20xrnt.sys
C:\WINDOWS\SYSTEM32\DLLCACHE\cdm.dll
C:\WINDOWS\SYSTEM32\DLLCACHE\cdmodem.dll
C:\WINDOWS\SYSTEM32\DLLCACHE\chkdsk.exe
C:\WINDOWS\SYSTEM32\DLLCACHE\chkntfs.exe
C:\WINDOWS\SYSTEM32\DLLCACHE\ciadmin.dll
C:\WINDOWS\SYSTEM32\DLLCACHE\cic.dll
C:\WINDOWS\SYSTEM32\DLLCACHE\cidaemon.exe
C:\WINDOWS\SYSTEM32\DLLCACHE\cinemst2.sys
C:\WINDOWS\SYSTEM32\DLLCACHE\ckcnv.exe
C:\WINDOWS\SYSTEM32\DLLCACHE\cmdide.sys
C:\WINDOWS\SYSTEM32\DLLCACHE\cmpbk32.dll
C:\WINDOWS\SYSTEM32\DLLCACHE\cnetcfg.dll
C:\WINDOWS\SYSTEM32\DLLCACHE\cnvfat.dll
C:\WINDOWS\SYSTEM32\DLLCACHE\commdlg.dll
C:\WINDOWS\SYSTEM32\DLLCACHE\comp.exe
C:\WINDOWS\SYSTEM32\DLLCACHE\compact.exe
C:\WINDOWS\SYSTEM32\DLLCACHE\compobj.dll
C:\WINDOWS\SYSTEM32\DLLCACHE\comrepl.dll
C:\WINDOWS\SYSTEM32\DLLCACHE\comrereg.exe
C:\WINDOWS\SYSTEM32\DLLCACHE\comsnap.dll
C:\WINDOWS\SYSTEM32\DLLCACHE\confmsp.dll
C:\WINDOWS\SYSTEM32\DLLCACHE\console.dll
C:\WINDOWS\SYSTEM32\DLLCACHE\convert.exe
C:\WINDOWS\SYSTEM32\DLLCACHE\cpqarray.sys
C:\WINDOWS\SYSTEM32\DLLCACHE\cpqdap01.sys
C:\WINDOWS\SYSTEM32\DLLCACHE\csseqchk.dll
C:\WINDOWS\SYSTEM32\DLLCACHE\ctl3d32.dll
C:\WINDOWS\SYSTEM32\DLLCACHE\ctl3dv2.dll
C:\WINDOWS\SYSTEM32\DLLCACHE\d3dim.dll
C:\WINDOWS\SYSTEM32\DLLCACHE\d3dpmesh.dll
C:\WINDOWS\SYSTEM32\DLLCACHE\d3dramp.dll
C:\WINDOWS\SYSTEM32\DLLCACHE\d3drm.dll
C:\WINDOWS\SYSTEM32\DLLCACHE\d3dxof.dll
C:\WINDOWS\SYSTEM32\DLLCACHE\dac2w2k.sys
C:\WINDOWS\SYSTEM32\DLLCACHE\dac960nt.sys
C:\WINDOWS\SYSTEM32\DLLCACHE\datime.dll
C:\WINDOWS\SYSTEM32\DLLCACHE\dcomcnfg.exe
C:\WINDOWS\SYSTEM32\DLLCACHE\ddeml.dll
C:\WINDOWS\SYSTEM32\DLLCACHE\debug.exe
C:\WINDOWS\SYSTEM32\DLLCACHE\dgrpsetu.dll
C:\WINDOWS\SYSTEM32\DLLCACHE\dgsetup.dll
C:\WINDOWS\SYSTEM32\DLLCACHE\dhcpmon.dll
C:\WINDOWS\SYSTEM32\DLLCACHE\dhcpsapi.dll
C:\WINDOWS\SYSTEM32\DLLCACHE\diactfrm.dll
C:\WINDOWS\SYSTEM32\DLLCACHE\dimap.dll
C:\WINDOWS\SYSTEM32\DLLCACHE\diskperf.exe
C:\WINDOWS\SYSTEM32\DLLCACHE\dllhst3g.exe
C:\WINDOWS\SYSTEM32\DLLCACHE\dmconfig.dll
C:\WINDOWS\SYSTEM32\DLLCACHE\dmdlgs.dll
C:\WINDOWS\SYSTEM32\DLLCACHE\dmdskres.dll
C:\WINDOWS\SYSTEM32\DLLCACHE\dmintf.dll
C:\WINDOWS\SYSTEM32\DLLCACHE\dmload.sys
C:\WINDOWS\SYSTEM32\DLLCACHE\dpnmodem.dll
C:\WINDOWS\SYSTEM32\DLLCACHE\dpnwsock.dll
C:\WINDOWS\SYSTEM32\DLLCACHE\dpserial.dll
C:\WINDOWS\SYSTEM32\DLLCACHE\dpti2o.sys
C:\WINDOWS\SYSTEM32\DLLCACHE\dpwsock.dll
C:\WINDOWS\SYSTEM32\DLLCACHE\drvqry.exe
C:\WINDOWS\SYSTEM32\DLLCACHE\drwatson.exe
C:\WINDOWS\SYSTEM32\DLLCACHE\dsauth.dll
C:\WINDOWS\SYSTEM32\DLLCACHE\dskquoui.dll
C:\WINDOWS\SYSTEM32\DLLCACHE\dsprov.dll
C:\WINDOWS\SYSTEM32\DLLCACHE\dvdplay.exe
C:\WINDOWS\SYSTEM32\DLLCACHE\dxapi.sys
C:\WINDOWS\SYSTEM32\DLLCACHE\edlin.exe
C:\WINDOWS\SYSTEM32\DLLCACHE\eqnclass.dll
C:\WINDOWS\SYSTEM32\DLLCACHE\esent97.dll
C:\WINDOWS\SYSTEM32\DLLCACHE\esentprf.dll
C:\WINDOWS\SYSTEM32\DLLCACHE\esentutl.exe TABLE IV-continued Windows Essential System Files C:\WINDOWS\SYSTEM32\DLLCACHE\eventcls.dll
C:\WINDOWS\SYSTEM32\DLLCACHE\eventvwr.exe
C:\WINDOWS\SYSTEM32\DLLCACHE\evtrig.exe
C:\WINDOWS\SYSTEM32\DLLCACHE\exe2bin.exe
C:\WINDOWS\SYSTEM32\DLLCACHE\expand.exe
C:\WINDOWS\SYSTEM32\DLLCACHE\fastopen.exe
C:\WINDOWS\SYSTEM32\DLLCACHE\fc.exe
C:\WINDOWS\SYSTEM32\DLLCACHE\fde.dll
C:\WINDOWS\SYSTEM32\DLLCACHE\find.exe
C:\WINDOWS\SYSTEM32\DLLCACHE\finger.exe
C:\WINDOWS\SYSTEM32\DLLCACHE\fixmapi.exe
C:\WINDOWS\SYSTEM32\DLLCACHE\fontsub.dll
C:\WINDOWS\SYSTEM32\DLLCACHE\forcedos.exe
C:\WINDOWS\SYSTEM32\DLLCACHE\fsconins.dll
C:\WINDOWS\SYSTEM32\DLLCACHE\fsusd.dll
C:\WINDOWS\SYSTEM32\DLLCACHE\fsutil.exe
C:\WINDOWS\SYSTEM32\DLLCACHE\fsvga.sys
C:\WINDOWS\SYSTEM32\DLLCACHE\ftsrch.dll
C:\WINDOWS\SYSTEM32\DLLCACHE\fwdprov.dll
C:\WINDOWS\SYSTEM32\DLLCACHE\fxscfgwz.dll
C:\WINDOWS\SYSTEM32\DLLCACHE\gcdef.dll
C:\WINDOWS\SYSTEM32\DLLCACHE\gdi.exe
C:\WINDOWS\SYSTEM32\DLLCACHE\getmac.exe
C:\WINDOWS\SYSTEM32\DLLCACHE\getuname.dll
C:\WINDOWS\SYSTEM32\DLLCACHE\glmf32.dll
C:\WINDOWS\SYSTEM32\DLLCACHE\gpupdate.exe
C:\WINDOWS\SYSTEM32\DLLCACHE\help.exe
C:\WINDOWS\SYSTEM32\DLLCACHE\helphost.exe
C:\WINDOWS\SYSTEM32\DLLCACHE\hhctrlui.dll
C:\WINDOWS\SYSTEM32\DLLCACHE\hidserv.dll
C:\WINDOWS\SYSTEM32\DLLCACHE\hidusb.sys
C:\WINDOWS\SYSTEM32\DLLCACHE\hnetmon.dll
C:\WINDOWS\SYSTEM32\DLLCACHE\home_ss.dll
C:\WINDOWS\SYSTEM32\DLLCACHE\hostname.exe
C:\WINDOWS\SYSTEM32\DLLCACHE\hpn.sys
C:\WINDOWS\SYSTEM32\DLLCACHE\htrn_jis.dll
C:\WINDOWS\SYSTEM32\DLLCACHE\iashlpr.dll
C:\WINDOWS\SYSTEM32\DLLCACHE\iasnap.dll
C:\WINDOWS\SYSTEM32\DLLCACHE\iaspolcy.dll
C:\WINDOWS\SYSTEM32\DLLCACHE\iasrecst.dll
C:\WINDOWS\SYSTEM32\DLLCACHE\iassam.dll
C:\WINDOWS\SYSTEM32\DLLCACHE\iassdo.dll
C:\WINDOWS\SYSTEM32\DLLCACHE\iassvcs.dll
C:\WINDOWS\SYSTEM32\DLLCACHE\icfgnt5.dll
C:\WINDOWS\SYSTEM32\DLLCACHE\ieakui.dll
C:\WINDOWS\SYSTEM32\DLLCACHE\iissuba.dll
C:\WINDOWS\SYSTEM32\DLLCACHE\infosoft.dll
C:\WINDOWS\SYSTEM32\DLLCACHE\ini910u.sys
C:\WINDOWS\SYSTEM32\DLLCACHE\iologmsg.dll
C:\WINDOWS\SYSTEM32\DLLCACHE\ipfltdrv.sys
C:\WINDOWS\SYSTEM32\DLLCACHE\ipmontr.dll
C:\WINDOWS\SYSTEM32\DLLCACHE\iprop.dll
C:\WINDOWS\SYSTEM32\DLLCACHE\iprtprio.dll
C:\WINDOWS\SYSTEM32\DLLCACHE\iprtrmgr.dll
C:\WINDOWS\SYSTEM32\DLLCACHE\ipsec6.exe
C:\WINDOWS\SYSTEM32\DLLCACHE\ipxmontr.dll
C:\WINDOWS\SYSTEM32\DLLCACHE\ipxpromn.dll
C:\WINDOWS\SYSTEM32\DLLCACHE\ipxrip.dll
C:\WINDOWS\SYSTEM32\DLLCACHE\ipxrtmgr.dll
C:\WINDOWS\SYSTEM32\DLLCACHE\ipxsap.dll
C:\WINDOWS\SYSTEM32\DLLCACHE\ipxwan.dll
C:\WINDOWS\SYSTEM32\DLLCACHE\irclass.dll
C:\WINDOWS\SYSTEM32\DLLCACHE\iuengine.dll
C:\WINDOWS\SYSTEM32\DLLCACHE\iyuv_32.dll
C:\WINDOWS\SYSTEM32\DLLCACHE\jet500.dll
C:\WINDOWS\SYSTEM32\DLLCACHE\jobexec.dll
C:\WINDOWS\SYSTEM32\DLLCACHE\kbdal.dll
C:\WINDOWS\SYSTEM32\DLLCACHE\kbdaze.dll
C:\WINDOWS\SYSTEM32\DLLCACHE\kbdazel.dll
C:\WINDOWS\SYSTEM32\DLLCACHE\kbdbe.dll
C:\WINDOWS\SYSTEM32\DLLCACHE\kbdbene.dll
C:\WINDOWS\SYSTEM32\DLLCACHE\kbdblr.dll
C:\WINDOWS\SYSTEM32\DLLCACHE\kbdbr.dll
C:\WINDOWS\SYSTEM32\DLLCACHE\kbdbu.dll
C:\WINDOWS\SYSTEM32\DLLCACHE\kbdca.dll
C:\WINDOWS\SYSTEM32\DLLCACHE\kbdcan.dll
C:\WINDOWS\SYSTEM32\DLLCACHE\kbdcr.dll
C:\WINDOWS\SYSTEM32\DLLCACHE\kbdcz.dll TABLE IV-continued Windows Essential System Files C:\WINDOWS\SYSTEM32\DLLCACHE\kbdcz1.dll
C:\WINDOWS\SYSTEM32\DLLCACHE\kbdcz2.dll
C:\WINDOWS\SYSTEM32\DLLCACHE\kbdda.dll
C:\WINDOWS\SYSTEM32\DLLCACHE\kbddv.dll
C:\WINDOWS\SYSTEM32\DLLCACHE\kbdes.dll
C:\WINDOWS\SYSTEM32\DLLCACHE\kbdest.dll
C:\WINDOWS\SYSTEM32\DLLCACHE\kbdfc.dll
C:\WINDOWS\SYSTEM32\DLLCACHE\kbdfi.dll
C:\WINDOWS\SYSTEM32\DLLCACHE\kbdfo.dll
C:\WINDOWS\SYSTEM32\DLLCACHE\kbdfr.dll
C:\WINDOWS\SYSTEM32\DLLCACHE\kbdgae.dll
C:\WINDOWS\SYSTEM32\DLLCACHE\kbdgkl.dll
C:\WINDOWS\SYSTEM32\DLLCACHE\kbdgr.dll
C:\WINDOWS\SYSTEM32\DLLCACHE\kbdgr1.dll
C:\WINDOWS\SYSTEM32\DLLCACHE\kbdhe.dll
C:\WINDOWS\SYSTEM32\DLLCACHE\kbdhe220.dll
C:\WINDOWS\SYSTEM32\DLLCACHE\kbdhe319.dll
C:\WINDOWS\SYSTEM32\DLLCACHE\kbdhela2.dll
C:\WINDOWS\SYSTEM32\DLLCACHE\kbdhela3.dll
C:\WINDOWS\SYSTEM32\DLLCACHE\kbdhept.dll
C:\WINDOWS\SYSTEM32\DLLCACHE\kbdhid.sys
C:\WINDOWS\SYSTEM32\DLLCACHE\kbdhu.dll
C:\WINDOWS\SYSTEM32\DLLCACHE\kbdhu1.dll
C:\WINDOWS\SYSTEM32\DLLCACHE\kbdic.dll
C:\WINDOWS\SYSTEM32\DLLCACHE\kbdir.dll
C:\WINDOWS\SYSTEM32\DLLCACHE\kbdit.dll
C:\WINDOWS\SYSTEM32\DLLCACHE\kbdit142.dll
C:\WINDOWS\SYSTEM32\DLLCACHE\kbdkaz.dll
C:\WINDOWS\SYSTEM32\DLLCACHE\kbdkyr.dll
C:\WINDOWS\SYSTEM32\DLLCACHE\kbdla.dll
C:\WINDOWS\SYSTEM32\DLLCACHE\kbdlt1.dll
C:\WINDOWS\SYSTEM32\DLLCACHE\kbdlv.dll
C:\WINDOWS\SYSTEM32\DLLCACHE\kbdmon.dll
C:\WINDOWS\SYSTEM32\DLLCACHE\kbdne.dll
C:\WINDOWS\SYSTEM32\DLLCACHE\kbdnec.dll
C:\WINDOWS\SYSTEM32\DLLCACHE\kbdno.dll
C:\WINDOWS\SYSTEM32\DLLCACHE\kbdpl.dll
C:\WINDOWS\SYSTEM32\DLLCACHE\kbdpl1.dll
C:\WINDOWS\SYSTEM32\DLLCACHE\kbdpo.dll
C:\WINDOWS\SYSTEM32\DLLCACHE\kbdro.dll
C:\WINDOWS\SYSTEM32\DLLCACHE\kbdru.dll
C:\WINDOWS\SYSTEM32\DLLCACHE\kbdru1.dll
C:\WINDOWS\SYSTEM32\DLLCACHE\kbdsf.dll
C:\WINDOWS\SYSTEM32\DLLCACHE\kbdsg.dll
C:\WINDOWS\SYSTEM32\DLLCACHE\kbdsl.dll
C:\WINDOWS\SYSTEM32\DLLCACHE\kbdsl1.dll
C:\WINDOWS\SYSTEM32\DLLCACHE\kbdsp.dll
C:\WINDOWS\SYSTEM32\DLLCACHE\kbdsw.dll
C:\WINDOWS\SYSTEM32\DLLCACHE\kbdtat.dll
C:\WINDOWS\SYSTEM32\DLLCACHE\kbdtuf.dll
C:\WINDOWS\SYSTEM32\DLLCACHE\kbdtuq.dll
C:\WINDOWS\SYSTEM32\DLLCACHE\kbduk.dll
C:\WINDOWS\SYSTEM32\DLLCACHE\kbdur.dll
C:\WINDOWS\SYSTEM32\DLLCACHE\kbdusl.dll
C:\WINDOWS\SYSTEM32\DLLCACHE\kbdusr.dll
C:\WINDOWS\SYSTEM32\DLLCACHE\kbdusx.dll
C:\WINDOWS\SYSTEM32\DLLCACHE\kbduzb.dll
C:\WINDOWS\SYSTEM32\DLLCACHE\kbdycc.dll
C:\WINDOWS\SYSTEM32\DLLCACHE\kbdycl.dll
C:\WINDOWS\SYSTEM32\DLLCACHE\key01.sys
C:\WINDOWS\SYSTEM32\DLLCACHE\ks.sys
C:\WINDOWS\SYSTEM32\DLLCACHE\label.exe
C:\WINDOWS\SYSTEM32\DLLCACHE\langwrbk.dll
C:\WINDOWS\SYSTEM32\DLLCACHE\lights.exe
C:\WINDOWS\SYSTEM32\DLLCACHE\lnkstub.exe
C:\WINDOWS\SYSTEM32\DLLCACHE\lodctr.exe
C:\WINDOWS\SYSTEM32\DLLCACHE\loghours.dll
C:\WINDOWS\SYSTEM32\DLLCACHE\logoff.exe
C:\WINDOWS\SYSTEM32\DLLCACHE\lpq.exe
C:\WINDOWS\SYSTEM32\DLLCACHE\lpr.exe
C:\WINDOWS\SYSTEM32\DLLCACHE\lprmonui.dll
C:\WINDOWS\SYSTEM32\DLLCACHE\lzexpand.dll
C:\WINDOWS\SYSTEM32\DLLCACHE\mag_hook.dll
C:\WINDOWS\SYSTEM32\DLLCACHE\mcd.sys
C:\WINDOWS\SYSTEM32\DLLCACHE\mcd32.dll
C:\WINDOWS\SYSTEM32\DLLCACHE\mcdsrv32.dll
C:\WINDOWS\SYSTEM32\DLLCACHE\mchgrcoi.dll
C:\WINDOWS\SYSTEM32\DLLCACHE\mcicda.dll

TABLE IV-continued

Windows Essential System Files

C:\WINDOWS\SYSTEM32\DLLCACHE\mciole16.dll
C:\WINDOWS\SYSTEM32\DLLCACHE\mciole32.dll
C:\WINDOWS\SYSTEM32\DLLCACHE\mdhcp.dll
C:\WINDOWS\SYSTEM32\DLLCACHE\mdwmdmsp.dll
C:\WINDOWS\SYSTEM32\DLLCACHE\mem.exe
C:\WINDOWS\SYSTEM32\DLLCACHE\metal_ss.dll
C:\WINDOWS\SYSTEM32\DLLCACHE\mfc40.dll
C:\WINDOWS\SYSTEM32\DLLCACHE\mfc40u.dll
C:\WINDOWS\SYSTEM32\DLLCACHE\mimefilt.dll
C:\WINDOWS\SYSTEM32\DLLCACHE\mll_hp.dll
C:\WINDOWS\SYSTEM32\DLLCACHE\mll_mtf.dll
C:\WINDOWS\SYSTEM32\DLLCACHE\mll_qic.dll
C:\WINDOWS\SYSTEM32\DLLCACHE\mmdrv.dll
C:\WINDOWS\SYSTEM32\DLLCACHE\mmutilse.dll
C:\WINDOWS\SYSTEM32\DLLCACHE\modex.dll
C:\WINDOWS\SYSTEM32\DLLCACHE\mouhid.sys
C:\WINDOWS\SYSTEM32\DLLCACHE\mountvol.exe
C:\WINDOWS\SYSTEM32\DLLCACHE\mpnotify.exe
C:\WINDOWS\SYSTEM32\DLLCACHE\mprddm.dll
C:\WINDOWS\SYSTEM32\DLLCACHE\mprdim.dll
C:\WINDOWS\SYSTEM32\DLLCACHE\mprmsg.dll
C:\WINDOWS\SYSTEM32\DLLCACHE\mqcertui.dll
C:\WINDOWS\SYSTEM32\DLLCACHE\mqgentr.dll
C:\WINDOWS\SYSTEM32\DLLCACHE\mqperf.dll
C:\WINDOWS\SYSTEM32\DLLCACHE\mraid35x.sys
C:\WINDOWS\SYSTEM32\DLLCACHE\mrinfo.exe
C:\WINDOWS\SYSTEM32\DLLCACHE\msaudite.dll
C:\WINDOWS\SYSTEM32\DLLCACHE\msg.exe
C:\WINDOWS\SYSTEM32\DLLCACHE\msiprov.dll
C:\WINDOWS\SYSTEM32\DLLCACHE\msjetol1.dll
C:\WINDOWS\SYSTEM32\DLLCACHE\msobjs.dll
C:\WINDOWS\SYSTEM32\DLLCACHE\msr2c.dll
C:\WINDOWS\SYSTEM32\DLLCACHE\msr2cenu.dll
C:\WINDOWS\SYSTEM32\DLLCACHE\mssign32.dll
C:\WINDOWS\SYSTEM32\DLLCACHE\mssip32.dll
C:\WINDOWS\SYSTEM32\DLLCACHE\mssoap1.dll
C:\WINDOWS\SYSTEM32\DLLCACHE\mssoapr.dll
C:\WINDOWS\SYSTEM32\DLLCACHE\msswch.dll
C:\WINDOWS\SYSTEM32\DLLCACHE\msswchx.exe
C:\WINDOWS\SYSTEM32\DLLCACHE\msvcp50.dll
C:\WINDOWS\SYSTEM32\DLLCACHE\msvcrt20.dll
C:\WINDOWS\SYSTEM32\DLLCACHE\msvideo.dll
C:\WINDOWS\SYSTEM32\DLLCACHE\msxml2r.dll
C:\WINDOWS\SYSTEM32\DLLCACHE\msyuv.dll
C:\WINDOWS\SYSTEM32\DLLCACHE\mtxdm.dll
C:\WINDOWS\SYSTEM32\DLLCACHE\mtxex.dll
C:\WINDOWS\SYSTEM32\DLLCACHE\mtxlegih.dll
C:\WINDOWS\SYSTEM32\DLLCACHE\narrhook.dll
C:\WINDOWS\SYSTEM32\DLLCACHE\nbtstat.exe
C:\WINDOWS\SYSTEM32\DLLCACHE\ncxpnt.dll
C:\WINDOWS\SYSTEM32\DLLCACHE\netapi.dll
C:\WINDOWS\SYSTEM32\DLLCACHE\netevent.dll
C:\WINDOWS\SYSTEM32\DLLCACHE\neth.dll
C:\WINDOWS\SYSTEM32\DLLCACHE\nikedrv.sys
C:\WINDOWS\SYSTEM32\DLLCACHE\nlsfunc.exe
C:\WINDOWS\SYSTEM32\DLLCACHE\nmevtmsg.dll
C:\WINDOWS\SYSTEM32\DLLCACHE\notiflag.exe
C:\WINDOWS\SYSTEM32\DLLCACHE\ntdos404.sys
C:\WINDOWS\SYSTEM32\DLLCACHE\ntdos411.sys
C:\WINDOWS\SYSTEM32\DLLCACHE\ntdos412.sys
C:\WINDOWS\SYSTEM32\DLLCACHE\ntdos804.sys
C:\WINDOWS\SYSTEM32\DLLCACHE\ntdsbcli.dll
C:\WINDOWS\SYSTEM32\DLLCACHE\ntlanui.dll
C:\WINDOWS\SYSTEM32\DLLCACHE\ntlanui2.dll
C:\WINDOWS\SYSTEM32\DLLCACHE\ntmsevt.dll
C:\WINDOWS\SYSTEM32\DLLCACHE\ntsd.exe
C:\WINDOWS\SYSTEM32\DLLCACHE\nw16.exe
C:\WINDOWS\SYSTEM32\DLLCACHE\nwapi16.dll
C:\WINDOWS\SYSTEM32\DLLCACHE\nwapi32.dll
C:\WINDOWS\SYSTEM32\DLLCACHE\nwcfg.dll
C:\WINDOWS\SYSTEM32\DLLCACHE\nwevent.dll
C:\WINDOWS\SYSTEM32\DLLCACHE\nwlnkflt.sys
C:\WINDOWS\SYSTEM32\DLLCACHE\nwlnkfwd.sys
C:\WINDOWS\SYSTEM32\DLLCACHE\nwlnknb.sys
C:\WINDOWS\SYSTEM32\DLLCACHE\nwlnkspx.sys
C:\WINDOWS\SYSTEM32\DLLCACHE\nwscript.exe
C:\WINDOWS\SYSTEM32\DLLCACHE\ole2.dll
C:\WINDOWS\SYSTEM32\DLLCACHE\ole2disp.dll TABLE IV-continued Windows Essential System Files C:\WINDOWS\SYSTEM32\DLLCACHE\ole2nls.dll
C:\WINDOWS\SYSTEM32\DLLCACHE\olecli.dll
C:\WINDOWS\SYSTEM32\DLLCACHE\olesvr.dll
C:\WINDOWS\SYSTEM32\DLLCACHE\oprghdlr.sys
C:\WINDOWS\SYSTEM32\DLLCACHE\panmap.dll
C:\WINDOWS\SYSTEM32\DLLCACHE\paqsp.dll
C:\WINDOWS\SYSTEM32\DLLCACHE\parvdm.sys
C:\WINDOWS\SYSTEM32\DLLCACHE\pathping.exe
C:\WINDOWS\SYSTEM32\DLLCACHE\pciide.sys
C:\WINDOWS\SYSTEM32\DLLCACHE\pentnt.exe
C:\WINDOWS\SYSTEM32\DLLCACHE\perc2.sys
C:\WINDOWS\SYSTEM32\DLLCACHE\perc2hib.sys
C:\WINDOWS\SYSTEM32\DLLCACHE\perfnw.dll
C:\WINDOWS\SYSTEM32\DLLCACHE\pifmgr.dll
C:\WINDOWS\SYSTEM32\DLLCACHE\ping6.exe
C:\WINDOWS\SYSTEM32\DLLCACHE\plustab.dll
C:\WINDOWS\SYSTEM32\DLLCACHE\pmspl.dll
C:\WINDOWS\SYSTEM32\DLLCACHE\prflbmsg.dll
C:\WINDOWS\SYSTEM32\DLLCACHE\print.exe
C:\WINDOWS\SYSTEM32\DLLCACHE\qappsrv.exe
C:\WINDOWS\SYSTEM32\DLLCACHE\ql1080.sys
C:\WINDOWS\SYSTEM32\DLLCACHE\ql10wnt.sys
C:\WINDOWS\SYSTEM32\DLLCACHE\ql12160.sys
C:\WINDOWS\SYSTEM32\DLLCACHE\ql1240.sys
C:\WINDOWS\SYSTEM32\DLLCACHE\ql1280.sys
C:\WINDOWS\SYSTEM32\DLLCACHE\qosname.dll
C:\WINDOWS\SYSTEM32\DLLCACHE\qwinsta.exe
C:\WINDOWS\SYSTEM32\DLLCACHE\rasautou.exe
C:\WINDOWS\SYSTEM32\DLLCACHE\rasdial.exe
C:\WINDOWS\SYSTEM32\DLLCACHE\rasmontr.dll
C:\WINDOWS\SYSTEM32\DLLCACHE\rasmxs.dll
C:\WINDOWS\SYSTEM32\DLLCACHE\rasrad.dll
C:\WINDOWS\SYSTEM32\DLLCACHE\rasser.dll
C:\WINDOWS\SYSTEM32\DLLCACHE\rawwan.sys
C:\WINDOWS\SYSTEM32\DLLCACHE\rdpcfgex.dll
C:\WINDOWS\SYSTEM32\DLLCACHE\recover.exe
C:\WINDOWS\SYSTEM32\DLLCACHE\regedt32.exe
C:\WINDOWS\SYSTEM32\DLLCACHE\regini.exe
C:\WINDOWS\SYSTEM32\DLLCACHE\regwiz.exe
C:\WINDOWS\SYSTEM32\DLLCACHE\relog.exe
C:\WINDOWS\SYSTEM32\DLLCACHE\rend.dll
C:\WINDOWS\SYSTEM32\DLLCACHE\replace.exe
C:\WINDOWS\SYSTEM32\DLLCACHE\reset.exe
C:\WINDOWS\SYSTEM32\DLLCACHE\rio8drv.sys
C:\WINDOWS\SYSTEM32\DLLCACHE\riodrv.sys
C:\WINDOWS\SYSTEM32\DLLCACHE\rmcast.sys
C:\WINDOWS\SYSTEM32\DLLCACHE\rnr20.dll
C:\WINDOWS\SYSTEM32\DLLCACHE\rootmdm.sys
C:\WINDOWS\SYSTEM32\DLLCACHE\route.exe
C:\WINDOWS\SYSTEM32\DLLCACHE\routemon.exe
C:\WINDOWS\SYSTEM32\DLLCACHE\routetab.dll
C:\WINDOWS\SYSTEM32\DLLCACHE\rpcns4.dll
C:\WINDOWS\SYSTEM32\DLLCACHE\rsfsaps.dll
C:\WINDOWS\SYSTEM32\DLLCACHE\rsm.exe
C:\WINDOWS\SYSTEM32\DLLCACHE\rsmsink.exe
C:\WINDOWS\SYSTEM32\DLLCACHE\rsmui.exe
C:\WINDOWS\SYSTEM32\DLLCACHE\rsopprov.exe
C:\WINDOWS\SYSTEM32\DLLCACHE\rsvpmsg.dll
C:\WINDOWS\SYSTEM32\DLLCACHE\rsvpsp.dll
C:\WINDOWS\SYSTEM32\DLLCACHE\rtm.dll
C:\WINDOWS\SYSTEM32\DLLCACHE\runas.exe
C:\WINDOWS\SYSTEM32\DLLCACHE\rwinsta.exe
C:\WINDOWS\SYSTEM32\DLLCACHE\sapisvr.exe
C:\WINDOWS\SYSTEM32\DLLCACHE\scardssp.dll
C:\WINDOWS\SYSTEM32\DLLCACHE\scredir.dll
C:\WINDOWS\SYSTEM32\DLLCACHE\scriptpw.dll
C:\WINDOWS\SYSTEM32\DLLCACHE\sdpblb.dll
C:\WINDOWS\SYSTEM32\DLLCACHE\senscfg.dll
C:\WINDOWS\SYSTEM32\DLLCACHE\serialui.dll
C:\WINDOWS\SYSTEM32\DLLCACHE\serwvdrv.dll
C:\WINDOWS\SYSTEM32\DLLCACHE\setupdll.dll
C:\WINDOWS\SYSTEM32\DLLCACHE\sfc.exe
C:\WINDOWS\SYSTEM32\DLLCACHE\sfmapi.dll
C:\WINDOWS\SYSTEM32\DLLCACHE\shadow.exe
C:\WINDOWS\SYSTEM32\DLLCACHE\share.exe
C:\WINDOWS\SYSTEM32\DLLCACHE\shell.dll
C:\WINDOWS\SYSTEM32\DLLCACHE\sisbkup.dll
C:\WINDOWS\SYSTEM32\DLLCACHE\skdll.dll TABLE IV-continued Windows Essential System Files C:\WINDOWS\SYSTEM32\DLLCACHE\slbrcsp.dll
C:\WINDOWS\SYSTEM32\DLLCACHE\smclib.sys
C:\WINDOWS\SYSTEM32\DLLCACHE\smtpcons.dll
C:\WINDOWS\SYSTEM32\DLLCACHE\sort.exe
C:\WINDOWS\SYSTEM32\DLLCACHE\sparrow.sys
C:\WINDOWS\SYSTEM32\DLLCACHE\spcommon.dll
C:\WINDOWS\SYSTEM32\DLLCACHE\spcplui.dll
C:\WINDOWS\SYSTEM32\DLLCACHE\spnike.dll
C:\WINDOWS\SYSTEM32\DLLCACHE\sprestrt.exe
C:\WINDOWS\SYSTEM32\DLLCACHE\sprio600.dll
C:\WINDOWS\SYSTEM32\DLLCACHE\sprio800.dll
C:\WINDOWS\SYSTEM32\DLLCACHE\spttseng.dll
C:\WINDOWS\SYSTEM32\DLLCACHE\spxcoins.dll
C:\WINDOWS\SYSTEM32\DLLCACHE\srdiag.exe
C:\WINDOWS\SYSTEM32\DLLCACHE\stclient.dll
C:\WINDOWS\SYSTEM32\DLLCACHE\storage.dll
C:\WINDOWS\SYSTEM32\DLLCACHE\stream.sys
C:\WINDOWS\SYSTEM32\DLLCACHE\streamci.dll
C:\WINDOWS\SYSTEM32\DLLCACHE\subst.exe
C:\WINDOWS\SYSTEM32\DLLCACHE\svcpack.dll
C:\WINDOWS\SYSTEM32\DLLCACHE\swmidi.sys
C:\WINDOWS\SYSTEM32\DLLCACHE\swprv.dll
C:\WINDOWS\SYSTEM32\DLLCACHE\sym_hi.sys
C:\WINDOWS\SYSTEM32\DLLCACHE\sym_u3.sys
C:\WINDOWS\SYSTEM32\DLLCACHE\symc810.sys
C:\WINDOWS\SYSTEM32\DLLCACHE\symc8xx.sys
C:\WINDOWS\SYSTEM32\DLLCACHE\syncapp.exe
C:\WINDOWS\SYSTEM32\DLLCACHE\sysedit.exe
C:\WINDOWS\SYSTEM32\DLLCACHE\sysinfo.exe
C:\WINDOWS\SYSTEM32\DLLCACHE\sysinv.dll
C:\WINDOWS\SYSTEM32\DLLCACHE\syskey.exe
C:\WINDOWS\SYSTEM32\DLLCACHE\systray.exe
C:\WINDOWS\SYSTEM32\DLLCACHE\tapi.dll
C:\WINDOWS\SYSTEM32\DLLCACHE\tapiui.dll
C:\WINDOWS\SYSTEM32\DLLCACHE\taskkill.exe
C:\WINDOWS\SYSTEM32\DLLCACHE\tasklist.exe
C:\WINDOWS\SYSTEM32\DLLCACHE\taskman.exe
C:\WINDOWS\SYSTEM32\DLLCACHE\tcmsetup.exe
C:\WINDOWS\SYSTEM32\DLLCACHE\tcpsvcs.exe
C:\WINDOWS\SYSTEM32\DLLCACHE\tftp.exe
C:\WINDOWS\SYSTEM32\DLLCACHE\tmplprov.dll
C:\WINDOWS\SYSTEM32\DLLCACHE\toolhelp.dll
C:\WINDOWS\SYSTEM32\DLLCACHE\tosdvd.sys
C:\WINDOWS\SYSTEM32\DLLCACHE\toside.sys
C:\WINDOWS\SYSTEM32\DLLCACHE\tourW.exe
C:\WINDOWS\SYSTEM32\DLLCACHE\tracert6.exe
C:\WINDOWS\SYSTEM32\DLLCACHE\trnsprov.dll
C:\WINDOWS\SYSTEM32\DLLCACHE\tsappcmp.dll
C:\WINDOWS\SYSTEM32\DLLCACHE\tsbvcap.sys
C:\WINDOWS\SYSTEM32\DLLCACHE\tsbyuv.dll
C:\WINDOWS\SYSTEM32\DLLCACHE\tscon.exe
C:\WINDOWS\SYSTEM32\DLLCACHE\tsdiscon.exe
C:\WINDOWS\SYSTEM32\DLLCACHE\tskill.exe
C:\WINDOWS\SYSTEM32\DLLCACHE\tsshutdn.exe
C:\WINDOWS\SYSTEM32\DLLCACHE\twain.dll
C:\WINDOWS\SYSTEM32\DLLCACHE\twunk_16.exe
C:\WINDOWS\SYSTEM32\DLLCACHE\twunk_32.exe
C:\WINDOWS\SYSTEM32\DLLCACHE\typelib.dll
C:\WINDOWS\SYSTEM32\DLLCACHE\typeperf.exe
C:\WINDOWS\SYSTEM32\DLLCACHE\ufat.dll
C:\WINDOWS\SYSTEM32\DLLCACHE\ultra.sys
C:\WINDOWS\SYSTEM32\DLLCACHE\umdmxfrm.dll
C:\WINDOWS\SYSTEM32\DLLCACHE\unlodctr.exe
C:\WINDOWS\SYSTEM32\DLLCACHE\unsecapp.exe
C:\WINDOWS\SYSTEM32\DLLCACHE\updprov.dll
C:\WINDOWS\SYSTEM32\DLLCACHE\ureg.dll
C:\WINDOWS\SYSTEM32\DLLCACHE\usbaudio.sys
C:\WINDOWS\SYSTEM32\DLLCACHE\usbcamd.sys
C:\WINDOWS\SYSTEM32\DLLCACHE\usbcamd2.sys
C:\WINDOWS\SYSTEM32\DLLCACHE\usbccgp.sys
C:\WINDOWS\SYSTEM32\DLLCACHE\usrcntra.dll
C:\WINDOWS\SYSTEM32\DLLCACHE\usrcoina.dll
C:\WINDOWS\SYSTEM32\DLLCACHE\usrdpa.dll
C:\WINDOWS\SYSTEM32\DLLCACHE\usrdtea.dll
C:\WINDOWS\SYSTEM32\DLLCACHE\usrfaxa.dll
C:\WINDOWS\SYSTEM32\DLLCACHE\usrmlnka.exe
C:\WINDOWS\SYSTEM32\DLLCACHE\usrprbda.exe
C:\WINDOWS\SYSTEM32\DLLCACHE\usrrtosa.dll TABLE IV-continued Windows Essential System Files C:\WINDOWS\SYSTEM32\DLLCACHE\usrsdpia.dll
C:\WINDOWS\SYSTEM32\DLLCACHE\usrsvpia.dll
C:\WINDOWS\SYSTEM32\DLLCACHE\usrv42a.dll
C:\WINDOWS\SYSTEM32\DLLCACHE\usrvoica.dll
C:\WINDOWS\SYSTEM32\DLLCACHE\usrvpa.dll
C:\WINDOWS\SYSTEM32\DLLCACHE\vcdex.dll
C:\WINDOWS\SYSTEM32\DLLCACHE\vdmindvd.sys
C:\WINDOWS\SYSTEM32\DLLCACHE\ver.dll
C:\WINDOWS\SYSTEM32\DLLCACHE\verifier.dll
C:\WINDOWS\SYSTEM32\DLLCACHE\verifier.exe
C:\WINDOWS\SYSTEM32\DLLCACHE\vfwwdm32.dll
C:\WINDOWS\SYSTEM32\DLLCACHE\vga256.dll
C:\WINDOWS\SYSTEM32\DLLCACHE\vga64k.dll
C:\WINDOWS\SYSTEM32\DLLCACHE\vjoy.dll
C:\WINDOWS\SYSTEM32\DLLCACHE\vmmreg32.dll
C:\WINDOWS\SYSTEM32\DLLCACHE\vss_ps.dll
C:\WINDOWS\SYSTEM32\DLLCACHE\vssadmin.exe
C:\WINDOWS\SYSTEM32\DLLCACHE\vwipxspx.dll
C:\WINDOWS\SYSTEM32\DLLCACHE\vwipxspx.exe
C:\WINDOWS\SYSTEM32\DLLCACHE\w32tm.exe
C:\WINDOWS\SYSTEM32\DLLCACHE\W32topl.dll
C:\WINDOWS\SYSTEM32\DLLCACHE\wavemsp.dll
C:\WINDOWS\SYSTEM32\DLLCACHE\wbemads.dll
C:\WINDOWS\SYSTEM32\DLLCACHE\webhits.dll
C:\WINDOWS\SYSTEM32\DLLCACHE\wiavusd.dll
C:\WINDOWS\SYSTEM32\DLLCACHE\wifeman.dll
C:\WINDOWS\SYSTEM32\DLLCACHE\win87em.dll
C:\WINDOWS\SYSTEM32\DLLCACHE\winchat.exe
C:\WINDOWS\SYSTEM32\DLLCACHE\winfax.dll
C:\WINDOWS\SYSTEM32\DLLCACHE\winhelp.exe
C:\WINDOWS\SYSTEM32\DLLCACHE\winmgmt.exe
C:\WINDOWS\SYSTEM32\DLLCACHE\winmgmtr.dll
C:\WINDOWS\SYSTEM32\DLLCACHE\winmsd.exe
C:\WINDOWS\SYSTEM32\DLLCACHE\winspool.exe
C:\WINDOWS\SYSTEM32\DLLCACHE\winstrm.dll
C:\WINDOWS\SYSTEM32\DLLCACHE\wisc10.dll
C:\WINDOWS\SYSTEM32\DLLCACHE\wmerrenu.dll
C:\WINDOWS\SYSTEM32\DLLCACHE\wmimsg.dll
C:\WINDOWS\SYSTEM32\DLLCACHE\wmipicmp.dll
C:\WINDOWS\SYSTEM32\DLLCACHE\wmiprop.dll
C:\WINDOWS\SYSTEM32\DLLCACHE\wmiscmgr.dll
C:\WINDOWS\SYSTEM32\DLLCACHE\wmitimep.dll
C:\WINDOWS\SYSTEM32\DLLCACHE\wowdeb.exe
C:\WINDOWS\SYSTEM32\DLLCACHE\wowexec.exe
C:\WINDOWS\SYSTEM32\DLLCACHE\wowfax.dll
C:\WINDOWS\SYSTEM32\DLLCACHE\wowfaxui.dll
C:\WINDOWS\SYSTEM32\DLLCACHE\write.exe
C:\WINDOWS\SYSTEM32\DLLCACHE\ws2ifsl.sys
C:\WINDOWS\SYSTEM32\DLLCACHE\wshatm.dll
C:\WINDOWS\SYSTEM32\DLLCACHE\wshisn.dll
C:\WINDOWS\SYSTEM32\DLLCACHE\wuauclt.exe
C:\WINDOWS\SYSTEM32\DLLCACHE\wuaueng.dll
C:\WINDOWS\SYSTEM32\dllhost.exe
C:\WINDOWS\SYSTEM32\DLLHST3G.EXE
C:\WINDOWS\SYSTEM32\dmadmin.exe
C:\WINDOWS\SYSTEM32\dmband.dll
C:\WINDOWS\SYSTEM32\dmcompos.dll
C:\WINDOWS\SYSTEM32\DMCONFIG.DLL
C:\WINDOWS\SYSTEM32\DMDLGS.DLL
C:\WINDOWS\SYSTEM32\dmdskmgr.dll
C:\WINDOWS\SYSTEM32\DMDSKRES.DLL
C:\WINDOWS\SYSTEM32\dmime.dll
C:\WINDOWS\SYSTEM32\DMINTF.DLL
C:\WINDOWS\SYSTEM32\dmloader.dll
C:\WINDOWS\SYSTEM32\DMOCX.DLL
C:\WINDOWS\SYSTEM32\dmremote.exe
C:\WINDOWS\SYSTEM32\dmscript.dll
C:\WINDOWS\SYSTEM32\dmserver.dll
C:\WINDOWS\SYSTEM32\dmstyle.dll
C:\WINDOWS\SYSTEM32\dmsynth.dll
C:\WINDOWS\SYSTEM32\dmusic.dll
C:\WINDOWS\SYSTEM32\dmutil.dll
C:\WINDOWS\SYSTEM32\dnsapi.dll
C:\WINDOWS\SYSTEM32\dnsrslvr.dll
C:\WINDOWS\SYSTEM32\DOCPROP.DLL
C:\WINDOWS\SYSTEM32\docprop2.dll
C:\WINDOWS\SYSTEM32\DOSKEY.EXE
C:\WINDOWS\SYSTEM32\dosx.exe TABLE IV-continued Windows Essential System Files C:\WINDOWS\SYSTEM32\dpcdll.dll
C:\WINDOWS\SYSTEM32\DPLAY.DLL
C:\WINDOWS\SYSTEM32\dplaysvr.exe
C:\WINDOWS\SYSTEM32\dplayx.dll
C:\WINDOWS\SYSTEM32\dpmodemx.dll
C:\WINDOWS\SYSTEM32\dpnaddr.dll
C:\WINDOWS\SYSTEM32\dpnet.dll
C:\WINDOWS\SYSTEM32\dpnhpast.dll
C:\WINDOWS\SYSTEM32\dpnhupnp.dll
C:\WINDOWS\SYSTEM32\dpnlobby.dll
C:\WINDOWS\SYSTEM32\DPNMODEM.DLL
C:\WINDOWS\SYSTEM32\dpnsvr.exe
C:\WINDOWS\SYSTEM32\DPNWSOCK.DLL
C:\WINDOWS\SYSTEM32\DPSERIAL.DLL
C:\WINDOWS\SYSTEM32\dpvacm.dll
C:\WINDOWS\SYSTEM32\dpvoice.dll
C:\WINDOWS\SYSTEM32\dpvsetup.exe
C:\WINDOWS\SYSTEM32\dpvvox.dll
C:\WINDOWS\SYSTEM32\DPWSOCK.DLL
C:\WINDOWS\SYSTEM32\dpwsockx.dll
C:\WINDOWS\SYSTEM32\driverquery.exe
C:\WINDOWS\SYSTEM32\DRIVERS\a302.sys
C:\WINDOWS\SYSTEM32\DRIVERS\a303.sys
C:\WINDOWS\SYSTEM32\DRIVERS\a304.sys
C:\WINDOWS\SYSTEM32\DRIVERS\a305.sys
C:\WINDOWS\SYSTEM32\DRIVERS\a306.sys
C:\WINDOWS\SYSTEM32\DRIVERS\a307.sys
C:\WINDOWS\SYSTEM32\DRIVERS\a308.sys
C:\WINDOWS\SYSTEM32\DRIVERS\a309.sys
C:\WINDOWS\SYSTEM32\DRIVERS\a310.sys
C:\WINDOWS\SYSTEM32\DRIVERS\a311.sys
C:\WINDOWS\SYSTEM32\DRIVERS\a313.sys
C:\WINDOWS\SYSTEM32\DRIVERS\a314.sys
C:\WINDOWS\SYSTEM32\DRIVERS\a347bus.sys
C:\WINDOWS\SYSTEM32\DRIVERS\a347scsi.sys
C:\WINDOWS\SYSTEM32\DRIVERS\ABP480N5.SYS
C:\WINDOWS\SYSTEM32\DRIVERS\acpi.sys
C:\WINDOWS\SYSTEM32\DRIVERS\ACPIEC.SYS
C:\WINDOWS\SYSTEM32\DRIVERS\ADPU160M.SYS
C:\WINDOWS\SYSTEM32\DRIVERS\adv01nt5.dll
C:\WINDOWS\SYSTEM32\DRIVERS\adv02nt5.dll
C:\WINDOWS\SYSTEM32\DRIVERS\adv05nt5.dll
C:\WINDOWS\SYSTEM32\DRIVERS\adv07nt5.dll
C:\WINDOWS\SYSTEM32\DRIVERS\adv08nt5.dll
C:\WINDOWS\SYSTEM32\DRIVERS\adv09nt5.dll
C:\WINDOWS\SYSTEM32\DRIVERS\adv11nt5.dll
C:\WINDOWS\SYSTEM32\DRIVERS\aec.sys
C:\WINDOWS\SYSTEM32\DRIVERS\afd.sys
C:\WINDOWS\SYSTEM32\DRIVERS\agp440.sys
C:\WINDOWS\SYSTEM32\DRIVERS\agpcpq.sys
C:\WINDOWS\SYSTEM32\DRIVERS\AHA154X.SYS
C:\WINDOWS\SYSTEM32\DRIVERS\AIC78U2.SYS
C:\WINDOWS\SYSTEM32\DRIVERS\AIC78XX.SYS
C:\WINDOWS\SYSTEM32\DRIVERS\ALIIDE.SYS
C:\WINDOWS\SYSTEM32\DRIVERS\alim1541.sys
C:\WINDOWS\SYSTEM32\DRIVERS\amdagp.sys
C:\WINDOWS\SYSTEM32\DRIVERS\amdk6.sys
C:\WINDOWS\SYSTEM32\DRIVERS\amdk7.sys
C:\WINDOWS\SYSTEM32\DRIVERS\AMSINT.SYS
C:\WINDOWS\SYSTEM32\DRIVERS\ar5211.sys
C:\WINDOWS\SYSTEM32\DRIVERS\arp1394.sys
C:\WINDOWS\SYSTEM32\DRIVERS\ASC.SYS
C:\WINDOWS\SYSTEM32\DRIVERS\ASC3350P.SYS
C:\WINDOWS\SYSTEM32\DRIVERS\ASC3550.SYS
C:\WINDOWS\SYSTEM32\DRIVERS\asctrm.sys
C:\WINDOWS\SYSTEM32\DRIVERS\asyncmac.sys
C:\WINDOWS\SYSTEM32\DRIVERS\atapi.sys
C:\WINDOWS\SYSTEM32\DRIVERS\ati1btxx.sys
C:\WINDOWS\SYSTEM32\DRIVERS\ati1mdxx.sys
C:\WINDOWS\SYSTEM32\DRIVERS\ati1pdxx.sys
C:\WINDOWS\SYSTEM32\DRIVERS\ati1raxx.sys
C:\WINDOWS\SYSTEM32\DRIVERS\ati1rvxx.sys
C:\WINDOWS\SYSTEM32\DRIVERS\ati1snxx.sys
C:\WINDOWS\SYSTEM32\DRIVERS\ati1ttxx.sys
C:\WINDOWS\SYSTEM32\DRIVERS\ati1tuxx.sys
C:\WINDOWS\SYSTEM32\DRIVERS\ati1xbxx.sys
C:\WINDOWS\SYSTEM32\DRIVERS\ati1xsxx.sys
C:\WINDOWS\SYSTEM32\DRIVERS\ati2mtaa.sys TABLE IV-continued Windows Essential System Files C:\WINDOWS\SYSTEM32\DRIVERS\ati2mtag.sys
C:\WINDOWS\SYSTEM32\DRIVERS\atinbtxx.sys
C:\WINDOWS\SYSTEM32\DRIVERS\atinmdxx.sys
C:\WINDOWS\SYSTEM32\DRIVERS\atinpdxx.sys
C:\WINDOWS\SYSTEM32\DRIVERS\atinraxx.sys
C:\WINDOWS\SYSTEM32\DRIVERS\atinrvxx.sys
C:\WINDOWS\SYSTEM32\DRIVERS\atinsnxx.sys
C:\WINDOWS\SYSTEM32\DRIVERS\atinttxx.sys
C:\WINDOWS\SYSTEM32\DRIVERS\atintuxx.sys
C:\WINDOWS\SYSTEM32\DRIVERS\atinxbxx.sys
C:\WINDOWS\SYSTEM32\DRIVERS\atinxsxx.sys
C:\WINDOWS\SYSTEM32\DRIVERS\atmarpc.sys
C:\WINDOWS\SYSTEM32\DRIVERS\ATMEPVC.SYS
C:\WINDOWS\SYSTEM32\DRIVERS\atmlane.sys
C:\WINDOWS\SYSTEM32\DRIVERS\ATMUNI.SYS
C:\WINDOWS\SYSTEM32\DRIVERS\atv01nt5.dll
C:\WINDOWS\SYSTEM32\DRIVERS\atv02nt5.dll
C:\WINDOWS\SYSTEM32\DRIVERS\atv04nt5.dll
C:\WINDOWS\SYSTEM32\DRIVERS\atv06nt5.dll
C:\WINDOWS\SYSTEM32\DRIVERS\atv10nt5.dll
C:\WINDOWS\SYSTEM32\DRIVERS\AUDSTUB.SYS
C:\WINDOWS\SYSTEM32\DRIVERS\BATTC.SYS
C:\WINDOWS\SYSTEM32\DRIVERS\bcm4sbxp.sys
C:\WINDOWS\SYSTEM32\DRIVERS\BCMSM.sys
C:\WINDOWS\SYSTEM32\DRIVERS\bcmwl5.sys
C:\WINDOWS\SYSTEM32\DRIVERS\bdasup.sys
C:\WINDOWS\SYSTEM32\DRIVERS\BEEP.SYS
C:\WINDOWS\SYSTEM32\DRIVERS\bridge.sys
C:\WINDOWS\SYSTEM32\DRIVERS\bthenum.sys
C:\WINDOWS\SYSTEM32\DRIVERS\bthmodem.sys
C:\WINDOWS\SYSTEM32\DRIVERS\bthpan.sys
C:\WINDOWS\SYSTEM32\DRIVERS\bthport.sys
C:\WINDOWS\SYSTEM32\DRIVERS\bthprint.sys
C:\WINDOWS\SYSTEM32\DRIVERS\bthusb.sys
C:\WINDOWS\SYSTEM32\DRIVERS\Camdrl.sys
C:\WINDOWS\SYSTEM32\DRIVERS\CamDrL21.sys
C:\WINDOWS\SYSTEM32\DRIVERS\CBIDF2K.SYS
C:\WINDOWS\SYSTEM32\DRIVERS\ccdecode.sys
C:\WINDOWS\SYSTEM32\DRIVERS\CD20XRNT.SYS
C:\WINDOWS\SYSTEM32\DRIVERS\CDAUDIO.SYS
C:\WINDOWS\SYSTEM32\DRIVERS\cdfs.sys
C:\WINDOWS\SYSTEM32\DRIVERS\cdrom.sys
C:\WINDOWS\SYSTEM32\DRIVERS\ch7xxnt5.dll
C:\WINDOWS\SYSTEM32\DRIVERS\CINEMST2.SYS
C:\WINDOWS\SYSTEM32\DRIVERS\classpnp.sys
C:\WINDOWS\SYSTEM32\DRIVERS\cmbatt.sys
C:\WINDOWS\SYSTEM32\DRIVERS\CMDIDE.SYS
C:\WINDOWS\SYSTEM32\DRIVERS\COMPBATT.SYS
C:\WINDOWS\SYSTEM32\DRIVERS\CPQARRAY.SYS
C:\WINDOWS\SYSTEM32\DRIVERS\CPQDAP01.SYS
C:\WINDOWS\SYSTEM32\DRIVERS\crusoe.sys
C:\WINDOWS\SYSTEM32\DRIVERS\csco21.sys
C:\WINDOWS\SYSTEM32\DRIVERS\csco21p.sys
C:\WINDOWS\SYSTEM32\DRIVERS\CW10.sys
C:\WINDOWS\SYSTEM32\DRIVERS\DAC2W2K.SYS
C:\WINDOWS\SYSTEM32\DRIVERS\DAC960NT.SYS
C:\WINDOWS\SYSTEM32\DRIVERS\disk.sys
C:\WINDOWS\SYSTEM32\DRIVERS\diskdump.sys
C:\WINDOWS\SYSTEM32\DRIVERS\dmboot.sys
C:\WINDOWS\SYSTEM32\DRIVERS\dmio.sys
C:\WINDOWS\SYSTEM32\DRIVERS\DMLOAD.SYS
C:\WINDOWS\SYSTEM32\DRIVERS\dmusic.sys
C:\WINDOWS\SYSTEM32\DRIVERS\DPTI2O.SYS
C:\WINDOWS\SYSTEM32\DRIVERS\drmk.sys
C:\WINDOWS\SYSTEM32\DRIVERS\drmkaud.sys
C:\WINDOWS\SYSTEM32\DRIVERS\drvmcdb.sys
C:\WINDOWS\SYSTEM32\DRIVERS\drvnddm.sys
C:\WINDOWS\SYSTEM32\DRIVERS\DXAPI.SYS
C:\WINDOWS\SYSTEM32\DRIVERS\dxg.sys
C:\WINDOWS\SYSTEM32\DRIVERS\DXGTHK.SYS
C:\WINDOWS\SYSTEM32\DRIVERS\fastfat.sys
C:\WINDOWS\SYSTEM32\DRIVERS\fdc.sys
C:\WINDOWS\SYSTEM32\DRIVERS\FIPS.SYS
C:\WINDOWS\SYSTEM32\DRIVERS\flpydisk.sys
C:\WINDOWS\SYSTEM32\DRIVERS\fltmgr.sys
C:\WINDOWS\SYSTEM32\DRIVERS\FS_REC.SYS
C:\WINDOWS\SYSTEM32\DRIVERS\FSVGA.SYS
C:\WINDOWS\SYSTEM32\DRIVERS\FTDISK.SYS

TABLE IV-continued

Windows Essential System Files

C:\WINDOWS\SYSTEM32\DRIVERS\gagp30kx.sys
C:\WINDOWS\SYSTEM32\DRIVERS\hidbth.sys
C:\WINDOWS\SYSTEM32\DRIVERS\hidclass.sys
C:\WINDOWS\SYSTEM32\DRIVERS\hidir.sys
C:\WINDOWS\SYSTEM32\DRIVERS\hidparse.sys
C:\WINDOWS\SYSTEM32\DRIVERS\hidusb.sys
C:\WINDOWS\SYSTEM32\DRIVERS\HPN.SYS
C:\WINDOWS\SYSTEM32\DRIVERS\hsfbs2s2.sys
C:\WINDOWS\SYSTEM32\DRIVERS\hsfcxts2.sys
C:\WINDOWS\SYSTEM32\DRIVERS\hsfdpsp2.sys
C:\WINDOWS\SYSTEM32\DRIVERS\http.sys
C:\WINDOWS\SYSTEM32\DRIVERS\i2omgmt.sys
C:\WINDOWS\SYSTEM32\DRIVERS\i2omp.sys
C:\WINDOWS\SYSTEM32\DRIVERS\i8042prt.sys
C:\WINDOWS\SYSTEM32\DRIVERS\ialmkchw.sys
C:\WINDOWS\SYSTEM32\DRIVERS\ialmnt5.sys
C:\WINDOWS\SYSTEM32\DRIVERS\ialmsbw.sys
C:\WINDOWS\SYSTEM32\DRIVERS\imagedrv.sys
C:\WINDOWS\SYSTEM32\DRIVERS\imagesrv.sys
C:\WINDOWS\SYSTEM32\DRIVERS\imapi.sys
C:\WINDOWS\SYSTEM32\DRIVERS\INI910U.SYS
C:\WINDOWS\SYSTEM32\DRIVERS\intelide.sys
C:\WINDOWS\SYSTEM32\DRIVERS\intelppm.sys
C:\WINDOWS\SYSTEM32\DRIVERS\ip6fw.sys
C:\WINDOWS\SYSTEM32\DRIVERS\IPFLTDRV.SYS
C:\WINDOWS\SYSTEM32\DRIVERS\ipinip.sys
C:\WINDOWS\SYSTEM32\DRIVERS\ipnat.sys
C:\WINDOWS\SYSTEM32\DRIVERS\ipsec.sys
C:\WINDOWS\SYSTEM32\DRIVERS\irbus.sys
C:\WINDOWS\SYSTEM32\DRIVERS\irenum.sys
C:\WINDOWS\SYSTEM32\DRIVERS\ISAPNP.SYS
C:\WINDOWS\SYSTEM32\DRIVERS\kbdclass.sys
C:\WINDOWS\SYSTEM32\DRIVERS\kbdhid.sys
C:\WINDOWS\SYSTEM32\DRIVERS\kmixer.sys
C:\WINDOWS\SYSTEM32\DRIVERS\ks.sys
C:\WINDOWS\SYSTEM32\DRIVERS\ksecdd.sys
C:\WINDOWS\SYSTEM32\DRIVERS\lgatbus.sys
C:\WINDOWS\SYSTEM32\DRIVERS\lgatcm.sys
C:\WINDOWS\SYSTEM32\DRIVERS\lgatcmnt.sys
C:\WINDOWS\SYSTEM32\DRIVERS\lgatmdm.sys
C:\WINDOWS\SYSTEM32\DRIVERS\lgatserd.sys
C:\WINDOWS\SYSTEM32\DRIVERS\lgatwh.sys
C:\WINDOWS\SYSTEM32\DRIVERS\lgatwhnt.sys
C:\WINDOWS\SYSTEM32\DRIVERS\LVSVF2.sys
C:\WINDOWS\SYSTEM32\DRIVERS\LVUSBSta.sys
C:\WINDOWS\SYSTEM32\DRIVERS\MCD.SYS
C:\WINDOWS\SYSTEM32\DRIVERS\mdc8021x.sys
C:\WINDOWS\SYSTEM32\DRIVERS\mdmxsdk.sys
C:\WINDOWS\SYSTEM32\DRIVERS\mf.sys
C:\WINDOWS\SYSTEM32\DRIVERS\MNMDD.SYS
C:\WINDOWS\SYSTEM32\DRIVERS\modem.sys
C:\WINDOWS\SYSTEM32\DRIVERS\mouclass.sys
C:\WINDOWS\SYSTEM32\DRIVERS\mouhid.sys
C:\WINDOWS\SYSTEM32\DRIVERS\mountmgr.sys
C:\WINDOWS\SYSTEM32\DRIVERS\mpe.sys
C:\WINDOWS\SYSTEM32\DRIVERS\mqac.sys
C:\WINDOWS\SYSTEM32\DRIVERS\MRAID35X.SYS
C:\WINDOWS\SYSTEM32\DRIVERS\mrxday.sys
C:\WINDOWS\SYSTEM32\DRIVERS\mrxsmb.sys
C:\WINDOWS\SYSTEM32\DRIVERS\msdv.sys
C:\WINDOWS\SYSTEM32\DRIVERS\msfs.sys
C:\WINDOWS\SYSTEM32\DRIVERS\msgpc.sys
C:\WINDOWS\SYSTEM32\DRIVERS\mskssrv.sys
C:\WINDOWS\SYSTEM32\DRIVERS\mspclock.sys
C:\WINDOWS\SYSTEM32\DRIVERS\mspqm.sys
C:\WINDOWS\SYSTEM32\DRIVERS\mssmbios.sys
C:\WINDOWS\SYSTEM32\DRIVERS\mstee.sys
C:\WINDOWS\SYSTEM32\DRIVERS\mtlmnt5.sys
C:\WINDOWS\SYSTEM32\DRIVERS\mtlstrm.sys
C:\WINDOWS\SYSTEM32\DRIVERS\mtxparhm.sys
C:\WINDOWS\SYSTEM32\DRIVERS\mup.sys
C:\WINDOWS\SYSTEM32\DRIVERS\mutohpen.sys
C:\WINDOWS\SYSTEM32\DRIVERS\MxlW2k.sys
C:\WINDOWS\SYSTEM32\DRIVERS\nabtsfec.sys
C:\WINDOWS\SYSTEM32\DRIVERS\NaiFiltr.sys
C:\WINDOWS\SYSTEM32\DRIVERS\ndis.sys
C:\WINDOWS\SYSTEM32\DRIVERS\ndisip.sys
C:\WINDOWS\SYSTEM32\DRIVERS\NDISTAPI.SYS TABLE IV-continued Windows Essential System Files C:\WINDOWS\SYSTEM32\DRIVERS\ndisuio.sys
C:\WINDOWS\SYSTEM32\DRIVERS\ndiswan.sys
C:\WINDOWS\SYSTEM32\DRIVERS\NDPROXY.SYS
C:\WINDOWS\SYSTEM32\DRIVERS\netbios.sys
C:\WINDOWS\SYSTEM32\DRIVERS\netbt.sys
C:\WINDOWS\SYSTEM32\DRIVERS\nic1394.sys
C:\WINDOWS\SYSTEM32\DRIVERS\NIKEDRV.SYS
C:\WINDOWS\SYSTEM32\DRIVERS\nmnt.sys
C:\WINDOWS\SYSTEM32\DRIVERS\npf.sys
C:\WINDOWS\SYSTEM32\DRIVERS\npfs.sys
C:\WINDOWS\SYSTEM32\DRIVERS\ntfs.sys
C:\WINDOWS\SYSTEM32\DRIVERS\ntmtlfax.sys
C:\WINDOWS\SYSTEM32\DRIVERS\ntpr11ag.sys
C:\WINDOWS\SYSTEM32\DRIVERS\NULL.SYS
C:\WINDOWS\SYSTEM32\DRIVERS\nv4_mini.sys
C:\WINDOWS\SYSTEM32\DRIVERS\NWLNKFLT.SYS
C:\WINDOWS\SYSTEM32\DRIVERS\NWLNKFWD.SYS
C:\WINDOWS\SYSTEM32\DRIVERS\nwlnkipx.sys
C:\WINDOWS\SYSTEM32\DRIVERS\NWLNKNB.SYS
C:\WINDOWS\SYSTEM32\DRIVERS\NWLNKSPX.SYS
C:\WINDOWS\SYSTEM32\DRIVERS\nwrdr.sys
C:\WINDOWS\SYSTEM32\DRIVERS\odysseyIM3.sys
C:\WINDOWS\SYSTEM32\DRIVERS\omci.sys
C:\WINDOWS\SYSTEM32\DRIVERS\OPRGHDLR.SYS
C:\WINDOWS\SYSTEM32\DRIVERS\p3.sys
C:\WINDOWS\SYSTEM32\DRIVERS\par1284.sys
C:\WINDOWS\SYSTEM32\DRIVERS\parport.sys
C:\WINDOWS\SYSTEM32\DRIVERS\PARTMGR.SYS
C:\WINDOWS\SYSTEM32\DRIVERS\PARVDM.SYS
C:\WINDOWS\SYSTEM32\DRIVERS\pci.sys
C:\WINDOWS\SYSTEM32\DRIVERS\pciide.sys
C:\WINDOWS\SYSTEM32\DRIVERS\pciidex.sys
C:\WINDOWS\SYSTEM32\DRIVERS\pcmcia.sys
C:\WINDOWS\SYSTEM32\DRIVERS\PERC2.SYS
C:\WINDOWS\SYSTEM32\DRIVERS\PERC2HIB.SYS
C:\WINDOWS\SYSTEM32\DRIVERS\portcls.sys
C:\WINDOWS\SYSTEM32\DRIVERS\ppnt.sys
C:\WINDOWS\SYSTEM32\DRIVERS\processr.sys
C:\WINDOWS\SYSTEM32\DRIVERS\psched.sys
C:\WINDOWS\SYSTEM32\DRIVERS\PTILINK.SYS
C:\WINDOWS\SYSTEM32\DRIVERS\pxhelp20.sys
C:\WINDOWS\SYSTEM32\DRIVERS\QL1080.SYS
C:\WINDOWS\SYSTEM32\DRIVERS\QL10WNT.SYS
C:\WINDOWS\SYSTEM32\DRIVERS\QL12160.SYS
C:\WINDOWS\SYSTEM32\DRIVERS\QL1240.SYS
C:\WINDOWS\SYSTEM32\DRIVERS\QL1280.SYS
C:\WINDOWS\SYSTEM32\DRIVERS\RASACD.SYS
C:\WINDOWS\SYSTEM32\DRIVERS\rasl2tp.sys
C:\WINDOWS\SYSTEM32\DRIVERS\raspppoe.sys
C:\WINDOWS\SYSTEM32\DRIVERS\raspptp.sys
C:\WINDOWS\SYSTEM32\DRIVERS\RASPTI.SYS
C:\WINDOWS\SYSTEM32\DRIVERS\RAWWAN.SYS
C:\WINDOWS\SYSTEM32\DRIVERS\rdbss.sys
C:\WINDOWS\SYSTEM32\DRIVERS\RDPCDD.SYS
C:\WINDOWS\SYSTEM32\DRIVERS\rdpdr.sys
C:\WINDOWS\SYSTEM32\DRIVERS\rdpwd.sys
C:\WINDOWS\SYSTEM32\DRIVERS\recagent.sys
C:\WINDOWS\SYSTEM32\DRIVERS\redbook.sys
C:\WINDOWS\SYSTEM32\DRIVERS\rfcomm.sys
C:\WINDOWS\SYSTEM32\DRIVERS\RIO8DRV.SYS
C:\WINDOWS\SYSTEM32\DRIVERS\RIODRV.SYS
C:\WINDOWS\SYSTEM32\DRIVERS\RMCast.sys
C:\WINDOWS\SYSTEM32\DRIVERS\rndismp.sys
C:\WINDOWS\SYSTEM32\DRIVERS\rndismpx.sys
C:\WINDOWS\SYSTEM32\DRIVERS\ROOTMDM.SYS
C:\WINDOWS\SYSTEM32\DRIVERS\s3gnbm.sys
C:\WINDOWS\SYSTEM32\DRIVERS\scsiport.sys
C:\WINDOWS\SYSTEM32\DRIVERS\sdbus.sys
C:\WINDOWS\SYSTEM32\DRIVERS\SECDRV.SYS
C:\WINDOWS\SYSTEM32\DRIVERS\ser2pl.sys
C:\WINDOWS\SYSTEM32\DRIVERS\serenum.sys
C:\WINDOWS\SYSTEM32\DRIVERS\serial.sys
C:\WINDOWS\SYSTEM32\DRIVERS\sffdisk.sys
C:\WINDOWS\SYSTEM32\DRIVERS\sffp_sd.sys
C:\WINDOWS\SYSTEM32\DRIVERS\sfloppy.sys
C:\WINDOWS\SYSTEM32\DRIVERS\siint5.dll
C:\WINDOWS\SYSTEM32\DRIVERS\sisagp.sys
C:\WINDOWS\SYSTEM32\DRIVERS\slip.sys TABLE IV-continued Windows Essential System Files C:\WINDOWS\SYSTEM32\DRIVERS\slnt7554.sys
C:\WINDOWS\SYSTEM32\DRIVERS\slntamr.sys
C:\WINDOWS\SYSTEM32\DRIVERS\slnthal.sys
C:\WINDOWS\SYSTEM32\DRIVERS\slwdmsup.sys
C:\WINDOWS\SYSTEM32\DRIVERS\smbali.sys
C:\WINDOWS\SYSTEM32\DRIVERS\SMCLIB.SYS
C:\WINDOWS\SYSTEM32\DRIVERS\sonydcam.sys
C:\WINDOWS\SYSTEM32\DRIVERS\SPARROW.SYS
C:\WINDOWS\SYSTEM32\DRIVERS\splitter.sys
C:\WINDOWS\SYSTEM32\DRIVERS\sr.sys
C:\WINDOWS\SYSTEM32\DRIVERS\srv.sys
C:\WINDOWS\SYSTEM32\DRIVERS\sscdbhk5.sys
C:\WINDOWS\SYSTEM32\DRIVERS\ssrtln.sys
C:\WINDOWS\SYSTEM32\DRIVERS\stac97.sys
C:\WINDOWS\SYSTEM32\DRIVERS\StMp3Rec.sys
C:\WINDOWS\SYSTEM32\DRIVERS\stream.sys
C:\WINDOWS\SYSTEM32\DRIVERS\streamip.sys
C:\WINDOWS\SYSTEM32\DRIVERS\swenum.sys
C:\WINDOWS\SYSTEM32\DRIVERS\swmidi.sys
C:\WINDOWS\SYSTEM32\DRIVERS\SYM_HI.SYS
C:\WINDOWS\SYSTEM32\DRIVERS\SYM_U3.SYS
C:\WINDOWS\SYSTEM32\DRIVERS\SYMC810.SYS
C:\WINDOWS\SYSTEM32\DRIVERS\SYMC8XX.SYS
C:\WINDOWS\SYSTEM32\DRIVERS\SynTP.sys
C:\WINDOWS\SYSTEM32\DRIVERS\sysaudio.sys
C:\WINDOWS\SYSTEM32\DRIVERS\tap0801.sys
C:\WINDOWS\SYSTEM32\DRIVERS\tapdrvr.sys
C:\WINDOWS\SYSTEM32\DRIVERS\tape.sys
C:\WINDOWS\SYSTEM32\DRIVERS\TCPIP.SYS
C:\WINDOWS\SYSTEM32\DRIVERS\tcpip6.sys
C:\WINDOWS\SYSTEM32\DRIVERS\tdi.sys
C:\WINDOWS\SYSTEM32\DRIVERS\tdpipe.sys
C:\WINDOWS\SYSTEM32\DRIVERS\tdtcp.sys
C:\WINDOWS\SYSTEM32\DRIVERS\termdd.sys
C:\WINDOWS\SYSTEM32\DRIVERS\TOSDVD.SYS
C:\WINDOWS\SYSTEM32\DRIVERS\TOSIDE.SYS
C:\WINDOWS\SYSTEM32\DRIVERS\TSBVCAP.SYS
C:\WINDOWS\SYSTEM32\DRIVERS\Tsknf501.sys
C:\WINDOWS\SYSTEM32\DRIVERS\tunmp.sys
C:\WINDOWS\SYSTEM32\DRIVERS\uagp35.sys
C:\WINDOWS\SYSTEM32\DRIVERS\udfs.sys
C:\WINDOWS\SYSTEM32\DRIVERS\ULTRA.SYS
C:\WINDOWS\SYSTEM32\DRIVERS\update.sys
C:\WINDOWS\SYSTEM32\DRIVERS\usb8023.sys
C:\WINDOWS\SYSTEM32\DRIVERS\usb8023x.sys
C:\WINDOWS\SYSTEM32\DRIVERS\USBAUDIO.sys
C:\WINDOWS\SYSTEM32\DRIVERS\usbcamd.sys
C:\WINDOWS\SYSTEM32\DRIVERS\USBCAMD2.SYS
C:\WINDOWS\SYSTEM32\DRIVERS\usbccgp.sys
C:\WINDOWS\SYSTEM32\DRIVERS\USBD.SYS
C:\WINDOWS\SYSTEM32\DRIVERS\usbehci.sys
C:\WINDOWS\SYSTEM32\DRIVERS\usbhub.sys
C:\WINDOWS\SYSTEM32\DRIVERS\usbintel.sys
C:\WINDOWS\SYSTEM32\DRIVERS\usbport.sys
C:\WINDOWS\SYSTEM32\DRIVERS\usbstor.sys
C:\WINDOWS\SYSTEM32\DRIVERS\usbuhci.sys
C:\WINDOWS\SYSTEM32\DRIVERS\usbvideo.sys
C:\WINDOWS\SYSTEM32\DRIVERS\vch.sys
C:\WINDOWS\SYSTEM32\DRIVERS\vchnt5.dll
C:\WINDOWS\SYSTEM32\DRIVERS\Vcs.sys
C:\WINDOWS\SYSTEM32\DRIVERS\VDMINDVD.SYS
C:\WINDOWS\SYSTEM32\DRIVERS\vga.sys
C:\WINDOWS\SYSTEM32\DRIVERS\viaagp.sys
C:\WINDOWS\SYSTEM32\DRIVERS\viaide.sys
C:\WINDOWS\SYSTEM32\DRIVERS\videoprt.sys
C:\WINDOWS\SYSTEM32\DRIVERS\volsnap.sys
C:\WINDOWS\SYSTEM32\DRIVERS\wa301a.sys
C:\WINDOWS\SYSTEM32\DRIVERS\wa301b.sys
C:\WINDOWS\SYSTEM32\DRIVERS\wacompen.sys
C:\WINDOWS\SYSTEM32\DRIVERS\wadv07nt.sys
C:\WINDOWS\SYSTEM32\DRIVERS\wadv08nt.sys
C:\WINDOWS\SYSTEM32\DRIVERS\wadv09nt.sys
C:\WINDOWS\SYSTEM32\DRIVERS\wadv11nt.sys
C:\WINDOWS\SYSTEM32\DRIVERS\wanarp.sys
C:\WINDOWS\SYSTEM32\DRIVERS\watv06nt.sys
C:\WINDOWS\SYSTEM32\DRIVERS\watv10nt.sys
C:\WINDOWS\SYSTEM32\DRIVERS\wdmaud.sys
C:\WINDOWS\SYSTEM32\DRIVERS\weasel.sys TABLE IV-continued Windows Essential System Files

```
C:\WINDOWS\SYSTEM32\DRIVERS\WMILIB.SYS
C:\WINDOWS\SYSTEM32\DRIVERS\WS2IFSL.SYS
C:\WINDOWS\SYSTEM32\DRIVERS\wstcodec.sys
C:\WINDOWS\SYSTEM32\drmclien.dll
C:\WINDOWS\SYSTEM32\drmstor.dll
C:\WINDOWS\SYSTEM32\drmv2clt.dll
C:\WINDOWS\SYSTEM32\drprov.dll
C:\WINDOWS\SYSTEM32\DRVNPANT.DLL
C:\WINDOWS\SYSTEM32\DRWATSON.EXE
C:\WINDOWS\SYSTEM32\DRWTSN32.EXE
C:\WINDOWS\SYSTEM32\ds16gt.dLL
C:\WINDOWS\SYSTEM32\ds32gt.dll
C:\WINDOWS\SYSTEM32\DSAUTH.DLL
C:\WINDOWS\SYSTEM32\dsdmo.dll
C:\WINDOWS\SYSTEM32\dsdmoprp.dll
C:\WINDOWS\SYSTEM32\DSentry.exe
C:\WINDOWS\SYSTEM32\dskquota.dll
C:\WINDOWS\SYSTEM32\DSKQUOUI.DLL
C:\WINDOWS\SYSTEM32\dsound.dll
C:\WINDOWS\SYSTEM32\dsound3d.dll
C:\WINDOWS\SYSTEM32\dsprop.dll
C:\WINDOWS\SYSTEM32\dsprpres.dll
C:\WINDOWS\SYSTEM32\dsquery.dll
C:\WINDOWS\SYSTEM32\dssec.dll
C:\WINDOWS\SYSTEM32\dssenh.dll
C:\WINDOWS\SYSTEM32\dsuiext.dll
C:\WINDOWS\SYSTEM32\dswave.dll
C:\WINDOWS\SYSTEM32\dumprep.exe
C:\WINDOWS\SYSTEM32\duser.dll
C:\WINDOWS\SYSTEM32\DVDPLAY.EXE
C:\WINDOWS\SYSTEM32\dvdupgrd.exe
C:\WINDOWS\SYSTEM32\dwwin.exe
C:\WINDOWS\SYSTEM32\dx7vb.dll
C:\WINDOWS\SYSTEM32\dx8vb.dll
C:\WINDOWS\SYSTEM32\dxdiag.exe
C:\WINDOWS\SYSTEM32\dxdiagn.dll
C:\WINDOWS\SYSTEM32\dxdllreg.exe
C:\WINDOWS\SYSTEM32\dxmasf.dll
C:\WINDOWS\SYSTEM32\dxtmsft.dll
C:\WINDOWS\SYSTEM32\dxtrans.dll
C:\WINDOWS\SYSTEM32\EDLIN.EXE
C:\WINDOWS\SYSTEM32\efsadu.dll
C:\WINDOWS\SYSTEM32\els.dll
C:\WINDOWS\SYSTEM32\encapi.dll
C:\WINDOWS\SYSTEM32\encdec.dll
C:\WINDOWS\SYSTEM32\EqnClass.Dll
C:\WINDOWS\SYSTEM32\ersvc.dll
C:\WINDOWS\SYSTEM32\es.dll
C:\WINDOWS\SYSTEM32\esent.dll
C:\WINDOWS\SYSTEM32\ESENT97.DLL
C:\WINDOWS\SYSTEM32\ESENTPRF.DLL
C:\WINDOWS\SYSTEM32\ESENTUTL.EXE
C:\WINDOWS\SYSTEM32\eudcedit.exe
C:\WINDOWS\SYSTEM32\EVENTCLS.DLL
C:\WINDOWS\SYSTEM32\eventcreate.exe
C:\WINDOWS\SYSTEM32\eventlog.dll
C:\WINDOWS\SYSTEM32\eventtriggers.exe
C:\WINDOWS\SYSTEM32\EVENTVWR.EXE
C:\WINDOWS\SYSTEM32\EVTGPROV.DLL
C:\WINDOWS\SYSTEM32\EXE2BIN.EXE
C:\WINDOWS\SYSTEM32\EXPAND.EXE
C:\WINDOWS\SYSTEM32\expsrv.dll
C:\WINDOWS\SYSTEM32\extmgr.dll
C:\WINDOWS\SYSTEM32\extrac32.exe
C:\WINDOWS\SYSTEM32\EXTS.DLL
C:\WINDOWS\SYSTEM32\FASTOPEN.EXE
C:\WINDOWS\SYSTEM32\faultrep.dll
C:\WINDOWS\SYSTEM32\faxpatch.exe
C:\WINDOWS\SYSTEM32\FC.EXE
C:\WINDOWS\SYSTEM32\FDE.DLL
C:\WINDOWS\SYSTEM32\fdeploy.dll
C:\WINDOWS\SYSTEM32\feclient.dll
C:\WINDOWS\SYSTEM32\filemgmt.dll
C:\WINDOWS\SYSTEM32\FileOps.exe
C:\WINDOWS\SYSTEM32\FIND.EXE
C:\WINDOWS\SYSTEM32\findstr.exe
C:\WINDOWS\SYSTEM32\FINGER.EXE
C:\WINDOWS\SYSTEM32\FIXMAPI.EXE
```

TABLE IV-continued

Windows Essential System Files

C:\WINDOWS\SYSTEM32\fldrclnr.dll
C:\WINDOWS\SYSTEM32\fltlib.dll
C:\WINDOWS\SYSTEM32\fltmc.exe
C:\WINDOWS\SYSTEM32\FM20.DLL
C:\WINDOWS\SYSTEM32\FM20ENU.DLL
C:\WINDOWS\SYSTEM32\FMIFS.DLL
C:\WINDOWS\SYSTEM32\fontext.dll
C:\WINDOWS\SYSTEM32\FONTSUB.DLL
C:\WINDOWS\SYSTEM32\fontview.exe
C:\WINDOWS\SYSTEM32\FORCEDOS.EXE
C:\WINDOWS\SYSTEM32\framebuf.dll
C:\WINDOWS\SYSTEM32\FREECELL.EXE
C:\WINDOWS\SYSTEM32\fsquirt.exe
C:\WINDOWS\SYSTEM32\FSUSD.DLL
C:\WINDOWS\SYSTEM32\FSUTIL.EXE
C:\WINDOWS\SYSTEM32\ftp.exe
C:\WINDOWS\SYSTEM32\FTSRCH.DLL
C:\WINDOWS\SYSTEM32\fwcfg.dll
C:\WINDOWS\SYSTEM32\fxsapi.dll
C:\WINDOWS\SYSTEM32\FXSCFGWZ.DLL
C:\WINDOWS\SYSTEM32\fxsclnt.exe
C:\WINDOWS\SYSTEM32\fxsclntR.dll
C:\WINDOWS\SYSTEM32\fxscom.dll
C:\WINDOWS\SYSTEM32\fxscomex.dll
C:\WINDOWS\SYSTEM32\fxscover.exe
C:\WINDOWS\SYSTEM32\fxsdrv.dll
C:\WINDOWS\SYSTEM32\fxsevent.dll
C:\WINDOWS\SYSTEM32\fxsext32.dll
C:\WINDOWS\SYSTEM32\fxsmon.dll
C:\WINDOWS\SYSTEM32\fxsperf.dll
C:\WINDOWS\SYSTEM32\fxsres.dll
C:\WINDOWS\SYSTEM32\FXSROUTE.DLL
C:\WINDOWS\SYSTEM32\FXSSEND.EXE
C:\WINDOWS\SYSTEM32\fxsst.dll
C:\WINDOWS\SYSTEM32\fxssvc.exe
C:\WINDOWS\SYSTEM32\fxst30.dll
C:\WINDOWS\SYSTEM32\fxstiff.dll
C:\WINDOWS\SYSTEM32\fxsui.dll
C:\WINDOWS\SYSTEM32\fxswzrd.dll
C:\WINDOWS\SYSTEM32\fxsxp32.dll
C:\WINDOWS\SYSTEM32\GCDEF.DLL
C:\WINDOWS\SYSTEM32\GDI.EXE
C:\WINDOWS\SYSTEM32\gdi32.dll
C:\WINDOWS\SYSTEM32\gdiplus.dll
C:\WINDOWS\SYSTEM32\GETMAC.EXE
C:\WINDOWS\SYSTEM32\GETUNAME.DLL
C:\WINDOWS\SYSTEM32\GIF89.DLL
C:\WINDOWS\SYSTEM32\GLMF32.DLL
C:\WINDOWS\SYSTEM32\g1u32.dll
C:\WINDOWS\SYSTEM32\gpedit.dll
C:\WINDOWS\SYSTEM32\GPKCSP.DLL
C:\WINDOWS\SYSTEM32\gpkrsrc.dll
C:\WINDOWS\SYSTEM32\gpresult.exe
C:\WINDOWS\SYSTEM32\gptext.dll
C:\WINDOWS\SYSTEM32\GPUPDATE.EXE
C:\WINDOWS\SYSTEM32\grpconv.exe
C:\WINDOWS\SYSTEM32\h323msp.dll
C:\WINDOWS\SYSTEM32\HAL.DLL
C:\WINDOWS\SYSTEM32\hccoin.dll
C:\WINDOWS\SYSTEM32\hccutils.dll
C:\WINDOWS\SYSTEM32\HELP.EXE
C:\WINDOWS\SYSTEM32\HHActiveX.dll
C:\WINDOWS\SYSTEM32\hhsetup.dll
C:\WINDOWS\SYSTEM32\hid.dll
C:\WINDOWS\SYSTEM32\hidserv.dll
C:\WINDOWS\SYSTEM32\HIMEM.SYS
C:\WINDOWS\SYSTEM32\hkcmd.exe
C:\WINDOWS\SYSTEM32\hlink.dll
C:\WINDOWS\SYSTEM32\hnetcfg.dll
C:\WINDOWS\SYSTEM32\HNETMON.DLL
C:\WINDOWS\SYSTEM32\hnetwiz.dll
C:\WINDOWS\SYSTEM32\HOSTNAME.EXE
C:\WINDOWS\SYSTEM32\hotplug.dll
C:\WINDOWS\SYSTEM32\hs_regex.dll
C:\WINDOWS\SYSTEM32\hsfcisp2.dll
C:\WINDOWS\SYSTEM32\HTICONS.DLL
C:\WINDOWS\SYSTEM32\httpapi.dll
C:\WINDOWS\SYSTEM32\htui.dll TABLE IV-continued Windows Essential System Files C:\WINDOWS\SYSTEM32\hypertrm.dll
C:\WINDOWS\SYSTEM32\Iacenc.dll
C:\WINDOWS\SYSTEM32\iAlmCoIn_v3701.dll
C:\WINDOWS\SYSTEM32\ialmdd5(2).dll
C:\WINDOWS\SYSTEM32\ialmdd5(3).dll
C:\WINDOWS\SYSTEM32\ialmdd5.dll
C:\WINDOWS\SYSTEM32\ialmdev5(2).dll
C:\WINDOWS\SYSTEM32\ialmdev5(3).dll
C:\WINDOWS\SYSTEM32\ialmdev5.dll
C:\WINDOWS\SYSTEM32\ia1mdnt5(2).dll
C:\WINDOWS\SYSTEM32\ialmdnt5(3).dll
C:\WINDOWS\SYSTEM32\ialmdnt5.dll
C:\WINDOWS\SYSTEM32\ialmgdev.dll
C:\WINDOWS\SYSTEM32\ialmgicd.dll
C:\WINDOWS\SYSTEM32\ialmrem.dll
C:\WINDOWS\SYSTEM32\ialmrnt5(2).dll
C:\WINDOWS\SYSTEM32\ialmrnt5(3).dll
C:\WINDOWS\SYSTEM32\ia1mrnt5.dll
C:\WINDOWS\SYSTEM32\IASACCT.DLL
C:\WINDOWS\SYSTEM32\IASADS.DLL
C:\WINDOWS\SYSTEM32\IASHLPR.DLL
C:\WINDOWS\SYSTEM32\IASNAP.DLL
C:\WINDOWS\SYSTEM32\IASPOLCY.DLL
C:\WINDOWS\SYSTEM32\iasrad.dll
C:\WINDOWS\SYSTEM32\IASRECST.DLL
C:\WINDOWS\SYSTEM32\IASSAM.DLL
C:\WINDOWS\SYSTEM32\IASSDO.DLL
C:\WINDOWS\SYSTEM32\IASSVCS.DLL
C:\WINDOWS\SYSTEM32\icaapi.dll
C:\WINDOWS\SYSTEM32\iccvid.dll
C:\WINDOWS\SYSTEM32\ICFGNT5.DLL
C:\WINDOWS\SYSTEM32\icm32.dll
C:\WINDOWS\SYSTEM32\icmp.dll
C:\WINDOWS\SYSTEM32\ICMUI.DLL
C:\WINDOWS\SYSTEM32\icwdial.dll
C:\WINDOWS\SYSTEM32\icwphbk.dll
C:\WINDOWS\SYSTEM32\idq.dll
C:\WINDOWS\SYSTEM32\ie4uinit.exe
C:\WINDOWS\SYSTEM32\ieakeng.dll
C:\WINDOWS\SYSTEM32\ieaksie.dll
C:\WINDOWS\SYSTEM32\IEAKUI.DLL
C:\WINDOWS\SYSTEM32\iedkcs32.dll
C:\WINDOWS\SYSTEM32\ieencode.dll
C:\WINDOWS\SYSTEM32\iernonce.dll
C:\WINDOWS\SYSTEM32\iesetup.dll
C:\WINDOWS\SYSTEM32\iexpress.exe
C:\WINDOWS\SYSTEM32\ifmon.dll
C:\WINDOWS\SYSTEM32\IFSUTIL.DLL
C:\WINDOWS\SYSTEM32\igfxcfg.exe
C:\WINDOWS\SYSTEM32\igfxdev.dll
C:\WINDOWS\SYSTEM32\igfxdgps.dll
C:\WINDOWS\SYSTEM32\igfxdiag.exe
C:\WINDOWS\SYSTEM32\igfxdo.dll
C:\WINDOWS\SYSTEM32\igfxeud.dll
C:\WINDOWS\SYSTEM32\igfxexps.dll
C:\WINDOWS\SYSTEM32\igfxext.exe
C:\WINDOWS\SYSTEM32\igfxhk.dll
C:\WINDOWS\SYSTEM32\igfxpph.dll
C:\WINDOWS\SYSTEM32\igfxres.dll
C:\WINDOWS\SYSTEM32\igfxress.dll
C:\WINDOWS\SYSTEM32\igfxsrvc.dll
C:\WINDOWS\SYSTEM32\igfxtray.exe
C:\WINDOWS\SYSTEM32\igmpagnt.dll
C:\WINDOWS\SYSTEM32\IISSUBA.DLL
C:\WINDOWS\SYSTEM32\ijl15.dll
C:\WINDOWS\SYSTEM32\ils.dll
C:\WINDOWS\SYSTEM32\imagehlp.dll
C:\WINDOWS\SYSTEM32\imagr5.dll
C:\WINDOWS\SYSTEM32\imagx5.dll
C:\WINDOWS\SYSTEM32\ImagXpr5.dll
C:\WINDOWS\SYSTEM32\imapi.exe
C:\WINDOWS\SYSTEM32\imeshare.dll
C:\WINDOWS\SYSTEM32\imgutil.dll
C:\WINDOWS\SYSTEM32\imm32.dll
C:\WINDOWS\SYSTEM32\indounin.dll
C:\WINDOWS\SYSTEM32\inetcfg.dll
C:\WINDOWS\SYSTEM32\inetcomm.dll
C:\WINDOWS\SYSTEM32\INETCPLC.DLL TABLE IV-continued Windows Essential System Files C:\WINDOWS\SYSTEM32\INETFR.DLL
C:\WINDOWS\SYSTEM32\inetmib1.dll
C:\WINDOWS\SYSTEM32\inetpp.dll
C:\WINDOWS\SYSTEM32\inetppui.dll
C:\WINDOWS\SYSTEM32\inetres.dll
C:\WINDOWS\SYSTEM32\INETSRV\seo.dll
C:\WINDOWS\SYSTEM32\INETSRV\smtpadm.dll
C:\WINDOWS\SYSTEM32\INETSRV\smtpsnap.dll
C:\WINDOWS\SYSTEM32\Inetwh32.dll
C:\WINDOWS\SYSTEM32\INFOSOFT.DLL
C:\WINDOWS\SYSTEM32\initpki.dll
C:\WINDOWS\SYSTEM32\input.dll
C:\WINDOWS\SYSTEM32\inseng.dll
C:\WINDOWS\SYSTEM32\InstMed.exe.
C:\WINDOWS\SYSTEM32\IOLOGMSG.DLL
C:\WINDOWS\SYSTEM32\ipconfig.exe
C:\WINDOWS\SYSTEM32\iphlpapi.dll
C:\WINDOWS\SYSTEM32\IPMONTR.DLL
C:\WINDOWS\SYSTEM32\ipnathlp.dll
C:\WINDOWS\SYSTEM32\ippromon.dll
C:\WINDOWS\SYSTEM32\IPROP.DLL
C:\WINDOWS\SYSTEM32\IPRTPRIO.DLL
C:\WINDOWS\SYSTEM32\IPRTRMGR.DLL
C:\WINDOWS\SYSTEM32\IPSEC6.EXE
C:\WINDOWS\SYSTEM32\ipsecsnp.dll
C:\WINDOWS\SYSTEM32\ipsecsvc.dll
C:\WINDOWS\SYSTEM32\ipsmsnap.dll
C:\WINDOWS\SYSTEM32\ipv6.exe
C:\WINDOWS\SYSTEM32\ipv6mon.dll
C:\WINDOWS\SYSTEM32\IPXMONTR.DLL
C:\WINDOWS\SYSTEM32\IPXPROMN.DLL
C:\WINDOWS\SYSTEM32\IPXRIP.DLL
C:\WINDOWS\SYSTEM32\ipxroute.exe
C:\WINDOWS\SYSTEM32\IPXRTMGR.DLL
C:\WINDOWS\SYSTEM32\IPXSAP.DLL
C:\WINDOWS\SYSTEM32\IPXWAN.DLL
C:\WINDOWS\SYSTEM32\IR32_32.DLL
C:\WINDOWS\SYSTEM32\ir41_qc.dll
C:\WINDOWS\SYSTEM32\ir41_qcx.dll
C:\WINDOWS\SYSTEM32\ir50_32.dll
C:\WINDOWS\SYSTEM32\ir50_qc.dll
C:\WINDOWS\SYSTEM32\ir50_qcx.dll
C:\WINDOWS\SYSTEM32\IRCLASS.DLL
C:\WINDOWS\SYSTEM32\isign32.dll
C:\WINDOWS\SYSTEM32\isrdbg32.dll
C:\WINDOWS\SYSTEM32\itircl.dll
C:\WINDOWS\SYSTEM32\itss.dll
C:\WINDOWS\SYSTEM32\iuengine.dll
C:\WINDOWS\SYSTEM32\ixsso.dll
C:\WINDOWS\SYSTEM32\iyuv_32.dll
C:\WINDOWS\SYSTEM32\Iyvu9_32.dll
C:\WINDOWS\SYSTEM32\java.exe
C:\WINDOWS\SYSTEM32\javaw.exe
C:\WINDOWS\SYSTEM32\JET500.DLL
C:\WINDOWS\SYSTEM32\JGAW400.DLL
C:\WINDOWS\SYSTEM32\JGDW400.DLL
C:\WINDOWS\SYSTEM32\JGMD400.DLL
C:\WINDOWS\SYSTEM32\JGPL400.DLL
C:\WINDOWS\SYSTEM32\JGSD400.DLL
C:\WINDOWS\SYSTEM32\JGSH400.DLL
C:\WINDOWS\SYSTEM32\JOBEXEC.DLL
C:\WINDOWS\SYSTEM32\jscript.dll
C:\WINDOWS\SYSTEM32\jsproxy.dll
C:\WINDOWS\SYSTEM32\KBDAL.DLL
C:\WINDOWS\SYSTEM32\KBDAZE.DLL
C:\WINDOWS\SYSTEM32\KBDAZEL.DLL
C:\WINDOWS\SYSTEM32\KBDBE.DLL
C:\WINDOWS\SYSTEM32\KBDBENE.DLL
C:\WINDOWS\SYSTEM32\KBDBLR.DLL
C:\WINDOWS\SYSTEM32\KBDBR.DLL
C:\WINDOWS\SYSTEM32\KBDBU.DLL
C:\WINDOWS\SYSTEM32\KBDCA.DLL
C:\WINDOWS\SYSTEM32\KBDCAN.DLL
C:\WINDOWS\SYSTEM32\KBDCR.DLL
C:\WINDOWS\SYSTEM32\KBDCZ.DLL
C:\WINDOWS\SYSTEM32\KBDCZ1.DLL
C:\WINDOWS\SYSTEM32\KBDCZ2.DLL
C:\WINDOWS\SYSTEM32\KBDDA.DLL TABLE IV-continued Windows Essential System Files C:\WINDOWS\SYSTEM32\KBDDV.DLL
C:\WINDOWS\SYSTEM32\KBDES.DLL
C:\WINDOWS\SYSTEM32\KBDEST.DLL
C:\WINDOW5\SYSTEM32\KBDFC.DLL
C:\WINDOWS\SYSTEM32\KBDFI.DLL
C:\WINDOWS\SYSTEM32\kbdfil.dll
C:\WINDOWS\SYSTEM32\KBDFO.DLL
C:\WINDOWS\SYSTEM32\KBDER.DLL
C:\WINDOWS\SYSTEM32\KBDGAE.DLL
C:\WINDOWS\SYSTEM32\KBDGKL.DLL
C:\WINDOWS\SYSTEM32\KBDGR.DLL
C:\WINDOWS\SYSTEM32\KBDGR1.DLL
C:\WINDOWS\SYSTEM32\KBDHE.DLL
C:\WINDOWS\SYSTEM32\KBDHE220.DLL
C:\WINDOWS\SYSTEM32\KBDHE319.DLL
C:\WINDOWS\SYSTEM32\KBDHELA2.DLL
C:\WINDOWS\SYSTEM32\KBDHELA3.DLL
C:\WINDOWS\SYSTEM32\KBDHEPT.DLL
C:\WINDOWS\SYSTEM32\KBDHU.DLL
C:\WINDOWS\SYSTEM32\KBDHU1.DLL
C:\WINDOWS\SYSTEM32\KBDIC.DLL
C:\WINDOWS\SYSTEM32\kbdinbel.dll
C:\WINDOWS\SYSTEM32\kbdinben.dll
C:\WINDOWS\SYSTEM32\kbdinmal.dll
C:\WINDOWS\SYSTEM32\KBDIR.DLL
C:\WINDOWS\SYSTEM32\KBDIT.DLL
C:\WINDOWS\SYSTEM32\KBDIT142.DLL
C:\WINDOWS\SYSTEM32\KBDKAZ.DLL
C:\WINDOWS\SYSTEM32\KBDKYR.DLL
C:\WINDOWS\SYSTEM32\KBDLA.DLL
C:\WINDOWS\SYSTEM32\KBDLT.DLL
C:\WINDOWS\SYSTEM32\KBDLT1.DLL
C:\WINDOWS\SYSTEM32\KBDLV.DLL
C:\WINDOWS\SYSTEM32\KBDLV1.DLL
C:\WINDOWS\SYSTEM32\KBDMAC.DLL
C:\WINDOWS\SYSTEM32\kbdmaori.dll
C:\WINDOWS\SYSTEM32\kbdmlt47.dll
C:\WINDOWS\SYSTEM32\kbdmlt48.dll
C:\WINDOWS\SYSTEM32\KBDMON.DLL
C:\WINDOWS\SYSTEM32\KBDNE.DLL
C:\WINDOWS\SYSTEM32\KBDNEC.DLL
C:\WINDOWS\SYSTEM32\KBDNO.DLL
C:\WINDOWS\SYSTEM32\kbdno1.dll
C:\WINDOWS\SYSTEM32\KBDPL.DLL
C:\WINDOWS\SYSTEM32\KBDPL1.DLL
C:\WINDOWS\SYSTEM32\KBDPO.DLL
C:\WINDOWS\SYSTEM32\KBDRO.DLL
C:\WINDOWS\SYSTEM32\KBDRU.DLL
C:\WINDOWS\SYSTEM32\KBDRU1.DLL
C:\WINDOWS\SYSTEM32\KBDSF.DLL
C:\WINDOWS\SYSTEM32\KBDSG.DLL
C:\WINDOWS\SYSTEM32\KBDSL.DLL
C:\WINDOWS\SYSTEM32\KBDSL1.DLL
C:\WINDOWS\SYSTEM32\kbdsmsfi.dll
C:\WINDOWS\SYSTEM32\kbdsmsno.dll
C:\WINDOWS\SYSTEM32\KBDSP.DLL
C:\WINDOWS\SYSTEM32\KBDSW.DLL
C:\WINDOWS\SYSTEM32\KBDTAT.DLL
C:\WINDOWS\SYSTEM32\KBDTUF.DLL
C:\WINDOWS\SYSTEM32\KBDTUQ.DLL
C:\WINDOWS\SYSTEM32\KBDUK.DLL
C:\WINDOWS\SYSTEM32\kbdukx.dll
C:\WINDOWS\SYSTEM32\KBDUR.DLL
C:\WINDOWS\SYSTEM32\KBDUS.DLL
C:\WINDOWS\SYSTEM32\KBDUSL.DLL
C:\WINDOWS\SYSTEM32\KBDUSR.DLL
C:\WINDOWS\SYSTEM32\KBDUSX.DLL
C:\WINDOWS\SYSTEM32\KBDUZB.DLL
C:\WINDOWS\SYSTEM32\KBDYCC.DLL
C:\WINDOWS\SYSTEM32\KBDYCL.DLL
C:\WINDOWS\SYSTEM32\kd1394.dll
C:\WINDOWS\SYSTEM32\KDCOM.DLL
C:\WINDOWS\SYSTEM32\kerberos.dll
C:\WINDOWS\SYSTEM32\kernel32.dll
C:\WINDOWS\SYSTEM32\KEY01.SYS
C:\WINDOWS\SYSTEM32\KEYBOARD.SYS
C:\WINDOWS\SYSTEM32\keymgr.dll
C:\WINDOWS\SYSTEM32\KiwiEventlog.dll TABLE IV-continued Windows Essential System Files C:\WINDOWS\SYSTEM32\krnl386.exe
C:\WINDOWS\SYSTEM32\ksuser.dll
C:\WINDOWS\SYSTEM32\LABEL.EXE
C:\WINDOWS\SYSTEM32\LANGWRBK.DLL
C:\WINDOWS\SYSTEM32\laprxy.dll
C:\WINDOWS\SYSTEM32\LCamCpl.dll
C:\WINDOWS\SYSTEM32\LEXCFI.DLL
C:\WINDOWS\SYSTEM32\LEXDRVX.DLL
C:\WINDOWS\SYSTEM32\LexLog.dll
C:\WINDOWS\SYSTEM32\lfbmp12n.dll
C:\WINDOWS\SYSTEM32\LFCMP12n.DLL
C:\WINDOWS\SYSTEM32\lffax12n.dll
C:\WINDOWS\SYSTEM32\lftif12n.dll
C:\WINDOWS\SYSTEM32\libeay32.dll
C:\WINDOWS\SYSTEM32\licdll.dll
C:\WINDOWS\SYSTEM32\licmgr10.dll
C:\WINDOWS\SYSTEM32\licwmi.dll
C:\WINDOWS\SYSTEM32\LIGHTS.EXE
C:\WINDOWS\SYSTEM32\linkinfo.dll
C:\WINDOWS\SYSTEM32\lmhsvc.dll
C:\WINDOWS\SYSTEM32\lmrt.dll
C:\WINDOWS\SYSTEM32\LNKSTUB.EXE.
C:\WINDOWS\SYSTEM32\loadperf.dll
C:\WINDOWS\SYSTEM32\localsec.dll
C:\WINDOWS\SYSTEM32\localspl.dll
C:\WINDOWS\SYSTEM32\localui.dll
C:\WINDOWS\SYSTEM32\locator.exe
C:\WINDOWS\SYSTEM32\LODCTR.EXE
C:\WINDOWS\SYSTEM32\logagent.exe
C:\WINDOWS\SYSTEM32\LOGHOURS.DLL
C:\WINDOWS\SYSTEM32\logman.exe
C:\WINDOWS\SYSTEM32\LOGOFF.EXE
C:\WINDOWS\SYSTEM32\logonui.exe
C:\WINDOWS\SYSTEM32\lpk.dll
C:\WINDOWS\SYSTEM32\LPQ.EXE
C:\WINDOWS\SYSTEM32\LPR.EXE
C:\WINDOWS\SYSTEM32\lprhelp.dll
C:\WINDOWS\SYSTEM32\LPRMONUI.DLL
C:\WINDOWS\SYSTEM32\LQCUI2.dll
C:\WINDOWS\SYSTEM32\lsasrv.dll
C:\WINDOWS\SYSTEM32\lsass.exe
C:\WINDOWS\SYSTEM32\LTDIS12n.dll
C:\WINDOWS\SYSTEM32\ltefx12n.dll
C:\WINDOWS\SYSTEM32\ltfil12n.DLL
C:\WINDOWS\SYSTEM32\ltimg12n.dll
C:\WINDOWS\SYSTEM32\ltkrn12n.dll
C:\WINDOWS\SYSTEM32\Ltwvc12n.dll
C:\WINDOWS\SYSTEM32\lvcodec2.dll
C:\WINDOWS\SYSTEM32\lvcoinst.dll
C:\WINDOWS\SYSTEM32\LVComC.dll
C:\WINDOWS\SYSTEM32\LVCOMCX.dll
C:\WINDOWS\SYSTEM32\LVComS.exe
C:\WINDOWS\SYSTEM32\LVCOMSX.EXE
C:\WINDOWS\SYSTEM32\Lvkrn12n.dll
C:\WINDOWS\SYSTEM32\LVMAENUM.dll
C:\WINDOWS\SYSTEM32\LVUI2.dll
C:\WINDOWS\SYSTEM32\LVUI2RC.dll
C:\WINDOWS\SYSTEM32\LZ32.DLL
C:\WINDOWS\SYSTEM32\LZEXPAND.DLL
C:\WINDOWS\SYSTEM32\Macromed\Common\SwSupport.dll
C:\WINDOWS\SYSTEM32\Macromed\Director\M5drvr32.exe
C:\WINDOWS\SYSTEM32\Macromed\Director\M5if32.dll
C:\WINDOWS\SYSTEM32\Macromed\Director\SwDir.dll
C:\WINDOWS\SYSTEM32\Macromed\Shockwave 8\Control.dll
C:\WINDOWS\SYSTEM32\Macromed\Shockwave 8\dirapi.dll
C:\WINDOWS\SYSTEM32\Macromed\Shockwave 8\DynaPlayer.dll
C:\WINDOWS\SYSTEM32\Macromed\Shockwave 8\iml32.dll
C:\WINDOWS\SYSTEM32\Macromed\Shockwave 8\Plugin.dll
C:\WINDOWS\SYSTEM32\Macromed\Shockwave 8\PluginPing.dll
C:\WINDOWS\SYSTEM32\Macromed\Shockwave 8\Proj.dll
C:\WINDOWS\SYSTEM32\Macromed\Shockwave 8\QuitRemote.exe
C:\WINDOWS\SYSTEM32\Macromed\Shockwave 8\SwInit.exe
C:\WINDOWS\SYSTEM32\Macromed\Shockwave 8\SwMenu.dll
C:\WINDOWS\SYSTEM32\Macromed\Shockwave 8\SwOnce.dll
C:\WINDOWS\SYSTEM32\Macromed\Shockwave 8\UNWISE.EXE
C:\WINDOWS\SYSTEM32\MAG_HOOK.DLL
C:\WINDOWS\SYSTEM32\magnify.exe
C:\WINDOWS\SYSTEM32\makecab.exe

TABLE IV-continued

Windows Essential System Files

C:\WINDOWS\SYSTEM32\MAPI32.DLL
C:\WINDOWS\SYSTEM32\MAPISTUB.DLL
C:\WINDOWS\SYSTEM32\mcastmib.dll
C:\WINDOWS\SYSTEM32\MCD32.DLL
C:\WINDOWS\SYSTEM32\MCDSRV32.DLL
C:\WINDOWS\SYSTEM32\McGDMgr.dll
C:\WINDOWS\SYSTEM32\MCHGRCOI.DLL
C:\WINDOWS\SYSTEM32\mciavi32.dll
C:\WINDOWS\SYSTEM32\MCICDA.DLL
C:\WINDOWS\SYSTEM32\mcinsctl.dll
C:\WINDOWS\SYSTEM32\MCIOLE16.DLL
C:\WINDOWS\SYSTEM32\MCIOLE32.DLL
C:\WINDOWS\SYSTEM32\mciqtz32.dll
C:\WINDOWS\SYSTEM32\mciseq.dll
C:\WINDOWS\SYSTEM32\mciwave.dll
C:\WINDOWS\SYSTEM32\MDHCP.DLL
C:\WINDOWS\SYSTEM32\mdminst.dll
C:\WINDOWS\SYSTEM32\mdmxsdk.dll
C:\WINDOWS\SYSTEM32\MDWMDMSP.DLL
C:\WINDOWS\SYSTEM32\MEM.EXE
C:\WINDOWS\SYSTEM32\mf3216.dll
C:\WINDOWS\SYSTEM32\mfc40.dll
C:\WINDOWS\SYSTEM32\MFC40U.DLL
C:\WINDOWS\SYSTEM32\mfc42.dll
C:\WINDOWS\SYSTEM32\MFC42ENU.DLL
C:\WINDOWS\SYSTEM32\mfc42u.dll
C:\WINDOWS\SYSTEM32\mfc70.dll
C:\WINDOWS\SYSTEM32\mfc70enu.dll
C:\WINDOWS\SYSTEM32\mfc70u.dll
C:\WINDOWS\SYSTEM32\MFC71.dll
C:\WINDOWS\SYSTEM32\MFC71CHS.DLL
C:\WINDOWS\SYSTEM32\MFC71CHT.DLL
C:\WINDOWS\SYSTEM32\MFC71DEU.DLL
C:\WINDOWS\SYSTEM32\MFC71ENU.DLL
C:\WINDOWS\SYSTEM32\MFC71ESP.DLL
C:\WINDOWS\SYSTEM32\MFC71FRA.DLL
C:\WINDOWS\SYSTEM32\MFC71ITA.DLL
C:\WINDOWS\SYSTEM32\MFC71JPN.DLL
C:\WINDOWS\SYSTEM32\MFC71KOR.DLL
C:\WINDOWS\SYSTEM32\MFC71u.dll
C:\WINDOWS\SYSTEM32\MFCANS32.DLL
C:\WINDOWS\SYSTEM32\mfcsubs.dll
C:\WINDOWS\SYSTEM32\mfcuia32.dll
C:\WINDOWS\SYSTEM32\mgmtapi.dll
C:\WINDOWS\SYSTEM32\midimap.dll
C:\WINDOWS\SYSTEM32\miglibnt.dll
C:\WINDOWS\SYSTEM32\MIGPWD.EXE
C:\WINDOWS\SYSTEM32\MIGREGDB.EXE
C:\WINDOWS\SYSTEM32\MIMEFILT.DLL
C:\WINDOWS\SYSTEM32\MINDEX.DLL
C:\WINDOWS\SYSTEM32\mlang.dll
C:\WINDOWS\SYSTEM32\MLL_HP.DLL
C:\WINDOWS\SYSTEM32\MLL_MTF.DLL
C:\WINDOWS\SYSTEM32\MLL_QIC.DLL
C:\WINDOWS\SYSTEM32\mmc.exe
C:\WINDOWS\SYSTEM32\mmcbase.dll
C:\WINDOWS\SYSTEM32\mmcndmgr.dll
C:\WINDOWS\SYSTEM32\mmcshext.dll
C:\WINDOWS\SYSTEM32\MMDRV.DLL
C:\WINDOWS\SYSTEM32\mmfutil.dll
C:\WINDOWS\SYSTEM32\mmsystem.dll
C:\WINDOWS\SYSTEM32\MMUTILSE.DLL
C:\WINDOWS\SYSTEM32\mnmdd.dll
C:\WINDOWS\SYSTEM32\mnmsrvc.exe
C:\WINDOWS\SYSTEM32\mobsync.dll
C:\WINDOWS\SYSTEM32\mobsync.exe
C:\WINDOWS\SYSTEM32\modemui.dll
C:\WINDOWS\SYSTEM32\MODEX.DLL
C:\WINDOWS\SYSTEM32\moricons.dll
C:\WINDOWS\SYSTEM32\MOUNTVOL.EXE
C:\WINDOWS\SYSTEM32\mp43dmod.dll
C:\WINDOWS\SYSTEM32\mp4sdmod.dll
C:\WINDOWS\SYSTEM32\mpg4dmod.dll
C:\WINDOWS\SYSTEM32\mplay32.exe
C:\WINDOWS\SYSTEM32\MPNOTIFY.EXE
C:\WINDOWS\SYSTEM32\mpr.dll
C:\WINDOWS\SYSTEM32\mprapi.dll
C:\WINDOWS\SYSTEM32\MPRDDM.DLL TABLE IV-continued Windows Essential System Files C:\WINDOWS\SYSTEM32\MPRDIM.DLL
C:\WINDOWS\SYSTEM32\MPRMSG.DLL
C:\WINDOWS\SYSTEM32\MPRUI.DLL
C:\WINDOWS\SYSTEM32\mqad.dll
C:\WINDOWS\SYSTEM32\mqbkup.exe
C:\WINDOWS\SYSTEM32\MQCERTUI.DLL
C:\WINDOWS\SYSTEM32\mqdscli.dll
C:\WINDOWS\SYSTEM32\MQGENTR.DLL
C:\WINDOWS\SYSTEM32\mqise.dll
C:\WINDOWS\SYSTEM32\mqlogmgr.dll
C:\WINDOWS\SYSTEM32\mqoa.dll
C:\WINDOWS\SYSTEM32\MQPERF.DLL
C:\WINDOWS\SYSTEM32\mqqm.dll
C:\WINDOWS\SYSTEM32\mqrt.dll
C:\WINDOWS\SYSTEM32\mqrtdep.dll
C:\WINDOWS\SYSTEM32\mqsec.dll
C:\WINDOWS\SYSTEM32\mqsnap.dll
C:\WINDOWS\SYSTEM32\mqsvc.exe
C:\WINDOWS\SYSTEM32\mqtgsvc.exe
C:\WINDOWS\SYSTEM32\mqtrig.dll
C:\WINDOWS\SYSTEM32\mqupgrd.dll
C:\WINDOWS\SYSTEM32\mqutil.dll
C:\WINDOWS\SYSTEM32\MRINFO.EXE
C:\WINDOWS\SYSTEM32\MSAATEXT.DLL
C:\WINDOWS\SYSTEM32\MSACM.DLL
C:\WINDOWS\SYSTEM32\msacm32.dll
C:\WINDOWS\SYSTEM32\msafd.dll
C:\WINDOWS\SYSTEM32\msapsspc.dll
C:\WINDOWS\SYSTEM32\msasf.exe
C:\WINDOWS\SYSTEM32\msasn1.dll
C:\WINDOWS\SYSTEM32\MSAUDITE.DLL
C:\WINDOWS\SYSTEM32\MSCAT32.DLL
C:\WINDOWS\SYSTEM32\MSCDEXNT.EXE
C:\WINDOWS\SYSTEM32\Mscmcde.dll
C:\WINDOWS\SYSTEM32\MSCMCFR.DLL
C:\WINDOWS\SYSTEM32\mscms.dll
C:\WINDOWS\SYSTEM32\msconf.dll
C:\WINDOWS\SYSTEM32\mscoree.dll
C:\WINDOWS\SYSTEM32\mscorier.dll
C:\WINDOWS\SYSTEM32\mscories.dll
C:\WINDOWS\SYSTEM32\mscpx32r.dll
C:\WINDOWS\SYSTEM32\mscpxl32.dll
C:\WINDOWS\SYSTEM32\msctf.dll
C:\WINDOWS\SYSTEM32\msctfp.dll
C:\WINDOWS\SYSTEM32\msdadiag.dll
C:\WINDOWS\SYSTEM32\msdart.dll
C:\WINDOWS\SYSTEM32\msdmo.dll
C:\WINDOWS\SYSTEM32\msdtc.exe
C:\WINDOWS\SYSTEM32\msdtclog.dll
C:\WINDOWS\SYSTEM32\msdtcprx.dll
C:\WINDOWS\SYSTEM32\msdtctm.dll
C:\WINDOWS\SYSTEM32\msdtcuiu.dll
C:\WINDOWS\SYSTEM32\msdxmlc.dll
C:\WINDOWS\SYSTEM32\MSENCODE.DLL
C:\WINDOWS\SYSTEM32\msexch40.dll
C:\WINDOWS\SYSTEM32\msexcl40.dll
C:\WINDOWS\SYSTEM32\msftedit.dll
C:\WINDOWS\SYSTEM32\MSG.EXE
C:\WINDOWS\SYSTEM32\msgina.dll
C:\WINDOWS\SYSTEM32\msgsvc.dll
C:\WINDOWS\SYSTEM32\MSHEARTS.EXE
C:\WINDOWS\SYSTEM32\mshta.exe
C:\WINDOWS\SYSTEM32\mshtml.dll
C:\WINDOWS\SYSTEM32\mshtmled.dll
C:\WINDOWS\SYSTEM32\mshtmler.dll
C:\WINDOWS\SYSTEM32\msi.dll
C:\WINDOWS\SYSTEM32\msident.dll
C:\WINDOWS\SYSTEM32\msidle.dll
C:\WINDOWS\SYSTEM32\MSIDNTLD.DLL
C:\WINDOWS\SYSTEM32\msiexec.exe
C:\WINDOWS\SYSTEM32\msihnd.dll
C:\WINDOWS\SYSTEM32\msimg32.dll
C:\WINDOWS\SYSTEM32\msimsg.dll
C:\WINDOWS\SYSTEM32\msimtf.dll
C:\WINDOWS\SYSTEM32\MSISAM11.DLL
C:\WINDOWS\SYSTEM32\msisip.dll
C:\WINDOWS\SYSTEM32\msjet35.dll
C:\WINDOWS\SYSTEM32\msjet40.dll TABLE IV-continued Windows Essential System Files C:\WINDOWS\SYSTEM32\msjetoledb40.dll
C:\WINDOWS\SYSTEM32\msjint35.dll
C:\WINDOWS\SYSTEM32\msjint40.dll
C:\WINDOWS\SYSTEM32\msjter35.dll
C:\WINDOWS\SYSTEM32\msjter40.dll
C:\WINDOWS\SYSTEM32\msjtes40.dll
C:\WINDOWS\SYSTEM32\mslbui.dll
C:\WINDOWS\SYSTEM32\MSLS31.DLL
C:\WINDOWS\SYSTEM32\msltus40.dll
C:\WINDOWS\SYSTEM32\msnetobj.dll
C:\WINDOWS\SYSTEM32\msnsspc.dll
C:\WINDOWS\SYSTEM32\MSOBJS.DLL
C:\WINDOWS\SYSTEM32\msoeacct.dll
C:\WINDOWS\SYSTEM32\msoert2.dll
C:\WINDOWS\SYSTEM32\msorc32r.dll
C:\WINDOWS\SYSTEM32\msorcl32.dll
C:\WINDOWS\SYSTEM32\mspaint.exe
C:\WINDOWS\SYSTEM32\mspatcha.dll
C:\WINDOWS\SYSTEM32\mspbde40.dll
C:\WINDOWS\SYSTEM32\mspmsnsv.dll
C:\WINDOWS\SYSTEM32\mspmsp.dll
C:\WINDOWS\SYSTEM32\MSPORTS.DLL
C:\WINDOWS\SYSTEM32\msprivs.dll
C:\WINDOWS\SYSTEM32\MSR2C.DLL
C:\WINDOWS\SYSTEM32\MSR2CENU.DLL
C:\WINDOWS\SYSTEM32\MSRATELC.DLL
C:\WINDOWS\SYSTEM32\msrating.dll
C:\WINDOWS\SYSTEM32\MSRCLR4O.DLL
C:\WINDOWS\SYSTEM32\MSRD2X35.DLL
C:\WINDOWS\SYSTEM32\msrd2x40.dll
C:\WINDOWS\SYSTEM32\msrd3x40.dll
C:\WINDOWS\SYSTEM32\MSRDO20.DLL
C:\WINDOWS\SYSTEM32\MSRECR4O.DLL
C:\WINDOWS\SYSTEM32\msrepl35.dll
C:\WINDOWS\SYSTEM32\msrepl40.dll
C:\WINDOWS\SYSTEM32\msrle32.dll
C:\WINDOWS\SYSTEM32\mssap.dll
C:\WINDOWS\SYSTEM32\msscp.dll
C:\WINDOWS\SYSTEM32\mssecadv.dll
C:\WINDOWS\SYSTEM32\MSSIGN32.DLL
C:\WINDOWS\SYSTEM32\MSSIP32.DLL
C:\WINDOWS\SYSTEM32\msstdfmt.dll
C:\WINDOWS\SYSTEM32\MSSTKPRP.DLL
C:\WINDOWS\SYSTEM32\MSSWCH.DLL
C:\WINDOWS\SYSTEM32\MSSWCHX.EXE
C:\WINDOWS\SYSTEM32\MST120.DLL
C:\WINDOWS\SYSTEM32\mstask.dll
C:\WINDOWS\SYSTEM32\mstext40.dll
C:\WINDOWS\SYSTEM32\mstime.dll
C:\WINDOWS\SYSTEM32\mstinit.exe
C:\WINDOWS\SYSTEM32\mstlsapi.dll
C:\WINDOWS\SYSTEM32\mstsc.exe
C:\WINDOWS\SYSTEM32\mstscax.dll
C:\WINDOWS\SYSTEM32\MSUNI11.DLL
C:\WINDOWS\SYSTEM32\msutb.dll
C:\WINDOWS\SYSTEM32\msv1_0.dll
C:\WINDOWS\SYSTEM32\MSVBVM50.DLL
C:\WINDOWS\SYSTEM32\msvbvm60.dll
C:\WINDOWS\SYSTEM32\msvci70.dll
C:\WINDOWS\SYSTEM32\msvcirt.dll
C:\WINDOWS\SYSTEM32\MSVCP50.DLL
C:\WINDOWS\SYSTEM32\msvcp60.dll
C:\WINDOWS\SYSTEM32\msvcp70.dll
C:\WINDOWS\SYSTEM32\msvcp71.dll
C:\WINDOWS\SYSTEM32\msvcr70.dll
C:\WINDOWS\SYSTEM32\msvcr71.dll
C:\WINDOWS\SYSTEM32\msvcrt.dll
C:\WINDOWS\SYSTEM32\MSVCRT20.DLL
C:\WINDOWS\SYSTEM32\msvcrt40.dll
C:\WINDOWS\SYSTEM32\msvdm.dll
C:\WINDOWS\SYSTEM32\msvfw32.dll
C:\WINDOWS\SYSTEM32\MSVIDC32.DLL
C:\WINDOWS\SYSTEM32\msvidctl.dll
C:\WINDOWS\SYSTEM32\MSVIDEO.DLL
C:\WINDOWS\SYSTEM32\msw3prt.dll
C:\WINDOWS\SYSTEM32\mswdat10.dll
C:\WINDOWS\SYSTEM32\mswebdvd.dll
C:\WINDOWS\SYSTEM32\mswmdm.dll TABLE IV-continued Windows Essential System Files C:\WINDOWS\SYSTEM32\mswsock.dll
C:\WINDOWS\SYSTEM32\mswstr10.dll
C:\WINDOWS\SYSTEM32\msxbde40.dll
C:\WINDOWS\SYSTEM32\msxml.dll
C:\WINDOWS\SYSTEM32\msxml2.dll
C:\WINDOWS\SYSTEM32\MSXML2R.DLL
C:\WINDOWS\SYSTEM32\msxml3.dll
C:\WINDOWS\SYSTEM32\MSXML3R.DLL
C:\WINDOWS\SYSTEM32\msxml4.dll
C:\WINDOWS\SYSTEM32\msxml4a.dll
C:\WINDOWS\SYSTEM32\msxml4r.dll
C:\WINDOWS\SYSTEM32\MSXMLR.DLL
C:\WINDOWS\SYSTEM32\msyuv.dll
C:\WINDOWS\SYSTEM32\mtxclu.dll
C:\WINDOWS\SYSTEM32\MTXDM.DLL
C:\WINDOWS\SYSTEM32\MTXEX.DLL
C:\WINDOWS\SYSTEM32\MTXLEGIH.DLL
C:\WINDOWS\SYSTEM32\mtxoci.dll
C:\WINDOWS\SYSTEM32\mtxparhd.dll
C:\WINDOWS\SYSTEM32\MUI\0009\HHCTRLUI.DLL
C:\WINDOWS\SYSTEM32\MUI\0401\xpob2res.dll
C:\WINDOWS\SYSTEM32\MUI\0401\xpsp1res.dll
C:\WINDOWS\SYSTEM32\MUI\0401\xpsp2res.dll
C:\WINDOWS\SYSTEM32\MUI\0402\xpsp1res.dll
C:\WINDOWS\SYSTEM32\MUI\0404\xpob2res.dll
C:\WINDOWS\SYSTEM32\MUI\0404\xpsp1res.dll
C:\WINDOWS\SYSTEM32\MUI\0404\xpsp2res.dll
C:\WINDOWS\SYSTEM32\MUI\0405\xpob2res.dll
C:\WINDOWS\SYSTEM32\MUI\0405\xpsp1res.dll
C:\WINDOWS\SYSTEM32\MUI\0405\xpsp2res.dll
C:\WINDOWS\SYSTEM32\MUI\0406\xpob2res.dll
C:\WINDOWS\SYSTEM32\MUI\0406\xpsp1res.dll
C:\WINDOWS\SYSTEM32\MUI\0406\xpsp2res.dll
C:\WINDOWS\SYSTEM32\MUI\0407\xpob2res.dll
C:\WINDOWS\SYSTEM32\MUI\0407\xpsp1res.dll
C:\WINDOWS\SYSTEM32\MUI\0407\xpsp2res.dll
C:\WINDOWS\SYSTEM32\MUI\0408\xpob2res.dll
C:\WINDOWS\SYSTEM32\MUI\0408\xpsp1res.dll
C:\WINDOWS\SYSTEM32\MUI\0408\xpsp2res.dll
C:\WINDOWS\SYSTEM32\MUI\0409\mscoreer.dll
C:\WINDOWS\SYSTEM32\MUI\040B\xpob2res.dll
C:\WINDOWS\SYSTEM32\MUI\040B\xpsp1res.dll
C:\WINDOWS\SYSTEM32\MUI\040B\xpsp2res.dll
C:\WINDOWS\SYSTEM32\MUI\040C\xpob2res.dll
C:\WINDOWS\SYSTEM32\MUI\040C\xpsp1res.dll
C:\WINDOWS\SYSTEM32\MUI\040C\xpsp2res.dll
C:\WINDOWS\SYSTEM32\MUI\040D\xpob2res.dll
C:\WINDOWS\SYSTEM32\MUI\040D\xpsp1res.dll
C:\WINDOWS\SYSTEM32\MUI\040D\xpsp2res.dll
C:\WINDOWS\SYSTEM32\MUI\040E\xpob2res.dll
C:\WINDOWS\SYSTEM32\MUI\040E\xpsp1res.dll
C:\WINDOWS\SYSTEM32\MUI\040E\xpsp2res.dll
C:\WINDOWS\SYSTEM32\MUI\0410\xpob2res.dll
C:\WINDOWS\SYSTEM32\MUI\0410\xpsp1res.dll
C:\WINDOWS\SYSTEM32\MUI\0410\xpsp2res.dll
C:\WINDOWS\SYSTEM32\MUI\0411\xpob2res.dll
C:\WINDOWS\SYSTEM32\MUI\0411\xpsp1res.dll
C:\WINDOWS\SYSTEM32\MUI\0411\xpsp2res.dll
C:\WINDOWS\SYSTEM32\MUI\0412\xpob2res.dll
C:\WINDOWS\SYSTEM32\MUI\0412\xpsp1res.dll
C:\WINDOWS\SYSTEM32\MUI\0412\xpsp2res.dll
C:\WINDOWS\SYSTEM32\MUI\0413\xpob2res.dll
C:\WINDOWS\SYSTEM32\MUI\0413\xpsp1res.dll
C:\WINDOWS\SYSTEM32\MUI\0413\xpsp1res.dll
C:\WINDOWS\SYSTEM32\MUI\0414\xpob2res.dll
C:\WINDOWS\SYSTEM32\MUI\0414\xpsp1res.dll
C:\WINDOWS\SYSTEM32\MUI\0414\xpsp2res.dll
C:\WINDOWS\SYSTEM32\MUI\0415\xpob2res.dll
C:\WINDOWS\SYSTEM32\MUI\0415\xpsp1res.dll
C:\WINDOWS\SYSTEM32\MUI\0415\xpsp2res.dll
C:\WINDOWS\SYSTEM32\MUI\0416\xpob2res.dll
C:\WINDOWS\SYSTEM32\MUI\0416\xpsp1res.dll
C:\WINDOWS\SYSTEM32\MUI\0416\xpsp2res.dll
C:\WINDOWS\SYSTEM32\MUI\0418\xpsp1res.dll
C:\WINDOWS\SYSTEM32\MUI\0419\xpob2res.dll
C:\WINDOWS\SYSTEM32\MUI\0419\xpsp1res.dll
C:\WINDOWS\SYSTEM32\MUI\0419\xpsp2res.dll
C:\WINDOWS\SYSTEM32\MUI\041A\xpsp1res.dll TABLE IV-continued Windows Essential System Files C:\WINDOWS\SYSTEM32\MUI\041B\xpob2res.dll
C:\WINDOWS\SYSTEM32\MUI\041B\xpsp1res.dll
C:\WINDOWS\SYSTEM32\MUI\041B\xpsp2res.dll
C:\WINDOWS\SYSTEM32\MUI\041D\xpob2res.dll
C:\WINDOWS\SYSTEM32\MUI\041D\xpsp1res.dll
C:\WINDOWS\SYSTEM32\MUI\041D\xpsp2res.dll
C:\WINDOWS\SYSTEM32\MUI\041E\xpsp1res.dll
C:\WINDOWS\SYSTEM32\MUI\041F\xpob2res.dll
C:\WINDOWS\SYSTEM32\MUI\041F\xpsp1res.dll
C:\WINDOWS\SYSTEM32\MUI\041F\xpsp2res.dll
C:\WINDOWS\SYSTEM32\MUI\0424\xpob2res.dll
C:\WINDOWS\SYSTEM32\MUI\0424\xpsp1res.dll
C:\WINDOWS\SYSTEM32\MUI\0424\xpsp2res.dll
C:\WINDOWS\SYSTEM32\MUI\0425\xpsp1res.dll
C:\WINDOWS\SYSTEM32\MUI\0426\xpsp1res.dll
C:\WINDOWS\SYSTEM32\MUI\0427\xpsp1res.dll
C:\WINDOWS\SYSTEM32\MUI\0804\xpob2res.dll
C:\WINDOWS\SYSTEM32\MUI\0804\xpsp1res.dll
C:\WINDOWS\SYSTEM32\MUI\0804\xpsp2res.dll
C:\WINDOWS\SYSTEM32\MUI\0816\xpob2res.dll
C:\WINDOWS\SYSTEM32\MUI\0816\xpsp1res.dll
C:\WINDOWS\SYSTEM32\MUI\0816\xpsp2res.dll
C:\WINDOWS\SYSTEM32\MUI\0C0A\xpob2res.dll
C:\WINDOWS\SYSTEM32\MUI\0C0A\xpsp1res.dll
C:\WINDOWS\SYSTEM32\MUI\0C0A\xpsp2res.dll
C:\WINDOWS\SYSTEM32\MYCOMPUT.DLL
C:\WINDOWS\SYSTEM32\mydocs.dll
C:\WINDOWS\SYSTEM32\narrator.exe
C:\WINDOWS\SYSTEM32\NARRHOOK.DLL
C:\WINDOWS\SYSTEM32\NBTSTAT.EXE
C:\WINDOWS\SYSTEM32\ncobjapi.dll
C:\WINDOWS\SYSTEM32\NCXPNT.DLL
C:\WINDOWS\SYSTEM32\nddeapi.dll
C:\WINDOWS\SYSTEM32\nddeapir.exe
C:\WINDOWS\SYSTEM32\nddenb32.dll
C:\WINDOWS\SYSTEM32\net.exe
C:\WINDOWS\SYSTEM32\net1.exe
C:\WINDOWS\SYSTEM32\NETAPI.DLL
C:\WINDOWS\SYSTEM32\netapi32.dll
C:\WINDOWS\SYSTEM32\netcfgx.dll
C:\WINDOWS\SYSTEM32\netdde.exe
C:\WINDOWS\SYSTEM32\NETEVENT.DLL
C:\WINDOWS\SYSTEM32\netfxperf.dll
C:\WINDOWS\SYSTEM32\NETH.DLL
C:\WINDOWS\SYSTEM32\netid.dll
C:\WINDOWS\SYSTEM32\netlogon.dll
C:\WINDOWS\SYSTEM32\netman.dll
C:\WINDOWS\SYSTEM32\NETMSG.DLL
C:\WINDOWS\SYSTEM32\netplwiz.dll
C:\WINDOWS\SYSTEM32\netrap.dll
C:\WINDOWS\SYSTEM32\netsetup.exe
C:\WINDOWS\SYSTEM32\netsh.exe
C:\WINDOWS\SYSTEM32\netshell.dll
C:\WINDOWS\SYSTEM32\netstat.exe
C:\WINDOWS\SYSTEM32\netui0.dll
C:\WINDOWS\SYSTEM32\netui0.dll
C:\WINDOWS\SYSTEM32\NETUI2.DLL
C:\WINDOWS\SYSTEM32\newdev.dll
C:\WINDOWS\SYSTEM32\nlhtml.dll
C:\WINDOWS\SYSTEM32\NLSFUNC.EXE
C:\WINDOWS\SYSTEM32\NMCOM.DLL
C:\WINDOWS\SYSTEM32\NMEVTMSG.DLL
C:\WINDOWS\SYSTEM32\nmmkcert.dll
C:\WINDOWS\SYSTEM32\notepad.exe
C:\WINDOWS\SYSTEM32\Npindeo.dll
C:\WINDOWS\SYSTEM32\NPP\ndisnpp.dll
C:\WINDOWS\SYSTEM32\NPP\nppagent.exe
C:\WINDOWS\SYSTEM32\npptools.dll
C:\WINDOWS\SYSTEM32\npwmsdrm.dll
C:\WINDOWS\SYSTEM32\nslookup.exe
C:\WINDOWS\SYSTEM32\nsndis5.sys
C:\WINDOWS\SYSTEM32\nsndis50.dll
C:\WINDOWS\SYSTEM32\ntdll.dll
C:\WINDOWS\SYSTEM32\NTDOS.SYS
C:\WINDOWS\SYSTEM32\NTDOS404.SYS
C:\WINDOWS\SYSTEM32\NTDOS411.SYS
C:\WINDOWS\SYSTEM32\NTDOS412.SYS
C:\WINDOWS\SYSTEM32\NTDOS804.SYS TABLE IV-continued

| Windows Essential System Files |
|---|
| C:\WINDOWS\SYSTEM32\ntdsapi.dll |
| C:\WINDOWS\SYSTEM32\NTDSBCLI.DLL |
| C:\WINDOWS\SYSTEM32\ntio.sys |
| C:\WINDOWS\SYSTEM32\ntio404.sys |
| C:\WINDOWS\SYSTEM32\ntio411.sys |
| C:\WINDOWS\SYSTEM32\ntio412.sys |
| C:\WINDOWS\SYSTEM32\ntio804.sys |
| C:\WINDOWS\SYSTEM32\ntkrnlpa.exe |
| C:\WINDOWS\SYSTEM32\ntlanman.dll |
| C:\WINDOWS\SYSTEM32\NTLANUI.DLL |
| C:\WINDOWS\SYSTEM32\NTLANUI2.DLL |
| C:\WINDOWS\SYSTEM32\ntlsapi.dll |
| C:\WINDOWS\SYSTEM32\ntmarta.dll |
| C:\WINDOWS\SYSTEM32\ntmsapi.dll |
| C:\WINDOWS\SYSTEM32\ntmsdba.dll |
| C:\WINDOWS\SYSTEM32\NTMSEVT.DLL |
| C:\WINDOWS\SYSTEM32\ntmsmgr.dll |
| C:\WINDOWS\SYSTEM32\ntmssvc.dll |
| C:\WINDOWS\SYSTEM32\ntoskrnl.exe |
| C:\WINDOWS\SYSTEM32\ntprint.dll |
| C:\WINDOWS\SYSTEM32\NTSD.EXE |
| C:\WINDOWS\SYSTEM32\NTSDEXTS.DLL |
| C:\WINDOWS\SYSTEM32\ntshrui.dll |
| C:\WINDOWS\SYSTEM32\ntvdm.exe |
| C:\WINDOWS\SYSTEM32\NTVDMD.DLL |
| C:\WINDOWS\SYSTEM32\nv4_disp.dll |
| C:\WINDOWS\SYSTEM32\NW16.EXE |
| C:\WINDOWS\SYSTEM32\NWAPI16.DLL |
| C:\WINDOWS\SYSTEM32\NWAPI32.DLL |
| C:\WINDOWS\SYSTEM32\NWCFG.DLL |
| C:\WINDOWS\SYSTEM32\NWEVENT.DLL |
| C:\WINDOWS\SYSTEM32\nwprovau.dll |
| C:\WINDOWS\SYSTEM32\NWSCRIPT.EXE |
| C:\WINDOWS\SYSTEM32\nwwks.dll |
| C:\WINDOWS\SYSTEM32\oakley.dll |
| C:\WINDOWS\SYSTEM32\objsel.dll |
| C:\WINDOWS\SYSTEM32\occache.dll |
| C:\WINDOWS\SYSTEM32\OCMANAGE.DLL |
| C:\WINDOWS\SYSTEM32\ODBC16GT.DLL |
| C:\WINDOWS\SYSTEM32\odbc32.dll |
| C:\WINDOWS\SYSTEM32\odbc32gt.dll |
| C:\WINDOWS\SYSTEM32\odbcad32.exe |
| C:\WINDOWS\SYSTEM32\odbcbcp.dll |
| C:\WINDOWS\SYSTEM32\odbcconf.dll |
| C:\WINDOWS\SYSTEM32\odbcconf.exe |
| C:\WINDOWS\SYSTEM32\odbccp32.dll |
| C:\WINDOWS\SYSTEM32\odbccr32.dll |
| C:\WINDOWS\SYSTEM32\odbccu32.dll |
| C:\WINDOWS\SYSTEM32\odbcint.dll |
| C:\WINDOWS\SYSTEM32\odbcji32.dll |
| C:\WINDOWS\SYSTEM32\odbcjt32.dll |
| C:\WINDOWS\SYSTEM32\odbcp32r.dll |
| C:\WINDOWS\SYSTEM32\odbctrac.dll |
| C:\WINDOWS\SYSTEM32\oddbse32.dll |
| C:\WINDOWS\SYSTEM32\odexl32.dll |
| C:\WINDOWS\SYSTEM32\odfox32.dll |
| C:\WINDOWS\SYSTEM32\odpdx32.dll |
| C:\WINDOWS\SYSTEM32\odtext32.dll |
| C:\WINDOWS\SYSTEM32\oemdspif.dll |
| C:\WINDOWS\SYSTEM32\offfilt.dll |
| C:\WINDOWS\SYSTEM32\OLE2.DLL |
| C:\WINDOWS\SYSTEM32\OLE2DISP.DLL |
| C:\WINDOWS\SYSTEM32\OLE2NLS.DLL |
| C:\WINDOWS\SYSTEM32\ole32.dll |
| C:\WINDOWS\SYSTEM32\OLEACC.DLL |
| C:\WINDOWS\SYSTEM32\OLEACCRC.DLL |
| C:\WINDOWS\SYSTEM32\oleaut32.dll |
| C:\WINDOWS\SYSTEM32\OLECLI.DLL |
| C:\WINDOWS\SYSTEM32\olecli32.dll |
| C:\WINDOWS\SYSTEM32\olecnv32.dll |
| C:\WINDOWS\SYSTEM32\OLEDLG.DLL |
| C:\WINDOWS\SYSTEM32\oleprn.dll |
| C:\WINDOWS\SYSTEM32\olepro32.dll |
| C:\WINDOWS\SYSTEM32\OLESVR.DLL |
| C:\WINDOWS\SYSTEM32\OLESVR32.DLL |
| C:\WINDOWS\SYSTEM32\OLETHK32.DLL |
| C:\WINDOWS\SYSTEM32\OOBE\msobcomm.dll |
| C:\WINDOWS\SYSTEM32\OOBE\msobdl.dll |

TABLE IV-continued

Windows Essential System Files

C:\WINDOWS\SYSTEM32\OOBE\msobmain.dll
C:\WINDOWS\SYSTEM32\OOBE\msobshel.dll
C:\WINDOWS\SYSTEM32\OOBE\msobweb.dll
C:\WINDOWS\SYSTEM32\OOBE\MSOOBE.EXE
C:\WINDOWS\SYSTEM32\OOBE\oobebaln.exe
C:\WINDOWS\SYSTEM32\openfiles.exe
C:\WINDOWS\SYSTEM32\opengl32.dll
C:\WINDOWS\SYSTEM32\osk.exe
C:\WINDOWS\SYSTEM32\p2p.dll
C:\WINDOWS\SYSTEM32\p2pgasvc.dll
C:\WINDOWS\SYSTEM32\p2pgraph.dll
C:\WINDOWS\SYSTEM32\p2pnetsh.dll
C:\WINDOWS\SYSTEM32\p2psvc.dll
C:\WINDOWS\SYSTEM32\packager.exe
C:\WINDOWS\SYSTEM32\packet.dll
C:\WINDOWS\SYSTEM32\PANMAP.DLL
C:\WINDOWS\SYSTEM32\PAQSP.DLL
C:\WINDOWS\SYSTEM32\PATHPING.EXE
C:\WINDOWS\SYSTEM32\pautoenr.dll
C:\WINDOWS\SYSTEM32\PCANDIS5.SYS
C:\WINDOWS\SYSTEM32\PCDLIB32.DLL
C:\WINDOWS\SYSTEM32\pdh.dll
C:\WINDOWS\SYSTEM32\PENTNT.EXE
C:\WINDOWS\SYSTEM32\perfctrs.dll
C:\WINDOWS\SYSTEM32\perfdisk.dll
C:\WINDOWS\SYSTEM32\perfmon.exe
C:\WINDOWS\SYSTEM32\PERFNET.DLL
C:\WINDOWS\SYSTEM32\PERFNW.DLL
C:\WINDOWS\SYSTEM32\perfos.dll
C:\WINDOWS\SYSTEM32\perfproc.dll
C:\WINDOWS\SYSTEM32\PERFTS.DLL
C:\WINDOWS\SYSTEM32\phototoys.dll
C:\WINDOWS\SYSTEM32\photowiz.dll
C:\WINDOWS\SYSTEM32\picn20.dll
C:\WINDOWS\SYSTEM32\pid.dll
C:\WINDOWS\SYSTEM32\pidgen.dll
C:\WINDOWS\SYSTEM32\PIFMGR.DLL
C:\WINDOWS\SYSTEM32\ping.exe
C:\WINDOWS\SYSTEM32\PING6.EXE
C:\WINDOWS\SYSTEM32\pjlmon.dll
C:\WINDOWS\SYSTEM32\PLUSTAB.DLL
C:\WINDOWS\SYSTEM32\PMSPL.DLL
C:\WINDOWS\SYSTEM32\pncrt.dll
C:\WINDOWS\SYSTEM32\pndx5016.dll
C:\WINDOWS\SYSTEM32\pndx5032.dll
C:\WINDOWS\SYSTEM32\pngfilt.dll
C:\WINDOWS\SYSTEM32\pnrpnsp.dll
C:\WINDOWS\SYSTEM32\polstore.dll
C:\WINDOWS\SYSTEM32\powercfg.exe
C:\WINDOWS\SYSTEM32\powrprof.dll
C:\WINDOWS\SYSTEM32\PRFLBMSG.DLL
C:\WINDOWS\SYSTEM32\PRINT.EXE
C:\WINDOWS\SYSTEM32\printui.dll
C:\WINDOWS\SYSTEM32\PRISMIOC.dll
C:\WINDOWS\SYSTEM32\PRISMRES.dll
C:\WINDOWS\SYSTEM32\profmap.dll
C:\WINDOWS\SYSTEM32\progman.exe
C:\WINDOWS\SYSTEM32\proquota.exe
C:\WINDOWS\SYSTEM32\proxycfg.exe
C:\WINDOWS\SYSTEM32\psapi.dll
C:\WINDOWS\SYSTEM32\psbase.dll
C:\WINDOWS\SYSTEM32\PSCHDPRF.DLL
C:\WINDOWS\SYSTEM32\psisdecd.dll
C:\WINDOWS\SYSTEM32\PSNPPAGN.DLL
C:\WINDOWS\SYSTEM32\pspascrrc.dll
C:\WINDOWS\SYSTEM32\pstorec.dll
C:\WINDOWS\SYSTEM32\pstorsvc.dll
C:\WINDOWS\SYSTEM32\pthreadVC.dll
C:\WINDOWS\SYSTEM32\Px.dll
C:\WINDOWS\SYSTEM32\pxdrv.dll
C:\WINDOWS\SYSTEM32\pxhpinst.exe
C:\WINDOWS\SYSTEM32\PxMas.dll
C:\WINDOWS\SYSTEM32\PxWave.dll
C:\WINDOWS\SYSTEM32\PXWMA.dll
C:\WINDOWS\SYSTEM32\QAPPSRV.EXE
C:\WINDOWS\SYSTEM32\qasf.dll
C:\WINDOWS\SYSTEM32\qcap.dll
C:\WINDOWS\SYSTEM32\QCUI2.dll TABLE IV-continued Windows Essential System Files C:\WINDOWS\SYSTEM32\qdv.dll
C:\WINDOWS\SYSTEM32\qdvd.dll
C:\WINDOWS\SYSTEM32\qedit.dll
C:\WINDOWS\SYSTEM32\qedwipes.dll
C:\WINDOWS\SYSTEM32\qmgr.dll
C:\WINDOWS\SYSTEM32\qmgrprxy.dll
C:\WINDOWS\SYSTEM32\QOSNAME.DLL
C:\WINDOWS\SYSTEM32\qprocess.exe
C:\WINDOWS\SYSTEM32\qt-mt305.dll
C:\WINDOWS\SYSTEM32\qt-mt332.dll
C:\WINDOWS\SYSTEM32\quartz.dll
C:\WINDOWS\SYSTEM32\query.dll
C:\WINDOWS\SYSTEM32\QuickTime\QuickTimeUpdateHelper.exe
C:\WINDOWS\SYSTEM32\QWINSTA.EXE
C:\WINDOWS\SYSTEM32\racpldlg.dll
C:\WINDOWS\SYSTEM32\rasadhlp.dll
C:\WINDOWS\SYSTEM32\rasapi32.dll
C:\WINDOWS\SYSTEM32\rasauto.dll
C:\WINDOWS\SYSTEM32\RASAUTOU.EXE
C:\WINDOWS\SYSTEM32\raschap.dll
C:\WINDOWS\SYSTEM32\RASCTRS.DLL
C:\WINDOWS\SYSTEM32\RASDIAL.EXE
C:\WINDOWS\SYSTEM32\rasdlg.dll
C:\WINDOWS\SYSTEM32\rasman.dll
C:\WINDOWS\SYSTEM32\rasmans.dll
C:\WINDOWS\SYSTEM32\RASMONTR.DLL
C:\WINDOWS\SYSTEM32\RASMXS.DLL
C:\WINDOWS\SYSTEM32\rasphone.exe
C:\WINDOWS\SYSTEM32\rasppp.dll
C:\WINDOWS\SYSTEM32\RASRAD.DLL
C:\WINDOWS\SYSTEM32\rassapi.dll
C:\WINDOWS\SYSTEM32\RASSER.DLL
C:\WINDOWS\SYSTEM32\rastapi.dll
C:\WINDOWS\SYSTEM32\rastls.dll
C:\WINDOWS\SYSTEM32\rcbdyctl.dll
C:\WINDOWS\SYSTEM32\rcimlby.exe
C:\WINDOWS\SYSTEM32\rcp.exe
C:\WINDOWS\SYSTEM32\rdchost.dll
C:\WINDOWS\SYSTEM32\RDOCURS.DLL
C:\WINDOWS\SYSTEM32\RDPCFGEX.DLL
C:\WINDOWS\SYSTEM32\rdpclip.exe
C:\WINDOWS\SYSTEM32\rdpdd.dll
C:\WINDOWS\SYSTEM32\rdpsnd.dll
C:\WINDOWS\SYSTEM32\rdpwsx.dll
C:\WINDOWS\SYSTEM32\rdsaddin.exe
C:\WINDOWS\SYSTEM32\rdshost.exe
C:\WINDOWS\SYSTEM32\RECOVER.EXE
C:\WINDOWS\SYSTEM32\redir.exe
C:\WINDOWS\SYSTEM32\reg.exe
C:\WINDOWS\SYSTEM32\regapi.dll
C:\WINDOWS\SYSTEM32\REGEDT32.EXE
C:\WINDOWS\SYSTEM32\REGINI.EXE
C:\WINDOWS\SYSTEM32\regsvc.dll
C:\WINDOWS\SYSTEM32\regsvr32.exe
C:\WINDOWS\SYSTEM32\REGWIZ.EXE
C:\WINDOWS\SYSTEM32\regwizc.dll
C:\WINDOWS\SYSTEM32\RELOG.EXE
C:\WINDOWS\SYSTEM32\remotepg.dll
C:\WINDOWS\SYSTEM32\REND.DLL
C:\WINDOWS\SYSTEM32\REPLACE.EXE
C:\WINDOWS\SYSTEM32\RESET.EXE
C:\WINDOWS\SYSTEM32\ResolveX.dll
C:\WINDOWS\SYSTEM32\Restore\rstrui.exe
C:\WINDOWS\SYSTEM32\Restore\SRDIAG.EXE
C:\WINDOWS\SYSTEM32\resutils.dll
C:\WINDOWS\SYSTEM32\rexec.exe
C:\WINDOWS\SYSTEM32\riched20.dll
C:\WINDOWS\SYSTEM32\RICHED32.DLL
C:\WINDOWS\SYSTEM32\rmoc3260.dll
C:\WINDOWS\SYSTEM32\RNR20.DLL
C:\WINDOWS\SYSTEM32\roboex32.dll
C:\WINDOWS\SYSTEM32\ROUTE.EXE
C:\WINDOWS\SYSTEM32\ROUTEMON.EXE
C:\WINDOWS\SYSTEM32\ROUTETAB.DLL
C:\WINDOWS\SYSTEM32\RPCNS4.DLL
C:\WINDOWS\SYSTEM32\rpert4.dll
C:\WINDOWS\SYSTEM32\rpcss.dll
C:\WINDOWS\SYSTEM32\RPRWord.dll TABLE IV-continued Windows Essential System Files C:\WINDOWS\SYSTEM32\rsaenh.dll
C:\WINDOWS\SYSTEM32\RSFSAPS.DLL
C:\WINDOWS\SYSTEM32\rsh.exe
C:\WINDOWS\SYSTEM32\rshx32.dll
C:\WINDOWS\SYSTEM32\RSM.EXE
C:\WINDOWS\SYSTEM32\rsmps.dll
C:\WINDOWS\SYSTEM32\RSMSINK.EXE
C:\WINDOWS\SYSTEM32\RSMUI.EXE
C:\WINDOWS\SYSTEM32\rsnotify.exe
C:\WINDOWS\SYSTEM32\RSOPPROV.EXE
C:\WINDOWS\SYSTEM32\RSVP.EXE
C:\WINDOWS\SYSTEM32\RSVPMSG.DLL
C:\WINDOWS\SYSTEM32\RSVPPERF.DLL
C:\WINDOWS\SYSTEM32\RSVPSP.DLL
C:\WINDOWS\SYSTEM32\RTCRES.dll
C:\WINDOWS\SYSTEM32\rtcshare.exe
C:\WINDOWS\SYSTEM32\rtipxmib.dll
C:\WINDOWS\SYSTEM32\RTM.DLL
C:\WINDOWS\SYSTEM32\rtutils.dll
C:\WINDOWS\SYSTEM32\RUNAS.EXE
C:\WINDOWS\SYSTEM32\rundll32.exe
C:\WINDOWS\SYSTEM32\runonce.exe
C:\WINDOWS\SYSTEM32\RWINSTA.EXE
C:\WINDOWS\SYSTEM32\rwnh.dll
C:\WINDOWS\SYSTEM32\s3gnb.dll
C:\WINDOWS\SYSTEM32\safrcdlg.dll
C:\WINDOWS\SYSTEM32\safrdm.dll
C:\WINDOWS\SYSTEM32\safrslv.dll
C:\WINDOWS\SYSTEM32\samlib.dll
C:\WINDOWS\SYSTEM32\samsrv.dll
C:\WINDOWS\SYSTEM32\savedump.exe
C:\WINDOWS\SYSTEM32\sbe.dll
C:\WINDOWS\SYSTEM32\sbeio.dll
C:\WINDOWS\SYSTEM32\SC.EXE
C:\WINDOWS\SYSTEM32\scarddlg.dll
C:\WINDOWS\SYSTEM32\SCARDSSP.DLL
C:\WINDOWS\SYSTEM32\scardsvr.exe
C:\WINDOWS\SYSTEM32\SCCBASE.DLL
C:\WINDOWS\SYSTEM32\sccsccp.dll
C:\WINDOWS\SYSTEM32\scecli.dll
C:\WINDOWS\SYSTEM32\scesrv.dll
C:\WINDOWS\SYSTEM32\schannel.dll
C:\WINDOWS\SYSTEM32\schedsvc.dll
C:\WINDOWS\SYSTEM32\schtasks.exe
C:\WINDOWS\SYSTEM32\sclgntfy.dll
C:\WINDOWS\SYSTEM32\SCP32.DLL
C:\WINDOWS\SYSTEM32\SCREDIR.DLL
C:\WINDOWS\SYSTEM32\SCRIPTO.DLL
C:\WINDOWS\SYSTEM32\SCRIPTPW.DLL
C:\WINDOWS\SYSTEM32\scrobj.dll
C:\WINDOWS\SYSTEM32\scrrnde.dll
C:\WINDOWS\SYSTEM32\scrrun.dll
C:\WINDOWS\SYSTEM32\sdbinst.exe
C:\WINDOWS\SYSTEM32\sdhcinst.dll
C:\WINDOWS\SYSTEM32\SDPBLB.DLL
C:\WINDOWS\SYSTEM32\secedit.exe
C:\WINDOWS\SYSTEM32\seclogon.dll
C:\WINDOWS\SYSTEM32\secur32.dll
C:\WINDOWS\SYSTEM32\security.dll
C:\WINDOWS\SYSTEM32\sendcmsg.dll
C:\WINDOWS\SYSTEM32\sendmail.dll
C:\WINDOWS\SYSTEM32\sens.dll
C:\WINDOWS\SYSTEM32\sensapi.dll
C:\WINDOWS\SYSTEM32\SENSCFG.DLL
C:\WINDOWS\SYSTEM32\SERIALUI.DLL
C:\WINDOWS\SYSTEM32\servdeps.dll
C:\WINDOWS\SYSTEM32\services.exe
C:\WINDOWS\SYSTEM32\SERWVDRV.DLL
C:\WINDOWS\SYSTEM32\sessmgr.exe
C:\WINDOWS\SYSTEM32\Setfcnam.dll
C:\WINDOWS\SYSTEM32\sethc.exe
C:\WINDOWS\SYSTEM32\setup.exe
C:\WINDOWS\SYSTEM32\Setup\COMSETUP.DLL
C:\WINDOWS\SYSTEM32\Setup\fp40ext.dll
C:\WINDOWS\SYSTEM32\Setup\FSCONINS.DLL
C:\WINDOWS\SYSTEM32\Setup\fxsocm.dll
C:\WINDOWS\SYSTEM32\Setup\iis.dll
C:\WINDOWS\SYSTEM32\Setup\IMSINSNT.DLL TABLE IV-continued Windows Essential System Files C:\WINDOWS\SYSTEM32\Setup\medctroc.dll
C:\WINDOWS\SYSTEM32\Setup\MSDTCSTP.DLL
C:\WINDOWS\SYSTEM32\Setup\msgrocm.dll
C:\WINDOWS\SYSTEM32\Setup\msmqocm.dll
C:\WINDOWS\SYSTEM32\Setup\NETFXOCM.DLL
C:\WINDOWS\SYSTEM32\Setup\netoc.dll
C:\WINDOWS\SYSTEM32\Setup\ntoc.dll
C:\WINDOWS\SYSTEM32\Setup\ocgen.dll
C:\WINDOWS\SYSTEM32\Setup\ocmsn.dll
C:\WINDOWS\SYSTEM32\Setup\setupqry.dll
C:\WINDOWS\SYSTEM32\Setup\tabletoc.dll
C:\WINDOWS\SYSTEM32\Setup\tsoc.dll
C:\WINDOWS\SYSTEM32\Setup\ZONEOC.DLL
C:\WINDOWS\SYSTEM32\setupapi.dll
C:\WINDOWS\SYSTEM32\SETUPDLL.DLL
C:\WINDOWS\SYSTEM32\SETVER.EXE
C:\WINDOWS\SYSTEM32\sfc.dll
C:\WINDOWS\SYSTEM32\SFC.EXE
C:\WINDOWS\SYSTEM32\sfc_os.dll
C:\WINDOWS\SYSTEM32\sfcFiles.dll
C:\WINDOWS\SYSTEM32\SFMAPI.DLL
C:\WINDOWS\SYSTEM32\SfxBar.dll
C:\WINDOWS\SYSTEM32\SHADOW.EXE
C:\WINDOWS\SYSTEM32\SHARE.EXE
C:\WINDOWS\SYSTEM32\shazammp3.dll
C:\WINDOWS\SYSTEM32\shdoclc.dll
C:\WINDOWS\SYSTEM32\shdocvw.dll
C:\WINDOWS\SYSTEM32\SHELL.DLL
C:\WINDOWS\SYSTEM32\shell32.dll
C:\WINDOWS\SYSTEM32\shellstyle.dll
C:\WINDOWS\SYSTEM32\shfolder.dll
C:\WINDOWS\SYSTEM32\shgina.dll
C:\WINDOWS\SYSTEM32\shimeng.dll
C:\WINDOWS\SYSTEM32\shimgvw.dll
C:\WINDOWS\SYSTEM32\shlwapi.dll
C:\WINDOWS\SYSTEM32\shmedia.dll
C:\WINDOWS\SYSTEM32\shmgrate.exe
C:\WINDOWS\SYSTEM32\shrpubw.exe
C:\WINDOWS\SYSTEM32\shscrap.dll
C:\WINDOWS\SYSTEM32\shsvcs.dll
C:\WINDOWS\SYSTEM32\shutdown.exe
C:\WINDOWS\SYSTEM32\sigtab.dll
C:\WINDOWS\SYSTEM32\sigverif.exe
C:\WINDOWS\SYSTEM32\SISBKUP.DLL
C:\WINDOWS\SYSTEM32\SKDLL.DLL
C:\WINDOWS\SYSTEM32\skeys.exe
C:\WINDOWS\SYSTEM32\slayerxp.dll
C:\WINDOWS\SYSTEM32\slbcsp.dll
C:\WINDOWS\SYSTEM32\slbiop.dll
C:\WINDOWS\SYSTEM32\SLBRCCSP.DLL
C:\WINDOWS\SYSTEM32\slcoinst.dll
C:\WINDOWS\SYSTEM32\slextspk.dll
C:\WINDOWS\SYSTEM32\slgen.dll
C:\WINDOWS\SYSTEM32\slrundll.exe
C:\WINDOWS\SYSTEM32\slserv..exe
C:\WINDOWS\SYSTEM32\smbinst.exe
C:\WINDOWS\SYSTEM32\smlogcfg.dll
C:\WINDOWS\SYSTEM32\smlogsvc.exe
C:\WINDOWS\SYSTEM32\smss.exe
C:\WINDOWS\SYSTEM32\smtpapi.dll
C:\WINDOWS\SYSTEM32\sndrec32.exe
C:\WINDOWS\SYSTEM32\SNDVOL32.EXE
C:\WINDOWS\SYSTEM32\snmpapi.dll
C:\WINDOWS\SYSTEM32\snmpsnap.dll
C:\WINDOWS\SYSTEM32\SOFTPUB.DLL
C:\WINDOWS\SYSTEM32\SOL.EXE
C:\WINDOWS\SYSTEM32\SORT.EXE
C:\WINDOWS\SYSTEM32\spdwnwxp.exe
C:\WINDOWS\SYSTEM32\spider.exe
C:\WINDOWS\SYSTEM32\spiisupd.exe
C:\WINDOWS\SYSTEM32\spmsg.dll
C:\WINDOWS\SYSTEM32\SPNIKE.DLL
C:\WINDOWS\SYSTEM32\spnpinst.exe
C:\WINDOWS\SYSTEM32\SPOOL\DRIVERS\W32X86\3\AD2KREGP.DLL
C:\WINDOWS\SYSTEM32\SPOOL\DRIVERS\W32X86\3\AD2KUIGP.DLL
C:\WINDOWS\SYSTEM32\SPOOL\DRIVERS\W32X86\3\C710BM.DLL
C:\WINDOWS\SYSTEM32\SPOOL\DRIVERS\W32X86\3\C720BM.DLL
C:\WINDOWS\SYSTEM32\SPOOL\DRIVERS\W32X86\3\C750BM.DLL TABLE IV-continued Windows Essential System Files C:\WINDOWS\SYSTEM32\SPOOL\DRIVERS\W32X86\3\C910BM.DLL
C:\WINDOWS\SYSTEM32\SPOOL\DRIVERS\W32X86\3\DRVNPANT.DLL
C:\WINDOWS\SYSTEM32\SPOOL\DRIVERS\W32X86\3\E32XBM.DLL
C:\WINDOWS\SYSTEM32\SPOOL\DRIVERS\W32X86\3\E855BM.DLL
C:\WINDOWS\SYSTEM32\SPOOL\DRIVERS\W32X86\3\fxsapi.dll
C:\WINDOWS\SYSTEM32\SPOOL\DRIVERS\W32X86\3\fxsdrv.dll
C:\WINDOWS\SYSTEM32\SPOOL\DRIVERS\W32X86\3\fxsres.dll
C:\WINDOWS\SYSTEM32\SPOOL\DRIVERS\W32X86\3\fxstiff.dll
C:\WINDOWS\SYSTEM32\SPOOL\DRIVERS\W32X86\3\fxsui.dll
C:\WINDOWS\SYSTEM32\SPOOL\DRIVERS\W32X86\3\fxswzrd.dll
C:\WINDOWS\SYSTEM32\SPOOL\DRIVERS\W32X86\3\gl2hlpax.dll
C:\WINDOWS\SYSTEM32\SPOOL\DRIVERS\W32X86\3\GLCFG.DLL
C:\WINDOWS\SYSTEM32\SPOOL\DRIVERS\W32X86\3\K1220BM.DLL
C:\WINDOWS\SYSTEM32\SPOOL\DRIVERS\W32X86\3\LEXCFI.DLL
C:\WINDOWS\SYSTEM32\SPOOL\DRIVERS\W32X86\3\LEXDRVIN.EXE
C:\WINDOWS\SYSTEM32\SPOOL\DRIVERS\W32X86\3\LEXDRVX.DLL
C:\WINDOWS\SYSTEM32\SPOOL\DRIVERS\W32X86\3\LEXEDF.DLL
C:\WINDOWS\SYSTEM32\SPOOL\DRIVERS\W32X86\3\LEXFNTRC.DLL
C:\WINDOWS\SYSTEM32\SPOOL\DRIVERS\W32X86\3\LEXPSLNG.DLL
C:\WINDOWS\SYSTEM32\SPOOL\DRIVERS\W32X86\3\lexpsnt3.dll
C:\WINDOWS\SYSTEM32\SPOOL\DRIVERS\W32X86\3\LEXPSNTU.DLL
C:\WINDOWS\SYSTEM32\SPOOL\DRIVERS\W32X86\3\LMPCLTHK.DLL
C:\WINDOWS\SYSTEM32\SPOOL\DRIVERS\W32X86\3\M410BM.DLL
C:\WINDOWS\SYSTEM32\SPOOL\DRIVERS\W32X86\3\OC1200BM.DLL
C:\WINDOWS\SYSTEM32\SPOOL\DRIVERS\W32X86\3\OC40BM.DLL
C:\WINDOWS\SYSTEM32\SPOOL\DRIVERS\W32X86\3\OC45BM.DLL
C:\WINDOWS\SYSTEM32\SPOOL\DRIVERS\W32X86\3\OPTRASBM.DLL
C:\WINDOWS\SYSTEM32\SPOOL\DRIVERS\W32X86\3\ps5ui.dll
C:\WINDOWS\SYSTEM32\SPOOL\DRIVERS\W32X86\3\pscript5.dll
C:\WINDOWS\SYSTEM32\SPOOL\DRIVERS\W32X86\3\PTAPIW32.DLL
C:\WINDOWS\SYSTEM32\SPOOL\DRIVERS\W32X86\3\PTGUIW32.DLL
C:\WINDOWS\SYSTEM32\SPOOL\DRIVERS\W32X86\3\PTRESW32.DLL
C:\WINDOWS\SYSTEM32\SPOOL\DRIVERS\W32X86\3\PTZIPW32.DLL
C:\WINDOWS\SYSTEM32\SPOOL\DRIVERS\W32X86\3\ROBOEX32.DLL
C:\WINDOWS\SYSTEM32\SPOOL\DRIVERS\W32X86\3\SC1275BM.DLL
C:\WINDOWS\SYSTEM32\SPOOL\DRIVERS\W32X86\3\sc3disc.dll
C:\WINDOWS\SYSTEM32\SPOOL\DRIVERS\W32X86\3\SC3MI.DLL
C:\WINDOWS\SYSTEM32\SPOOL\DRIVERS\W32X86\3\SC3MISVR.EXE
C:\WINDOWS\SYSTEM32\SPOOL\DRIVERS\W32X86\3\SC3PRCFG.DLL
C:\WINDOWS\SYSTEM32\SPOOL\DRIVERS\W32X86\3\SC3PS3C.DLL
C:\WINDOWS\SYSTEM32\SPOOL\DRIVERS\W32X86\3\SC3PS3J.DLL
C:\WINDOWS\SYSTEM32\SPOOL\DRIVERS\W32X86\3\SC3PS3K.DLL
C:\WINDOWS\SYSTEM32\SPOOL\DRIVERS\W32X86\3\SC3PS3L.DLL
C:\WINDOWS\SYSTEM32\SPOOL\DRIVERS\W32X86\3\SC3PS3P.DLL
C:\WINDOWS\SYSTEM32\SPOOL\DRIVERS\W32X86\3\SC3PS3Q.EXE
C:\WINDOWS\SYSTEM32\SPOOL\DRIVERS\W32X86\3\SC3PS3S.DLL
C:\WINDOWS\SYSTEM32\SPOOL\DRIVERS\W32X86\3\SC3PS3U.DLL
C:\WINDOWS\SYSTEM32\SPOOL\DRIVERS\W32X86\3\SC3PS3WK.DLL
C:\WINDOWS\SYSTEM32\SPOOL\DRIVERS\W32X86\3\SC3PS3WU.DLL
C:\WINDOWS\SYSTEM32\SPOOL\DRIVERS\W32X86\3\SC3PS3X.DLL
C:\WINDOWS\SYSTEM32\SPOOL\DRIVERS\W32X86\3\SC3PS3ZK.DLL
C:\WINDOWS\SYSTEM32\SPOOL\DRIVERS\W32X86\3\SC3PS3ZU.DLL
C:\WINDOWS\SYSTEM32\SPOOL\DRIVERS\W32X86\3\SNMP_PP.DLL
C:\WINDOWS\SYSTEM32\SPOOL\DRIVERS\W32X86\3\T61XBM.DLL
C:\WINDOWS\SYSTEM32\SPOOL\DRIVERS\W32X86\3\T62XBM.DLL
C:\WINDOWS\SYSTEM32\SPOOL\DRIVERS\W32X86\3\W810BM.DLL
C:\WINDOWS\SYSTEM32\SPOOL\DRIVERS\W32X86\3\W820BM.DLL
C:\WINDOWS\SYSTEM32\SPOOL\DRIVERS\W32X86\ad2kregp.dll
C:\WINDOWS\SYSTEM32\SPOOL\DRIVERS\W32X86\ad2kuigp.dll
C:\WINDOWS\SYSTEM32\SPOOL\DRIVERS\W32X86\ps5ui.dll
C:\WINDOWS\SYSTEM32\SPOOL\DRIVERS\W32X86\pscript5.dll
C:\WINDOWS\SYSTEM32\spoolss.dll
C:\WINDOWS\SYSTEM32\spoolsv.exe
C:\WINDOWS\SYSTEM32\SPRESTRT.EXE
C:\WINDOWS\SYSTEM32\SPRIO600.DLL
C:\WINDOWS\SYSTEM32\SPRIO800.DLL
C:\WINDOWS\SYSTEM32\spupdsvc.exe
C:\WINDOWS\SYSTEM32\spupdwxp.exe
C:\WINDOWS\SYSTEM32\SPXCOINS.DLL
C:\WINDOWS\SYSTEM32\sqlsrv32.dll
C:\WINDOWS\SYSTEM32\sqlunirl.dll
C:\WINDOWS\SYSTEM32\SQLWID.DLL
C:\WINDOWS\SYSTEM32\SQLWOA.DLL
C:\WINDOWS\SYSTEM32\srclient.dll
C:\WINDOWS\SYSTEM32\srrstr.dll
C:\WINDOWS\SYSTEM32\srsvc.dll
C:\WINDOWS\SYSTEM32\srvsvc.dll
C:\WINDOWS\SYSTEM32\ssdpapi.dll TABLE IV-continued Windows Essential System Files C:\WINDOWS\SYSTEM32\ssdpsrv.dll
C:\WINDOWS\SYSTEM32\ssleay32.dll
C:\WINDOWS\SYSTEM32\SSPng2.dll
C:\WINDOWS\SYSTEM32\STCLIENT.DLL
C:\WINDOWS\SYSTEM32\sti.dll
C:\WINDOWS\SYSTEM32\sti_ci.dll
C:\WINDOWS\SYSTEM32\stimon.exe
C:\WINDOWS\SYSTEM32\stobject.dll
C:\WINDOWS\SYSTEM32\STORAGE.DLL
C:\WINDOWS\SYSTEM32\storprop.dll
C:\WINDOWS\SYSTEM32\STREAMCI.DLL
C:\WINDOWS\SYSTEM32\strmdll.dll
C:\WINDOWS\SYSTEM32\strmfilt.dll
C:\WINDOWS\SYSTEM32\Strmrsz.dll
C:\WINDOWS\SYSTEM32\SUBST.EXE
C:\WINDOWS\SYSTEM32\svchost.exe
C:\WINDOWS\SYSTEM32\SVCPACK.DLL
C:\WINDOWS\SYSTEM32\swfobjs.dll
C:\WINDOWS\SYSTEM32\SWPRV.DLL
C:\WINDOWS\SYSTEM32\sxs.dll
C:\WINDOWS\SYSTEM32\SYNCAPP.EXE
C:\WINDOWS\SYSTEM32\synceng.dll
C:\WINDOWS\SYSTEM32\SynCOM.dll
C:\WINDOWS\SYSTEM32\SynCtrl.dll
C:\WINDOWS\SYSTEM32\syncui.dll
C:\WINDOWS\SYSTEM32\SynTPAPI.dll
C:\WINDOWS\SYSTEM32\SynTPCoI.dll
C:\WINDOWS\SYSTEM32\SynTPFcs.dll
C:\WINDOWS\SYSTEM32\SYSEDIT.EXE
C:\WINDOWS\SYSTEM32\SYSINV.DLL
C:\WINDOWS\SYSTEM32\SYSKEY.EXE
C:\WINDOWS\SYSTEM32\sysocmgr.exe
C:\WINDOWS\SYSTEM32\syssetup.dll
C:\WINDOWS\SYSTEM32\systeminfo.exe
C:\WINDOWS\SYSTEM32\SYSTRAY.EXE
C:\WINDOWS\SYSTEM32\t2embed.dll
C:\WINDOWS\SYSTEM32\Tabctde.dll
C:\WINDOWS\SYSTEM32\TAPI.DLL
C:\WINDOWS\SYSTEM32\tapi3.dll
C:\WINDOWS\SYSTEM32\tapi32.dll
C:\WINDOWS\SYSTEM32\TAPIPERF.DLL
C:\WINDOWS\SYSTEM32\tapisrv.dll
C:\WINDOWS\SYSTEM32\TAPIUI.DLL
C:\WINDOWS\SYSTEM32\TASKKILL.EXE
C:\WINDOWS\SYSTEM32\TASKLIST.EXE
C:\WINDOWS\SYSTEM32\TASKMAN.EXE
C:\WINDOWS\SYSTEM32\taskmgr.exe
C:\WINDOWS\SYSTEM32\TCMSETUP.EXE
C:\WINDOWS\SYSTEM32\tcpmib.dll
C:\WINDOWS\SYSTEM32\tcpmon.dll
C:\WINDOWS\SYSTEM32\tcpmonui.dll
C:\WINDOWS\SYSTEM32\TCPSVCS.EXE
C:\WINDOWS\SYSTEM32\telnet.exe
C:\WINDOWS\SYSTEM32\termmgr.dll
C:\WINDOWS\SYSTEM32\termsrv.dll
C:\WINDOWS\SYSTEM32\tfswapi.dll
C:\WINDOWS\SYSTEM32\TFTP.EXE
C:\WINDOWS\SYSTEM32\themeui.dll
C:\WINDOWS\SYSTEM32\TimerLite.dll
C:\WINDOWS\SYSTEM32\tlntadmn.exe
C:\WINDOWS\SYSTEM32\tlntsess.exe
C:\WINDOWS\SYSTEM32\tlntsvr.exe
C:\WINDOWS\SYSTEM32\tlntsvrp.dll
C:\WINDOWS\SYSTEM32\TOOLHELP.DLL
C:\WINDOWS\SYSTEM32\tourstart.exe
C:\WINDOWS\SYSTEM32\tracerpt.exe
C:\WINDOWS\SYSTEM32\tracert.exe
C:\WINDOWS\SYSTEM32\TRACERT6.EXE
C:\WINDOWS\SYSTEM32\TRAFFIC.DLL
C:\WINDOWS\SYSTEM32\trkwks.dll
C:\WINDOWS\SYSTEM32\TSAPPCMP.DLL
C:\WINDOWS\SYSTEM32\tsbyuv.dll
C:\WINDOWS\SYSTEM32\tsccvid.dll
C:\WINDOWS\SYSTEM32\tscfgwmi.dll
C:\WINDOWS\SYSTEM32\TSCON.EXE
C:\WINDOWS\SYSTEM32\tscupgrd.exe
C:\WINDOWS\SYSTEM32\TSD32.DLL
C:\WINDOWS\SYSTEM32\tsddd.dll TABLE IV-continued Windows Essential System Files C:\WINDOWS\SYSTEM32\TSDISCON.EXE
C:\WINDOWS\SYSTEM32\TSKILL.EXE
C:\WINDOWS\SYSTEM32\TSSHUTDN.EXE
C:\WINDOWS\SYSTEM32\TTFIWZ6.dll
C:\WINDOWS\SYSTEM32\TweakUI.exe
C:\WINDOWS\SYSTEM32\twext.dll
C:\WINDOWS\SYSTEM32\TwnLib20.dll
C:\WINDOWS\SYSTEM32\txflog.dll
C:\WINDOWS\SYSTEM32\TYPELIB.DLL
C:\WINDOWS\SYSTEM32\TYPEPERF.EXE
C:\WINDOWS\SYSTEM32\udhisapi.dll
C:\WINDOWS\SYSTEM32\UFAT.DLL
C:\WINDOWS\SYSTEM32\ulib.dll
C:\WINDOWS\SYSTEM32\umandlg.dll
C:\WINDOWS\SYSTEM32\UMDMXFRM.DLL
C:\WINDOWS\SYSTEM32\umloader.dll
C:\WINDOWS\SYSTEM32\umpnpmgr.dll
C:\WINDOWS\SYSTEM32\unimdmat.dll
C:\WINDOWS\SYSTEM32\uniplat.dll
C:\WINDOWS\SYSTEM32\UNLODCTR.EXE
C:\WINDOWS\SYSTEM32\untfs.dll
C:\WINDOWS\SYSTEM32\UNWISE.EXE
C:\WINDOWS\SYSTEM32\upnp.dll
C:\WINDOWS\SYSTEM32\upnpcont.exe
C:\WINDOWS\SYSTEM32\upnphost.dll
C:\WINDOWS\SYSTEM32\upnpui.dll
C:\WINDOWS\SYSTEM32\ups.exe
C:\WINDOWS\SYSTEM32\UREG.DLL
C:\WINDOWS\SYSTEM32\url.dll
C:\WINDOWS\SYSTEM32\urlmon.dll
C:\WINDOWS\SYSTEM32\usbmon.dll
C:\WINDOWS\SYSTEM32\usbui.dll
C:\WINDOWS\SYSTEM32\USER.EXE
C:\WINDOWS\SYSTEM32\user32.dll
C:\WINDOWS\SYSTEM32\userenv.dll
C:\WINDOWS\SYSTEM32\userinit.exe
C:\WINDOWS\SYSTEM32\USMT\guitrn.dll
C:\WINDOWS\SYSTEM32\USMT\guitrn_a.dll
C:\WINDOWS\SYSTEM32\USMT\iconlib.dll
C:\WINDOWS\SYSTEM32\USMT\log.dll
C:\WINDOWS\SYSTEM32\USMT\migism.dll
C:\WINDOWS\SYSTEM32\USMT\migism_a.dll
C:\WINDOWS\SYSTEM32\USMT\migload.exe
C:\WINDOWS\SYSTEM32\USMT\migwiz.exe
C:\WINDOWS\SYSTEM32\USMT\migwiz_a.exe
C:\WINDOWS\SYSTEM32\USMT\script.dll
C:\WINDOWS\SYSTEM32\USMT\script_a.dll
C:\WINDOWS\SYSTEM32\USMT\sysmod.dll
C:\WINDOWS\SYSTEM32\USMT\sysmod_a.dll
C:\WINDOWS\SYSTEM32\usp10.dll
C:\WINDOWS\SYSTEM32\USRCNTRA.DLL
C:\WINDOWS\SYSTEM32\USRCOINA.DLL
C:\WINDOWS\SYSTEM32\USRDPA.DLL
C:\WINDOWS\SYSTEM32\USRDTEA.DLL
C:\WINDOWS\SYSTEM32\USRFAXA.DLL
C:\WINDOWS\SYSTEM32\USRLBVA.DLL
C:\WINDOWS\SYSTEM32\USRMLNKA.EXE
C:\WINDOWS\SYSTEM32\USRPRBDA.EXE
C:\WINDOWS\SYSTEM32\USRRTOSA.DLL
C:\WINDOWS\SYSTEM32\USRSDPIA.DLL
C:\WINDOWS\SYSTEM32\USRSHUTA.EXE
C:\WINDOWS\SYSTEM32\USRSVPIA.DLL
C:\WINDOWS\SYSTEM32\USRV42A.DLL
C:\WINDOWS\SYSTEM32\USRV80A.DLL
C:\WINDOWS\SYSTEM32\USRVOICA.DLL
C:\WINDOWS\SYSTEM32\USRVPA.DLL
C:\WINDOWS\SYSTEM32\UTILDLL.DLL
C:\WINDOWS\SYSTEM32\utilman.exe
C:\WINDOWS\SYSTEM32\uxtheme.dll
C:\WINDOWS\SYSTEM32\Vb6de.dll
C:\WINDOWS\SYSTEM32\VB6FR.DLL
C:\WINDOWS\SYSTEM32\VB6STKIT.DLL
C:\WINDOWS\SYSTEM32\vbajet32.dll
C:\WINDOWS\SYSTEM32\VBAME.DLL
C:\WINDOWS\SYSTEM32\VBAR332.DLL
C:\WINDOWS\SYSTEM32\Vbhlp32.dll
C:\WINDOWS\SYSTEM32\vbscript.dll
C:\WINDOWS\SYSTEM32\vbwFunctionsVB6.dll TABLE IV-continued Windows Essential System Files C:\WINDOWS\SYSTEM32\VCDEX.DLL
C:\WINDOWS\SYSTEM32\vdmdbg.dll
C:\WINDOWS\SYSTEM32\vdmredir.dll
C:\WINDOWS\SYSTEM32\VER.DLL
C:\WINDOWS\SYSTEM32\VERIFIER.DLL
C:\WINDOWS\SYSTEM32\VERIFIER.EXE
C:\WINDOWS\SYSTEM32\version.dll
C:\WINDOWS\SYSTEM32\VFPODBC.DLL
C:\WINDOWS\SYSTEM32\vfwwdm32.dll
C:\WINDOWS\SYSTEM32\VGA.DLL
C:\WINDOWS\SYSTEM32\VGA256.DLL
C:\WINDOWS\SYSTEM32\VGA64K.DLL
C:\WINDOWS\SYSTEM32\VJOY.DLL
C:\WINDOWS\SYSTEM32\vktd.dll
C:\WINDOWS\SYSTEM32\VSS_PS.DLL
C:\WINDOWS\SYSTEM32\VSSADMIN.EXE
C:\WINDOWS\SYSTEM32\vssapi.dll
C:\WINDOWS\SYSTEM32\vssvc.exe
C:\WINDOWS\SYSTEM32\VWIPXSPX.DLL
C:\WINDOWS\SYSTEM32\VWIPXSPX.EXE
C:\WINDOWS\SYSTEM32\VXBLOCK.dll
C:\WINDOWS\SYSTEM32\vxdmdcdlg.dll
C:\WINDOWS\SYSTEM32\W32N50.dll
C:\WINDOWS\SYSTEM32\W32N50CT.dll
C:\WINDOWS\SYSTEM32\w32time.dll
C:\WINDOWS\SYSTEM32\W32TM.EXE
C:\WINDOWS\SYSTEM32\W32TOPL.DLL
C:\WINDOWS\SYSTEM32\w3ssl.dll
C:\WINDOWS\SYSTEM32\W95Inf16.dll
C:\WINDOWS\SYSTEM32\W95Inf32.dll
C:\WINDOWS\SYSTEM32\wanpacket.dll
C:\WINDOWS\SYSTEM32\watchdog.sys
C:\WINDOWS\SYSTEM32\WAVEMSP.DLL
C:\WINDOWS\SYSTEM32\WBEM\cimwin32.dll
C:\WINDOWS\SYSTEM32\WBEM\cmdevtgprov.dll
C:\WINDOWS\SYSTEM32\WBEM\DSPROV.DLL
C:\WINDOWS\SYSTEM32\WBEM\esscli.dll
C:\WINDOWS\SYSTEM32\WBEM\evntprv.dll
C:\WINDOWS\SYSTEM32\WBEM\fastprox.dll
C:\WINDOWS\SYSTEM32\WBEM\framedyn.dll
C:\WINDOWS\SYSTEM32\WBEM\FWDPROV.DLL
C:\WINDOWS\SYSTEM32\WBEM\krnlprov.dll
C:\WINDOWS\SYSTEM32\WBEM\mofcomp.exe
C:\WINDOWS\SYSTEM32\WBEM\mofd.dll
C:\WINDOWS\SYSTEM32\WBEM\MSIPROV.DLL
C:\WINDOWS\SYSTEM32\WBEM\ncprov.dll
C:\WINDOWS\SYSTEM32\WBEM\ntevt.dll
C:\WINDOWS\SYSTEM32\WBEM\policman.dll
C:\WINDOWS\SYSTEM32\WBEM\provthrd.dll
C:\WINDOWS\SYSTEM32\WBEM\repdrvfs.dll
C:\WINDOWS\SYSTEM32\WBEM\scrcons.exe
C:\WINDOWS\SYSTEM32\WBEM\SMTPCONS.DLL
C:\WINDOWS\SYSTEM32\WBEM\stdprov.dll
C:\WINDOWS\SYSTEM32\WBEM\TMPLPROV.DLL
C:\WINDOWS\SYSTEM32\WBEM\TRNSPROV.DLL
C:\WINDOWS\SYSTEM32\WBEM\UNSECAPP.EXE
C:\WINDOWS\SYSTEM32\WBEM\UPDPROV.DLL
C:\WINDOWS\SYSTEM32\WBEM\viewprov.dll
C:\WINDOWS\SYSTEM32\WBEM\WBEMADS.DLL
C:\WINDOWS\SYSTEM32\WBEM\wbemcntl.dll
C:\WINDOWS\SYSTEM32\WBEM\wbemcomn.dll
C:\WINDOWS\SYSTEM32\WBEM\wbemcons.dll
C:\WINDOWS\SYSTEM32\WBEM\wbemcore.dll
C:\WINDOWS\SYSTEM32\WBEM\wbemdisp.dll
C:\WINDOWS\SYSTEM32\WBEM\wbemess.dll
C:\WINDOWS\SYSTEM32\WBEM\wbemperf.dll
C:\WINDOWS\SYSTEM32\WBEM\wbemprox.dll
C:\WINDOWS\SYSTEM32\WBEM\wbemsvc.dll
C:\WINDOWS\SYSTEM32\WBEM\wbemtest.exe
C:\WINDOWS\SYSTEM32\WBEM\wbemupgd.dll
C:\WINDOWS\SYSTEM32\WBEM\WINMGMT.EXE
C:\WINDOWS\SYSTEM32\WBEM\WINMGMTR.DLL
C:\WINDOWS\SYSTEM32\WBEM\wmiadap.exe
C:\WINDOWS\SYSTEM32\WBEM\wmiapres.dll
C:\WINDOWS\SYSTEM32\WBEM\wmiaprpl.dll
C:\WINDOWS\SYSTEM32\WBEM\wmiapsrv.exe
C:\WINDOWS\SYSTEM32\WBEM\wmic.exe
C:\WINDOWS\SYSTEM32\WBEM\wmicookr.dll TABLE IV-continued Windows Essential System Files C:\WINDOWS\SYSTEM32\WBEM\wmidcprv.dll
C:\WINDOWS\SYSTEM32\WBEM\WMIMSG.DLL
C:\WINDOWS\SYSTEM32\WBEM\wmipcima.dll
C:\WINDOWS\SYSTEM32\WBEM\wmipdskq.dll
C:\WINDOWS\SYSTEM32\WBEM\WMIPICMP.DLL
C:\WINDOWS\SYSTEM32\WBEM\wmipiprt.dll
C:\WINDOWS\SYSTEM32\WBEM\wmipjobj.dll
C:\WINDOWS\SYSTEM32\WBEM\wmiprov.dll
C:\WINDOWS\SYSTEM32\WBEM\wmiprvsd.dll
C:\WINDOWS\SYSTEM32\WBEM\wmiprvse.exe
C:\WINDOWS\SYSTEM32\WBEM\wmipsess.dll
C:\WINDOWS\SYSTEM32\WBEM\wmisvc.dll
C:\WINDOWS\SYSTEM32\WBEM\WMITIMEP.DLL
C:\WINDOWS\SYSTEM32\WBEM\wmiutils.dll
C:\WINDOWS\SYSTEM32\WBEM\XML\WMI2XML.DLL
C:\WINDOWS\SYSTEM32\wdigest.dll
C:\WINDOWS\SYSTEM32\webcheck.dll
C:\WINDOWS\SYSTEM32\webclnt.dll
C:\WINDOWS\SYSTEM32\WEBHITS.DLL
C:\WINDOWS\SYSTEM32\webvw.dll
C:\WINDOWS\SYSTEM32\weirddlg.dll
C:\WINDOWS\SYSTEM32\wextract.exe
C:\WINDOWS\SYSTEM32\wiaacmgr.exe
C:\WINDOWS\SYSTEM32\wiadefui.dll
C:\WINDOWS\SYSTEM32\wiadss.dll
C:\WINDOWS\SYSTEM32\wiascr.dll
C:\WINDOWS\SYSTEM32\wiaservc.dll
C:\WINDOWS\SYSTEM32\wiashext.dll
C:\WINDOWS\SYSTEM32\wiavideo.dll
C:\WINDOWS\SYSTEM32\WIAVUSD.DLL
C:\WINDOWS\SYSTEM32\WIFEMAN.DLL
C:\WINDOWS\SYSTEM32\win32k.sys
C:\WINDOWS\SYSTEM32\win32spl.dll
C:\WINDOWS\SYSTEM32\WIN87EM.DLL
C:\WINDOWS\SYSTEM32\winbrand.dll
C:\WINDOWS\SYSTEM32\WINCHAT.EXE
C:\WINDOWS\SYSTEM32\WINFAX.DLL
C:\WINDOWS\SYSTEM32\WINHLP32.EXE
C:\WINDOWS\SYSTEM32\winhttp.dll
C:\WINDOWS\SYSTEM32\wininet.dll
C:\WINDOWS\SYSTEM32\winipsec.dll
C:\WINDOWS\SYSTEM32\winlogon.exe
C:\WINDOWS\SYSTEM32\WINMINE.EXE
C:\WINDOWS\SYSTEM32\winmm.dll
C:\WINDOWS\SYSTEM32\WINMSD.EXE
C:\WINDOWS\SYSTEM32\WINNLS.DLL
C:\WINDOWS\SYSTEM32\winntbbu.dll
C:\WINDOWS\SYSTEM32\winrnr.dll
C:\WINDOWS\SYSTEM32\winscard.dll
C:\WINDOWS\SYSTEM32\winshfhc.dll
C:\WINDOWS\SYSTEM32\WINSOCK.DLL
C:\WINDOWS\SYSTEM32\WINSPOOL.EXE
C:\WINDOWS\SYSTEM32\winsrv.dll
C:\WINDOWS\SYSTEM32\winsta.dll
C:\WINDOWS\SYSTEM32\WINSTRM.DLL
C:\WINDOWS\SYSTEM32\wintrust.dll
C:\WINDOWS\SYSTEM32\winver.exe
C:\WINDOWS\SYSTEM32\wkssvc.dll
C:\WINDOWS\SYSTEM32\wldap32.dll
C:\WINDOWS\SYSTEM32\wlnotify.dll
C:\WINDOWS\SYSTEM32\wmadmod.dll
C:\WINDOWS\SYSTEM32\wmadmoe.dll
C:\WINDOWS\SYSTEM32\wmasf.dll
C:\WINDOWS\SYSTEM32\wmaudsdk.dll
C:\WINDOWS\SYSTEM32\wmdmlog.dll
C:\WINDOWS\SYSTEM32\wmdmps.dll
C:\WINDOWS\SYSTEM32\WMERRENU.DLL
C:\WINDOWS\SYSTEM32\wmerror.dll
C:\WINDOWS\SYSTEM32\wmi.dll
C:\WINDOWS\SYSTEM32\wmidx.dll
C:\WINDOWS\SYSTEM32\WMIPROP.DLL
C:\WINDOWS\SYSTEM32\WMISCMGR.DLL
C:\WINDOWS\SYSTEM32\wmnetmgr.dll
C:\WINDOWS\SYSTEM32\wmp.dll
C:\WINDOWS\SYSTEM32\wmpasf.dll
C:\WINDOWS\SYSTEM32\wmpcd.dll
C:\WINDOWS\SYSTEM32\wmpcore.dll
C:\WINDOWS\SYSTEM32\wmpdxm.dll TABLE IV-continued Windows Essential System Files C:\WINDOWS\SYSTEM32\wmploc.dll
C:\WINDOWS\SYSTEM32\wmpns.dll
C:\WINDOWS\SYSTEM32\wmpshell.dll
C:\WINDOWS\SYSTEM32\WMPSTUB.EXE
C:\WINDOWS\SYSTEM32\wmpui.dll
C:\WINDOWS\SYSTEM32\wmrmcmp.exe
C:\WINDOWS\SYSTEM32\wmsdmod.dll
C:\WINDOWS\SYSTEM32\wmsdmoe.dll
C:\WINDOWS\SYSTEM32\wmsdmoe2.dll
C:\WINDOWS\SYSTEM32\wmspdmod.dll
C:\WINDOWS\SYSTEM32\wmspdmoe.dll
C:\WINDOWS\SYSTEM32\wmstream.dll
C:\WINDOWS\SYSTEM32\WMV8DMOD.DLL
C:\WINDOWS\SYSTEM32\wmv8dmoe.dll
C:\WINDOWS\SYSTEM32\wmvcore.dll
C:\WINDOWS\SYSTEM32\WMVCORE2.DLL
C:\WINDOWS\SYSTEM32\wmvdmod.dll
C:\WINDOWS\SYSTEM32\WMVDMOE.DLL
C:\WINDOWS\SYSTEM32\wmvdmoe2.dll
C:\WINDOWS\SYSTEM32\wow32.dll
C:\WINDOWS\SYSTEM32\WOWDEB.EXE
C:\WINDOWS\SYSTEM32\WOWEXEC.EXE
C:\WINDOWS\SYSTEM32\WOWFAX.DLL
C:\WINDOWS\SYSTEM32\WOWFAXUI.DLL
C:\WINDOWS\SYSTEM32\wpabaln.exe
C:\WINDOWS\SYSTEM32\wpcap.dll
C:\WINDOWS\SYSTEM32\wpnpinst.exe
C:\WINDOWS\SYSTEM32\WRITE.EXE
C:\WINDOWS\SYSTEM32\ws2_32.dll
C:\WINDOWS\SYSTEM32\ws2help.dll
C:\WINDOWS\SYSTEM32\wscntfy.exe
C:\WINDOWS\SYSTEM32\wscript.exe
C:\WINDOWS\SYSTEM32\wscsvc.dll
C:\WINDOWS\SYSTEM32\wsecedit.dll
C:\WINDOWS\SYSTEM32\WSHATM.DLL
C:\WINDOWS\SYSTEM32\wshbth.dll
C:\WINDOWS\SYSTEM32\wshcon.dll
C:\WINDOWS\SYSTEM32\wshext.dll
C:\WINDOWS\SYSTEM32\wship6.dll
C:\WINDOWS\SYSTEM32\WSHISN.DLL
C:\WINDOWS\SYSTEM32\WSHNETBS.DLL
C:\WINDOWS\SYSTEM32\wshrm.dll
C:\WINDOWS\SYSTEM32\wshtcpip.dll
C:\WINDOWS\SYSTEM32\wsnmp32.dll
C:\WINDOWS\SYSTEM32\wsock32.dll
C:\WINDOWS\SYSTEM32\wstdecod.dll
C:\WINDOWS\SYSTEM32\wtsapi32.dll
C:\WINDOWS\SYSTEM32\wuapi.dll
C:\WINDOWS\SYSTEM32\wuauclt.exe
C:\WINDOWS\SYSTEM32\wuauclt1.exe
C:\WINDOWS\SYSTEM32\wuaueng.dll
C:\WINDOWS\SYSTEM32\wuaueng1.dll
C:\WINDOWS\SYSTEM32\wuauserv.dll
C:\WINDOWS\SYSTEM32\wucltui.dll
C:\WINDOWS\SYSTEM32\WUPDMGR.EXE
C:\WINDOWS\SYSTEM32\wups.dll
C:\WINDOWS\SYSTEM32\wuweb.dll
C:\WINDOWS\SYSTEM32\wzcdlg.dll
C:\WINDOWS\SYSTEM32\wzcsapi.dll
C:\WINDOWS\SYSTEM32\wzcsvc.dll
C:\WINDOWS\SYSTEM32\xactsrv.dll
C:\WINDOWS\SYSTEM32\XceedFtp.dll
C:\WINDOWS\SYSTEM32\xcopy.exe
C:\WINDOWS\SYSTEM32\xenroll.dll
C:\WINDOWS\SYSTEM32\xmlprov.dll
C:\WINDOWS\SYSTEM32\xmlprovi.dll
C:\WINDOWS\SYSTEM32\xolehlp.dll
C:\WINDOWS\SYSTEM32\xpob2res.dll
C:\WINDOWS\SYSTEM32\XPSP1HFM.EXE
C:\WINDOWS\SYSTEM32\xpsp1res.dll
C:\WINDOWS\SYSTEM32\xpsp2res.dll
C:\WINDOWS\SYSTEM32\zipfldr.dll
C:\WINDOWS\SYSTEM32\zlib.dll
C:\WINDOWS\SYSTEM\AVICAP.DLL
C:\WINDOWS\SYSTEM\AVIFILE.DLL
C:\WINDOWS\SYSTEM\CamExL20.dll
C:\WINDOWS\SYSTEM\COMMDLG.DLL
C:\WINDOWS\SYSTEM\LZEXPAND.DLL TABLE IV-continued Windows Essential System Files C:\WINDOWS\SYSTEM\mmsystem.dll
C:\WINDOWS\SYSTEM\msvcr71.dll
C:\WINDOWS\SYSTEM\MSVIDEO.DLL
C:\WINDOWS\SYSTEM\OLECLI.DLL
C:\WINDOWS\SYSTEM\OLESVR.DLL
C:\WINDOWS\SYSTEM\SHELL.DLL
C:\WINDOWS\SYSTEM\TAPI.DLL
C:\WINDOWS\SYSTEM\VER.DLL
C:\WINDOWS\TASKMAN.EXE
C:\WINDOWS\TWAIN.DLL
C:\WINDOWS\twain_32.dll
C:\WINDOWS\TWAIN_32\LogiVid\HPortal2.dll
C:\WINDOWS\TWAIN_32\LogiVid\HVideoS2.exe
C:\WINDOWS\TWAIN_32\LogiVid\HVidSp2.dll
C:\WINDOWS\TWAIN_32\LogiVid\InstVid.exe
C:\WINDOWS\TWAIN_32\LogiVid\LHPorta2.dll
C:\WINDOWS\TWAIN_32\LogiVid\LQCT32_2.dll
C:\WINDOWS\TWAIN_32\LogiVid\msvcp71.dll
C:\WINDOWS\TWAIN_32\LogiVid\msvcr71.dll
C:\WINDOWS\TWAIN_32\LogiVid\PCSmart2.dll
C:\WINDOWS\TWAIN_32\QuickCam\HPortal.dll
C:\WINDOWS\TWAIN_32\QuickCam\HVideoS.exe
C:\WINDOWS\TWAIN_32\QuickCam\HVideoSP.dll
C:\WINDOWS\TWAIN_32\QuickCam\LHPortal.dll
C:\WINDOWS\TWAIN_32\QuickCam\LQCTwn32.dll
C:\WINDOWS\TWAIN_32\QuickCam\lvsf.dll
C:\WINDOWS\TWAIN_32\QuickCam\lvWIAext.dll
C:\WINDOWS\TWAIN_32\QuickCam\pcsmart.dll
C:\WINDOWS\TWUNK_16.EXE
C:\WINDOWS\TWUNK_32.EXE
C:\WINDOWS\UDHID.dll
C:\WINDOWS\UnDeploy.exe
C:\WINDOWS\unvise32qt.exe
C:\WINDOWS\UNWISE.EXE
C:\WINDOWS\VMMREG32.DLL
C:\WINDOWS\WINHELP.EXE
C:\WINDOWS\winhlp32.exe In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
    booting a computer system into an alternate operating system environment that is separate from said computer system's main operating system environment;
    retrieving first data from a database that is external to said computer system, said first data representing content of a clean version of a file;
    comparing said first data with second data, said second data representing content of an instance of said file that exists on said computing system and has been installed on said computing system, wherein, said file remains on said system and is not transmitted externally from said system in order to support the comparing process;
    identifying said instance of said file as being corrupt because said first data is different than said second data;
    in response to said identifying, receiving at said computer system a clean replacement file for said file; and,
    replacing said instance of said file with said clean replacement file on said computer system.

2. The method of claim 1 wherein said alternate operating system environment is booted from a removable hard disk.

3. The method of claim 2 wherein said removable hard disk is a read only memory.

4. The method of claim 2 wherein said alternate environment includes at least one of:
    a virus scanner;
    an Ad ware scanner;
    a scan disk utility.

5. The method of claim 1 wherein said method further comprises said computer system connecting to a network after said booting and before said retrieving.

6. The method of claim 1 further comprising said computer system prompting a user of said computer system to perform any of:
    signing in;
    logging in;
    signify use of a free mode of operation.

7. The method of claim 1 wherein said first data is a first checksum and said second data is a second checksum.

8. The method of claim 1 wherein said file is a DLL file.

9. The method of claim 1 wherein said comparing is performed on said computer in said alternate operating system environment.

10. The method of claim 1 wherein said method further comprises:
    after said replacing of said instance of said file with said clean replacement file, performing the following:
    operating said computer system within said main operating system environment, said replacement file available for use within said main operating system environment;
    operating any of a virus scanner, an Ad ware scanner and a scan disk utility within said main operating system environment to detect changes to files and/or registries used within said main operating system environment;

reporting notification of at least one of said changes over a network to a computing system maintenance service.

11. The method of claim 1 wherein said computer system is a client of a networked service that performs said transmitting of said replacement file, and wherein, said replacement file is taken from another client of said networked service.

12. The method of claim 1 further comprising:
retrieving through a network a configuration of said computer system;
comparing said configuration against a known good configuration; and,
in response to said comparing, modifying said configuration of said computer system through said network.

13. The method of claim 12 further comprising verifying that a software instance on said computer system is properly licensed.

14. One or more non-transitory computer readable storage media having program code stored thereon that when processed by one or more processors causes a method to be performed, said method comprising:
booting a computer system into an alternate operating system environment that is separate from said computer system's main operating system environment;
retrieving first data from a database that is external to said computer system, said first data representing content of a clean version of a file;
comparing said first data with second data, said second data representing content of an instance of said file that exists on said computing system and has been installed on said computing system, wherein, said file remains on said system and is not transmitted externally from said system in order to support the comparing process;
identifying said instance of said file as being corrupt because said first data is different than said second data;
in response to said identifying, receiving at said computer system a clean replacement file for said file; and,
replacing said instance of said file with said clean replacement file on said computer system.

15. A medium as in claim 14 wherein said alternate operating system environment is booted from a removable hard disk.

16. A medium as in claim 15 wherein said removable hard disk is a read only memory.

17. A medium as in claim 15 wherein said alternate environment includes at least one of:
a virus scanner;
an Ad ware scanner;
a scan disk utility.

18. A medium as in claim 14 wherein said method further comprises said computer system connecting to a network after said booting and before said retrieving.

19. A medium as in claim 14 further comprising said computer system prompting a user of said computer system to perform any of:
signing in;
logging in;
signify use of a free mode of operation.

20. A medium as in claim 14 wherein said first data is a first checksum and said second data is a second checksum.

* * * * *